US009823839B2

(12) United States Patent
Brown et al.

(10) Patent No.: US 9,823,839 B2
(45) Date of Patent: Nov. 21, 2017

(54) DEVICE, METHOD, AND GRAPHICAL USER INTERFACE FOR DISPLAYING ADDITIONAL INFORMATION IN RESPONSE TO A USER CONTACT

(71) Applicant: Apple Inc., Cupertino, CA (US)

(72) Inventors: Matthew I. Brown, San Francisco, CA (US); Jeffrey Traer Bernstein, San Francisco, CA (US); Julian Missig, Redwood City, CA (US); Avi E. Cieplinski, San Francisco, CA (US); May-Li Khoe, San Francisco, CA (US); Nicholas Zambetti, Largo, FL (US); Bianca C. Costanzo, Barcelona (ES); Myra Haggerty, San Mateo, CA (US); David J. Hart, San Francisco, CA (US); B. Michael Victor, Castro Valley, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/536,426

(22) Filed: Nov. 7, 2014

(65) Prior Publication Data

US 2015/0067596 A1    Mar. 5, 2015

Related U.S. Application Data

(63) Continuation of application No. PCT/US2013/040058, filed on May 8, 2013.
(Continued)

(51) Int. Cl.
*G06F 3/041*    (2006.01)
*G06F 3/0481*    (2013.01)
(Continued)

(52) U.S. Cl.
CPC ........ *G06F 3/04883* (2013.01); *G06F 3/0412* (2013.01); *G06F 3/0416* (2013.01);
(Continued)

(58) Field of Classification Search
CPC .... G06F 3/0412; G06F 3/0416; G06F 3/0481; G06F 3/0488; G06F 3/04883; G06F 3/04847; G06F 3/04812
(Continued)

(56) References Cited

U.S. PATENT DOCUMENTS 4,674,044 A    6/1987  Kalmus et al.
4,750,135 A    6/1988  Boilen
(Continued)

FOREIGN PATENT DOCUMENTS

CN    1658150    8/2005
CN    1661556    8/2005
(Continued)

OTHER PUBLICATIONS

Office Action, dated Aug. 27, 2015, received in Australian Patent Application No. 2013259614, which corresponds with U.S. Appl. No. 14/536,141, 4 pages.
(Continued)

*Primary Examiner* — Jennifer To
*Assistant Examiner* — John Repsher, III
(74) *Attorney, Agent, or Firm* — Morgan, Lewis & Bockius LLP

(57)    ABSTRACT

An electronic device, with a touch-sensitive surface and a display, includes one or more sensors to detect intensity of contacts with the touch-sensitive surface. The device detects a contact on the touch-sensitive surface while a focus selector corresponding to the contact is at a respective location on the display associated with additional information not initially displayed on the display. While the focus
(Continued)

selector is at the respective location, upon determining that the contact has an intensity above a respective intensity threshold before a predefined delay time has elapsed with the focus selector at the respective location, the device displays the additional information associated with the respective location without waiting until the predefined delay time has elapsed; and upon determining that the contact has an intensity below the respective intensity threshold, the device waits until the predefined delay time has elapsed to display the additional information associated with the respective location.

15 Claims, 87 Drawing Sheets

Related U.S. Application Data

(60) Provisional application No. 61/778,171, filed on Mar. 12, 2013, provisional application No. 61/747,278, filed on Dec. 29, 2012, provisional application No. 61/688,227, filed on May 9, 2012.

(51) Int. Cl.
    *G06F 3/0488* (2013.01)
    *G06F 3/0484* (2013.01)

(52) U.S. Cl.
    CPC .......... *G06F 3/0481* (2013.01); *G06F 3/0488* (2013.01); *G06F 3/04812* (2013.01); *G06F 3/04847* (2013.01)

(58) Field of Classification Search
    USPC .......................................................... 715/808
    See application file for complete search history.

(56) References Cited

U.S. PATENT DOCUMENTS

| | | | |
|---|---|---|---|
| 4,903,201 A | 2/1990 | Wagner |
| 5,038,284 A | 8/1991 | Kramer |
| 5,077,665 A | 12/1991 | Silverman et al. |
| 5,101,353 A | 3/1992 | Lupien et al. |
| 5,136,501 A | 8/1992 | Silverman et al. |
| 5,270,922 A | 12/1993 | Higgins |
| 5,297,031 A | 3/1994 | Gutterman et al. |
| 5,297,032 A | 3/1994 | Trojan et al. |
| 5,374,787 A | 12/1994 | Miller et al. |
| 5,455,965 A | 10/1995 | Shaughnessy et al. |
| 5,463,722 A | 10/1995 | Venolia |
| 5,510,813 A | 4/1996 | Makinwa et al. |
| 5,555,354 A | 9/1996 | Strasnick et al. |
| 5,559,301 A | 9/1996 | Bryan, Jr. et al. |
| 5,590,265 A | 12/1996 | Nakazawa |
| 5,627,914 A | 5/1997 | Pagallo |
| 5,689,651 A | 11/1997 | Lozman |
| 5,695,400 A | 12/1997 | Fennell, Jr. et al. |
| 5,710,896 A | 1/1998 | Seidl |
| 5,717,438 A | 2/1998 | Kim et al. |
| 5,717,725 A | 2/1998 | Campana, Jr. |
| 5,719,796 A | 2/1998 | Chen |
| 5,727,165 A | 3/1998 | Ordish et al. |
| 5,774,877 A | 6/1998 | Patterson, Jr. et al. |
| 5,775,996 A | 7/1998 | Othmer et al. |
| 5,793,301 A | 8/1998 | Patterson, Jr. et al. |
| 5,793,360 A | 8/1998 | Fleck et al. |
| 5,793,377 A | 8/1998 | Moore |
| 5,797,002 A | 8/1998 | Patterson, Jr. et al. |
| 5,801,692 A | 9/1998 | Muzio et al. |
| 5,805,144 A | 9/1998 | Scholder et al. |
| 5,809,267 A | 9/1998 | Moran et al. |
| 5,820,463 A | 10/1998 | O'Callaghan |
| 5,825,352 A | 10/1998 | Bisset et al. |
| 5,844,560 A | 12/1998 | Crutcher et al. |
| 5,845,266 A | 12/1998 | Lupien et al. |
| 5,872,922 A | 2/1999 | Hogan et al. |
| 5,880,733 A | 3/1999 | Horvitz et al. |
| 5,910,882 A | 6/1999 | Burrell |
| 5,915,245 A | 6/1999 | Patterson, Jr. et al. |
| 5,924,082 A | 7/1999 | Silverman et al. |
| 5,924,083 A | 7/1999 | Silverman et al. |
| 5,946,647 A | 8/1999 | Miller et al. |
| 5,946,667 A | 8/1999 | Tull, Jr. et al. |
| 5,953,708 A | 9/1999 | Midorikawa et al. |
| 5,963,923 A | 10/1999 | Garber |
| 6,002,397 A | 12/1999 | Jaaskelainen, Jr. |
| 6,012,046 A | 1/2000 | Lupien et al. |
| 6,014,643 A | 1/2000 | Minton |
| 6,031,989 A | 2/2000 | Cordell |
| 6,035,287 A | 3/2000 | Stallaert et al. |
| 6,072,488 A | 6/2000 | Mcfarland |
| 6,088,019 A | 7/2000 | Rosenberg |
| 6,088,027 A | 7/2000 | Konar et al. |
| 6,098,051 A | 8/2000 | Lupien et al. |
| 6,111,575 A | 8/2000 | Martinez et al. |
| 6,115,043 A | 9/2000 | Levine et al. |
| 6,131,087 A | 10/2000 | Luke et al. |
| 6,134,535 A | 10/2000 | Belzberg |
| 6,180,894 B1 | 1/2001 | Chao et al. |
| 6,195,647 B1 | 2/2001 | Martyn et al. |
| 6,208,329 B1 | 3/2001 | Ballare |
| 6,208,340 B1 | 3/2001 | Amin et al. |
| 6,219,034 B1 | 4/2001 | Elbing et al. |
| 6,227,743 B1 | 5/2001 | Robb |
| 6,229,542 B1 | 5/2001 | Miller |
| 6,243,080 B1 | 6/2001 | Molne |
| 6,247,000 B1 | 6/2001 | Hawkins et al. |
| 6,252,594 B1 | 6/2001 | Xia et al. |
| 6,266,684 B1 | 7/2001 | Kraus et al. |
| 6,272,474 B1 | 8/2001 | Garcia |
| 6,278,982 B1 | 8/2001 | Korhammer et al. |
| 6,282,521 B1 | 8/2001 | Howorka |
| 6,323,846 B1 | 11/2001 | Westerman et al. |
| 6,347,997 B1 | 2/2002 | Armstrong |
| 6,377,940 B2 | 4/2002 | Tilfors et al. |
| 6,396,523 B1 | 5/2002 | Segal et al. |
| 6,396,962 B1 | 5/2002 | Haffey et al. |
| 6,400,303 B2 | 6/2002 | Armstrong |
| 6,405,180 B2 | 6/2002 | Tilfors et al. |
| 6,408,282 B1 | 6/2002 | Buist |
| 6,411,998 B1 | 6/2002 | Bryant et al. |
| 6,429,846 B2 | 8/2002 | Rosenberg et al. |
| 6,448,977 B1 | 9/2002 | Braun et al. |
| 6,456,778 B2 | 9/2002 | Armstrong |
| 6,459,424 B1 | 10/2002 | Resman |
| 6,459,442 B1 | 10/2002 | Edwards et al. |
| 6,469,691 B1 | 10/2002 | Armstrong |
| 6,470,078 B1 | 10/2002 | Armstrong |
| 6,489,975 B1 | 12/2002 | Patil et al. |
| 6,489,978 B1 | 12/2002 | Gong et al. |
| 6,504,527 B1 | 1/2003 | Armstrong |
| 6,512,530 B1 | 1/2003 | Rzepkowski et al. |
| 6,512,761 B1 | 1/2003 | Schuster et al. |
| 6,532,000 B2 | 3/2003 | Armstrong |
| 6,551,357 B1 | 4/2003 | Madduri |
| 6,559,831 B1 | 5/2003 | Armstrong |
| 6,563,487 B2 | 5/2003 | Martin et al. |
| 6,567,102 B2 | 5/2003 | Kung |
| 6,570,557 B1 | 5/2003 | Westerman et al. |
| 6,583,798 B1 | 6/2003 | Hoek et al. |
| 6,590,568 B1 | 7/2003 | Astala et al. |
| 6,659,861 B1 | 12/2003 | Faris et al. |
| 6,661,438 B1 | 12/2003 | Shiraishi et al. |
| 6,670,952 B2 | 12/2003 | Jaeger et al. |
| 6,677,932 B1 | 1/2004 | Westerman |
| 6,735,307 B1 | 5/2004 | Volckers |
| 6,750,890 B1 | 6/2004 | Sugimoto |
| 6,772,132 B1 | 8/2004 | Kemp, II et al. |
| 6,822,635 B2 | 11/2004 | Shahoian et al. |
| 6,831,666 B1 | 12/2004 | Kreis |
| 6,891,551 B2 | 5/2005 | Keely et al. |
| 6,904,405 B2 | 6/2005 | Suominen |

(56) References Cited

U.S. PATENT DOCUMENTS

| | | |
|---|---|---|
| 6,906,697 B2 | 6/2005 | Rosenberg |
| 6,919,927 B1 | 7/2005 | Hyodo |
| 6,954,899 B1 | 10/2005 | Anderson |
| 7,036,088 B2 | 4/2006 | Tunney |
| 7,058,146 B2 | 6/2006 | Paulraj et al. |
| 7,114,091 B2 | 9/2006 | Vrancic |
| 7,134,093 B2 | 11/2006 | Etgen et al. |
| 7,138,983 B2 | 11/2006 | Wakai et al. |
| 7,159,189 B2 | 1/2007 | Weingart et al. |
| 7,259,752 B1 | 8/2007 | Simmons |
| 7,312,791 B2 | 12/2007 | Hoshino et al. |
| 7,346,855 B2 | 3/2008 | Hellyar et al. |
| 7,380,218 B2 | 5/2008 | Rundell |
| 7,411,575 B2 | 8/2008 | Hill et al. |
| 7,441,204 B2 | 10/2008 | Thomson et al. |
| 7,461,026 B2 | 12/2008 | Schluetter |
| 7,479,949 B2 | 1/2009 | Jobs et al. |
| 7,492,720 B2 | 2/2009 | Pruthi et al. |
| 7,532,206 B2 | 5/2009 | Morrison et al. |
| 7,533,352 B2 | 5/2009 | Chew et al. |
| 7,577,167 B2 | 8/2009 | Kikuchi et al. |
| 7,577,530 B2 | 8/2009 | Vignalou-Marche |
| 7,581,186 B2 | 8/2009 | Dowdy et al. |
| 7,614,008 B2 | 11/2009 | Ording |
| 7,619,616 B2 | 11/2009 | Rimas Ribikauskas et al. |
| 7,633,076 B2 | 12/2009 | Huppi et al. |
| 7,653,883 B2 | 1/2010 | Hotelling et al. |
| 7,656,413 B2 | 2/2010 | Khan et al. |
| 7,657,849 B2 | 2/2010 | Chaudhri et al. |
| 7,663,607 B2 | 2/2010 | Hotelling et al. |
| 7,673,255 B2 | 3/2010 | Schechter et al. |
| 7,680,513 B2 | 3/2010 | Haitani et al. |
| 7,683,889 B2 | 3/2010 | Rimas Ribikauskas et al. |
| 7,694,231 B2 | 4/2010 | Kocienda et al. |
| 7,694,236 B2 | 4/2010 | Gusmorino et al. |
| 7,739,604 B1 | 6/2010 | Lyons et al. |
| 7,743,348 B2 | 6/2010 | Robbins et al. |
| 7,752,115 B2 | 7/2010 | Schluetter |
| 7,757,185 B2 | 7/2010 | Paquette et al. |
| 7,760,187 B2 | 7/2010 | Kennedy |
| 7,787,026 B1 | 8/2010 | Flory et al. |
| 7,788,595 B2 | 8/2010 | Biwer et al. |
| 7,797,642 B1 | 9/2010 | Karam et al. |
| 7,801,796 B2 | 9/2010 | Friedman et al. |
| 7,801,950 B2 | 9/2010 | Eisenstadt et al. |
| 7,812,826 B2 | 10/2010 | Ording et al. |
| 7,817,568 B2 | 10/2010 | Paik et al. |
| 7,844,914 B2 | 11/2010 | Andre et al. |
| 7,880,728 B2 | 2/2011 | de los Reyes et al. |
| 7,890,862 B2 | 2/2011 | Kompe et al. |
| 7,903,090 B2 | 3/2011 | Soss et al. |
| 7,921,373 B2 | 4/2011 | Yamashita et al. |
| 7,952,566 B2 | 5/2011 | Poupyrev et al. |
| 7,956,847 B2 | 6/2011 | Christie |
| 7,957,762 B2 | 6/2011 | Herz et al. |
| 7,966,352 B2 | 6/2011 | Madan et al. |
| 7,973,778 B2 | 7/2011 | Chen |
| 8,001,189 B2 | 8/2011 | Nielsen et al. |
| 8,006,002 B2 | 8/2011 | Kalayjian et al. |
| 8,010,900 B2 | 8/2011 | Hart et al. |
| 8,020,028 B1 | 9/2011 | Lutter |
| 8,024,670 B1 | 9/2011 | Rahmation et al. |
| 8,040,142 B1 | 10/2011 | Bokma et al. |
| 8,046,712 B2 | 10/2011 | Landman et al. |
| 8,106,856 B2 | 1/2012 | Matas et al. |
| 8,125,440 B2 | 2/2012 | Guyot-Sionnest et al. |
| 8,125,492 B1 | 2/2012 | Wainwright et al. |
| RE43,448 E | 6/2012 | Kimoto et al. |
| 8,209,628 B1 | 6/2012 | Davidson |
| 8,214,768 B2 | 7/2012 | Boule et al. |
| 8,239,784 B2 | 8/2012 | Hotelling et al. |
| 8,279,180 B2 | 10/2012 | Hotelling et al. |
| 8,363,020 B2 | 1/2013 | Li et al. |
| 8,381,135 B2 | 2/2013 | Hotelling et al. |
| 8,390,583 B2 | 3/2013 | Forutanpour et al. |
| 8,423,089 B2 | 4/2013 | Song et al. |
| 8,438,504 B2 | 5/2013 | Cranfill et al. |
| 8,446,376 B2 | 5/2013 | Levy et al. |
| 8,456,431 B2 | 6/2013 | Victor |
| 8,466,889 B2 | 6/2013 | Tong et al. |
| 8,479,122 B2 | 7/2013 | Hotelling et al. |
| 8,508,494 B2 | 8/2013 | Moore |
| 8,542,205 B1 | 9/2013 | Keller |
| 8,553,092 B2 | 10/2013 | Tezuka et al. |
| 8,581,870 B2 | 11/2013 | Bokma et al. |
| 8,587,542 B2 | 11/2013 | Moore |
| 8,593,415 B2 | 11/2013 | Han et al. |
| 8,625,882 B2 | 1/2014 | Backlund et al. |
| 8,638,311 B2 | 1/2014 | Kang et al. |
| 8,665,227 B2 | 3/2014 | Gunawan |
| 8,669,945 B2 | 3/2014 | Coddington |
| 8,674,932 B2 | 3/2014 | Armstrong |
| 8,698,765 B1 * | 4/2014 | Keller ............... G06F 17/2735 340/407.2 |
| 8,698,845 B2 | 4/2014 | Lemay |
| 8,717,305 B2 | 5/2014 | Williamson et al. |
| 8,743,069 B2 | 6/2014 | Morton et al. |
| 8,773,389 B1 | 7/2014 | Freed |
| 8,788,964 B2 | 7/2014 | Shin et al. |
| 8,793,577 B2 | 7/2014 | Schellingerhout et al. |
| 8,799,816 B2 | 8/2014 | Wells et al. |
| 8,806,369 B2 | 8/2014 | Khoe et al. |
| 8,854,316 B2 | 10/2014 | Shenfield |
| 8,872,729 B2 | 10/2014 | Lyons et al. |
| 8,872,773 B2 | 10/2014 | Mak et al. |
| 8,875,044 B2 | 10/2014 | Ozawa et al. |
| 8,881,062 B2 | 11/2014 | Kim et al. |
| 8,914,732 B2 | 12/2014 | Jun et al. |
| 8,952,987 B2 | 2/2015 | Momeyer et al. |
| 8,959,430 B1 | 2/2015 | Spivak et al. |
| 8,976,128 B2 | 3/2015 | Moore |
| 9,026,932 B1 | 5/2015 | Dixon |
| 9,030,419 B1 | 5/2015 | Freed |
| 9,030,436 B2 | 5/2015 | Ikeda |
| 9,058,186 B2 | 6/2015 | Chaudhri |
| 9,069,460 B2 | 6/2015 | Moore |
| 9,086,755 B2 | 7/2015 | Cho et al. |
| 9,092,058 B2 | 7/2015 | Kasahara et al. |
| 9,098,188 B2 | 8/2015 | Kim |
| 9,116,571 B2 | 8/2015 | Zeliff et al. |
| 9,122,364 B2 | 9/2015 | Kuwabara et al. |
| 9,148,618 B2 | 9/2015 | Matas et al. |
| 9,164,779 B2 | 10/2015 | Brakensiek et al. |
| 9,170,607 B2 | 10/2015 | Bose et al. |
| 9,218,105 B2 | 12/2015 | Mansson et al. |
| 9,244,562 B1 | 1/2016 | Rosenberg et al. |
| 9,244,576 B1 | 1/2016 | Vadagave et al. |
| 9,244,601 B2 | 1/2016 | Kim et al. |
| 9,246,487 B2 | 1/2016 | Casparian et al. |
| 9,262,002 B2 | 2/2016 | Momeyer et al. |
| 9,304,668 B2 | 4/2016 | Rezende et al. |
| 9,307,112 B2 | 4/2016 | Molgaard et al. |
| 9,349,552 B2 | 5/2016 | Huska et al. |
| 9,361,018 B2 | 6/2016 | Defazio et al. |
| 9,389,718 B1 | 7/2016 | Letourneur |
| 9,389,722 B2 | 7/2016 | Matsuki et al. |
| 9,400,581 B2 | 7/2016 | Bokma et al. |
| 9,405,367 B2 | 8/2016 | Jung et al. |
| 9,417,754 B2 | 8/2016 | Smith |
| 9,436,344 B2 | 9/2016 | Kuwabara et al. |
| 9,471,145 B2 | 10/2016 | Langlois et al. |
| 9,477,393 B2 | 10/2016 | Zambetti et al. |
| 9,542,013 B2 | 1/2017 | Dearman et al. |
| 9,600,114 B2 | 3/2017 | Milam et al. |
| 9,600,116 B2 | 3/2017 | Tao et al. |
| 2001/0024195 A1 | 9/2001 | Hayakawa et al. |
| 2001/0045965 A1 | 11/2001 | Orbanes et al. |
| 2002/0008691 A1 | 1/2002 | Hanajima et al. |
| 2002/0015024 A1 | 2/2002 | Westerman et al. |
| 2002/0015064 A1 | 2/2002 | Robotham et al. |
| 2002/0023038 A1 | 2/2002 | Fritsch et al. |
| 2002/0026321 A1 | 2/2002 | Faris et al. |
| 2002/0027957 A1 | 3/2002 | Paulraj et al. |
| 2002/0035534 A1 | 3/2002 | Buist et al. |

(56) References Cited

U.S. PATENT DOCUMENTS

| | | |
|---|---|---|
| 2002/0055899 A1 | 5/2002 | Williams |
| 2002/0073016 A1 | 6/2002 | Furbush et al. |
| 2002/0075289 A1 | 6/2002 | Hatori et al. |
| 2002/0077117 A1 | 6/2002 | Cloutier et al. |
| 2002/0107748 A1 | 8/2002 | Boies et al. |
| 2002/0109678 A1 | 8/2002 | Marmolin et al. |
| 2002/0120837 A1 | 8/2002 | Maxemchuk et al. |
| 2002/0138401 A1 | 9/2002 | Allen et al. |
| 2002/0140680 A1 | 10/2002 | Lu |
| 2002/0149609 A1 | 10/2002 | Suzuki et al. |
| 2002/0149630 A1 | 10/2002 | Kitainik et al. |
| 2002/0161687 A1 | 10/2002 | Serkin et al. |
| 2002/0161693 A1 | 10/2002 | Greenwald |
| 2002/0178102 A1 | 11/2002 | Scheinberg et al. |
| 2002/0180763 A1 | 12/2002 | Kung |
| 2003/0001869 A1 | 1/2003 | Nissen |
| 2003/0074413 A1 | 4/2003 | Nielsen et al. |
| 2003/0086496 A1 | 5/2003 | Zhang et al. |
| 2003/0112269 A1 | 6/2003 | Lentz et al. |
| 2003/0117440 A1 | 6/2003 | Hellyar et al. |
| 2003/0119562 A1 | 6/2003 | Kokubo |
| 2003/0151589 A1 | 8/2003 | Bensen et al. |
| 2003/0177154 A1 | 9/2003 | Vrancic |
| 2003/0184574 A1 | 10/2003 | Phillips et al. |
| 2003/0189647 A1 | 10/2003 | Kang |
| 2003/0206169 A1 | 11/2003 | Springer et al. |
| 2003/0222915 A1 | 12/2003 | Marion et al. |
| 2004/0021643 A1 | 2/2004 | Hoshino et al. |
| 2004/0025112 A1 | 2/2004 | Chasen et al. |
| 2004/0056849 A1 | 3/2004 | Lohbihler et al. |
| 2004/0085328 A1 | 5/2004 | Maruyama et al. |
| 2004/0108995 A1 | 6/2004 | Hoshino et al. |
| 2004/0138849 A1 | 7/2004 | Schmidt et al. |
| 2004/0150631 A1 | 8/2004 | Fleck et al. |
| 2004/0150644 A1 | 8/2004 | Kincaid et al. |
| 2004/0155908 A1 | 8/2004 | Wagner |
| 2004/0174398 A1 | 9/2004 | Luke et al. |
| 2004/0174399 A1 | 9/2004 | Wu et al. |
| 2004/0219969 A1 | 11/2004 | Casey et al. |
| 2005/0012723 A1 | 1/2005 | Pallakoff |
| 2005/0022138 A1 | 1/2005 | Tunney |
| 2005/0073961 A1 | 4/2005 | Paik et al. |
| 2005/0110769 A1 | 5/2005 | DaCosta et al. |
| 2005/0114785 A1 | 5/2005 | Finnigan et al. |
| 2005/0125742 A1 | 6/2005 | Grotjohn et al. |
| 2005/0132297 A1* | 6/2005 | Milic-Frayling . G06F 17/30873 715/745 |
| 2005/0134578 A1 | 6/2005 | Chambers et al. |
| 2005/0177798 A1 | 8/2005 | Thomson et al. |
| 2005/0183017 A1 | 8/2005 | Cain |
| 2005/0183035 A1 | 8/2005 | Ringel et al. |
| 2005/0184973 A1 | 8/2005 | Lum et al. |
| 2005/0190059 A1 | 9/2005 | Wehrenberg |
| 2005/0190280 A1 | 9/2005 | Haas et al. |
| 2005/0204295 A1 | 9/2005 | Voorhees et al. |
| 2005/0223338 A1 | 10/2005 | Partanen |
| 2005/0229112 A1 | 10/2005 | Clay et al. |
| 2005/0289476 A1 | 12/2005 | Tokkonen |
| 2006/0017692 A1 | 1/2006 | Wehrenberg et al. |
| 2006/0022955 A1* | 2/2006 | Kennedy .............. G06F 3/0414 345/173 |
| 2006/0022956 A1 | 2/2006 | Lengeling et al. |
| 2006/0026535 A1 | 2/2006 | Hotelling et al. |
| 2006/0026536 A1 | 2/2006 | Hotelling et al. |
| 2006/0033724 A1 | 2/2006 | Chaudhri et al. |
| 2006/0036971 A1 | 2/2006 | Mendel et al. |
| 2006/0041846 A1 | 2/2006 | Masselle et al. |
| 2006/0055662 A1 | 3/2006 | Rimas-Ribikauskas et al. |
| 2006/0059436 A1 | 3/2006 | Nurmi |
| 2006/0067677 A1 | 3/2006 | Tokiwa et al. |
| 2006/0101347 A1 | 5/2006 | Runov et al. |
| 2006/0107226 A1 | 5/2006 | Matthews et al. |
| 2006/0109252 A1 | 5/2006 | Kolmykov-Zotov et al. |
| 2006/0109256 A1 | 5/2006 | Grant et al. |
| 2006/0119586 A1 | 6/2006 | Grant et al. |
| 2006/0132455 A1 | 6/2006 | Rimas-Ribikauskas et al. |
| 2006/0132456 A1 | 6/2006 | Anson |
| 2006/0132457 A1 | 6/2006 | Rimas-Ribikauskas et al. |
| 2006/0136834 A1 | 6/2006 | Cao et al. |
| 2006/0136845 A1 | 6/2006 | Rimas-Ribikauskas et al. |
| 2006/0161861 A1 | 7/2006 | Holecek et al. |
| 2006/0161868 A1 | 7/2006 | Van et al. |
| 2006/0161870 A1 | 7/2006 | Hotelling et al. |
| 2006/0197753 A1 | 9/2006 | Hotelling |
| 2006/0212812 A1 | 9/2006 | Simmons et al. |
| 2006/0213754 A1 | 9/2006 | Jarrett et al. |
| 2006/0224986 A1 | 10/2006 | Lindsay et al. |
| 2006/0233248 A1 | 10/2006 | Rynderman et al. |
| 2006/0242602 A1 | 10/2006 | Schechter et al. |
| 2006/0265653 A1 | 11/2006 | Paasonen et al. |
| 2006/0274042 A1 | 12/2006 | Krah et al. |
| 2006/0277469 A1 | 12/2006 | Chaudhri et al. |
| 2006/0282778 A1 | 12/2006 | Barsness et al. |
| 2006/0284858 A1 | 12/2006 | Rekimoto |
| 2006/0290681 A1 | 12/2006 | Ho et al. |
| 2007/0004451 A1 | 1/2007 | Anderson |
| 2007/0004461 A1 | 1/2007 | Bathina et al. |
| 2007/0024595 A1 | 2/2007 | Baker et al. |
| 2007/0024646 A1 | 2/2007 | Saarinen et al. |
| 2007/0070066 A1 | 3/2007 | Bakhash |
| 2007/0080953 A1 | 4/2007 | Lii |
| 2007/0113681 A1 | 5/2007 | Nishimura et al. |
| 2007/0115264 A1 | 5/2007 | Yu et al. |
| 2007/0120835 A1 | 5/2007 | Sato |
| 2007/0124699 A1 | 5/2007 | Michaels |
| 2007/0128899 A1 | 6/2007 | Mayer |
| 2007/0152980 A1 | 7/2007 | Kocienda et al. |
| 2007/0157089 A1 | 7/2007 | Van Os et al. |
| 2007/0168369 A1 | 7/2007 | Bruns |
| 2007/0168890 A1 | 7/2007 | Zhao et al. |
| 2007/0176904 A1 | 8/2007 | Russo |
| 2007/0186178 A1 | 8/2007 | Schiller |
| 2007/0220445 A1 | 9/2007 | Yach et al. |
| 2007/0222768 A1 | 9/2007 | Geurts et al. |
| 2007/0226327 A1 | 9/2007 | Redpath |
| 2007/0229455 A1 | 10/2007 | Martin et al. |
| 2007/0229464 A1 | 10/2007 | Hotelling et al. |
| 2007/0236450 A1 | 10/2007 | Colgate et al. |
| 2007/0236477 A1 | 10/2007 | Ryu et al. |
| 2007/0245241 A1 | 10/2007 | Bertram et al. |
| 2007/0245249 A1 | 10/2007 | Weisberg |
| 2007/0257821 A1 | 11/2007 | Son et al. |
| 2007/0262964 A1 | 11/2007 | Zotov et al. |
| 2007/0270186 A1 | 11/2007 | Gullikson et al. |
| 2007/0294295 A1 | 12/2007 | Finkelstein et al. |
| 2007/0294639 A1 | 12/2007 | Van Berkel et al. |
| 2007/0296333 A1 | 12/2007 | Kim et al. |
| 2008/0001924 A1 | 1/2008 | de los Reyes et al. |
| 2008/0024459 A1 | 1/2008 | Poupyrev et al. |
| 2008/0034306 A1 | 2/2008 | Ording |
| 2008/0034331 A1 | 2/2008 | Josephsoon et al. |
| 2008/0036743 A1 | 2/2008 | Westerman et al. |
| 2008/0051989 A1 | 2/2008 | Welsh |
| 2008/0052945 A1 | 3/2008 | Matas et al. |
| 2008/0066010 A1 | 3/2008 | Brodersen et al. |
| 2008/0094367 A1 | 4/2008 | Van De Ven et al. |
| 2008/0094368 A1 | 4/2008 | Ording et al. |
| 2008/0106523 A1 | 5/2008 | Conrad |
| 2008/0109753 A1 | 5/2008 | Karstens |
| 2008/0136790 A1 | 6/2008 | Hio |
| 2008/0155415 A1 | 6/2008 | Yoon et al. |
| 2008/0165144 A1 | 7/2008 | Forstall et al. |
| 2008/0165152 A1 | 7/2008 | Forstall et al. |
| 2008/0168379 A1 | 7/2008 | Forstall et al. |
| 2008/0168395 A1 | 7/2008 | Ording et al. |
| 2008/0168401 A1 | 7/2008 | Boule et al. |
| 2008/0168403 A1* | 7/2008 | Westerman ......... G06F 3/04883 715/863 |
| 2008/0202824 A1 | 8/2008 | Philipp et al. |
| 2008/0204424 A1 | 8/2008 | Jin et al. |
| 2008/0204427 A1 | 8/2008 | Heesemans et al. |
| 2008/0211959 A1 | 9/2008 | Balram et al. |
| 2008/0219493 A1 | 9/2008 | Tadmor |
| 2008/0222545 A1 | 9/2008 | Lemay et al. |

(56) References Cited

U.S. PATENT DOCUMENTS

| | | |
|---|---|---|
| 2008/0222569 A1 | 9/2008 | Champion et al. |
| 2008/0259046 A1 | 10/2008 | Carsanaro |
| 2008/0263452 A1 | 10/2008 | Tomkins |
| 2008/0270910 A1 | 10/2008 | Lukasik et al. |
| 2008/0284866 A1 | 11/2008 | Mizutani |
| 2008/0294984 A1 | 11/2008 | Ramsay et al. |
| 2008/0297475 A1 | 12/2008 | Woolf et al. |
| 2008/0307335 A1 | 12/2008 | Chaudhri et al. |
| 2008/0307351 A1 | 12/2008 | Louch et al. |
| 2008/0307359 A1 | 12/2008 | Louch et al. |
| 2008/0307360 A1 | 12/2008 | Chaudhri et al. |
| 2008/0316183 A1 | 12/2008 | Westerman et al. |
| 2008/0317378 A1 | 12/2008 | Steinberg et al. |
| 2008/0320391 A1 | 12/2008 | Lemay et al. |
| 2008/0320419 A1 | 12/2008 | Matas et al. |
| 2009/0002392 A1 | 1/2009 | Hou et al. |
| 2009/0007017 A1 | 1/2009 | Anzures et al. |
| 2009/0036108 A1 | 2/2009 | Cho |
| 2009/0037846 A1 | 2/2009 | Spalink et al. |
| 2009/0046110 A1 | 2/2009 | Sadler et al. |
| 2009/0051667 A1 | 2/2009 | Park et al. |
| 2009/0058828 A1* | 3/2009 | Jiang .................. G06F 3/0488 345/173 |
| 2009/0066668 A1 | 3/2009 | Kim et al. |
| 2009/0073118 A1 | 3/2009 | Yamaji et al. |
| 2009/0083665 A1 | 3/2009 | Anttila et al. |
| 2009/0085878 A1 | 4/2009 | Heubel et al. |
| 2009/0085881 A1 | 4/2009 | Keam |
| 2009/0085886 A1 | 4/2009 | Huang et al. |
| 2009/0089293 A1 | 4/2009 | Garritano et al. |
| 2009/0094562 A1 | 4/2009 | Jeong et al. |
| 2009/0100343 A1 | 4/2009 | Lee et al. |
| 2009/0102804 A1 | 4/2009 | Wong et al. |
| 2009/0102805 A1 | 4/2009 | Meijer et al. |
| 2009/0140985 A1 | 6/2009 | Liu |
| 2009/0158198 A1 | 6/2009 | Hayter et al. |
| 2009/0160793 A1 | 6/2009 | Rekimoto |
| 2009/0160814 A1 | 6/2009 | Li et al. |
| 2009/0167507 A1 | 7/2009 | Maenpaa |
| 2009/0167508 A1 | 7/2009 | Fadell et al. |
| 2009/0167509 A1 | 7/2009 | Fadell et al. |
| 2009/0167704 A1 | 7/2009 | Terlizzi et al. |
| 2009/0167728 A1 | 7/2009 | Geaghan et al. |
| 2009/0169061 A1 | 7/2009 | Anderson et al. |
| 2009/0197635 A1 | 8/2009 | Kim et al. |
| 2009/0225037 A1 | 9/2009 | Williamson et al. |
| 2009/0237374 A1 | 9/2009 | Li et al. |
| 2009/0247112 A1 | 10/2009 | Lundy et al. |
| 2009/0256947 A1 | 10/2009 | Ciurea et al. |
| 2009/0267906 A1 | 10/2009 | Schroderus |
| 2009/0282360 A1 | 11/2009 | Park et al. |
| 2009/0293007 A1 | 11/2009 | Duarte et al. |
| 2009/0293009 A1 | 11/2009 | Meserth et al. |
| 2009/0303187 A1 | 12/2009 | Pallakoff |
| 2009/0307633 A1 | 12/2009 | Haughay, Jr. et al. |
| 2009/0322893 A1 | 12/2009 | Stallings et al. |
| 2010/0007926 A1 | 1/2010 | Imaizumi et al. |
| 2010/0011304 A1 | 1/2010 | Van Os |
| 2010/0013777 A1 | 1/2010 | Baudisch et al. |
| 2010/0017710 A1 | 1/2010 | Kim et al. |
| 2010/0023858 A1 | 1/2010 | Ryu et al. |
| 2010/0026640 A1 | 2/2010 | Kim et al. |
| 2010/0026647 A1 | 2/2010 | Abe et al. |
| 2010/0039446 A1 | 2/2010 | Hillis et al. |
| 2010/0044121 A1 | 2/2010 | Simon et al. |
| 2010/0057235 A1 | 3/2010 | Wang et al. |
| 2010/0058231 A1 | 3/2010 | Duarte et al. |
| 2010/0070908 A1 | 3/2010 | Mori et al. |
| 2010/0073329 A1 | 3/2010 | Raman et al. |
| 2010/0083116 A1 | 4/2010 | Akifusa et al. |
| 2010/0085302 A1 | 4/2010 | Fairweather et al. |
| 2010/0085314 A1 | 4/2010 | Kwok |
| 2010/0085317 A1 | 4/2010 | Park et al. |
| 2010/0088596 A1 | 4/2010 | Griffin et al. |
| 2010/0088628 A1 | 4/2010 | Flygh et al. |
| 2010/0088639 A1 | 4/2010 | Yach et al. |
| 2010/0090988 A1 | 4/2010 | Park |
| 2010/0125816 A1 | 5/2010 | Bezos |
| 2010/0127983 A1 | 5/2010 | Irani et al. |
| 2010/0128002 A1 | 5/2010 | Stacy et al. |
| 2010/0138776 A1 | 6/2010 | Korhonen |
| 2010/0148999 A1 | 6/2010 | Casparian et al. |
| 2010/0149096 A1 | 6/2010 | Migos et al. |
| 2010/0156812 A1 | 6/2010 | Stallings et al. |
| 2010/0156813 A1 | 6/2010 | Duarte et al. |
| 2010/0156818 A1 | 6/2010 | Burrough et al. |
| 2010/0156823 A1 | 6/2010 | Paleczny et al. |
| 2010/0156825 A1 | 6/2010 | Sohn et al. |
| 2010/0171713 A1 | 7/2010 | Kwok et al. |
| 2010/0175023 A1 | 7/2010 | Gatlin et al. |
| 2010/0180225 A1 | 7/2010 | Chiba et al. |
| 2010/0194693 A1 | 8/2010 | Selin et al. |
| 2010/0199227 A1 | 8/2010 | Xiao et al. |
| 2010/0211872 A1 | 8/2010 | Rolston et al. |
| 2010/0214257 A1 | 8/2010 | Wussler et al. |
| 2010/0225604 A1 | 9/2010 | Homma et al. |
| 2010/0228644 A1 | 9/2010 | Schluetter |
| 2010/0231534 A1 | 9/2010 | Chaudhri et al. |
| 2010/0235726 A1 | 9/2010 | Ording et al. |
| 2010/0235735 A1 | 9/2010 | Ording et al. |
| 2010/0235746 A1 | 9/2010 | Anzures |
| 2010/0251168 A1 | 9/2010 | Fujita et al. |
| 2010/0269039 A1 | 10/2010 | Pahlavan et al. |
| 2010/0271312 A1 | 10/2010 | Alameh et al. |
| 2010/0271500 A1 | 10/2010 | Park et al. |
| 2010/0289807 A1 | 11/2010 | Yu et al. |
| 2010/0299597 A1 | 11/2010 | Shin et al. |
| 2010/0302177 A1 | 12/2010 | Kim et al. |
| 2010/0302179 A1 | 12/2010 | Ahn et al. |
| 2010/0306702 A1 | 12/2010 | Warner |
| 2010/0308983 A1 | 12/2010 | Conte et al. |
| 2010/0309147 A1 | 12/2010 | Fleizach et al. |
| 2010/0313124 A1 | 12/2010 | Privault et al. |
| 2010/0313156 A1 | 12/2010 | Louch et al. |
| 2010/0313158 A1 | 12/2010 | Lee et al. |
| 2010/0313166 A1 | 12/2010 | Nakayama et al. |
| 2010/0315417 A1 | 12/2010 | Cho et al. |
| 2010/0315438 A1 | 12/2010 | Horodezky et al. |
| 2010/0321301 A1 | 12/2010 | Casparian et al. |
| 2010/0325578 A1 | 12/2010 | Mital et al. |
| 2011/0010626 A1 | 1/2011 | Fino et al. |
| 2011/0018695 A1 | 1/2011 | Bells et al. |
| 2011/0035662 A1 | 2/2011 | King et al. |
| 2011/0043652 A1 | 2/2011 | King et al. |
| 2011/0050588 A1 | 3/2011 | Li et al. |
| 2011/0050591 A1 | 3/2011 | Kim et al. |
| 2011/0050594 A1 | 3/2011 | Kim et al. |
| 2011/0050629 A1 | 3/2011 | Homma et al. |
| 2011/0050630 A1 | 3/2011 | Ikeda |
| 2011/0050653 A1 | 3/2011 | Miyazawa et al. |
| 2011/0054837 A1 | 3/2011 | Ikeda |
| 2011/0055135 A1 | 3/2011 | Dawson et al. |
| 2011/0055741 A1 | 3/2011 | Jeon et al. |
| 2011/0057886 A1 | 3/2011 | Ng et al. |
| 2011/0057903 A1 | 3/2011 | Yamano et al. |
| 2011/0061029 A1 | 3/2011 | Yeh et al. |
| 2011/0063248 A1 | 3/2011 | Yoon |
| 2011/0069012 A1 | 3/2011 | Martensson |
| 2011/0069016 A1 | 3/2011 | Victor |
| 2011/0074697 A1 | 3/2011 | Rapp et al. |
| 2011/0080350 A1 | 4/2011 | Almalki et al. |
| 2011/0084910 A1 | 4/2011 | Almalki et al. |
| 2011/0087982 A1 | 4/2011 | McCann et al. |
| 2011/0087983 A1 | 4/2011 | Shim |
| 2011/0093815 A1 | 4/2011 | Gobeil |
| 2011/0093817 A1 | 4/2011 | Song et al. |
| 2011/0096174 A1 | 4/2011 | King et al. |
| 2011/0107272 A1 | 5/2011 | Aquilar |
| 2011/0115721 A1 | 5/2011 | Li et al. |
| 2011/0116716 A1 | 5/2011 | Kwon et al. |
| 2011/0122087 A1 | 5/2011 | Jang et al. |
| 2011/0138295 A1 | 6/2011 | Momchilov et al. |
| 2011/0141031 A1 | 6/2011 | McCullough et al. |
| 2011/0141052 A1 | 6/2011 | Bernstein et al. |

(56) References Cited

U.S. PATENT DOCUMENTS

| | | |
|---|---|---|
| 2011/0144777 A1 | 6/2011 | Firkins et al. |
| 2011/0145068 A1 | 6/2011 | King et al. |
| 2011/0145752 A1 | 6/2011 | Fagans |
| 2011/0145753 A1 | 6/2011 | Prakash |
| 2011/0145764 A1 | 6/2011 | Higuchi et al. |
| 2011/0149138 A1 | 6/2011 | Watkins et al. |
| 2011/0163971 A1 | 7/2011 | Wagner et al. |
| 2011/0164042 A1 | 7/2011 | Chaudhri |
| 2011/0167058 A1 | 7/2011 | Van Os |
| 2011/0167339 A1 | 7/2011 | Lemay |
| 2011/0167382 A1 | 7/2011 | Van Os |
| 2011/0169765 A1 | 7/2011 | Aono |
| 2011/0175830 A1 | 7/2011 | Miyazawa et al. |
| 2011/0179368 A1 | 7/2011 | King et al. |
| 2011/0179381 A1 | 7/2011 | King |
| 2011/0181538 A1 | 7/2011 | Aono |
| 2011/0185299 A1 | 7/2011 | Hinckley et al. |
| 2011/0185300 A1 | 7/2011 | Hinckley et al. |
| 2011/0185316 A1 | 7/2011 | Reid et al. |
| 2011/0193809 A1 | 8/2011 | Walley et al. |
| 2011/0193881 A1 | 8/2011 | Rydenhag |
| 2011/0197160 A1 | 8/2011 | Kim et al. |
| 2011/0201387 A1 | 8/2011 | Paek et al. |
| 2011/0202834 A1 | 8/2011 | Mandryk et al. |
| 2011/0202853 A1 | 8/2011 | Mujkic |
| 2011/0202872 A1 | 8/2011 | Park |
| 2011/0205163 A1 | 8/2011 | Hinckley et al. |
| 2011/0209088 A1 | 8/2011 | Hinckley et al. |
| 2011/0209093 A1 | 8/2011 | Hinckley et al. |
| 2011/0209099 A1 | 8/2011 | Hinckley et al. |
| 2011/0210931 A1 | 9/2011 | Shai |
| 2011/0215914 A1 | 9/2011 | Edwards |
| 2011/0221684 A1 | 9/2011 | Rydenhag |
| 2011/0221776 A1 | 9/2011 | Shimotani et al. |
| 2011/0231789 A1 | 9/2011 | Bukurak et al. |
| 2011/0238690 A1 | 9/2011 | Arrasvuori et al. |
| 2011/0239110 A1 | 9/2011 | Garrett et al. |
| 2011/0242029 A1 | 10/2011 | Kasahara et al. |
| 2011/0246877 A1 | 10/2011 | Kwak et al. |
| 2011/0248948 A1 | 10/2011 | Griffin et al. |
| 2011/0252357 A1 | 10/2011 | Chaudhri |
| 2011/0252362 A1 | 10/2011 | Cho et al. |
| 2011/0252376 A1 | 10/2011 | Chaudhri et al. |
| 2011/0258537 A1 | 10/2011 | Rives et al. |
| 2011/0258582 A1 | 10/2011 | Bang |
| 2011/0263298 A1 | 10/2011 | Park |
| 2011/0267530 A1 | 11/2011 | Chun |
| 2011/0279380 A1 | 11/2011 | Weber et al. |
| 2011/0279381 A1 | 11/2011 | Tong et al. |
| 2011/0279395 A1 | 11/2011 | Kuwabara et al. |
| 2011/0279852 A1 | 11/2011 | Oda et al. |
| 2011/0285656 A1 | 11/2011 | Yaksick et al. |
| 2011/0285659 A1 | 11/2011 | Kuwabara et al. |
| 2011/0291951 A1 | 12/2011 | Tong |
| 2011/0296333 A1 | 12/2011 | Bateman et al. |
| 2011/0296351 A1 | 12/2011 | Ewing, Jr. et al. |
| 2011/0304559 A1 | 12/2011 | Pasquero |
| 2011/0304577 A1 | 12/2011 | Brown et al. |
| 2011/0307778 A1 | 12/2011 | Tsai et al. |
| 2011/0310049 A1 | 12/2011 | Homma et al. |
| 2012/0011437 A1 | 1/2012 | James et al. |
| 2012/0013541 A1 | 1/2012 | Boka et al. |
| 2012/0013542 A1 | 1/2012 | Shenfield |
| 2012/0019448 A1 | 1/2012 | Pitkanen et al. |
| 2012/0026110 A1 | 2/2012 | Yamano |
| 2012/0036556 A1 | 2/2012 | LeBeau et al. |
| 2012/0038580 A1* | 2/2012 | Sasaki ............... G06F 3/016 345/173 |
| 2012/0044153 A1 | 2/2012 | Arrasvuori et al. |
| 2012/0056837 A1 | 3/2012 | Park et al. |
| 2012/0056848 A1 | 3/2012 | Yamano et al. |
| 2012/0062564 A1* | 3/2012 | Miyashita ............ G06F 1/1626 345/419 |
| 2012/0062604 A1 | 3/2012 | Lobo et al. |
| 2012/0066630 A1 | 3/2012 | Kim et al. |
| 2012/0066648 A1 | 3/2012 | Rolleston et al. |
| 2012/0081375 A1 | 4/2012 | Robert et al. |
| 2012/0084689 A1 | 4/2012 | Ledet et al. |
| 2012/0084713 A1 | 4/2012 | Desai et al. |
| 2012/0089932 A1 | 4/2012 | Kano et al. |
| 2012/0089951 A1 | 4/2012 | Cassidy |
| 2012/0092355 A1 | 4/2012 | Yamamoto et al. |
| 2012/0096393 A1 | 4/2012 | Shim et al. |
| 2012/0098780 A1 | 4/2012 | Fujisawa et al. |
| 2012/0102437 A1 | 4/2012 | Worley et al. |
| 2012/0105358 A1 | 5/2012 | Momeyer et al. |
| 2012/0105367 A1 | 5/2012 | Son et al. |
| 2012/0106852 A1 | 5/2012 | Khawand et al. |
| 2012/0113023 A1 | 5/2012 | Koch et al. |
| 2012/0126962 A1 | 5/2012 | Ujii et al. |
| 2012/0131495 A1 | 5/2012 | Goossens et al. |
| 2012/0139864 A1 | 6/2012 | Sleeman et al. |
| 2012/0146945 A1 | 6/2012 | Miyazawa et al. |
| 2012/0147052 A1 | 6/2012 | Homma et al. |
| 2012/0154328 A1 | 6/2012 | Kono |
| 2012/0154329 A1 | 6/2012 | Shinozaki |
| 2012/0159380 A1 | 6/2012 | Kocienda et al. |
| 2012/0169646 A1 | 7/2012 | Berkes et al. |
| 2012/0176403 A1 | 7/2012 | Cha et al. |
| 2012/0179967 A1 | 7/2012 | Hayes |
| 2012/0182226 A1 | 7/2012 | Tuli |
| 2012/0183271 A1 | 7/2012 | Forutanpour et al. |
| 2012/0206393 A1 | 8/2012 | Hillis et al. |
| 2012/0216114 A1 | 8/2012 | Privault et al. |
| 2012/0216139 A1 | 8/2012 | Ording et al. |
| 2012/0216143 A1 | 8/2012 | Shiplacoff et al. |
| 2012/0218203 A1 | 8/2012 | Kanki |
| 2012/0218304 A1 | 8/2012 | Anzures et al. |
| 2012/0235912 A1 | 9/2012 | Laubach |
| 2012/0240044 A1 | 9/2012 | Johnson et al. |
| 2012/0249575 A1 | 10/2012 | Krolczyk et al. |
| 2012/0249853 A1 | 10/2012 | Krolczyk et al. |
| 2012/0256846 A1 | 10/2012 | Mak |
| 2012/0256847 A1 | 10/2012 | Mak et al. |
| 2012/0256857 A1 | 10/2012 | Mak |
| 2012/0257071 A1 | 10/2012 | Prentice |
| 2012/0260220 A1 | 10/2012 | Griffin |
| 2012/0274591 A1 | 11/2012 | Rimas-Ribikauskas et al. |
| 2012/0274662 A1 | 11/2012 | Kim et al. |
| 2012/0284673 A1 | 11/2012 | Lamb et al. |
| 2012/0293449 A1 | 11/2012 | Dietz |
| 2012/0293551 A1 | 11/2012 | Momeyer et al. |
| 2012/0299859 A1 | 11/2012 | Kinoshita |
| 2012/0304132 A1 | 11/2012 | Sareen et al. |
| 2012/0304133 A1 | 11/2012 | Nan et al. |
| 2012/0306748 A1 | 12/2012 | Fleizach et al. |
| 2012/0306764 A1 | 12/2012 | Kamibeppu |
| 2012/0306765 A1 | 12/2012 | Moore |
| 2012/0306766 A1 | 12/2012 | Moore |
| 2012/0306772 A1 | 12/2012 | Tan et al. |
| 2012/0306778 A1 | 12/2012 | Wheeldreyer et al. |
| 2012/0311429 A1 | 12/2012 | Decker et al. |
| 2012/0311437 A1 | 12/2012 | Weeldreyer et al. |
| 2012/0311498 A1 | 12/2012 | Kluttz et al. |
| 2013/0002561 A1 | 1/2013 | Wakasa |
| 2013/0016042 A1 | 1/2013 | Makinen et al. |
| 2013/0019158 A1 | 1/2013 | Watanabe |
| 2013/0019174 A1 | 1/2013 | Gil et al. |
| 2013/0044062 A1* | 2/2013 | Bose ................... G06F 3/0414 345/173 |
| 2013/0047100 A1 | 2/2013 | Kroeger et al. |
| 2013/0050131 A1 | 2/2013 | Lee et al. |
| 2013/0061172 A1 | 3/2013 | Huang et al. |
| 2013/0063389 A1 | 3/2013 | Moore |
| 2013/0067383 A1 | 3/2013 | Kataoka et al. |
| 2013/0067513 A1 | 3/2013 | Takami |
| 2013/0077804 A1 | 3/2013 | Glebe et al. |
| 2013/0080923 A1 | 3/2013 | Anzures et al. |
| 2013/0082824 A1 | 4/2013 | Colley |
| 2013/0093691 A1 | 4/2013 | Moosavi |
| 2013/0097520 A1 | 4/2013 | Lewin et al. |
| 2013/0097521 A1 | 4/2013 | Lewin et al. |
| 2013/0097534 A1 | 4/2013 | Lewin et al. |
| 2013/0097539 A1 | 4/2013 | Mansson et al. |

(56) References Cited

U.S. PATENT DOCUMENTS

| | | |
|---|---|---|
| 2013/0097564 A1 | 4/2013 | Kermoian et al. |
| 2013/0106766 A1 | 5/2013 | Yilmaz et al. |
| 2013/0113720 A1 | 5/2013 | Van Eerd et al. |
| 2013/0120295 A1 | 5/2013 | Kim et al. |
| 2013/0120306 A1 | 5/2013 | Furukawa |
| 2013/0135243 A1 | 5/2013 | Hirsch et al. |
| 2013/0135499 A1 | 5/2013 | Song |
| 2013/0141364 A1 | 6/2013 | Lynn et al. |
| 2013/0141396 A1 | 6/2013 | Lynn et al. |
| 2013/0145313 A1 | 6/2013 | Roh et al. |
| 2013/0154948 A1 | 6/2013 | Schediwy et al. |
| 2013/0154959 A1 | 6/2013 | Lindsay et al. |
| 2013/0155018 A1 | 6/2013 | Dagdeviren |
| 2013/0159893 A1 | 6/2013 | Lewin et al. |
| 2013/0162667 A1* | 6/2013 | Eskolin ............... G06F 3/0488 345/619 |
| 2013/0169549 A1 | 7/2013 | Seymour et al. |
| 2013/0174094 A1 | 7/2013 | Heo et al. |
| 2013/0174179 A1 | 7/2013 | Park et al. |
| 2013/0179840 A1 | 7/2013 | Fisher et al. |
| 2013/0191791 A1 | 7/2013 | Rydenhag et al. |
| 2013/0194217 A1 | 8/2013 | Lee et al. |
| 2013/0198690 A1 | 8/2013 | Barsoum et al. |
| 2013/0212541 A1 | 8/2013 | Dolenc et al. |
| 2013/0222274 A1 | 8/2013 | Mori et al. |
| 2013/0222671 A1 | 8/2013 | Tseng et al. |
| 2013/0227450 A1 | 8/2013 | Na et al. |
| 2013/0232402 A1 | 9/2013 | Lu et al. |
| 2013/0232445 A1 | 9/2013 | Ording et al. |
| 2013/0234929 A1 | 9/2013 | Libin |
| 2013/0249814 A1 | 9/2013 | Zeng |
| 2013/0257793 A1 | 10/2013 | Zeliff et al. |
| 2013/0257817 A1* | 10/2013 | Yliaho ............... G06F 3/0414 345/177 |
| 2013/0265246 A1 | 10/2013 | Tae |
| 2013/0268875 A1 | 10/2013 | Han et al. |
| 2013/0278520 A1 | 10/2013 | Weng et al. |
| 2013/0305184 A1 | 11/2013 | Kim et al. |
| 2013/0325342 A1 | 12/2013 | Pylappan et al. |
| 2013/0326420 A1 | 12/2013 | Liu et al. |
| 2013/0326421 A1 | 12/2013 | Jo |
| 2013/0328770 A1 | 12/2013 | Parham |
| 2013/0332892 A1 | 12/2013 | Matsuki |
| 2013/0339909 A1 | 12/2013 | Ha |
| 2014/0002355 A1 | 1/2014 | Lee et al. |
| 2014/0002374 A1 | 1/2014 | Hunt et al. |
| 2014/0002386 A1 | 1/2014 | Rosenberg et al. |
| 2014/0026098 A1 | 1/2014 | Gilman |
| 2014/0028571 A1 | 1/2014 | St. Clair |
| 2014/0028601 A1 | 1/2014 | Moore |
| 2014/0049491 A1 | 2/2014 | Nagar et al. |
| 2014/0055367 A1 | 2/2014 | Dearman et al. |
| 2014/0055377 A1 | 2/2014 | Kim |
| 2014/0059485 A1 | 2/2014 | Lehrian et al. |
| 2014/0063316 A1 | 3/2014 | Lee et al. |
| 2014/0078343 A1 | 3/2014 | Dai et al. |
| 2014/0082536 A1 | 3/2014 | Costa et al. |
| 2014/0092025 A1 | 4/2014 | Pala et al. |
| 2014/0092030 A1 | 4/2014 | Van der Velden |
| 2014/0109016 A1 | 4/2014 | Ouyang et al. |
| 2014/0111456 A1 | 4/2014 | Kashiwa et al. |
| 2014/0111670 A1 | 4/2014 | Lord et al. |
| 2014/0139471 A1 | 5/2014 | Matsuki |
| 2014/0152581 A1 | 6/2014 | Case et al. |
| 2014/0157203 A1 | 6/2014 | Jeon et al. |
| 2014/0160063 A1 | 6/2014 | Yairi et al. |
| 2014/0160073 A1 | 6/2014 | Matsuki |
| 2014/0164966 A1 | 6/2014 | Kim et al. |
| 2014/0165006 A1 | 6/2014 | Chaudhri et al. |
| 2014/0168093 A1 | 6/2014 | Lawrence |
| 2014/0168153 A1 | 6/2014 | Deichmann et al. |
| 2014/0173517 A1 | 6/2014 | Chaudhri |
| 2014/0184526 A1 | 7/2014 | Cho |
| 2014/0210758 A1 | 7/2014 | Park et al. |
| 2014/0210798 A1 | 7/2014 | Wilson |
| 2014/0229888 A1 | 8/2014 | Ko et al. |
| 2014/0245202 A1 | 8/2014 | Yoon et al. |
| 2014/0267114 A1 | 9/2014 | Lisseman et al. |
| 2014/0267135 A1 | 9/2014 | Chhabra |
| 2014/0267362 A1 | 9/2014 | Kocienda et al. |
| 2014/0282084 A1 | 9/2014 | Murarka et al. |
| 2014/0282214 A1 | 9/2014 | Shirzadi et al. |
| 2014/0300569 A1 | 10/2014 | Matsuki et al. |
| 2014/0304651 A1 | 10/2014 | Johansson et al. |
| 2014/0306897 A1 | 10/2014 | Cueto |
| 2014/0306899 A1 | 10/2014 | Hicks |
| 2014/0310638 A1 | 10/2014 | Lee et al. |
| 2014/0313130 A1 | 10/2014 | Yamano et al. |
| 2014/0333561 A1 | 11/2014 | Bull et al. |
| 2014/0344765 A1 | 11/2014 | Hicks et al. |
| 2014/0354845 A1 | 12/2014 | Molgaard et al. |
| 2014/0354850 A1 | 12/2014 | Kosaka et al. |
| 2014/0359528 A1 | 12/2014 | Murata |
| 2014/0380247 A1 | 12/2014 | Tecarro et al. |
| 2015/0015763 A1 | 1/2015 | Lee et al. |
| 2015/0020036 A1 | 1/2015 | Kim et al. |
| 2015/0026584 A1 | 1/2015 | Kobyakov et al. |
| 2015/0026592 A1 | 1/2015 | Mohammed et al. |
| 2015/0029149 A1 | 1/2015 | Andersson et al. |
| 2015/0033184 A1 | 1/2015 | Kim et al. |
| 2015/0042588 A1 | 2/2015 | Park |
| 2015/0046876 A1 | 2/2015 | Goldenberg |
| 2015/0049033 A1 | 2/2015 | Kim et al. |
| 2015/0058723 A1 | 2/2015 | Cieplinski et al. |
| 2015/0062052 A1 | 3/2015 | Bernstein et al. |
| 2015/0062068 A1 | 3/2015 | Shih et al. |
| 2015/0067495 A1 | 3/2015 | Bernstein et al. |
| 2015/0067496 A1 | 3/2015 | Missig et al. |
| 2015/0067497 A1 | 3/2015 | Cieplinski et al. |
| 2015/0067513 A1 | 3/2015 | Zambetti et al. |
| 2015/0067519 A1 | 3/2015 | Missig et al. |
| 2015/0067559 A1 | 3/2015 | Missig et al. |
| 2015/0067560 A1 | 3/2015 | Cieplinski et al. |
| 2015/0067596 A1 | 3/2015 | Brown et al. |
| 2015/0067601 A1 | 3/2015 | Bernstein et al. |
| 2015/0067602 A1 | 3/2015 | Bernstein et al. |
| 2015/0067605 A1 | 3/2015 | Zambetti et al. |
| 2015/0071547 A1 | 3/2015 | Keating et al. |
| 2015/0116205 A1 | 4/2015 | Westerman et al. |
| 2015/0121225 A1 | 4/2015 | Somasundaram et al. |
| 2015/0067563 A1 | 5/2015 | Bernstein et al. |
| 2015/0128092 A1 | 5/2015 | Lee et al. |
| 2015/0135109 A1 | 5/2015 | Zambetti et al. |
| 2015/0138126 A1 | 5/2015 | Westerman |
| 2015/0138155 A1 | 5/2015 | Bernstein et al. |
| 2015/0139605 A1 | 5/2015 | Wiklof |
| 2015/0143273 A1 | 5/2015 | Bernstein et al. |
| 2015/0149899 A1 | 5/2015 | Bernstein et al. |
| 2015/0149964 A1 | 5/2015 | Bernstein et al. |
| 2015/0149967 A1 | 5/2015 | Bernstein et al. |
| 2015/0153929 A1 | 6/2015 | Bernstein et al. |
| 2015/0160729 A1 | 6/2015 | Nakagawa |
| 2015/0205495 A1 | 7/2015 | Koide et al. |
| 2015/0234446 A1 | 8/2015 | Nathan et al. |
| 2015/0253866 A1 | 9/2015 | Amm et al. |
| 2015/0268813 A1 | 9/2015 | Bos |
| 2015/0321607 A1 | 11/2015 | Cho et al. |
| 2015/0332107 A1 | 11/2015 | Paniaras |
| 2015/0378519 A1 | 12/2015 | Brown et al. |
| 2015/0378982 A1 | 12/2015 | McKenzie et al. |
| 2015/0381931 A1 | 12/2015 | Uhma et al. |
| 2016/0004427 A1 | 1/2016 | Zambetti et al. |
| 2016/0004428 A1 | 1/2016 | Bernstein et al. |
| 2016/0004429 A1 | 1/2016 | Bernstein et al. |
| 2016/0004430 A1 | 1/2016 | Missig et al. |
| 2016/0004431 A1 | 1/2016 | Bernstein et al. |
| 2016/0004432 A1 | 1/2016 | Bernstein et al. |
| 2016/0011771 A1 | 1/2016 | Cieplinski |
| 2016/0019718 A1 | 1/2016 | Mukkamala et al. |
| 2016/0041750 A1 | 2/2016 | Cieplinski et al. |
| 2016/0048326 A1 | 2/2016 | Kim et al. |
| 2016/0062466 A1 | 3/2016 | Moussette et al. |
| 2016/0062619 A1 | 3/2016 | Reeve et al. |
| 2016/0070401 A1 | 3/2016 | Kim et al. |

(56) References Cited

U.S. PATENT DOCUMENTS

| | | |
|---|---|---|
| 2016/0132139 A1 | 5/2016 | Du et al. |
| 2016/0188181 A1 | 6/2016 | Smith |
| 2016/0196028 A1 | 7/2016 | Kenney et al. |
| 2016/0210025 A1 | 7/2016 | Bernstein et al. |
| 2016/0224220 A1 | 8/2016 | Ganguly |
| 2016/0259412 A1 | 9/2016 | Flint et al. |
| 2016/0259413 A1 | 9/2016 | Anzures et al. |
| 2016/0259495 A1 | 9/2016 | Butcher et al. |
| 2016/0259496 A1 | 9/2016 | Butcher et al. |
| 2016/0259497 A1 | 9/2016 | Foss et al. |
| 2016/0259498 A1 | 9/2016 | Foss et al. |
| 2016/0259499 A1 | 9/2016 | Kocienda et al. |
| 2016/0259516 A1 | 9/2016 | Kudurshian et al. |
| 2016/0259517 A1 | 9/2016 | Butcher et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0259536 A1 | 9/2016 | Kudurshian et al. |
| 2016/0274686 A1 | 9/2016 | Ruiz et al. |
| 2016/0274728 A1 | 9/2016 | Luo et al. |
| 2016/0274761 A1 | 9/2016 | Ruiz et al. |
| 2016/0320906 A1 | 11/2016 | Bokma et al. |
| 2017/0075520 A1 | 3/2017 | Bauer et al. |
| 2017/0075562 A1 | 3/2017 | Bauer et al. |
| 2017/0075563 A1 | 3/2017 | Bauer et al. |

FOREIGN PATENT DOCUMENTS

| | | |
|---|---|---|
| CN | 1808362 A | 7/2006 |
| CN | 1955906 | 5/2007 |
| CN | 101102573 | 1/2008 |
| CN | 101222704 A | 7/2008 |
| CN | 201107762 | 8/2008 |
| CN | 101320303 A | 12/2008 |
| CN | 101593077 A | 12/2009 |
| CN | 101727268 | 6/2010 |
| CN | 101809526 A | 8/2010 |
| CN | 102004593 A | 4/2011 |
| CN | 102037435 | 4/2011 |
| CN | 102099776 | 6/2011 |
| CN | 102112946 A | 6/2011 |
| CN | 102160021 A | 8/2011 |
| CN | 102385478 A | 3/2012 |
| CN | 102438092 A | 5/2012 |
| CN | 102662573 A | 9/2012 |
| CN | 102841677 A | 12/2012 |
| CN | 103097992 A | 5/2013 |
| DE | 100 59 906 A1 | 6/2002 |
| DE | 21 2009 000 073 | 2/2011 |
| DE | 20 2009 018 283 | 8/2011 |
| DE | 11 2009 001 276 | 1/2012 |
| DE | 11 2009 001 281 | 1/2012 |
| EP | 0 388 162 A2 | 3/1990 |
| EP | 0 859 307 A1 | 3/1998 |
| EP | 0 880 090 A2 | 11/1998 |
| EP | 1 028 583 A1 | 8/2000 |
| EP | 1 067 471 A1 | 1/2001 |
| EP | 1406150 A1 | 4/2004 |
| EP | 1 571 549 A2 | 2/2005 |
| EP | 1 562 105 A2 | 8/2005 |
| EP | 1 568 966 A2 | 8/2005 |
| EP | 1 640 855 A2 | 3/2006 |
| EP | 1 674 977 A2 | 6/2006 |
| EP | 1 882 902 A1 | 1/2008 |
| EP | 2 000 896 A2 | 12/2008 |
| EP | 2 017 701 A1 | 1/2009 |
| EP | 2 028 583 A2 | 2/2009 |
| EP | 2 141 574 A2 | 1/2010 |
| EP | 2 175 357 A1 | 4/2010 |
| EP | 2 196 893 A2 | 6/2010 |
| EP | 2 214 087 A1 | 8/2010 |
| EP | 2 226 715 A2 | 9/2010 |
| EP | 2 286 324 | 2/2011 |
| EP | 2 286 325 | 2/2011 |
| EP | 2 299 351 A2 | 3/2011 |
| EP | 2 302 496 A1 | 3/2011 |
| EP | 2 375 309 A1 | 10/2011 |
| EP | 2 375 314 A1 | 10/2011 |
| EP | 2 386 935 A1 | 11/2011 |
| EP | 2 407 868 A1 | 1/2012 |
| EP | 2 426 580 A2 | 3/2012 |
| EP | 2 447 818 A1 | 5/2012 |
| EP | 2 527 966 A2 | 11/2012 |
| EP | 2 530 677 A2 | 12/2012 |
| EP | 2 541 376 A1 | 1/2013 |
| EP | 2 555 500 A1 | 2/2013 |
| EP | 2 568 359 A2 | 3/2013 |
| EP | 2 615 535 A1 | 7/2013 |
| EP | 2 631 737 A1 | 8/2013 |
| EP | 2 674 846 A2 | 12/2013 |
| EP | 2 733 578 A2 | 5/2014 |
| EP | 2 808 764 A1 | 12/2014 |
| EP | 2 809 058 A1 | 12/2014 |
| EP | 2 813 938 A1 | 12/2014 |
| GB | 2 350 991 | 12/2000 |
| GB | 2 366 630 A | 3/2002 |
| GB | 2 402 105 A | 12/2004 |
| GB | 2 492 709 A | 11/2009 |
| GB | 2 473 389 A | 3/2011 |
| GB | 2 474 153 A | 4/2011 |
| JP | H07-151512 A | 6/1995 |
| JP | H08-227341 A | 9/1996 |
| JP | H09-330175 A | 12/1997 |
| JP | H11-203044 A | 7/1999 |
| JP | 2000-148348 A | 5/2000 |
| JP | 2001-202192 A | 7/2001 |
| JP | 2002-041023 A | 2/2002 |
| JP | 2002-149312 A | 5/2002 |
| JP | 2002-268867 A | 9/2002 |
| JP | 2002-286489 | 10/2002 |
| JP | 2003-084744 A | 3/2003 |
| JP | 2003-157131 A | 5/2003 |
| JP | 2003-186597 A | 7/2003 |
| JP | 2004-054861 A | 2/2004 |
| JP | 2004-062648 A | 2/2004 |
| JP | 2004-070492 A | 3/2004 |
| JP | 2004-086733 A | 3/2004 |
| JP | 2004-152169 A | 5/2004 |
| JP | 2005-031786 A | 2/2005 |
| JP | 2005-070777 A | 3/2005 |
| JP | 2005-092386 A | 4/2005 |
| JP | 2005-135106 A | 5/2005 |
| JP | 2005-157842 A | 6/2005 |
| JP | 2005-196810 A | 7/2005 |
| JP | 2005-222553 A | 8/2005 |
| JP | 2005-309933 A | 11/2005 |
| JP | 2006-185443 A | 7/2006 |
| JP | 2007-116384 A | 5/2007 |
| JP | 2007-517462 | 6/2007 |
| JP | 2007-264808 A | 10/2007 |
| JP | 2008-009759 A | 1/2008 |
| JP | 2008-015890 A | 1/2008 |
| JP | 2008-017373 A | 1/2008 |
| JP | 2008-033739 A | 2/2008 |
| JP | 2008-076818 A | 4/2008 |
| JP | 2008-076853 A | 4/2008 |
| JP | 2008-146453 A | 6/2008 |
| JP | 2008-537615 | 9/2008 |
| JP | 2008 305174 A | 12/2008 |
| JP | 2009-500761 | 1/2009 |
| JP | 2009-211704 A | 9/2009 |
| JP | 2009-217543 A | 9/2009 |
| JP | 2009-217815 A | 9/2009 |
| JP | 2010-009321 A | 1/2010 |
| JP | 2010-503130 A | 1/2010 |
| JP | 2010-055274 A | 3/2010 |
| JP | 2010-146507 A | 7/2010 |
| JP | 2010-152716 A | 7/2010 |
| JP | 2010-176174 A | 8/2010 |
| JP | 2010-176337 A | 8/2010 |
| JP | 2010-181934 A | 8/2010 |
| JP | 2010-541071 A | 12/2010 |
| JP | 2011-501307 A | 1/2011 |

(56) References Cited

FOREIGN PATENT DOCUMENTS

| | | |
|---|---|---|
| JP | 2011-048666 A | 3/2011 |
| JP | 2011-048686 A | 3/2011 |
| JP | 2011-048762 A | 3/2011 |
| JP | 2011-048832 A | 3/2011 |
| JP | 2011-053831 A | 3/2011 |
| JP | 2011-053972 A | 3/2011 |
| JP | 2011-053973 A | 3/2011 |
| JP | 2011-053974 A | 3/2011 |
| JP | 2011-059821 A | 3/2011 |
| JP | 2011-070342 A | 4/2011 |
| JP | 2011-100290 A | 5/2011 |
| JP | 2011-107823 A | 6/2011 |
| JP | 2011-123773 A | 6/2011 |
| JP | 2011-141868 A | 7/2011 |
| JP | 2011 192179 A | 9/2011 |
| JP | 2011-192215 A | 9/2011 |
| JP | 2011-242386 A | 12/2011 |
| JP | 2011-253556 A | 12/2011 |
| JP | 2011-257941 A | 12/2011 |
| JP | 2011-530101 A | 12/2011 |
| JP | 2012-027940 A | 2/2012 |
| JP | 2012-043266 A | 3/2012 |
| JP | 2012-043267 A | 3/2012 |
| JP | 2012-053754 | 3/2012 |
| JP | 2012-053926 A | 3/2012 |
| JP | 2012-073873 A | 4/2012 |
| JP | 2012-509605 A | 4/2012 |
| JP | 2012-093820 A | 5/2012 |
| JP | 2012-123564 A | 6/2012 |
| JP | 2012-128825 A | 7/2012 |
| JP | 2013-030050 A | 2/2013 |
| JP | 2013-058149 A | 3/2013 |
| JP | 2013-080521 A | 5/2013 |
| JP | 2013-529339 A | 7/2013 |
| JP | 2013-542488 A | 11/2013 |
| JP | 2014-130567 A | 7/2014 |
| JP | 2014-519109 A | 8/2014 |
| JP | 2015-153420 A | 8/2015 |
| KR | 2006-0071353 A | 6/2006 |
| KR | 2008-0045143 A | 4/2008 |
| KR | 2008-0054346 A | 6/2008 |
| KR | 2008-0078108 A | 8/2008 |
| KR | 2010-0010302 | 2/2010 |
| KR | 2010-0023637 | 3/2010 |
| KR | 2010-0034608 | 4/2010 |
| KR | 2010 0046087 | 6/2010 |
| KR | 2010 0133246 A | 12/2010 |
| KR | 2011 0086501 A | 7/2011 |
| KR | 2013 0099647 A | 9/2013 |
| KR | 2014 0079110 A | 6/2014 |
| KR | 20150021977 A | 3/2015 |
| WO | WO 90/10910 A1 | 9/1990 |
| WO | WO 90/11571 A1 | 10/1990 |
| WO | WO 91/14231 A1 | 9/1991 |
| WO | WO 95/26005 A1 | 9/1995 |
| WO | WO 98/49639 A1 | 11/1998 |
| WO | WO 99/19821 A1 | 4/1999 |
| WO | WO 99/30259 A1 | 6/1999 |
| WO | WO 99/53424 A1 | 10/1999 |
| WO | WO 00/11587 A1 | 3/2000 |
| WO | WO 00/50974 A2 | 8/2000 |
| WO | WO 00/52619 A1 | 9/2000 |
| WO | WO 00/62187 A2 | 10/2000 |
| WO | WO 00/65510 A1 | 11/2000 |
| WO | WO 01/16830 A1 | 3/2001 |
| WO | WO 01/16852 A2 | 3/2001 |
| WO | WO 01/22263 A2 | 3/2001 |
| WO | WO 01/22315 A2 | 3/2001 |
| WO | WO 01/88808 A1 | 11/2001 |
| WO | WO 00/62187 A3 | 12/2001 |
| WO | WO 01/22263 A3 | 1/2002 |
| WO | WO 01/22315 A3 | 1/2002 |
| WO | WO 02/07032 A1 | 1/2002 |
| WO | WO 02/15461 A2 | 2/2002 |
| WO | WO 01/16852 A8 | 6/2002 |
| WO | WO 2005/106637 A2 | 11/2005 |
| WO | WO 2006/013485 A2 | 2/2006 |
| WO | WO 2006/073020 A1 | 7/2006 |
| WO | WO 2007/121557 A1 | 11/2007 |
| WO | WO 2008/030976 A2 | 3/2008 |
| WO | WO 2006/043209 A1 | 4/2008 |
| WO | WO 2008/064142 A2 | 5/2008 |
| WO | WO 2009/059062 A2 | 5/2009 |
| WO | WO 2009/143075 A2 | 11/2009 |
| WO | WO 2009/143076 A2 | 11/2009 |
| WO | WO 2009/143294 A2 | 11/2009 |
| WO | WO 2009/148781 A2 | 12/2009 |
| WO | WO 2009/155981 A1 | 12/2009 |
| WO | WO 2009/158549 A2 | 12/2009 |
| WO | WO 2010/013876 A1 | 2/2010 |
| WO | WO 2010/090010 A1 | 8/2010 |
| WO | WO 2011/024389 A1 | 3/2011 |
| WO | WO 2011/024465 A1 | 3/2011 |
| WO | WO 2011/093045 A1 | 8/2011 |
| WO | WO 2011/105009 A1 | 9/2011 |
| WO | WO 2011/114630 A1 | 9/2011 |
| WO | WO 2011/115187 A1 | 9/2011 |
| WO | WO 2011/121375 A1 | 10/2011 |
| WO | WO 2012/037664 | 3/2012 |
| WO | WO 2012/096804 A2 | 7/2012 |
| WO | WO 2012/114760 A1 | 8/2012 |
| WO | WO 2012/150540 A2 | 11/2012 |
| WO | WO 2013/169299 A1 | 11/2013 |
| WO | WO 2013/169849 A2 | 11/2013 |
| WO | WO 2013/169851 A2 | 11/2013 |
| WO | WO 2013/169853 A1 | 11/2013 |
| WO | WO 2013/169854 A2 | 11/2013 |
| WO | WO 2013/169870 A1 | 11/2013 |
| WO | WO 2013/169875 A2 | 11/2013 |
| WO | WO 2013/169877 A2 | 11/2013 |
| WO | WO 2013/169882 A2 | 11/2013 |
| WO | WO 2014/105275 A1 | 7/2014 |
| WO | WO 2014/105276 A1 | 7/2014 |
| WO | WO 2014/105277 A1 | 7/2014 |
| WO | WO 2014/105278 A1 | 7/2014 |
| WO | WO 2014/105279 A1 | 7/2014 |
| WO | WO 2014/129655 A1 | 8/2014 |
| WO | WO 2014/149473 A1 | 9/2014 |
| WO | WO 2014/200733 A1 | 12/2014 |
| WO | WO 2016/200584 A2 | 12/2016 |

OTHER PUBLICATIONS

Office Action, dated Aug. 10, 2015, received in Australian Patent Application No. 2013259637, which corresponds with U.S. Appl. No. 14/536,203, 3 pages.
Office Action, dated Aug. 18, 2015, received in Australian Patent Application No. 2013259642, which corresponds with U.S. Appl. No. 14/536,291, 3 pages.
Bautista, "Microsoft Mathematics Tutorial 7—The Ink Input", <URL:http://mathandmultimedia.com/2012/05/23/microsoft-math-tutorial-7-ink>, May 23, 2012, 3 pages.
Davidson, et al., "Extending 2D Object Arrangement with Pressure-Sensitive Layering Cues", Proceedings of the 21st Annual ACM Symposium on User Interface Software and Technology, Oct. 19, 2008, 4 pages.
Dinwiddie, et al., "Combined-User Interface for Computers, Television, Video Recorders, and Telephone, Etc", ip.com Journal, Aug. 1, 1990, 3 Pages.
Forlines, et al., "Glimpse: a Novel Input Model for Multi-level Devices", Chi '05 Extended Abstracts on Human Factors in Computing Systems, Apr. 2, 2005, 4 pages.
Harrison, "Stylus-Based Interface with Full Mouse Emulation", IBM Technical Disclosure Bulletin, vol. 34, No. 10B, Mar. 1, 1992, 3 pages.
International Preliminary Report on Patentability dated Nov. 20, 2014, received in International Application No. PCT/US2013/040053, which corresponds to U.S. Appl. No. 14/535,671, 26 pages.
International Preliminary Report on Patentability dated Nov. 20, 2014, received in International Application No. PCT/US2013/040054, which corresponds to U.S. Appl. No. 14/536,235, 11 pages.

(56) References Cited

OTHER PUBLICATIONS

International Preliminary Report on Patentability dated Nov. 20, 2014, received in International Application No. PCT/US2013/040056, which corresponds to U.S. Appl. No. 14/536,367, 11 pages.
International Preliminary Report on Patentability dated Nov. 20, 2014, received in International Application No. PCT/US2013/040058, which corresponds to U.S. Appl. No. 14/536,426, 11 pages.
International Preliminary Report on Patentability dated Nov. 20, 2014, received in International Application No. PCT/US2013/040061, which corresponds to U.S. Appl. No. 14/536,464, 26 pages.
International Preliminary Report on Patentability dated Nov. 20, 2014, received in International Application No. PCT/US2013/040067, which corresponds to U.S. Appl. No. 14/536,644, 36 pages.
International Preliminary Report on Patentability dated Nov. 20, 2014, received in International Application No. PCT/US2013/040070, which corresponds to U.S. Appl. No. 14/535,646, 10 pages.
International Preliminary Report on Patentability dated Nov. 20, 2014, received in International Application No. PCT/US2013/040072, which corresponds to U.S. Appl. No. 14/536,141, 32 pages.
International Preliminary Report on Patentability dated Nov. 20, 2014, received in International Application No. PCT/2013/040087, which corresponds to U.S. Appl. No. 14/536,166, 29 pages.
International Preliminary Report on Patentability dated Nov. 20, 2014, received in International Application No. PCT/2013040093, which corresponds to U.S. Appl. No. 14,536,203, 9 pages.
International Preliminary Report on Patentability dated Nov. 20, 2014, received in International Application No. PCT/2013/040098, which corresponds to U.S. Appl. No. 14/536,247, 27 pages.
International Preliminary Report on Patentability dated Nov. 20, 2014, received in International Application No. PCT/2013/040101, which corresponds to U.S. Appl. No. 14/536,267, 24 pages.
International Preliminary Report on Patentability dated Nov. 20, 2014, received in International Application No. PCT/2013/040108, which corresponds to U.S. Appl. No. 14/536,291, 25 pages.
International Search Report and Written Opinion dated Aug. 6, 2013, received in International Application No. PCT/US2013/040058, which corresponds to U.S. Appl. No. 14/536,426, 12 pages.
International Search Report and Written Opinion dated Aug. 7, 2013, received in International Application No. PCT/US2013/040054, which corresponds to U.S. Appl. No. 14/536,235, 12 pages.
International Search Report and Written Opinion dated Aug. 7, 2013, received in International Application No. PCT/US2013/040056, which corresponds to U.S. Appl. No. 14/536,367, 12 pages.
International Search Report and Written Opinion dated Aug. 7, 2013, received in International Application No. PCT/US2013/040070, which corresponds to U.S. Appl. No. 14/535,646, 12 pages.
International Search Report and Written Opinion dated Aug. 7, 2013, received in International Application No. PCT/US2013/040093, which corresponds to U.S. Appl. No. 14/536,203, 11 pages.
International Search Report and Written Opinion dated Jan. 8, 2014, received in International Application No. PCT/US2013/040108, 30 pages.
International Search Report and Written Opinion dated Jan. 27, 2014, received in International Application No. PCT/US2013/040101, 30 pages.
International Search Report and Written Opinion dated Feb. 5, 2014, received in International Application No. PCT/US2013/040061, which corresponds to U.S. Appl. No. 14/536,464, 30 pages.
International Search Report and Written Opinion dated Feb. 5, 2014, received in International Application No. PCT/US2013/040098, which corresponds to U.S. Appl. No. 14/536,247, 35 pages.
International Search Report and Written Opinion dated Mar. 3, 2014, received in International Application No. PCT/US2013/040087, which corresponds to U.S. Appl. No. 14/536,166, 35 pages.
International Search Report and Written Opinion dated Mar. 6, 2014, received in International Application No. PCT/US2013/069489, 12 pages.
International Search Report and Written Opinion dated Mar. 12, 2014, received in International Application No. PCT/US2013/069479, 14 pages.
International Search Report and Written Opinion dated Apr. 7, 2014, received in International Application No. PCT/US2013/040072, which corresponds to U.S. Appl. No. 14/536,141, 38 pages.
International Search Report and Written Opinion dated Apr. 7, 2014, received in International Application No. PCT/US2013/069483, 18 pages.
International Search Report and Written Opinion dated May 8, 2014, received in International Application No. PCT/US2013/040067, which corresponds to U.S. Appl. No. 14/536,644, 45 pages.
International Search Report and Written Opinion dated Apr. 7, 2014, received in International Application No. PCT/US2013/069472, 24 pages.
International Search Report and Written Opinion dated May 26, 2014, received in International Application No. PCT/US2013/040053, which corresponds to U.S. Appl. No. 14/535,671, 32 pages.
International Search Report and Written Opinion dated Jun. 2, 2014, received in International Application No. PCT/US2013/069486, 7 pages.
International Search Report and Written Opinion dated Jul. 9, 2014, received in International Application No. PCT/US2013/069484, 17 pages.
International Search Report and Written Opinion dated Sep. 30, 2014, received in International Application No. PCT/US2014/047303, 10 pages.
Invitation to Pay Additional Fees dated Aug. 7, 2013, received in International Application No. PCT/US2013/040101, which corresponds to U.S. Appl. No. 14/536,267, 7 pages.
Invitation to Pay Additional Fees dated Aug. 7, 2013, received in International Application No. PCT/US2013/040108, which corresponds to U.S. Appl. No. 14/536,291, 6 pages.
Invitation to Pay Additional Fees dated Sep. 25, 2013, received in International Application No. PCT/US2013/040061, which corresponds to U.S. Appl. No. 14/536,464, 6 pages.
Invitation to Pay Additional Fees dated Sep. 25, 2013, received in International Application No. PCT/US2013/040098, which corresponds to U.S. Appl. No. 14/536,247, 8 pages.
Invitation to Pay Additional Fees dated Oct. 8, 2013, received in International Application No. PCT/US2013/040067, which corresponds to U.S. Appl. No. 14/536,644, 8 pages.
Invitation to Pay Additional Fees dated Oct. 28, 2013, received in International Application No. PCT/US2013/040072, which corresponds to U.S. Appl. No. 14/536,141, 7 pages.
Invitation to Pay Additional Fees dated Oct. 28, 2013, received in International Application No. PCT/US2013/040087, which corresponds to U.S. Appl. No. 14/536,166, 8 pages.
Invitation to Pay Additional Fees dated Feb. 10, 2014, received in International Application No. PCT/US2013/069472, 6 pages.
Invitation to Pay Additional Fees dated Feb. 14, 2014, received in International Application No. PCT/US2013/069483, 7 pages.
Invitation to Pay Additional Fees dated Apr. 1, 2014, received in International Application No. PCT/US2013/069486, 7 pages.
Invitation to Pay Additional Fees dated Apr. 17, 2014, received in International Application No. PCT/US2013/069484, 7 pages.
Kaaresoja, et al., "Snap-Crackle-Pop: Tactile Feedback for Mobile Touch Screens", Proceedings of Eurohaptics vol. 2006, Jul. 3, 2006, 2 pages.
O'Hara, et al., "Pressure-Sensitive Icons", ip.com Journal, Jun. 1, 1990, 2 Pages.
Quinn, et al., "Zoofing! Faster List Selections with Pressure-Zoom-Flick-Scrolling", Proceedings of the 21st Annual Conference of the Australian Computer-Human Interaction Special Interest Group on Design, Nov. 23, 2009, ACM Press, vol. 411, 8 pages.
Rekimoto, et al., "PreSense: Interaction Techniques for Finger Sensing Input Devices", Proceedings of the 16th Annual ACM Symposium on User Interface Software and Technology, Nov. 30, 2003, 10 pages.
Rekimoto, et al., "PreSensell: Bi-directional Touch and Pressure Sensing Interactions with Tactile Feedback", Conference on Human Factors in Computing Systems Archive, ACM, Apr. 22, 2006, 6 pages.
Song, et al., "Grips and Gestures on a Multi-Touch Pen," The ACM CHI Conference on Human Factors in Computing Systems,

(56) References Cited

OTHER PUBLICATIONS

<URL:research.microsoft.com/pubs/.../gripsandgenstures%20mtpen-chi201>, May 7-12, 2011, 10 pages.
Minsky, "Computational Haptics The Sandpaper System for Synthesizing Texture for a Force-Feedback Display," Massachusetts Institute of Technology, Jun. 1978, 217 pages.
Office Action, dated Jul. 15, 2015, received in Australian Patent Application No. 2013259606, which corresponds with U.S. Appl. No. 14/536,426, 3 pages.
Office Action, dated Jul. 17, 2015, received in Australian Patent Application No. 2013259613, which corresponds with U.S. Appl. No. 14/536,646, 5 pages.
Office Action, dated Jul. 9, 2015, received in Australian Patent Application No. 2013259630, which corresponds with U.S. Appl. No. 14/536,203, 3 pages.
International Preliminary Report on Patentability, dated Jun. 30, 2015, received in International Patent Application No. PCT/US2013/069472, which corresponds with U.S. Appl. No. 14/608,895, 18 pages.
International Preliminary Report on Patentability, dated Jun. 30, 2015, received in International Application No. PCT/2013/069483, which corresponds to U.S. Appl. No. 14/608,942, 13 pages.
International Preliminary Report on Patentability, dated Jun. 30, 2015, received in International Patent Application No. PCT/US2013/069484, which corresponds with U.S. Appl. No. 14/608,965, 12 pages.
International Preliminary Report on Patentability, dated Jun. 30, 2015, received in International Patent Application No. PCT/US2013/069486, which corresponds with U.S. Appl. No. 14/608,985, 19 pages.
International Preliminary Report on Patentability, dated Jun. 30, 2015, received in International Patent Application No. PCT/US2013/069489, which corresponds with U.S. Appl. No. 14/609,006, 10 pages.
Office Action, dated Dec. 17, 2015, received in U.S. Appl. No. 14/536,426, 28 pages.
Office Action, dated Nov. 18, 2015, received in Australian Patent Application No. 2015101231, which corresponds with U.S. Appl. No. 14/536,426, 3 pages.
Office Action, dated Mar. 4, 2016, received in Japanese Patent Application No. 2015-511644, which corresponds with U.S. Appl. No. 14/536,426, 3 pages.
Office Action, dated Nov. 12, 2015, received in European Patent Application No. 13724102.2, which corresponds with U.S. Appl. No. 14/536,646, 6 pages.
Office Action, dated Jan. 7, 2016, received in European Patent Application No. 13726053.5, which corresponds with U.S. Appl. No. 14/536,141, 10 pages.
Office Action, dated Nov. 11, 2015, received in European Patent Application No. 13724104.8, which corresponds with U.S. Appl. No. 14/536,203, 5 pages.
Office Action, dated Feb. 15, 2016, received in Japanese Patent Application No. 2015-511650, which corresponds with U.S. Appl. No. 14/536,203, 5 pages.
Office Action, dated Dec. 4, 2015, received in Korean Patent Application No. 2014-7034520, which corresponds with U.S. Appl. No. 14/536,203, 4 pages.
Office Action, dated Jan. 29, 2016, received in Japanese Patent Application No. 2015-511652, which corresponds with U.S. Appl. No. 14/536,267, 3 pages.
Office Action, dated Dec. 4, 2015, received in Korean Patent Application No. 2014-7034530, which corresponds with U.S. Appl. No. 14/536,267, 3 pages.
Office Action, dated Jan. 7, 2016, received in European Patent Application No. 13724107.1, which corresponds with U.S. Appl. No. 14/052,515, 11 pages.
Office Action, dated Nov. 30, 2015, received in U.S. Appl. No. 14/845,217, 24 pages.
Office Action, dated Feb. 3, 2016, received in U.S. Appl. No. 14/856,517, 36 pages.
Office Action, dated Feb. 11, 2016, received in U.S. Appl. No. 14/856,519, 34 pages.
Office Action, dated Feb. 1, 2016, received in U.S. Appl. No. 14/857,645, 15 pages.
Extended European Search Report, dated Nov. 6, 2015, received in European Patent Application No. 15183980.0, which corresponds with U.S. Appl. No. 14/536,426, 7 pages.
International Preliminary Report on Patentability, dated Jun. 30, 2015, received in International Patent Application No. PCT/US2013/069479, which corresponds with U.S. Appl. No. 14/608,926, 11 pages.
B-log—betriebsraum weblog, "Extremely Efficient Menu Selection: Marking Menus for the Flash Platform," http://www.betriebsraum.de/blog/2009/12/11/extremely-efficient-menu-selection-marking-for-the-flash-platform, Dec. 11, 2009, 9 pages.
Clark, "Global Moxie, Touch Means a Renaissance for Radial Menus," http://globalmoxie.com/blog/radial-menus-for-touch-ui~print.shtml, Jul. 17, 2012, 7 pages.
Cohen, Cinemagraphs are Animated Gifs for Adults, http://www.tubefilter.com/2011/07/10/cinemagraph, Jul. 10, 2011, 3 pages.
Drinkwater, "Glossary: Pre/Post Alarm Image Buffer," http://www.networkwebcams.com/ip-camera-learning-center/2008/07/17/glossary-prepost-alarm-image-buffer/, Jul. 17, 2008, 1 page.
Flixel, "Cinemagraph Pro for Mac", https://flixel.com/products/mac/cinemagraph-pro, 2014, 7 pages.
Flock, "Cinemagraphics: What It Looks Like When a Photo Moves," http://www.washingtonpost.com/blogs/blowpost/post/cinemagraphs-what-it-looks-like-when-a-photo-moves/2011/07-08/gl@AONez3H.blog.html, Jul. 12, 2011, 3 pages.
IBM et al., "Pressure-Sensitive Icons", IBM Technical Disclosure Bulletin, vol. 33, No. 1B, Jun. 1, 1990, 3 pages.
Kaaresoja, "Snap-Crackle-Pop: Tactile Feedback for Mobile Touch Screens," Nokia Research Center, Helsinki, Finland, Proceedings of Eurohaptics vol. 2006, Jul. 3, 2006, 2 pages.
Kronfli, "HTC Zoe Comes to Google Play, Here's Everthing You Need to Know," Know Your Mobile, http://www.knowyourmobile.com/htc/htc-one/19550/what-htc-zoe, Aug. 14, 2014, 5 pages.
Laurie, "The Power of the Right Click," http://vlaurie.com/right-click/customize-context-menu.html, 2002-2016, 3 pages.
Microsoft, "Use Radial Menus to Display Commands in OneNote for Windows 8," https://support.office.com/en-us/article/Use-radial-menues-to-display-OneNote-commands-Od75f03f-cde7-493a-a8a0b2ed6f99fbe2, 2016, 5 pages.
Nikon, "Scene Recognition System and Advanced SRS," http://www.nikonusa.com/en.Learn-And-Explore/Article/ftlzi4rr/Scene-Recognition-System.html, Jul. 22, 2015, 2 pages.
PoliceOne.com, "COBAN Technologies Pre-Event Buffer & Fail Safe Feature," http://www.policeone.com/police-products/police-technology/mobile-computures/videos/5955587-COBAN-Technologies-Pre-Event, Nov. 11, 2010, 2 pages.
"Quickly Preview Songs in Windows Media Player 12 in Windows 7," Quickly Preview Songs in Windows Media Player 12 in Windows 7. How-to Geek, Apr. 28, 2010, Web. May 8, 2010, http://web.archive.org/web/20100502013134/http://www.howtogeek.conn/howto/16157/quickly-preview-songs-in-windows-media-center-12-in-windows-7>, 6 pages.
Sony, "Intelligent Scene Recognition," https://www.sony-asia.com/article/252999/section/product/product/dsc-t77, downloaded on May 20, 2016, 5 pages.
Stross, "Wearing a Badge, and a Video Camera," The New York Times, http://www.nytimes.com/2013/04/07/business/wearable-video-cameras-for-police-offers.html? R=0, Apr. 6, 2013, 4 pages.
Taser, "Taser Axon Body Camera User Manual," https://www.taser.com/images/support/downloads/product-resourses/axon_body_product_manual.pdf, Oct. 1, 2013, 24 pages.
Wikipedia, "AirDrop,", Wikipedia, the free encyclopedia, http://en.wikipedia.org/wiki/AirDrop, May 17, 2016, 5 pages.
Wikipedia, "Cinemagraph," Wikipedia, the free encyclopedia, http://en.wikipedia.org/wiki/Cinemagraph, Last Modified Mar. 16, 2016, 2 pages.
Wikipedia, "Context Menu," Wikipedia, the free encyclopedia https://en.wikipedia.org/wiki/Context menu, Last Modified May 15, 2016, 4 pages.

(56) References Cited

OTHER PUBLICATIONS

Wikipedia, "Mobile Ad Hoc Network," Wikipedia, the free encyclopedia, http://en.wikipedia.org/wiki/Mobile_ad_hoc_network, May 20, 2016, 4 pages.

Wikipedia, "Pie Menu," Wikipedia, the free encyclopedia, http://en.wikipedia.org/wiki/Pie_menu, Last Modified Jun. 4, 2016, 3 pages.

Wikipedia, "Quick Look," from Wikipedia, the free encyclopedia, https://en.wikipedia.org/wiki/Quick_Look, Last Modified Jan. 15, 2016, 3 pages.

Office Action, dated Jul. 21, 2016, received in European Patent Application No. 13795391.5, which corresponds with U.S. Appl. No. 14/536,426, 9 pages.

Notice of Allowance, dated May 23, 2016, received in Australian Patent Application No. 2013259606, which corresponds with U.S. Appl. No. 14/536,426, 3 pages.

Decision to Grant, dated Jul. 14, 2016, received in European Patent Application No. 13724100.6, which corresponds with U.S. Appl. No. 14/536,426, 1 page.

Letters Patent, dated Aug. 10, 2016, received in European Patent Application No. 13724100.6, which corresponds with U.S. Appl. No. 14/536,426, 1 page.

Certificate of Grant, dated Jul. 29, 2016, received in Australian Patent Application No. 2013368441, which corresponds with U.S. Appl. No. 14/608,926, 1 page.

Office Action, dated Apr. 21, 2016, received in European Patent Application No. 13795392.3, which corresponds with U.S. Appl. No. 14/608,926, 6 pages.

Office Action, dated May 6, 2016, received in European Patent Application No. 13795392.3, which corresponds with U.S. Appl. No. 14/608,926, 6 pages.

Office Action, dated May 12, 2016, received in Korean Patent Application No. 10-2015-7018853, which corresponds with U.S. Appl. No. 14/608,926, 4 pages.

Office Action, dated May 31, 2016, received in Australian Patent Application No. 2013259613, which corresponds with U.S. Appl. No. 14/536,646, 4 pages.

Notice of Allowance, dated Jul. 5, 2016, received in Australian Patent Application No. 2013259613, which corresponds with U.S. Appl. No. 14/536,646, 3 pages.

Office Action, dated May 31, 2016, received in European Patent Application No. 13724102.2, which corresponds with U.S. Appl. No. 14/536,646, 5 pages.

Notice of Allowance, dated Aug. 15, 2016, received in Australian Patent Application No. 2013259614, which corresponds with U.S. Appl. No. 14/536,141, 1 page.

Certificate of Grant, dated Jul. 7, 2016, received in Australian Patent Application No. 2013368443, which corresponds with U.S. Appl. No. 14/536,141, 3 pages.

Office Action, dated Jul. 4, 2016, received in Japanese Patent Application No. 2015-549393, which corresponds with U.S. Appl. No. 14/536,141, 4 pages.

Office Action, dated Aug. 1, 2016, received in U.S. Appl. No. 14/536,203, 14 pages.

Notice of Allowance, dated Jun. 15, 2016, received in Australian Patent Applicatin No. 2013259630, which corresponds with U.S. Appl. No. 14/536,203, 3 pages.

Office Action, dated May 31, 2016, received in European Patent Application No. 13724104.8, which corresponds with U.S. Appl. No. 14/536,203, 5 pages.

Notice of Allowance, dated Aug. 5, 2016, received in Japanese Patent Application No. 2015-511650, which corresponds with U.S. Appl. No. 14/536,203, 4 pages.

Office Action, dated Jul. 22, 2016, received in European Office Action No. 13798465.4, which corresponds with U.S. Appl. No. 14/608,965, 8 pages.

Notice of Allowance, dated Jun. 28, 2016, received in Australian Patent Application No. 2013259637, which corresponds with U.S. Appl. No. 14/536,267, 3 pages.

Office Action, dated Jul. 25, 2016, received in Australian Patent Application No. 2013259642, which corresponds with U.S. Appl. No. 14/536,291, 3 pages.

Office Action, dated Aug. 10, 2016, received in Australian Patent Application No. 2013259642, which corresponds with U.S. Appl. No. 14/536,291, 4 pages.

Office Action, dated Aug. 22, 2016, received in European Patent Application No. 13724107.1, which corresponds with U.S. Appl. No. 14/536,291, 7 pages.

Office Action, dated Mar. 8, 2016, received in Japanese Patent Application No. 2015-511655, which corresponds with U.S. Appl. No. 14/536,291, 4 pages.

Office Action, dated Jan. 15, 2016, received in Australian Patent Application No. 2013368445, which corresponds with U.S. Appl. No. 14/608,985, 3 pages.

Office Action, dated Jul. 25, 2016, received in Japanese Patent Application No. 13811032.5, which corresponds with U.S. Appl. No. 14/608,985, 8 pages.

Office Action, dated Apr. 25, 2016, received in Japanese Patent Application No. 2015-550384, which corresponds with U.S. Appl. No. 14/608,985, 4 pages.

Office Action, dated Mar. 31, 2016, received in U.S. Appl. No. 14/864,737, 17 pages.

Notice of Allowance, dated Jul. 1, 2016, received in Chinese Patent Application No. 201620214376.7, which correresponds with U.S. Appl. No. 14/864,737, 3 pages.

Patent, dated Aug. 3, 2016, received in Chinese Patent Application No. 201620214376.7, which corresponds with U.S. Appl. No. 14/864,737, 5 pages.

Certificate of Registration, dated Jun. 20, 2016, received in German Patent Application No. 202016001845.1, which corresponds with U.S. Appl. No. 14/864,737, 3 pages.

Office Action, dated Apr. 5, 2016, received in Danish Patent Application No. 201500577, which corresponds with U.S. Appl. No. 14/864,737, 7 pages.

Intention to Grant, dated Aug. 2, 2016, received in Danish Patent Application No. 201500577, which corresponds with U.S. Appl. No. 14/864,737, 2 pages.

Office Action, dated Jun. 27, 2016, received in U.S. Appl. No. 14/866,981, 22 pages.

Office Action, dated May 10, 2016, received in Australian Patent Application No. 2016100254, which corresponds with U.S. Appl. No. 14/866,981, 6 pages.

Notice of Allowance, dated Jul. 27, 2016, received in Chinese Patent Application No. 201620176169.7, which corresponds with U.S. Appl. No. 14/866,981, 3 pages.

Certificate of Registration, dated Jun. 20, 2016, received in German Patent Application No. 202016001514.2, which corresponds with U.S. Appl. No. 14/864,737, 3 pages.

Office Action, dated Mar. 18, 2016, received in Danish Patent Application No. 2016100254, which corresponds with U.S. Appl. No. 14/866,981, 9 pages.

Office Action, dated May 19, 2016, received in Australian Patent Application No. 2016100251, which corresponds with U.S. Appl. No. 14,866,159, 5 pages.

Certificate of Registration, dated Jun. 16, 2016, received in German Patent No. 202016001483.9, which corresponds with U.S. Appl. No. 14/866,159, 3 pages.

Office Action, dated Mar. 9, 2016, received in Danish Patent Application No. 201500574, which corresponds with U.S. Appl. No. 14/866,159, 11 pages.

Innovation Patent Certificate, dated Aug. 4, 2016, received in Australian Patent Application No. 2016101201, which corresponds with U.S. Appl. No. 14/686,078, 1 page.

Certificate of Registration, dated Jun. 30, 2016, received in German Patent Application No. 20201600156.9, which corresponds with U.S. Appl. No. 14/868,078, 3 pages.

Office Action, dated Mar. 30, 2016, received in Australian Patent Application No. 201500588, which corresponds with U.S. Appl. No. 14/868,078, 9 pages.

Office Action, dated May 9, 2016, received in U.S. Appl. No. 14/863,432, 26 pages.

(56) References Cited

OTHER PUBLICATIONS

Office Action, dated Aug. 19, 2016, received in Australian Patent Application No. 2016100647, which corresponds with U.S. Appl. No. 14/863,432, 5 pages.
Office Action, dated Apr. 4, 2016, received in Danish Patent Application No. 201500582, which corresponds with U.S. Appl. No. 14/863,432, 10 pages.
Patent, dated Aug. 8, 2016, received in Australian Patent Application 2016100653, corresponds with U.S. Appl. No. 14/866,511, 1 page.
Office Action, dated Mar. 22, 2016, received in Danish Patent Application No. 201500576, which corresponds with U.S. Appl. No. 14/866,511, 10 pages.
Notice of Allowance, dated Jun. 8, 2016, received in Danish Patent Application No. 201500576, which corresponds with U.S. Appl. No. 14/866,511, 2 pages.
Notice of Allowance, dated Aug. 26, 2016, received in Danish Patent Application No. 201500576, which corresponds with U.S. Appl. No. 14/866,511, 2 pages.
Office Action, dated May 10, 2016, received in U.S. Appl. No. 14/866,489, 15 pages.
Office Action, dated Mar. 28, 2016, received in U.S. Appl. No. 14/869,899, 17 pages.
Office Action, dated Jun. 28, 2016, received in U.S. Appl. No. 14/869,899, 5 pages.
Office Action, dated Feb. 3, 2016, received in Danish Patent Application No. 201500592, which corresponds with U.S. Appl. No. 14/869,899, 9 pages.
Office Action, dated Mar. 4, 2016, received in U.S. Appl. No. 14/866,992, 30 pages.
Final Office Action, dated Jul. 29, 2016, received in U.S. Appl. No. 14/866,992, 35 pages.
Office Action, dated Mar. 18, 2016, received in Danish Patent Application No. 201500593, which corresponds with U.S. Appl. No. 14/866,992, 10 pages.
Office Action, dated Jun. 27, 2016, received in Danish Patent Application No. 201500593, which corresponds with U.S. Appl. No. 14/866,992, 7 pages.
Notice of Allowance, dated Aug. 26, 2016, received in U.S. Appl. No. 14/845,217, 5 pages.
Final Office Action, dated Jul. 13, 2016, received in U.S. Appl. No. 14/856,517, 30 pages.
Final Office Action, dated Jul. 15, 2016, received in U.S. Appl. No. 14/856,519, 31 pages.
Final Office Action, dated Jun. 16, 2016, received in U.S. Appl. No. 14/857,645, 12 pages.
Notice of Allowance, dated May 23, 2016, received in U.S. Appl. No. 14/864,580, 9 pages.
Corrected Notice of Allowability, dated Jun. 16, 2016, received in U.S. Appl. No. 14/864,580, 2 pages.
Notice of Allowance, dated Aug. 4, 2016, received in U.S. Appl. No. 14/864,580, 9 pages.
Office Action, dated Aug. 19, 2016, received in Australian Patent Application No. 2016100648, which corresponds with U.S. Appl. No. 14/864,580, 6 pages.
Notice of Allowance, dated Jul. 19, 2016, received in U.S. Appl. No. 14/866,361, 8 pages.
Office Action, dated Jun. 10, 2016, received in Australian Patent Application No. 2016100292, which corresponds with U.S. Appl. No. 14/866,361, 4 pages.
Notice of Allowance/Grant, dated Jul. 1, 2016, received in Chinese Patent Application No. 201620251706.X, which corresponds with U.S. Appl. No. 14/866,361, 3 pages.
Letters Patent, dated Aug. 3, 2016, received in Chinese Patent Application No. 201620251706.X, which corresponds with U.S. Appl. No. 14/866,361, 3 pages.
Certificate of Registration, dated Jun. 24, 2016, received in German Patent Application No. 202016001819.2, which corresponds with U.S. Appl. No. 14/866,361, 3 pages.
Patent, dated Aug. 8, 2016, received in Australian Patent Application No. 2016100649, which corresponds with U.S. Appl. No. 14/866,987, 1 page.
Notice of Allowance, dated Jun. 10, 2016, received in Danish Patent Application No. 201500587, which corresponds with U.S. Appl. No. 14/866,987, 2 pages.
Certificate of Exam, dated Jul. 21, 2016, received in Australian Patent Application No. 2016100652, which corresponds with U.S. Appl. No. 14/866,989, 1 page.
Notice of Allowance, dated Jun. 10, 2016, received in Danish Patent Application No. 201500589, which corresponds with U.S. Appl. No. 14/866,989, 2 pages.
Office Action, dated Jun. 28, 2016, received in U.S. Appl. No. 14/871,236, 21 pages.
Office Action, dated May 26, 2016, received in Danish Patent Application No. 201500595, which corresponds with U.S. Appl. No. 14/871,236, 14 pages.
Office Action, dated Jun. 9, 2016, received in Danish Patent Application No. 201500596, which corresponds with U.S. Appl. No. 14/870,882, 9 pages.
Notice of Allowance, dated Jun. 21, 2016, received in Danish Patent Application No. 201500597, which corresponds with U.S. Appl. No. 14/871,227, 2 pages.
Office Action, dated Apr. 29, 2016, received in U.S. Appl. No. 14/867,823, 28 pages.
Office Action, dated May 10, 2016, received in U.S. Appl. No. 14/867,892, 28 pages.
Office Action, dated May 23, 2016, received in Australian Patent Application No. 2016100253, which corresponds with U.S. Appl. No. 14/867,990, 5 pages.
Certificate of Registration, dated Jun. 16, 2016, received in German Patent No. 202016001489.8, which corresponds with U.S. Appl. No. 14/867,990, 3 pages.
International Search Report and Written Opinion, dated Apr. 25, 2016, received in International Patent Application No. PCT/US2016/018758, which corresponds with U.S. Appl. No. 14/866,159, 15 pages.
International Search Report and Written Opinion, dated Jul. 21, 2016, received in International Patent Application No. PCT/US2016/019913, which corresponds with U.S. Appl. No. 14/868,078, 16 pages.
Anonymous, "Nokia 808 PureView screenshots", retrieved from Internet; no URL, Nov. 12, 2012, 8 pages.
Anonymous, "Nokia 808 PureView User Guide," http://download-fds.webapps.microsoft.com/supportFiles/phones/files/pdf_guides/devices/808/Nokia_808_UG_en_APAC.pdf, Jan. 1, 2012, 144 pages.
Bolluyt, "5 Apple Watch Revelations from Apple's New WatchKit", http://www.cheatsheet.com/tecnology/5-apple-watch-revelations-from-apples-new-watchkit.html/?a=viewall, Nov. 22, 2014, 3 pages.
Farshad, "SageThumbs-Preview and Convert Pictures From Windows Context Menu", https://web.addictivetips.com/windows-tips/sagethumbs-preview-and-convert-photos-from-windows-context-menu, Aug. 8, 2011, 5 pages.
Flaherty, "Is Apple Watch's Pressure-Sensitive Screen a Bigger Deal Than the Gadget Itself?", http://www.wired.com/2014/09/apple-watchs-pressure-sensitive-screen-bigger-deal-gadget, Sep. 15, 2014, 3 pages.
Gardner, "Recenz—Recent Apps in One Tap", You Tube, https://www.youtube.com/watch?v-qailSHRgsTo, May 15, 2015, 1 page.
iPodHacks 142: "Water Ripple Effects on the Home and Lock Screen: AquaBoard Cydia Tweak Review", YouTube, https://www.youtube.comwatch?v-Auu_uRaYHJs, Sep. 24, 2012, 3 pages.
Kiener, "Force Touch on iPhone", https://www.youtube.com/watch?v=CEMmnsU5fC8, Aug. 4, 2015, 4 pages.
Kumar, "How to Enable Ripple Effect on Lock Screen of Galaxy S2", YouTube, http, http://www.youtube.com/watch?v+B9-4M5abLXA, Feb. 12, 2013, 3 pages.
Matthew, "How to Preview Photos and Images From Right-Click Context Menue in Windows [Tip]", https://dottech.org/159009/add-image-preview-in-windows-context-menu-tip, Jul. 4, 2014, 5 pages.

(56) References Cited

OTHER PUBLICATIONS

Mitroff, "Google Android 5.0 Lollipop," http://www.cnet.com/products/google-android-5-0-lollipop, Mar. 12, 2015, 5 pages.
Mohr, "Do Not Disturb—The iPhone Feature You Should Be Using", http.www.wonderoftech.com/do-not-disturb-iphone, Jul. 14, 2014, 30 pages.
Nacca, "NiLS Lock Screen Notifications / Floating Panel—Review", https://www.youtube.com/watch?v=McT4QnS9TDY, Feb. 3, 2014, 4 pages.
Phonebuff, "How to Pair Bluetooth on the iPhone", https://www.youtube.com/watch?v=LudNwEar9A8, Feb. 8, 2012, 3 pages.
VGJFeliz, "How to Master Android Lollipop Notifications in Four Minutes!", https://www.youtube.com/watch?v=S-zBRG7GJgs, Feb. 8, 2015, 5 pages.
Office Action, dated Oct. 18, 2016, received in Australian Patent Application No. 2013368440, which corresponds with U.S. Appl. No. 14/536,426, 3 pages.
Office Action, dated Sep. 13, 2016, received in Japanese Patent Application No. 2015-547948, which corresponds with U.S. Appl. No. 14/536,426, 5 pages.
Certificate of Grant, dated Sep. 15, 2016, received in Australian Patent Australian Patent Application No. 2013259606, which corresponds with U.S. Appl. No. 14/536,426, 1 page.
Office Action, dated Nov. 11, 2016, received in European Patent Application No. 13795392.3, which corresponds with U.S. Appl. No. 14/608,926, 6 pages.
Office Action, dated Aug. 31, 2016, received in European Patent Application No. 13726053.5, which corresponds with U.S. Appl. No. 14/536,141, 10 pages.
Office Action, dated Oct. 25, 2016, received in Japanese Patent Application No. 2015-511646, which corresponds with U.S. Appl. No. 14/536,141, 6 pages.
Office Action, dated Oct. 7, 2016, received in European Patent Application No. 13798464.7, which corresponds with U.S. Appl. No. 14/608,942, 7 pages.
Certificate of Grant, dated Oct. 21, 2016, received in Australian Patent Application No. 2013259630, which corresponds with U.S. Appl. No. 14/536,203, 3 pages.
Certificate of Patent, dated Sep. 9, 2016, received in Japanese Patent Application No. 2015-511650, which corresponds with U.S. Appl. No. 14/536,203, 3 pages.
Notice of Allowance, dated Sep. 1, 2016, received in Korean Patent Application No. 2014-7034520, which corresponds with U.S. Appl. No. 14/536,203, 5 pages.
Office Action, dated Oct. 20, 2016, received in U.S. Appl. No. 14/536,247, 10 pages.
Certificate of Grant, dated Oct. 21, 2016, received in Australian Patent Application No. 2013259637, which corresponds with U.S. Appl. No. 14/536,267, 3 pages.
Notice of Allowance, dated Sep. 26, 2016, received in Japanese Patent Application No. 2015-511652, which corresponds with U.S. Appl. No. 14/536,267, 5 pages.
Notice of Allowance, dated Sep. 1, 2016, received in Korean Patent Application No. 2014-7034530, which corresponds with U.S. Appl. No. 14/536,267, 3 pages.
Innovation Patent, dated Sep. 1, 2016, received in Australian Patent Application No. 2016101481, which corresponds with U.S. Appl. No. 14/536,291, 1 page.
Office Action, dated Sep. 29, 2016, received in Australian Patent Application No. 2016101481, which corresponds with U.S. Appl. No. 14/536,291, 3 pages.
Office Action, dated Nov. 4, 2016, received in Korean Patent Application No. 10-2015-7019984, which corresponds with U.S. Appl. No. 14/608,985, 8 pages.
Notice of Allowance, dated Oct. 24, 2016, received in U.S. Appl. No. 14/866,981, 7 pages.
Patent, dated Nov. 2, 2016, received in Australian Patent Application No. 2016100254, which corresponds with U.S. Appl. No. 14/866,981, 1 page.
Patent, dated Sep. 28, 2016, received in Chinese Patent Application No. 201620176169.7, which corresponds with U.S. Appl. No. 14/866,981, 4 pages.
Office Action, dated Jul. 5, 2016, received in Chinese Patent Application No. 201620186008.6, which corresponds with U.S. Appl. No. 14/866,159, 3 pages.
Office Action, dated Sep. 27, 2016, received in Danish Patent Application No. 201500574, which corresponds with U.S. Appl. No. 14/866,159, 4 pages.
Office Action, dated Oct. 12, 2016, received in Australian Patent Application No. 2016101201, which corresponds with U.S. Appl. No. 14/686,078, 3 pages.
Notice of Allowance, dated Oct. 1, 2016, received in Chinese Patent Application No. 201620175847.8, which corresponds with U.S. Appl. No. 14/686,078, 1 page.
Office Action, dated Sep. 2, 2016, received in Australian Patent Application No. 201500588, which corresponds with U.S. Appl. No. 14/868,078, 4 pages.
Notice of Allowance, dated Nov. 14, 2016, received in U.S. Appl. No. 14/863,432, 7 pages.
Office Action and Additional Search Report, dated Oct. 7, 2016, received in Danish Patent Application No. 201500582, which corresponds with U.S. Appl. No. 14/863,432, 6 pages.
Office Action, dated Oct. 13, 2016, received in U.S. Appl. No. 14/866,511, 27 pages.
Final Office Action, dated Sep. 16, 2016, received in U.S. Appl. No. 14/866,489, 24 pages.
Final Office Action, dated Sep. 2, 2016, received in U.S. Appl. No. 14/869,899, 22 pages.
Innovation (Unexamined) Patent, dated Aug. 25, 2016, received in Australian Patent Application No. 2016101438, which corresponds with U.S. Appl. No. 14/869,899, 1 page.
Certificate of Examination, dated Oct. 11, 2016, received in Australian Patent Application No. 2016101438, which corresponds with U.S. Appl. No. 14/869,899, 1 page.
Office Action, dated Oct. 7, 2016, received in Danish Patent Application No. 201500592, which corresponds with U.S. Appl. No. 14/869,899, 6 pages.
Office Action, dated Nov. 22, 2016, received in Danish Patent Application No. 201670594, which corresponds with U.S. Appl. No. 14/869,899, 9 pages.
Innovation Patent, dated Sep. 22, 2016, received in Australian Patent Application No. 2016101418, which corresponds with U.S. Appl. No. 14/866,992, 1 page.
Office Action, dated Nov. 22, 2016, received in Australian Patent Application No. 2016101418, which corresponds with U.S. Appl. No. 14/866,992, 7 pages.
Notice of Allowance, dated Oct. 24, 2016, received in U.S. Appl. No. 14/857,645, 6 pages.
Notice of Allowance, dated Nov. 8, 2016, received in Chinese Patent Application No. 201620470247.4, which corresponds with U.S. Appl. No. 14/864,580, 3 pages.
Certificate of Registration, dated Oct. 14, 2016, received in German Patent Application No. 202016000003234.9, which corresponds with U.S. Appl. No. 14/864,580, 3 pages.
Office Action, dated Oct. 7, 2016, received in Danish Patent Application No. 201500584, which corresponds with U.S. Appl. No. 14/864,580, 3 pages.
Notice of Allowance, dated Nov. 23, 2016, received in U.S. Appl. No. 14/864,601, 12 pages.
Office Action, dated Oct. 7, 2016, received in Danish Patent Application No. 201500585, which corresponds with U.S. Appl. No. 14/864,627, 3 pages.
Office Action, dated Oct. 28, 2016, received in Danish Patent Application No. 201500579, which corresponds with U.S. Appl. No. 14/866,361, 3 pages.
Office Action, dated Oct. 19, 2016, received in Chinese Patent Application No. 2016201470246.X, which corresponds with U.S. Appl. No. 14/866,987, 4 pages.
Notice of Allowance, dated Nov. 1, 2016, received in Danish Patent Application No. 201500587, which corresponds with U.S. Appl. No. 14/866,987, 2 pages.

(56) References Cited

OTHER PUBLICATIONS

Office Action and Search Report, dated Sep. 9, 2016, received in Danish Patent Application No. 201670463, which corresponds with U.S. Appl. No. 14/866,987, 7 pages.
Notice of Allowance, dated Nov. 1, 2016, received in Danish Patent Application No. 201500589, which corresponds with U.S. Appl. No. 14/866,989, 2 pages.
Final Office Action, dated Nov. 4, 2016, received in U.S. Appl. No. 14/871,236, 24 pages.
Innovation (Unexamined) Patent, dated Aug. 25, 2016, received in Australian Patent Application No. 2016101433, which corresponds with U.S. Appl. No. 14/871,236, 1 page.
Office Action, dated Oct. 14, 2016, received in Australian Patent Application No. 2016101433, which corresponds with U.S. Appl. No. 14/871,236, 3 pages.
Office Action and Additional Search Report, dated Sep. 30, 2016, received in Danish Patent Application No. 201500595, which corresponds with U.S. Appl. No. 14/871,236, 10 pages.
Innovation (Unexamined) Patent, dated Aug. 25, 2016, received in Australian Patent Application No. 2016101436, which corresponds with U.S. Appl. No. 14/871,236, 1 pages.
Office Action, dated Oct. 31, 2016, received in Australian Patent Application No. 2016101438, which corresponds with U.S. Appl. No. 14/871,236, 6 pages.
Office Action, dated Oct. 17, 2016, received in Australian Patent Application No. 2016203040, which corresponds with U.S. Appl. No. 14/871,227, 7 pages.
Office Action, dated Oct. 18, 2016, received in Australian Patent Application No. 2016101431, which corresponds with U.S. Appl. No. 14/871,227, 3 pages.
Patent, dated Sep. 26, 2016, received in Danish Patent Application No. 201500597, which corresponds with U.S. No. 14/871,227, 7 pages.
Office Action, dated Oct. 14, 2016, received in Australian Patent Application No. 2016101437, which corresponds with U.S. Appl. No. 14/871,336, 2 pages.
Office Action, dated Oct. 18, 2016, received in Australian Patent Application No. 201500601, which corresponds with U.S. Appl. No. 14/871,336, 3 pages.
Innovation Patent, dated Aug. 25, 2016, received in Australian Patent Application No. 2016101435, which corresponds with U.S. Appl. No. 14/871,462, 1 page.
Office Action, dated Oct. 4, 2016, received in Australian Patent Application No. 2016101435, which corresponds with U.S. Appl. No. 14/871,462, 3 pages.
Office Action, dated Oct. 4, 2016, received in Australian Patent Application No. 2016231505, which corresponds with U.S. Appl. No. 14/871,462, 3 pages.
Grant, dated Aug. 30, 2016, received in Danish Patent Application No. 201500600, which corresponds with U.S. Appl. No. 14/871,462, 2 pages.
Final Office Action, dated Sep. 28, 2016, received in U.S. Appl. No. 14/867,823, 31 pages.
Office Action, dated Sep. 7, 2016, received in Danish Patent Application No. 201500594, which corresponds with U.S. Appl. No. 14/867,823, 4 pages.
Final Office Action, dated Nov. 2, 2016, received in U.S. Appl. No. 14/867,892, 48 pages.
Office Action, Sep. 14, 2016, received in Danish Patent Application No. 201500598, which corresponds with U.S. Appl. No. 14/867,892, 4 pages.
Office Action, dated Jul. 5, 2016, received in Chinese Patent Application No. 201620176221.9, which corresponds with U.S. Appl. No. 14/867,990, 4 pages.
Office Action, dated Oct. 25, 2016, received in Chinese Patent Application No. 201620176221.9, which corresponds with U.S. Appl. No. 14/867,990, 7 pages.
Office Action, dated Sep. 26, 2016, received in Danish Patent Application No. 201500581, which corresponds with U.S. Appl. No. 14/867,990, 5 pages.

Office Action, dated Nov. 25, 2016, received in U.S. Appl. No. 15/081,771, 17 pages.
Office Action and Search Report, dated Oct. 17, 2016, received in Danish Patent Application No. 201670587, which corresponds with U.S. Appl. No. 15/231,745, 9 pages.
Office Action and Search Report, dated Oct. 12, 2016, received in Danish Patent Application No. 201670593, which corresponds with U.S. Appl. No. 15/231,745, 7 pages.
Office Action (Search Report), dated Nov. 10, 2016, received in Danish Patent Application No. 201670591, which corresponds with U.S. Appl. No. 15/231,745, 12 pages.
Office Action and Search Report, dated Oct. 26, 2016, received in Danish Patent Application No. 201670592, which corresponds with U.S. Appl. No. 15/231,745, 8 pages.
Extended European Search Report, dated Oct. 7, 2016, received in European Patent Application No. 16177863.4, which corresponds with U.S. Appl. No. 14/536,267, 12 pages.
International Search Report and Written Opinion, dated Oct. 14, 2016, received in International Patent Application No. PCT/US2016/020697, which corresponds with U.S. Appl. No. 14/866,981, 21 pages.
International Search Report and Written Opinion, dated Oct. 31, 2016, received in International Patent Application No. PCT/US2016/033578, which corresponds with U.S. Appl. No. 14/863,432, 36 pages.
International Search Report and Written Opinion, dated Nov. 14, 2016, received in International Patent Application No. PCT/US2016/033541, which corresponds with U.S. Appl. No. 14/866,511, 29 pages.
International Search Report and Written Opinion, dated Aug. 29, 2016, received in International Patent Application No. PCT/US2016/021400, which corresponds with U.S. Appl. No. 14/869,899, 48 pages.
Angelov, "Sponsor Flip Wall With Jquery & CSS", Tutorialzine. N.p., Mar. 24, 2010. Web. http://tutorialzine.com/2010/03/sponsor-wall-slip-jquery-css/, Mar. 24, 2010, 8 pages.
Anonymous, "Notifications, Android 4.4 and Lower", Android Developers, https://developer.android.com/design/patterns/notifications_k.html, May 24, 2015, 9 pages.
Dzyre, "10 Android Notification Features You Can Fiddle With", http://www.hongkiat.com/blog/android-notification-features, Mar. 10, 2014, 10 pages.
Elliot, "Mac System 7", YouTube. Web. Mar. 8, 2017, http://www.youtube.com/watch?v=XLv22hfuuik, Aug. 3, 2011, 1 page.
Gonzalo et al., "Zliding: Fluid Zooming and Sliding for High Precision Parameter Manipulation", Department of Computer Science, University of Toronto, Seattle, Washington, Oct. 23, 2005, 10 pages.
Grant, "Android's Notification Center", https://www.objc.io/issues/11-android/android-notifications, Apr. 30, 2014, 26 pages.
iPhoneOperator, "Wasser Liveeffekt fur Homescreen & Lockscreen—Aquaboard (Cydia)", http://www.youtube.com/watch?v=fG9YMF-mB0Q, Sep. 22, 2012, 3 pages.
Kost, "LR3-Deselect All Images But One", Julieanne Kost's Blog, blogs.adobe.com/jkost/2011/12/lr3-deselect-all-images-but-one.html, Dec. 22, 2011, 1 page.
Microsoft, "Lumia—How to Personalize Your Start Screen", https://www.youtube.com/watch?v=6GI5Z3TrSEs, Nov. 11, 2014, 3 pages.
Office Action, dated Mar. 15, 2017, received in U.S. Appl. No. 14/535,671, 13 pages.
Notice of Allowance, dated Dec. 20, 2016, received in Australian Patent Application No. 2013368440, which corresponds with U.S. Appl. No. 14/536,426, 3 pages.
Office Action, dated Feb. 24, 2017, received in Korean Patent Application No. 10-2015-7018851, which corresponds with U.S. Appl. No. 14/536,426, 3 pages.
Office Action, dated Apr. 5, 2017, received in U.S. Appl. No. 14/536,367, 16 pages.
Office Action, dated Jan. 20, 2017, received in European Patent Application No. 15183980.0, which corresponds with U.S. Appl. No. 14/536,426, 5 pages.

(56) References Cited

OTHER PUBLICATIONS

Office Action, dated Feb. 6, 2017, received in Japanese Patent Application No. 2015-511644, which corresponds with U.S. Appl. No. 14/536,426, 6 pages.
Office Action, dated Mar. 9, 2017, received in U.S. Appl. No. 14/536,464, 21 pages.
Office Action, dated Jan. 3, 2017, received in Australian Patent Application No. 2016201451, which corresponds with U.S. Appl. No. 14/608,926, 3 pages.
Office Action, dated May 4, 2017, received in Chinese Patent Application No. 201380068414.1, which corresponds with U.S. Appl. No. 14/608,926, 5 pages.
Notice of Allowance, dated Jan. 17, 2017, received in Japanese Patent Application No. 2015-549392, which corresponds with U.S. Appl. No. 14/608,926, 2 pages.
Patent, dated Feb. 17, 2017, received in Japanese Patent Application No. 2015-549392, which corresponds with U.S. Appl. No. 14/608,926, 3 pages.
Notice of Allowance, dated Mar. 31, 2017, received in Korean Patent Application No. 2015-7018853, which corresponds with U.S. Appl. No. 14/608,926, 4 pages.
Office Action, dated Dec. 1, 2016, received in Chinese Patent Application No. 2013800362059, which corresponds with U.S. Appl. No. 14/536,646, 3 pages.
Notice of Allowance, dated Jan. 4, 2017, received in European Patent Application No. 13724102.2, which corresponds with U.S. Appl. No. 14/536,646, 5 pages.
Notice of Allowance, dated Dec. 22, 2016, received in Japanese Patent Application No. 2015-511645, which corresponds with U.S. Appl. No. 14/536,646, 2 pages.
Office Action, dated Apr. 3, 2017, received in U.S. Appl. No. 14/536,141, 11 pages.
Office Action, dated Mar. 3, 2017, received in Chinese Patent Application No. 201380035893.7, which corresponds with U.S. Appl. No. 14/536,646, 8 pages.
Notice of Allowance, dated May 12, 2017, received in U.S. Appl. No. 14/608,942, 10 pages.
Office Action, dated Mar. 29, 2017, received in Australian patent Application No. 2016201303, which corresponds with U.S. Appl. No. 14/608,942, 3 pages.
Office Action, dated Feb. 24, 2017, received in Korean Patent Application No. 2015-7018448, which corresponds with U.S. Appl. No. 14/608,942, 4 pages.
Notice of Allowance, dated Feb. 1, 2017, received in U.S. Appl. No. 14/536,203, 9 pages.
Office Action, dated Feb. 6, 2017, received in Korean Patent Application No. 2016-7033834, which corresponds with U.S. Appl. No. 14/536,203, 4 pages.
Final Office Action, dated Mar. 24, 2017, received in U.S. Appl. No. 14/536,247, 14 pages.
Office Action, dated Mar. 24, 2017, received in U.S. Appl. No. 14/536,267, 12 pages.
Office Action, dated Mar. 24, 2017, received in Australian Patent Application No. 2016204411, which corresponds with U.S. Appl. No. 14/536,267, 3 pages.
Office Action, dated Dec. 9, 2016, received in Chinese Patent Application No. 2016120601564130, which corresponds with U.S. Appl. No. 14/536,267, 4 pages.
Office Action, dated Mar. 3, 2017, received in Japanese Patent Application No. 2016-125839, which corresponds with U.S. Appl. No. 14/536,267, 6 pages.
Office Action, dated Jan. 5, 2017, received in Korean Patent Application No. 2016-7029533, which corresponds with U.S. Appl. No. 14/536,267, 2 pages.
Office Action, dated Apr. 7, 2017, received in U.S. Appl. No. 14/536,291, 11 pages.
Office Action, dated Mar. 23, 2017, received in European Patent Application No. 13724107.1, which corresponds with U.S. Appl. No. 14/536,291, 8 pages.

Final Office Action, dated Dec. 22, 2016, received in Japanese Patent Application No. 2015-511655, which corresponds with U.S. Appl. No. 14/536,291, 3 pages.
Notice of Allowance, dated Jan. 18, 2017, received in Australian Patent Application No. 2013368445, which corresponds with U.S. Appl. No. 14/608,985, 3 pages.
Office Action, dated Feb. 27, 2017, received in European Patent Application No. 13811032.5, which corresponds with U.S. Appl. No. 14/608,985, 6 pages.
Notice of Allowance, dated Jan. 24, 2017, received in Japanese Patent Application No. 2015-550384, which corresponds with U.S. Appl. No. 14/608,985, 5 pages.
Patent, dated Feb. 24, 2017, received in Japanese Patent Application No. 2015-550384, which corresponds with U.S. Appl. No. 14/608,985, 2 pages.
Office Action, dated Mar. 24, 2017, received in U.S. Appl. No. 14/609,006, 13 pages.
Office Action, dated Apr. 19, 2017, received in U.S. Appl. No. 14/536,296, 12 pages.
Office Action, dated Jan. 19, 2017, received in U.S. Appl. No. 14/609,042, 12 pages.
Notice of Allowance, dated Feb. 27, 2017, received in U.S. Appl. No. 14/864,737, 9 pages.
Notice of Allowance, dated Feb. 10, 2017, received in U.S. Appl. No. 14/866,981, 5 pages.
Office Action, dated Dec. 5, 2016, received in Danish Patent Application No. 201500575, which corresponds with U.S. Appl. No. 14/866,981, 3 pages.
Office Action, dated Mar. 14, 2017, received in Danish Patent Application No. 201500574, which corresponds with U.S. Appl. No. 14/866,159, 5 pages.
Notice of Allowance, dated Jan. 30, 2017, received in received in Danish Patent Application No. 201500588, which corresponds with U.S. Appl. No. 14/868,078, 2 pages.
Notice of Allowance, dated May 2, 2017, received in received in Danish Patent Application No. 201500588, which corresponds with U.S. Appl. No. 14/868,078, 2 pages.
Notice of Allowance, dated Apr. 27, 2017, received in U.S. Appl. No. 14/863,432, 7 pages.
Notice of Allowance, dated Jan. 12, 2017, received in Chinese Patent Application No. 201620470063.8, which corresponds with U.S. Appl. No. 14/863,432, 1 page.
Final Office Action, dated Jan. 27, 2017, received in U.S. Appl. No. 14/866,511, 26 pages.
Notice of Allowance, dated Jan. 12, 2017, received in Chinese Patent Application No. 201620470281.1, which corresponds with U.S. Appl. No. 14/866,511, 1 page.
Patent, dated Jan. 23, 2017, received in Danish Patent Application No. 201500576, which corresponds with U.S. Appl. No. 14/866,511, 3 pages.
Notice of Allowance, dated Apr. 27, 2017, received in U.S. Appl. No. 16/866,489, 27 pages.
Notice of Allowance, dated Feb. 28, 2017, received in U.S. Appl. No. 14/869,899, 9 pages.
Office Action, dated Apr. 13, 2017, received in U.S. Appl. No. 14/866,992, 34 pages.
Office Action, dated Feb. 7, 2017, received in Australian Patent Application No. 2016101418, which corresponds with U.S. Appl. No. 14/866,992, 5 pages.
Office Action, dated Feb. 6, 2017, received in Danish Patent Application No. 201500593, which corresponds with U.S. Appl. No. 14/866,992, 4 pages.
Notice of Allowance, dated Jan. 4, 2017, received in U.S. Appl. No. 14/845,217, 5 pages.
Office Action, dated May 2, 2017, received in U.S. Appl. No. 14/856,517, 34 pages.
Office Action, dated Mar. 31, 2017, received in U.S. Appl. No. 14/857,700, 14 pages.
Notice of Allowance, dated Dec. 28, 2016, received in U.S. Appl. No. 14/864,580, 8 pages.
Office Action, dated May 5, 2017, received in Danish Patent Application No. 201500584, which corresponds with U.S. Appl. No. 14/864,580, 3 pages.

(56) References Cited

OTHER PUBLICATIONS

Notice of Allowance, dated Apr. 20, 2017, received in U.S. Appl. No. 14/864,601, 13 pages.
Notice of Allowance, dated Jan. 31, 2017, received in U.S. Appl. No. 14/864,627, 7 pages.
Office Action, dated May 4, 2017, received in Danish Patent Application No. 201500585, which corresponds with U.S. Appl. No. 14/864,627, 4 pages.
Certificate of Examination, dated Dec. 8, 2016, received in Australian Patent Application No. 2016100292, which corresponds with U.S. Appl. No. 14/866,361, 1 page.
Patent, dated May 3, 2017, received in Chinese Patent Application No. 2016201470246.X, which corresponds with U.S. Appl. No. 14/866,987, 2 pages.
Patent, dated Sep. 19, 2016, received in German Patent Application No. 202016002908.9, which corresponds with U.S. Appl. No. 14/866,987, 3 pages.
Office Action, dated Jan. 31, 2017, received in Danish Patent Application No. 201670463, which corresponds with U.S. Appl. No. 14/866,987, 3 pages.
Office Action, dated Apr. 19, 2017, received in Danish Patent Application No. 201670463, which corresponds with U.S. Appl. No. 14/866,987, 3 pages.
Notice of Allowance, dated Feb. 28, 2017, received in U.S. Appl. No. 14/871,236, 9 pages.
Office Action, dated Apr. 13, 2017, received in Australian Patent Application No. 2016101431, which corresponds with U.S. Appl. No. 14/871,227, 4 pages.
Office Action, dated Mar. 24, 2017, received in Japanese Patent Application No. 2016-533201, which corresponds with U.S. Appl. No. 14/871,227, 6 pages.
Office Action, dated Apr. 11, 2017, received in Australian Patent Application No. 2016101437, which corresponds with U.S. Appl. No. 14/871,336, 4 pages.
Notice of Allowance, dated Mar. 23, 2017, received in Danish Patent Application No. 201500601, which corresponds with U.S. Appl. No. 14/871,336, 2 pages.
Office Action, dated Mar. 13, 2017, received in Japanese Patent Application No. 2016-183289, which corresponds with U.S. Appl. No. 14/871,462, 5 pages.
Office Action, dated May 4, 2017, received in Danish Patent Application No. 201500598, which corresponds with U.S. Appl. No. 14/867,892, 4 pages.
Office Action, dated Mar. 1, 2017, received in U.S. Appl. No. 14/869,855, 14 pages.
Office Action, dated Feb. 9, 2017, received in U.S. Appl. No. 14/869,873, 17 pages.
Office Action, dated May 3, 2017, received in Danish Patent Application No. 201500581, which corresponds with U.S. Appl. No. 14/867,990, 5 pages.
Final Office Action, dated May 1, 2017, received in U.S. Appl. No. 15/136,782, 18 pages.
Office Action, dated Jan. 20, 2017, received in U.S. Appl. No. 15/231,745, 21 pages.
Office Action (Search Report), dated Dec. 14, 2016, received in Danish Patent Application No. 201670590, which corresponds with U.S. Appl. No. 15/231,745, 9 pages.
Office Action, dated Jan. 5, 2017, received in Danish Patent Application No. 201670592, which corresponds with U.S. Appl. No. 15/231,745, 3 pages.
Extended European Search Report, dated Mar. 15, 2017, received in European Patent Application No. 17153418.3, which corresponds with U.S. Appl. No. 14/536,648, 7 pages.
International Search Report and Written Opinion, dated Jan. 12, 2017, received in International Patent No. PCT/US2016/046419, which corresponds with U.S. Appl. No. 14/866,992, 23 pages.
International Search Report and Written Opinion, dated Dec. 15, 2016, received in International Patent Application No. PCT/US2016/046403, which corresponds with U.S. Appl. No. 15/009,661, 17 pages.

International Search Report and Written Opinion, dated Feb. 27, 2017, received in International Patent Application No. PCT/US2016/046407, which corresponds with U.S. Appl. No. 15/009,688, 30 pages.
Extended European Search Report, dated Dec. 21, 2016, received in European Patent Application No. 16189790.5, which corresponds with U.S. Appl. No. 14/871,462, 8 pages.
International Search Report and Written Opinion, dated Jan. 3, 2017, received in International Patent Application No. PCT/US2016/046214, which corresponds with U.S. Appl. No. 15/231,745, 25 pages.
Brownlee, "Android 5.0 Lollipop Feature Review!", https//www.youtube.com/watch?v=pEDQ1z1-PvU, Oct. 27, 2014, 5 pages.
Google-Chrome, "Android 5.0 Lollipop", http://androidlover.net/android-os/android-5-0-lollipop/android-5-0-lollipop-recent-apps-card-google-search.html, Oct. 19, 2014, 10 pages.
YouTube, "How to Master Android Lollipop Notifications in Four Minutes!", Video Gadgets Journal (VGJFelix), https://www.youtube.com/watch?v=S-zBRG7GGJgs, Feb. 8, 2015, 4 pages.
Office Action, dated Jun. 29, 2017, received in U.S. Appl. No. 14/608,895, 30 pages.
Patent, dated May 12, 2017, received in Japanese Patent Application No. 2015-547948, which corresponds with U.S. Appl. No. 14/536,426, 3 pages.
Patent, dated May 26, 2017, received in Korean Patent Application No. 2015-7018851, which corresponds with U.S. Appl. No. 14/536,426, 3 pages.
Office Action, dated May 15, 2017, received in Australian Patent Application No. 2016216580, which corresponds with U.S. Appl. No. 14/536,426, 3 pages.
Patent, dated May 26, 2017, received in European Patent Application No. 13724102.2, which corresponds with U.S. Appl. No. 14,536,646, 1 page.
Notice of Allowance, dated Jun. 30, 2017, received in Japanese Patent Application No. 2015-511646, which corresponds with U.S. Appl. No. 14/536,141, 5 pages.
Office Action, dated Jun. 16, 2017, received in Chinese Patent Application No. 201380068295.X, which corresponds with U.S. Appl. No. 14/608,942, 6 pages.
Notice of Allowance, dated May 12, 2017, received in Japanese Patent Application No. 2015-549393, which corresponds with U.S. Appl. No. 14/608,942, 5 pages.
Patent, dated Jun. 16, 2017, received in Japanese Patent Application No. 2015-549393, which corresponds with U.S. Appl. No. 14/608,942, 3 pages.
Office Action, dated Jul. 4, 2017, received in Australian Patent Application No. 2016238917, which corresponds with U.S. Appl. No. 14/536,203, 5 pages.
Office Action, dated Jun. 23, 2017, received in Japanese Patent Application No. 2016173113, which corresponds with U.S. Appl. No. 14/536,203, 5 pages.
Patent, dated May 18, 2017, received in Australian Patent Application No. 2013368445, which corresponds with U.S. Appl. No. 14/608,985, 1 page.
Office Action, dated May 19, 2017, received in Chinese Patent Application No. 201380068399.0, which corresponds with U.S. Appl. No. 14/608,985, 5 pages.
Notice of Allowance, dated Jul. 10, 2017, received in U.S. Appl. No. 14/609,042, 8 pages.
Notice of Allowance, dated Jun. 19, 2017, received in U.S. Appl. No. 14/864,737, 8 pages.
Office Action, dated May 15, 2017, received in Japanese Patent Application No. 2016-558331, which corresponds with U.S. Appl. No. 14/864,737, 5 pages.
Notice of Allowance, dated Jun. 23, 2017, received in Japanese Patent Application No. 2016-558331, which corresponds with U.S. Appl. No. 14/864,737, 5 pages.
Office Action, dated May 18, 2017, received in Dutch Patent Application No. 2016452, which corresponds with U.S. Appl. No. 14/864,737, 22 pages.
Office Action, dated Jul. 7, 2017, received in Danish Patent Application No. 201500575, 4 pages.

(56) References Cited

OTHER PUBLICATIONS

Office Action, dated Jul. 6, 2017, received in Danish Patent Application No. 201500574, which corresponds with U.S. Appl. No. 14/866,159, 3 pages.
Office Action, dated Jul. 13, 2017, received in Dutch Patent Application No. 2016377, which corresponds with U.S. Appl. No. 14/866,159, 13 pages.
Office Action, dated May 18, 2017, received in Dutch Patent Application No. 2016376, which corresponds with U.S. Appl. No. 14/868,078, 15 pages.
Office Action, dated Jun. 12, 2017, received in Danish Patent Application No. 201500582, which corresponds with U.S. Appl. No. 14/863,432, 5 pages.
Office Action, dated May 18, 2017, received in Dutch Patent Application No. 2016801, which corresponds with U.S. Appl. No. 14/863,432, 34 pages.
Office Action, dated Jun. 9, 2017, received in Japanese Patent Application No. 2016558214, which corresponds with U.S. Appl. No. 14/866,511, 6 pages.
Notice of Allownce, dated Jul. 6, 2017, received in U.S. Appl. No. 14/866,489, 12 pages.
Office Action, dated Jul. 3, 2017, received in Danish Patent Application No. 201500592, which corresponds with U.S. Appl. No. 14/869,899, 5 pages.
Office Action, dated May 18, 2017, received in U.S. Appl. No. 14/856,519, 35 pages.
Office Action, dated Jun. 9, 2017, received in U.S. Appl. No. 14/856,520, 36 pages.
Office Action, dated Jun. 30, 2017, received in U.S. Appl. No. 14/856,522, 22 pages.
Notice of Allowance, dated Jun. 16, 2017, received in in U.S. Appl. No. 14/857,645, 5 pages.
Office Action, dated Jun. 15, 2017, received in Danish Patent Application No. 201500579, which corresponds with U.S. Appl. No. 14/866,361, 2 pages.
Office Action, dated Jun. 16, 2017, received in Japanese Patent Application No. 2016-233450, which corresponds with U.S. Appl. No. 14/866,989, 6 pages.
Office Action, dated Jun. 15, 2017, received in Danish Patent Application No. 201500595, which corresponds with U.S. Appl. No. 14/871,236, 4 pages.
Office Action, dated Apr. 20, 2017, received in Chinese Patent Application No. 201621044346.2, which corresponds with U.S. Appl. No. 14/871,462, 3 pages.
Office Action, dated May 11, 2017, received in U.S. Appl. No. 14/867,823, 42 pages.
Office Action, dated May 15, 2017, received in Danish Patent Application No. 201500594, which corresponds with U.S. Appl. No. 14/867,823, 4 pages.
Office Action, dated Jul. 6, 2017, received in U.S. Appl. No. 14/867,892, 55 pages.
Final Office Action, dated Jun. 2, 2017, received in U.S.Appl. No. 15/081,771, 17 pages.
Office Action, dated May 23, 2017, received in Danish Patent Application No. 201770190, which corresponds with U.S. Appl. No. 15/136,782, 7 pages.
Office Action, dated Jun. 29, 2017, received in Danish Patent Application No. 201670587, which corresponds with U.S. Appl. No. 15/231,745, 4 pages.
Office Action, dated Jul. 6, 2017, received in Danish Patent Application No. 201670590, which corresponds with U.S. Appl. No. 15/231,745, 3 pages.
Extended European Search Report, dated Jun. 22, 2017, received in European Patent Application No. 16189421.7, which corresponds with U.S. Appl. No. 14/866,987, 7 pages.
Extended European Search Report, dated Jun. 8, 2017, received in European Patent Application No. 16189425.8, which corresponds with U.S. Appl. No. 14/866,989, 8 pages.

Agarwal, "How to Copy and Paste Text on Windows Phone 8," Guiding Tech, http://web.archive.org/web20130709204246/http://www.guidingtech.com/20280/copy-paste-text-windows-phone-8/, Jul. 9, 2013, 10 pages.
Alzona, "Full Screen Maximization with RightZoom," http://www.brighhub.com/computing/mac-platform/articles/31024.aspx>, Mar. 31, 2009, 6 pages.
Apple Inc., "iPhone User Guide for iPhone and iPhone 3G," http://manuals.info.apple.com/en_US/iPhone_User_Guide.pdf, Jul. 11, 2008, 154 pages.
Ask.MetaFilter, "Enable Screen Resize?" ask. Metafilter.com, Jan. 29, 2006, http://ask.metafilter.com/31720/Enable-screen-resize, 4 pages.
Awduche et al., "Synchronized Broadcast in Cellular Networks," 2nd Telecommunications R&D Conference in Massachusetts, Mar. 1996, 12 pages.
Azundris, "A Fire in the Sky," http://web.archive.org/web/20140722062639/http://blog.azundrix.com/archives/168-A-fire-in-the-sky.html, Jul. 22, 2014, 8 pages.
CrackBerry Forums, Windows 8 Bezel Control and Gestures, http://wwwforums.crackberry.com/blackberry-playbook-f222/windows-8-bezel-control-gestures-705129/, Mar. 1, 2012, 8 pages.
Crook, "Microsoft Patenting Multi-Screen, Milti-Touch Gesures," http://techcrunch.com/2011/08/25/microsoft-awarded-patents-for-multi-screen-multi-touch-gestures/, Aug. 25, 2011, 8 pages.
Cvil.ly—a design blog, Interesting Touch Interactions on Windows 8, http://cvil.ly/2011/06/04/interesting-touch-interactions-on-windows-8/, Jun. 4, 2011, 3 pages.
Deeter, "DigiStamp Signs Strategic Partnership with European Trust Center EuroSignCard to Safeguard Monetary Transactions in Financial Sector," http://proquest.umi.com/, Mar. 14, 2001, 2 pages.
Dilger, "Inside Apple's iPad: Multitasking," Appleinsider.com, <http://www.appleinsider.com/articles/10/02/18/inside_apples_ipad_multitasking.html>, Feb. 17, 2010, 3 pages.
Fahey, "The iPad Blows Up iPhone Apps Read Good," Kotaku http://kotaku.com/5458316/the-ipad-blows-up-iphone-apps-rel-good, Jan. 27, 2010, 3 pages.
Fehily, "Visual QuickStart Guide: Microsoft Windows 7," Peachpit Press, 9 pages.
Fenlon, "The Case for Bezel Touch Gestures on Apple's iPad," http://www.tested.com/tech/tablets/3104-the case-for-bezel-touch-gestures-on-apples-ipad/, Nov. 2, 2011, 6 pages.
Flowplayer, "Slowmotion: Flowplayer," https://web.archive.org/web/20150226191526/http://flash.flowplayer.org/plugins/streaming/slowmotion.html, Feb. 26, 2015, 4 pages.
Gorman, "Hands-On With Immersion HD Integrator Hi-Fi Haptics," http://www.engadget.com/2012/02/23/hands-on-with-immersion-hd-integrator-hi-fi-haptics/?utm_medium=referral&utm_source=pulsenews, Feb. 23, 2012, 10 pages.
Harris, "Windows 8 Consumer Preview: Product Demo," https://www.youtube.com/watch?feature=[;auer-embedded&v=jDYAQmQ-phX8, Feb. 28, 2012, 3 pages.
HTC, "HTC One (M7)," Wikipedia, the free encyclopedia, https://en.wikipedia.org/wiki/HTC_One_(M7), Mar. 2013, 20 pages.
HTC, "User Manual—PDA Phone—HTC_P3050 Touch," http://web.archive.org/web/20101228223033/http://www.comparecellular.com, Nov. 2, 2007, 154 pages.
iCIMS Recruiting Software, "Blackberry Playbook Review," http://www.tested.com/tech.tablets/5749-blackberry-playbook-review/, 2015, 11 pages.
Jade et al., "Apple's iPhone 4.0 to Support Multitasking via Expose-like Interface," AppleInsider.com, Mar. 31, 2010, 4 pages.
Jade et al., "Apple's iPhone 4.0 Software to Deliver Multitasking Support," AppleSider.com, Mar. 11, 2010, 3 pages.
Kishore, "Make the OS X Maximize Button Work like Windows," http://www.switchingtomac.com/making-the-switch/make-the-os-x-maximize-buttom-work-like-windows/, May 5, 2009, 11 pages.
MacRumors, "Fit to Screen Button Poll for Mac / Windows Users," http://forums.macrumors.com/showthread.php?t=615215>, Dec. 11, 2008, 15 pages.
MacRumors, "Window, Fit to Screen?," http://forums.macrumors.com/showthread.php?t=439783>, Feb. 22, 2008, 5 pages.

(56) References Cited

OTHER PUBLICATIONS

McRitchie, "Internet Explorer Right-Click Menus," http://web.archive.org/web-201405020/http:/dmcritchie.mvps.org/ie/rightie6.htm, May 2, 2014, 10 pages.

MetaFilter Network Inc., "Enable Screen Resize?", http://ask.metafilter.com/31720/Enable-screen-resize>, Jan. 29, 2006, 4 pages.

Mick, "iPhone OS 4.0 Will Bring True Multitasking This Summer", Daily Tech, http:///www.dailytech.com/report+iphone+os+40+will+bring+true+multitasking+this+summer/article17878.htm>, Mar. 11, 2010, 3 pages.

Moth, "Share Code—Write Code Once for Both Mobile and Desktop Apps," MSDN Magazine, Jul. 2007, http://msdn.microsoft.com/en-us/magazine/cc163387.aspx, 8 pages.

Newman, "Sprint's HTC EVO 4G: 5 Killer Features," pcworld, http://www.pcworld.com/article/192286/sprints_htc_evo_4g_5_killer_features.html, Mar. 24, 2010, 3 pages.

Nickinson, "Review: The New HTC Sense Interface on Android Phones," Android Central, Feb. 22, 2010, http://www.androidcentral.com/review-new-htc-sense-android-phone, 10 pages.

Nilsson, "Design Guidelines for Mobile Applications," SINTEF ICT, Jun. 2008, 73 pages.

Nilsson et al., "Design Patterns for User Interface for Mobile Applications," Advances in Engineering Software, Elsevier Science, Oxford, GB vol. 40, No. 12, Dec. 1, 2009, 11 pages.

Pallenberg, "Wow, the new iPad had gestures." https://plus.google.com/+SaschaPallenberg/posts/aaJtJogu8ac, Mar. 7, 2012, 2 pages.

Pradeep, "Android App Development—Microsoft Awarded With Patents on Gestures Supported on Windows 8," http://mspoweruser.com/microsoft-awarded-with-patents-on-gestures-supported-on-windows-8/, Aug. 25, 2011, 16 pages.

Reiger, "Effective Design for Multiple Screen Sizes," mobiForge, http://mobiforge.com/designing/story/effective-design-multiple-screen-sizes, Jan. 2009, 12 pages.

Robertson et al., "The Task Gallery: A 3D Window Manager," Redmond, WA, Sep. 12, 1999, 8 pages.

Savoy, "HTC Enhances Sense with Leap and Friend Stream (updated with video)," Engadget, http://www.engadget.com/2010/02/16/htc-enhances-sense-with-leap-and-friend-stream/, Feb. 16, 2010, 4 pages.

Seffah et al., Multi-devices "Multiple" User Interfaces: Development Models and Research Opportunities, The Journal of Systems Software, www.sciencedirect.com, Dec. 25, 2003, 14 pages.

Siracusa, "Antacid Tablet," http://arstechnica.com/staff/2010/01/antacid-tablet/>, Jan. 1, 2010, 3 pages.

Sony, "Sony Xperia Z1", Wikipedia, the free encyclopedia, https://en.wikipedia.org/wiki/Sony_Xperia_Z1, Sep. 2013, 10 pages.

Tidwell, "Designing Interfaces," O'Reilly Media, Inc., USA, Nov. 2005, 348 pages.

Viana et al., "Xmobile: A MB-UID Environment for Semi-Automatic Generation of Adaptive Applications for Mobile Devices," The Journal of Systems and Software, www.sciencedirect.com, Jun. 9, 2007, 13 pages.

Windows, "Stupid Geek Tricks: Tile or Cascade Multiple Windows in Windows 7," How to Geek, Feb. 18, 2010, 3 pages.

YouTube, "Blackberry Playbook bezel interation," https://www.youtube.com/watch?v=YGkzFqnOwXI, Jan. 10, 2011, 2 pages.

Office Action, dated May 22, 2012, received in U.S. Appl. No. 12/888,381, 18 pages.

Final Office Action, dated Nov. 19, 2012, received in U.S. Appl. No. 12/888,381, 14 pages.

Office Action, dated Dec. 10, 2013, received in U.S. Appl. No. 12/888,381, 13 pages.

Notice of Allowance, dated Oct. 21, 2014, received in U.S. Appl. No. 12/888,381, 8 pages.

Notice of Allowance, dated Feb. 17, 2015, received in U.S. Appl. No. 12/888,381, 5 pages.

Notice of Allowance (corrected), dated Apr. 9, 2015, received in U.S. Appl. No. 12/888,381, 2 pages.

Office Action, dated Aug. 8, 2013, received in Australian Patent Application No. 2010350740, 3 pages.

Office Action, dated Aug. 28, 2012, received in Chinese Patent Application No. 201010602688.2, which corresponds with U.S. Appl. No. 12/888,381, 6 pages.

Office Action, dated May 24, 2013, received in Chinese Patent Application No. 201010602688.2, which corresponds with U.S. Appl. No. 12/888,381, 7 pages.

Office Action, dated Aug. 6, 2013, received in European Patent Application No. 10760867.1, which corresponds with U.S. Appl. No. 12/888,381, 4 pages.

Office Action, dated Dec. 6, 2013, received in Japanese Patent Application No. 2013-503722, which corresponds with U.S. Appl. No. 12/888,381, 2 pages.

Office Action, dated Nov. 29, 2013, received in Korean Patent Application No. 2012-7029281, which corresponds with U.S. Appl. No. 12/888,381, 4 pages.

Office Action, dated May 10, 2012, received in U.S. Appl. No. 12/888,382, 9 pages.

Final Office Action, dated Nov. 15, 2012, received in U.S. Appl. No. 12/888,382, 11 pages.

Office Action, dated Dec. 10, 2013, received in U.S. Appl. No. 12/888,382, 12 pages.

Notice of Allowance, dated Oct. 31, 2014, received in U.S. Appl. No. 12/888,382, 5 pages.

Notice of Allowance, dated Feb. 13, 2015, received in U.S. Appl. No. 12/888,382, 6 pages.

Office Action, dated May 17, 2012, received in U.S. Appl. No. 12/888,384, 15 pages.

Final Office Action, dated Nov. 7, 2012, received in U.S. Appl. No. 12/888,384, 14 pages.

Office Action, dated May 16, 2012, received in U.S. Appl. No. 12/888,386, 12 pages.

Final Office Action, dated Nov. 8, 2012, received in U.S. Appl. No. 12/888,386, 13 pages.

Office Action, dated Jan. 23, 2013, received in U.S. Appl. No. 12/888,389, 11 pages.

Final Office Action, dated Sep. 12, 2013, received in U.S. Appl. No. 12/888,389, 10 pages.

Notice of Allowance, dated Sep. 8, 2014, received in U.S. Appl. No. 12/888,389, 13 pages.

Notice of Allowance, dated Feb. 11, 2015, received in U.S. Appl. No. 12/888,389, 13 pages.

Notice of Allowance, dated Jun. 15, 2012, received in U.S. Appl. No. 12/888,391, 23 pages.

Office Action, dated Jun. 28, 2013, received in U.S. Appl. No. 13/077,524, 17 pages.

Office Action, dated Apr. 4, 2013, received in U.S. Appl. No. 12/789,426, 8 pages.

Office Action, dated Feb. 12, 2014, received in U.S. Appl. No. 13/077,524, 13 pages.

Notice of Allowance, dated May 27, 2015, received in U.S. Appl. No. 13/077,524, 9 pages.

Notice of Allowance, dated Sep. 15, 2015, received in U.S. Appl. No. 13/077,524, 9 pages.

Office Action, dated Mar. 19, 2013, received in U.S. Appl. No. 13/333,909, 18 pages.

Final Office Action, dated Dec. 5, 2013, received in U.S. Appl. No. 13/333,909, 24 pages.

Notice of Allowance, dated Mar. 31, 2014, received in U.S. Appl. No. 13/333,909. 20 pages.

Office Action, dated Dec. 18, 2015, received in Australian Patent Application No. 2013368440, which corresponds with U.S. Appl. No. 14/536,426, 3 pages.

Office Action, dated Apr. 5, 2016, received in Korean Patent Application No. 10-2015-7018851, which corresponds with U.S. Appl. No. 14/536,426, 7 pages.

Office Action, dated Feb. 1, 2016, received in Australian Patent Application No. 2013368441, which corresponds with U.S. Appl. No. 14/608,926, 3 pages.

Notice of Allowance, dated Mar. 30, 2016, received in Australian Patent Application No. 2013368441, which corresponds with U.S. Appl. No. 14/608,926, 1 page.

(56) References Cited

OTHER PUBLICATIONS

Office Action, dated Mar. 14, 2016, received in Japanese Patent Application No. 2015-549392, which corresponds with U.S. Appl. No. 14/608,926, 4 pages.
Office Action, dated Feb. 29, 2016, received in Japanese Patent Application No. 2015-511645, which corresponds with U.S. Appl. No. 14/536,646, 5 pages.
Office Action, dated Feb. 29, 2016, received in Japanese Patent Application No. 2015-511646, which corresponds with U.S. Appl. No. 14/536,141, 3 pages.
Office Action, dated Jan. 29, 2016, received in Australian Patent Application No. 2013368443, which corresponds with U.S. Appl. No. 14/536,141, 3 pages.
Notice of Allowance, dated Mar. 11, 2016, received in Australian Patent Application No. 2013368443, which corresponds with U.S. Appl. No. 14/536,141, 2 pages.
Office Action, dated Apr. 5, 2016, received in Korean Patent Application No. 10-2015-7018448, which corresponds with U.S. Appl. No. 14/536,141, 6 pages.
Office Action, dated Nov. 23, 2015, received in U.S. Appl. No. 14/183,316, 17 pages.
Office Action, dated Jul. 7, 2015, received in U.S. Appl. No. 14/183,347, 14 pages.
Final Office Action, dated Dec. 18, 2015, received in U.S. Appl. No. 14/183,347, 6 pages.
Notice of Allowance, dated Apr. 6, 2016, received in U.S. Appl. No. 14/183,347, 7 pages.
Notice of Allowance (corrected), dated Apr. 19, 2016, received in U.S. Appl. No. 14/183,347, 3 pages.
Certificate of Grant, dated Apr. 7, 2016, received in Australian Patent Application No. 2016100293, which corresponds with U.S. Appl. No. 14/864,737, 1 page.
Certificate of Grant, dated Mar. 24, 2016, received in Australian Patent Application No. 2016100254, which corresponds with U.S. Appl. No. 14/866,981, 1 page.
Office Action, dated Mar. 18, 2016, received in Danish Patent Application No. 201500575, which corresponds with U.S. Appl. No. 14/866,981, 9 pages.
Certificate of Grant, dated Mar. 24, 2016, received in Australian Patent Application No. 2016100251, which corresponds with U.S. Appl. No. 14/866,159, 1 page.
Certificate of Grant, dated Mar. 24, 2016, received in Australian Patnet Application No. 2016100247, which corresponds with U.S. Appl. No. 14/868,078, 1 page.
Office Action, dated Mar. 30, 2016, received in Danish Patent Application No. 201500588, which corresponds with U.S. Appl. No. 14/868,078, 9 pages.
Office Action, Apr. 4, 2016, received in Danish Patent Application No. 201500582, which corresponds with U.S. Appl. No. 14,863,432, 10 pages.
Office Action, dated Mar. 22, 2016, received in Danish Patent Application No. 201500576, which corresponds with U.S. Appl. No. 14/866,989, 10 pages.
Final Office Action, dated Apr. 22, 2016, received in U.S. Appl. No. 14/845,217, 36 pages.
Office Action, dated Jan. 25, 2016, received in U.S. Appl. No. 14,864,580, 29 pages.
Office Action, dated Apr. 8, 2016, received in Danish Patent Application No. 201500584, which corresponds with U.S. Appl. No. 14/864,580, 9 pages.
Office Action, dated Apr. 19, 2016, received in U.S. Appl. No. 14/864,627, 9 pages.
Office Action, dated Apr. 8, 2016, received in Danish Patent Application No. 201500585, which corresponds with U.S. Appl. No. 14/864,627, 9 pages.
Office Action, dated Mar. 29, 2016, received in U.S. Appl. No. 14/866,361, 22 pages.
Office Action, dated Apr. 7, 2016, received in Danish Patent Application No. 201500579, which corresponds with U.S. Appl. No. 14/866,361, 10 pages.
Office Action, dated Mar. 22, 2016, received in Danish Patent Application No. 201500587, which corresponds with U.S. Appl. No. 14/866,987, 8 pages.
Office Action, dated Apr. 1, 2016, received in Danish Patent Application No. 201500589, which corresponds with U.S. Appl. No. 14/866,989, 8 pages.
Office Action, dated Apr. 11, 2016, received in U.S. Appl. No. 14/871,236, 23 pages.
Office Action, dated Apr. 8, 2016, received in Danish Patent Application No. 201500595, which corresponds with U.S. Appl. No. 14/871,236, 12 pages.
Office Action, dated Apr. 6, 2016, received in Danish Patent Application No. 201500596, which corresponds with U.S. Appl. No. 14/870,882, 7 pages.
Office Action, dated Apr. 7, 2016, received in Danish Patent Application No. 201500597, which corresponds with U.S. Appl. No. 14/871,227, 7 pages.
Office Action, dated Apr. 18, 2016, received in Danish Patent Application No. 201500601, which corresponds with U.S. Appl. No. 14/871,336, 8 pages.
Notice of Allowance, dated Apr. 18, 2016, received in Danish Patent Application No. 201500600, which corresponds with U.S. Appl. No. 14/871,462, 7 pages.
Office Action, dated Mar. 18, 2016, received in Danish Patent Application No. 201500594, which corresponds with U.S. Appl. No. 14/867,823, 10 pages.
Office Action, dated Mar. 21, 2016, received in Danish Patent Application No. 201500598, which corresponds with U.S. Appl. No. 14/867,892, 9 pages.
Certificate of Grant, dated Mar. 24, 2016, received in Australian Patent Application No. 20161002253, which corresponds with U.S. Appl. No. 14/867,990, 1 page.
Office Action, dated Mar. 18, 2016, received in Danish Patent Application No. 201500581, which corresponds with U.S. Appl. No. 14/867,990, 9 pages.
International Search Report and Written Opinion, dated Dec. 10, 2010, received in International Patent Application No. PCT/US2010/050057, which corresponds with U.S. Appl. No. 12/888,381, 9 pages.
International Preliminary Search Report on Patentability, dated Oct. 9, 2012, received in International Patent Application No. PCT/US2010/050057, which corresponds with U.S. Appl. No. 12/888,381, 6 pages.
Office Action, dated Jul. 4, 2017, received in European Patent Application No. 13795392.3, which corresponds with U.S. Appl. No. 14/608,926, 4 pages.
Patent, dated Jun. 30, 2017, received in Korean Patent Application No. 2015-7018853, which corresponds with U.S. Appl. No. 14/608,926, 3 pages.
Office Action, dated Jul. 17, 2017, received in U.S. Appl. No. 14/536,166, 19 pages.
Notice of Allowance, dated Jul. 14, 2017, received in Japanese Patent Application No. 2016558214, which corresponds with U.S. Appl. No. 14/866,511, 5 pages.
Search Report, dated Jun. 22, 2017, received in Dutch Patent Application No. 2016375, which corresponds with U.S. Appl. No. 14/866,981, 17 pages.
Anonymous, "Google Android 5.0 Release Date, Specs and Editors Hands on Review—CNET", http://www.cnet.com/products/google-an-android-5-0-lollipop/, Mar. 12, 2015, 10 pages.
Sood, "MultitaskingGestures", http://cydia.saurik.com/package/org.thebigboxx.multitaskinggestures/, Mar. 3, 2014, 2 pages.
YouTube, "Multitasking Gestures: Zephyr Like Gestures on iOS", https://www.youtube.com/watch?v=Jcod-f7Lw0I, Jan. 27, 2014, 3 pages.
YouTube, "Recentz—Recent Apps in A Tap", https://www.youtube.com/watch?v=qailSHRgsTo, May 15, 2015, 1 page.
Certificate of Grant, dated Apr. 29, 2017, received in Australian Patent Application No. 2013368440, which corresponds with U.S. Appl. No. 14/536,426, 3 pages.
Office Action, dated Jul. 26, 2017, received in U.S. Appl. No. 14/536,235, 14 pages.

(56) References Cited

OTHER PUBLICATIONS

Final Office Action, dated Aug. 25, 2017, received in U.S. Appl. No. 14/536,464, 30 pages.
Office Action, dated Sep. 25, 2017, received in U.S. Appl. No. 14/536,644, 29 pages.
Notice of Allowance, dated Sep. 20, 2017, received in U.S. Appl. No. 14/536,141, 10 pages.
Final Office Action, dated Sep. 21, 2017, received in U.S. Appl. No. 14/609,006, 17 pages.
Notice of Allowance, dated Sep. 18, 2017, received in U.S. Appl. No. 14/863,432, 8 pages.
Office Action, dated Sep. 1, 2017, received in U.S. Appl. No. 14/870,754, 22 pages.
Office Action, dated Sep. 1, 2017, received in U.S. Appl. No. 14/870,988, 14 pages.
Final Office Action, dated Aug. 18, 2017, received in U.S. Appl. No. 14/869,873, 20 pages.
Notice of Allowance, dated Jul. 6, 2017, received in U.S. Appl. No. 15/231,745, 18 pages.
Office Action, dated Aug. 30, 2017, received in U.S. Appl. No. 15/655,749, 22 pages.
Office Action, dated Sep. 19, 2017, received in Chinese Patent Application No. 201380035982.1, which corresponds with U.S. Appl. No. 14/536,426, 5 pages.
Office Action, dated Sep. 20, 2017, received in Chinese Patent Application No. 201510566550.4, which corresponds with U.S. Appl. No. 14/536,426, 11 pages.
Office Action, dated Aug. 21, 2017, received in European Patent Application No. 15183980.0, which corresponds with U.S. Appl. No. 14/536,426, 3 pages.
Office Action, dated Aug. 22, 2017, received in Korean Patent Application No. 2017-7018250, which corresponds with U.S. Appl. No. 14/608,926, 2 pages.
Office Action, dated Jul. 21, 2017, received in Australian Patent Application No. 2016262773, which corresponds with U.S. Appl. No. 14/536,141, 3 pages.
Patent, dated Jul. 28, 2017, received in Japanese Patent Application No. 2015-511646, which corresponds with U.S. Appl. No. 14/536,141, 3 pages.
Office Action, dated Sep. 13, 2017, received in European Patent Application No. 16177863.4, which corresponds with U.S. Appl. No. 14/536,267, 6 pages.
Notice of Allowance, dated Sep. 1, 2017, received in Korean Patent Application No. 2016-7029533, which corresponds with U.S. Appl. No. 14/536,267, 4 pages.
Office Action, dated Jul. 21, 2017, received in Australian Patent Application No. 2016216658, which corresponds with U.S. Appl. No. 14/536,291, 3 pages.
Notice of Allowance, dated Sep. 19, 2017, received in Chinese Patent Application No. 201380068399.0, which corresponds with U.S. Appl. No. 14/608,985, 3 pages.
Office Action, dated Sep. 19, 2017, received in Korean Patent Application No. 2015-7019984, which corresponds with U.S. Appl. No. 14/608,985, 4 pages.
Office Action, dated Jul. 21, 2017, received in Australian Patent Application No. 2016247194, which corresponds with U.S. Appl. No. 14/536,648, 3 pages.
Patent, dated Jul. 28, 2017, received in Japanese Patent Application No. 2016558331, which corresponds with U.S. Appl. No. 14/864,737, 3 pages.
Patent, dated Jul. 12, 2017, received in Dutch Patent Application No. 2016452, which corresponds with U.S. Appl. No. 14/864,737, 2 pages.
Patent, dated Sep. 7, 2017, received in Dutch Patent Application No. 2016377, which corresponds with U.S. Appl. No. 14/866,159, 4 pages.
Notice of Allowance, dated Sep. 1, 2017, received in Korean Patent Application No. 2016229421, which corresponds with U.S. Appl. No. 14/868,078, 3 pages.
Patent, dated Sep. 11, 2017, received in Danish Patent Application No. 201500588, which corresponds with U.S. Appl. No. 14/868,078, 5 pages.
Patent, dated Jul. 12, 2017, received in Dutch Patent Application No. 2016376, which corresponds with U.S. Appl. No. 14/868,078, 2 pages.
Grant, dated Jul. 21, 2017, received in Dutch Patent Application No. 2016801, which corresponds with U.S. Appl. No. 14/871,227, 8 pages.
Patent, dated Aug. 18, 2017, received in Japanese Patent Application No. 2016558214, which corresponds with U.S. Appl. No. 14/866,511, 3 pages.
Office Action, dated Sep. 5, 2017, received in Danish Patent Application No. 201500593, which corresponds with U.S. Appl. No. 14/866,992, 6 pages.
Office Action, dated Sep. 22, 2017, received in Japanese Patent Application No. 2017-029201, which corresponds with U.S. Appl. No. 14/857,636 8 pages.
Notice of Allowance, dated Sep. 22, 2017, received in Japanese Patent Application No. 2016-233449, which corresponds with U.S. Appl. No. 14/866,987, 5 pages.
Office Action, dated Jul. 31, 2017, received in Japanese Patent Application No. 2017126445, which corresponds with U.S. Appl. No. 14/866,987, 6 pages.
Office Action, dated Aug. 4, 2017, received in Japanese Patent Application No. 2016-533201, which corresponds with U.S. Appl. No. 14/871,227, 6 pages.
Office Action, dated Aug. 29, 2017, received in Korean Patent Application No. 2017-7014536, which corresponds with U.S. Appl. No. 15/081,771, 5 pages.
Office Action, dated Jul. 27, 2017, received in Australian Patent Application No. 2017100535, which corresponds with U.S. Appl. No. 15/272,341, 4 pages.
Office Action, dated Aug. 4, 2017, received in Danish Patent Application No. 201770377, 9 pages.
Extended European Search Report, dated Sep. 11, 2017, received in European Patent Application No. 17163309.2, which corresponds with U.S. Appl. No. 14/866,987, 8 pages.
Extended European Search Report, dated Jul. 25, 2017, received in European Patent Application No. 17171972.7, which corresponds with U.S. Appl. No. 14/870,882, 12 pages.
Extended European Search Report, dated Jul. 25, 2017, received in European Patent Application No. 17172266.3, which corresponds with U.S. Appl. No. 14/871,336, 9 pages.

\* cited by examiner

4000

```
┌─────────────────────────────────────────────────────────────┐
│ Display a plurality of icons in a predefined area on a      │─4002
│ display, wherein the plurality of icons include a           │
│ respective icon                                             │
└─────────────────────────────────────────────────────────────┘
                              │
                              ▼
┌─────────────────────────────────────────────────────────────┐
│ Detect a gesture that includes: a contact on a touch-       │
│ sensitive surface while a focus selector is over the        │─4004
│ respective icon, and subsequent movement of the contact     │
│ across the touch-sensitive surface that corresponds to      │
│ movement of the focus selector outside of the predefined    │
│ area                                                        │
└─────────────────────────────────────────────────────────────┘
                              │
                              ▼
┌─────────────────────────────────────────────────────────────┐
│ In response to detecting the gesture:                   ─4006│
│  ┌────────────────────────────────────────────────────┐     │
│  │ In accordance with a determination that the        │─4008 │
│  │ contact had a maximum intensity during the gesture │     │
│  │ that was below a respective intensity threshold:   │     │
│  │  ┌──────────────────────────────────────────────┐  │     │
│  │  │ Display an indication that the gesture is    │─4010│
│  │  │ being performed during the gesture           │  │     │
│  │  │ ┌ ─ ─ ─ ─ ─ ─ ─ ─ ─ ─ ─ ─ ─ ─ ─ ─ ─ ─ ─ ─ ┐│  │     │
│  │  │  Change the appearance of the respective    │─4012│
│  │  │ │ icon in the predefined area; and while   ││  │     │
│  │  │  displaying the respective icon with the    │  │     │
│  │  │ │ changed appearance on the display, move  ││  │     │
│  │  │  a representation of the respective icon    │  │     │
│  │  │ │ in accordance with movement of the       ││  │     │
│  │  │  contact during the gesture                 │  │     │
│  │  │ └ ─ ─ ─ ─ ─ ─ ─ ─ ─ ─ ─ ─ ─ ─ ─ ─ ─ ─ ─ ─ ┘│  │     │
│  │  │ ┌ ─ ─ ─ ─ ─ ─ ─ ─ ─ ─ ─ ─ ─ ─ ─ ─ ─ ─ ─ ─ ┐│  │     │
│  │  │  Displaying the indication that the gesture │  │     │
│  │  │ │ is being performed includes, while       ││─4014│
│  │  │  maintaining the respective icon in a fixed │  │     │
│  │  │ │ location in the predefined area, move a  ││  │     │
│  │  │  cursor on the display in accordance with   │  │     │
│  │  │ │ movement of the contact                  ││  │     │
│  │  │ └ ─ ─ ─ ─ ─ ─ ─ ─ ─ ─ ─ ─ ─ ─ ─ ─ ─ ─ ─ ─ ┘│  │     │
│  │  │ ┌ ─ ─ ─ ─ ─ ─ ─ ─ ─ ─ ─ ─ ─ ─ ─ ─ ─ ─ ─ ─ ┐│  │     │
│  │  │  Displaying the indication that the gesture │  │     │
│  │  │ │ is being performed includes, while       ││─4016│
│  │  │  constraining movement of the respective    │  │     │
│  │  │ │ icon to the predefined area, move the    ││  │     │
│  │  │  respective icon in accordance with the     │  │     │
│  │  │ │ movement of the contact during the       ││  │     │
│  │  │  gesture                                    │  │     │
│  │  │ └ ─ ─ ─ ─ ─ ─ ─ ─ ─ ─ ─ ─ ─ ─ ─ ─ ─ ─ ─ ─ ┘│  │     │
│  │  └──────────────────────────────────────────────┘  │     │
│  │  ┌──────────────────────────────────────────────┐  │     │
│  │  │ Retain the respective icon in the predefined │─4018│
│  │  │ area after the gesture has ended             │  │     │
│  │  └──────────────────────────────────────────────┘  │     │
│  └────────────────────────────────────────────────────┘     │
└─────────────────────────────────────────────────────────────┘
                              │
                              ▼
                             (A)
```

Figure 12A

DEVICE, METHOD, AND GRAPHICAL USER INTERFACE FOR DISPLAYING ADDITIONAL INFORMATION IN RESPONSE TO A USER CONTACT

RELATED APPLICATIONS

This application is a Continuation of PCT Patent Application Serial No. PCT/US2013/040058, filed on May 8, 2013, entitled "Device, Method, and Graphical User Interface for Displaying Additional Information in Response to a User Contact," which claims the benefit of and priority to U.S. Provisional Patent Application Ser. No. 61/778,171, filed on Mar. 12, 2013, entitled "Device, Method, and Graphical User Interface for Displaying Additional Information in Response to a User Contact;" U.S. Provisional Patent Application No. 61/747,278, filed Dec. 29, 2012, entitled "Device, Method, and Graphical User Interface for Manipulating User Interface Objects with Visual and/or Haptic Feedback;" and U.S. Provisional Patent Application No. 61/688,227, filed May 9, 2012, entitled "Device, Method, and Graphical User Interface for Manipulating User Interface Objects with Visual and/or Haptic Feedback," which applications are incorporated by reference herein in their entireties.

This application is also related to the following: U.S. Provisional Patent Application Ser. No. 61/778,092, filed on Mar. 12, 2013, entitled "Device, Method, and Graphical User Interface for Selecting Object within a Group of Objects;" U.S. Provisional Patent Application Ser. No. 61/778,125, filed on Mar. 12, 2013, entitled "Device, Method, and Graphical User Interface for Navigating User Interface Hierarchies;" U.S. Provisional Patent Application Ser. No. 61/778,156, filed on Mar. 12, 2013, entitled "Device, Method, and Graphical User Interface for Manipulating Framed Graphical Objects;" U.S. Provisional Patent Application Ser. No. 61/778,179, filed on Mar. 12, 2013, entitled "Device, Method, and Graphical User Interface for Scrolling Nested Regions;" U.S. Provisional Patent Application Ser. No. 61/778,191, filed on Mar. 12, 2013, entitled "Device, Method, and Graphical User Interface for Displaying User Interface Objects Corresponding to an Application;" U.S. Provisional Patent Application Ser. No. 61/778,211, filed on Mar. 12, 2013, entitled "Device, Method, and Graphical User Interface for Facilitating User Interaction with Controls in a User Interface;" U.S. Provisional Patent Application Ser. No. 61/778,239, filed on Mar. 12, 2013, entitled "Device, Method, and Graphical User Interface for Forgoing Generation of Tactile Output for a Multi-Contact Gesture;" U.S. Provisional Patent Application Ser. No. 61/778,284, filed on Mar. 12, 2013, entitled "Device, Method, and Graphical User Interface for Providing Tactile Feedback for Operations Performed in a User Interface;" U.S. Provisional Patent Application Ser. No. 61/778,287, filed on Mar. 12, 2013, entitled "Device, Method, and Graphical User Interface for Providing Feedback for Changing Activation States of a User Interface Object;" U.S. Provisional Patent Application Ser. No. 61/778,363, filed on Mar. 12, 2013, entitled "Device, Method, and Graphical User Interface for Transitioning between Touch Input to Display Output Relationships;" U.S. Provisional Patent Application Ser. No. 61/778,367, filed on Mar. 12, 2013, entitled "Device, Method, and Graphical User Interface for Moving a User Interface Object Based on an Intensity of a Press Input;" U.S. Provisional Patent Application Ser. No. 61/778,265, filed on Mar. 12, 2013, entitled "Device, Method, and Graphical User Interface for Transitioning between Display States in Response to a Gesture;" U.S. Provisional Patent Application Ser. No. 61/778,373, filed on Mar. 12, 2013, entitled "Device, Method, and Graphical User Interface for Managing Activation of a Control Based on Contact Intensity;" U.S. Provisional Patent Application Ser. No. 61/778,412, filed on Mar. 13, 2013, entitled "Device, Method, and Graphical User Interface for Displaying Content Associated with a Corresponding Affordance;" U.S. Provisional Patent Application Ser. No. 61/778,413, filed on Mar. 13, 2013, entitled "Device, Method, and Graphical User Interface for Selecting User Interface Objects;" U.S. Provisional Patent Application Ser. No. 61/778,414, filed on Mar. 13, 2013, entitled "Device, Method, and Graphical User Interface for Moving and Dropping a User Interface Object;" U.S. Provisional Patent Application Ser. No. 61/778,416, filed on Mar. 13, 2013, entitled "Device, Method, and Graphical User Interface for Determining Whether to Scroll or Select Content;" and U.S. Provisional Patent Application Ser. No. 61/778,418, filed on Mar. 13, 2013, entitled "Device, Method, and Graphical User Interface for Switching between User Interfaces," which are incorporated herein by reference in their entireties.

This application is also related to the following: U.S. Provisional Patent Application Ser. No. 61/645,033, filed on May 9, 2012, entitled "Adaptive Haptic Feedback for Electronic Devices;" U.S. Provisional Patent Application Ser. No. 61/665,603, filed on Jun. 28, 2012, entitled "Adaptive Haptic Feedback for Electronic Devices;" and U.S. Provisional Patent Application Ser. No. 61/681,098, filed on Aug. 8, 2012, entitled "Adaptive Haptic Feedback for Electronic Devices," which are incorporated herein by reference in their entireties.

TECHNICAL FIELD

This relates generally to electronic devices with touch-sensitive surfaces, including but not limited to electronic devices with touch-sensitive surfaces that detect inputs for manipulating user interfaces.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But existing methods for performing these manipulations are cumbersome and inefficient. In addition, existing methods take longer than necessary, thereby wasting energy. This latter consideration is particularly important in battery-operated devices.

SUMMARY

Accordingly, there is a need for electronic devices with faster, more efficient methods and interfaces for manipulating user interfaces. Such methods and interfaces optionally complement or replace conventional methods for manipulating user interfaces. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

There is a need for electronic devices with faster, more efficient methods and interfaces for performing user interface operations on an electronic device with a track pad or touch screen. Examples of such operations including scrolling through a list of items or deleting an item in the list. Such methods and interfaces may complement or replace conventional methods for performing user interface operations. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes: displaying a user interface on the display and detecting a gesture by a user on the touch-sensitive surface that includes a contact that corresponds to a focus selector at a respective location in the user interface, where the gesture is associated with a respective operation. The method further includes, in response to detecting the gesture, in accordance with a determination that the contact has a maximum intensity below a first intensity threshold, requesting confirmation that the user wants the device to perform the respective operation. The method further includes, in accordance with a determination that the maximum intensity of the contact is above the first intensity threshold, performing the respective operation without requesting confirmation that the user wants the device to perform the respective operation.

In accordance with some embodiments, an electronic device includes a display unit configured to display a user interface on the display unit; a touch-sensitive surface unit configured to detect a gesture by a user on the touch-sensitive surface unit that includes a contact that corresponds to a focus selector at a respective location in the user interface, wherein the gesture is associated with a respective operation; and a processing unit coupled to the display unit and the touch-sensitive surface unit. The processing unit is configured to: in response to detecting the gesture: in accordance with a determination that the contact has a maximum intensity below a first intensity threshold, request confirmation that the user wants the device to perform the respective operation; and in accordance with a determination that the maximum intensity of the contact is above the first intensity threshold, perform the respective operation without requesting confirmation that the user wants the device to perform the respective operation.

Thus, electronic devices with displays, touch-sensitive surfaces and one or more sensors to detect intensity of contacts with the touch-sensitive surface are provided with faster, more efficient methods and interfaces for performing user interface operations, thereby increasing the effectiveness, efficiency, and user satisfaction with such devices. Such methods and interfaces may complement or replace conventional methods for performing user interface operations.

There is a need for electronic devices with faster, more efficient methods and interfaces for displaying additional (e.g., initially undisplayed) information when a user contact is detected while a focus selector that corresponds to the contact is at a location on a display that is associated with the additional information. Such methods and interfaces may complement or replace conventional methods for displaying such additional information. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes detecting a contact on the touch-sensitive surface while a focus selector corresponding to the contact is at a respective location on the display that is associated with additional information that is not initially displayed on the display. The method further includes, while the focus selector is at the respective location: in accordance with a determination that the contact has an intensity above a respective intensity threshold before a predefined delay time has elapsed with the focus selector at the respective location, displaying the additional information associated with the respective location without waiting until the predefined delay time has elapsed; and in accordance with a determination that the contact has an intensity below the respective intensity threshold, waiting until the predefined delay time has elapsed while the focus selector is at the respective location to display the additional information associated with the respective location.

In accordance with some embodiments, an electronic device includes a display unit configured to display additional information associated with a respective location; a touch sensitive surface unit configured to receive a contact on the touch-sensitive surface unit; one or more sensor units configured to detect intensity of contacts with the touch-sensitive surface unit; and a processing unit coupled to the display unit, the touch-sensitive surface unit, and the sensor units. The processing unit is configured to: detect a contact on the touch-sensitive surface unit while a focus selector corresponding to the contact is at a respective location on the display unit that is associated with additional information that is not initially displayed on the display unit; and while the focus selector is at the respective location: in accordance with a determination that the contact has an intensity above a respective intensity threshold before a predefined delay time has elapsed with the focus selector at the respective location, enable display of the additional information associated with the respective location without waiting until the predefined delay time has elapsed; and in accordance with a determination that the contact has an intensity below the respective intensity threshold, wait until the predefined delay time has elapsed while the focus selector is at the respective location to enable display of the additional information associated with the respective location.

Thus, electronic devices with displays, touch-sensitive surfaces and one or more sensors to detect intensity of contacts with the touch-sensitive surface are provided with faster, more efficient methods and interfaces for displaying additional (e.g., initially undisplayed) information when a contact is detected, thereby increasing the effectiveness, efficiency, and user satisfaction with such devices. Such methods and interfaces may complement or replace conventional methods for displaying additional (e.g., initially undisplayed) information when a contact is detected.

There is a need for electronic devices with faster, more efficient methods and interfaces for removing an icon from a predefined area. Such methods and interfaces may complement or replace conventional methods for removing an icon from a predefined area. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface, and one or more sensors to detect intensity of contacts with the touch-sensitive surface. The method includes: displaying a plurality of icons in a predefined area on the display, where the plurality of icons include a respective icon; detecting a gesture that includes: a contact on the touch-sensitive surface while a focus selector is over the respective icon and subsequent movement of the contact across the touch-sensitive surface that corresponds to movement of the focus selector outside of the predefined area; and in response to detecting the gesture: in accordance with a determination that the contact had a maximum intensity during the gesture that was below a respective intensity threshold, displaying an indication that the gesture is being performed during the gesture and retaining the respective icon in the predefined area after the gesture has ended; and in accordance with a determination that the contact reached an intensity during the gesture that was above the respective intensity threshold, moving the respective icon in accordance with the movement of the contact during the gesture and removing the respective icon from the predefined area after the gesture has ended.

In accordance with some embodiments, an electronic device includes a display unit configured to display a plurality of icons in a predefined area on the display unit, wherein the plurality of icons include a respective icon; a touch-sensitive surface unit configured to receive gestures; one or more sensor units configured to detect intensity of contacts with the touch-sensitive surface unit; and a processing unit coupled to the display unit, the touch-sensitive surface unit, and the sensor units. The processing unit is configured to: detect a gesture that includes a contact on the touch-sensitive surface unit while a focus selector is over the respective icon and subsequent movement of the contact across the touch-sensitive surface unit that corresponds to movement of the focus selector outside of the predefined area, and in response to detecting the gesture: in accordance with a determination that the contact had a maximum intensity during the gesture that was below a respective intensity threshold, enable display of an indication that the gesture is being performed during the gesture and retain the respective icon in the predefined area after the gesture has ended; and in accordance with a determination that the contact reached an intensity during the gesture that was above the respective intensity threshold, move the respective icon in accordance with the movement of the contact during the gesture and remove the respective icon from the predefined area after the gesture has ended.

Thus, electronic devices with displays, touch-sensitive surfaces, and one or more sensors to detect intensity of contacts with the touch-sensitive surface are provided with faster, more efficient methods and interfaces for removing an icon from a predefined area, thereby increasing the effectiveness, efficiency, and user satisfaction with such devices. Such methods and interfaces may complement or replace conventional methods for removing an icon from a predefined area.

There is a need for electronic devices with faster, more efficient methods and interfaces for displaying content layers. Such methods and interfaces may complement or replace conventional methods for displaying content layers. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes: displaying, on the display, first content, where portions of the first content are correlated with corresponding portions of second content that are not displayed on the display; while a focus selector is over a first portion of the first content, detecting an increase in intensity of a contact on the touch-sensitive surface above a respective intensity threshold; and in response to detecting the increase in intensity of the contact on the touch-sensitive surface above the respective intensity threshold: ceasing to display the first portion of the first content, and displaying a first portion of the second content that corresponds to the first portion of the first content.

In accordance with some embodiments, an electronic device includes a display unit configured to display, on the display unit, first content, where portions of the first content are correlated with corresponding portions of second content that are not displayed on the display unit; a touch-sensitive surface unit configured to receive contacts; one or more sensors configured to detect intensity of contacts with the touch-sensitive surface unit; and a processing unit coupled to the display unit, the touch-sensitive surface unit, and the sensors. The processing unit is configured to: while a focus selector is over a first portion of the first content, detect an increase in intensity of a contact on the touch-sensitive surface unit above a respective intensity threshold; and in response to detecting the increase in intensity of the contact on the touch-sensitive surface unit above the respective intensity threshold: cease to display the first portion of the first content, and enable display of a first portion of the second content that corresponds to the first portion of the first content.

Thus, electronic devices with displays, touch-sensitive surfaces and one or more sensors to detect intensity of contacts with the touch-sensitive surface are provided with faster, more efficient methods and interfaces for displaying content layers, thereby increasing the effectiveness, efficiency, and user satisfaction with such devices. Such methods and interfaces may complement or replace conventional methods for displaying content layers.

There is a need for electronic devices with faster, more efficient methods and interfaces for navigating between user interfaces (for example between an inbox view and a conversation view in an email client application) by using user inputs, such as inputs on a track pad or touch screen, or inputs from a touch-sensitive surface. Such methods and interfaces may complement or replace conventional methods for navigating between user interfaces. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes: displaying a first user interface on the display. The method further includes, while a focus selector is over a first representation of an object in the first user interface, detecting a first gesture on the touch-sensitive surface that includes a first contact with a maximum intensity during the first gesture above a respective intensity threshold. The method further includes, in response to detecting the first gesture, replacing the first user interface with a second user interface that includes a second representation of the object. The method further includes, while the focus selector is over the second representation of the object in the second user interface, detecting a second gesture on the touch-sensitive surface that includes a second contact with a maximum intensity during the second gesture above the respective intensity threshold. The method further includes, in response to detecting the second gesture, replacing the second user interface with the first user interface.

In accordance with some embodiments, an electronic device includes a display unit configured to display a first user interface that includes a first representation of an object and a second user interface that includes a second representation of the object; a touch-sensitive surface unit configured to detect, while a focus selector is over the first representation of the object in the first user interface, a first gesture on the touch-sensitive surface unit that includes a first contact with a maximum intensity during the first gesture above a respective intensity threshold, and to detect, while the focus selector is over the second representation of the object in the second user interface, a second gesture on the touch-sensitive surface unit that includes a second contact with a maximum intensity during the second gesture above the respective intensity threshold; and a processing unit coupled to the display unit and the touch-sensitive surface unit. The processing unit is configured to: in response to detecting the first gesture, replace the first user interface with the second user interface; and in response to detecting the second gesture, replace the second user interface with the first user interface.

Thus, electronic devices with displays, touch-sensitive surfaces and one or more sensors to detect intensity of contacts with the touch-sensitive surface are provided with faster, more efficient methods and interfaces for navigating between displayed user interfaces, thereby increasing the effectiveness, efficiency, and user satisfaction with such devices. Such methods and interfaces may complement or replace conventional methods for navigating between displayed user interfaces.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing the operations of any of the methods referred to in the fifth paragraph of the Description of Embodiments. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods referred to in the fifth paragraph of the Description of Embodiments, which are updated in response to inputs, as described in any of the methods referred to in the fifth paragraph of the Description of Embodiments. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform the operations of any of the methods referred to in the fifth paragraph of the Description of Embodiments. In accordance with some embodiments, an electronic device includes: a display, a touch-sensitive surface, and optionally one or more sensors to detect intensity of contacts with the touch-sensitive surface; and means for performing the operations of any of the methods referred to in the fifth paragraph of the Description of Embodiments. In accordance with some embodiments, an information processing apparatus, for use in an electronic device with a display and a touch-sensitive surface, optionally one or more sensors to detect intensity of contacts with the touch-sensitive surface, includes means for performing the operations of any of the methods referred to in the fifth paragraph of the Description of Embodiments.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 12A-12B are flow diagrams illustrating a method of removing an icon from a predefined area in accordance with some embodiments.

DESCRIPTION OF EMBODIMENTS

Figure 1A:
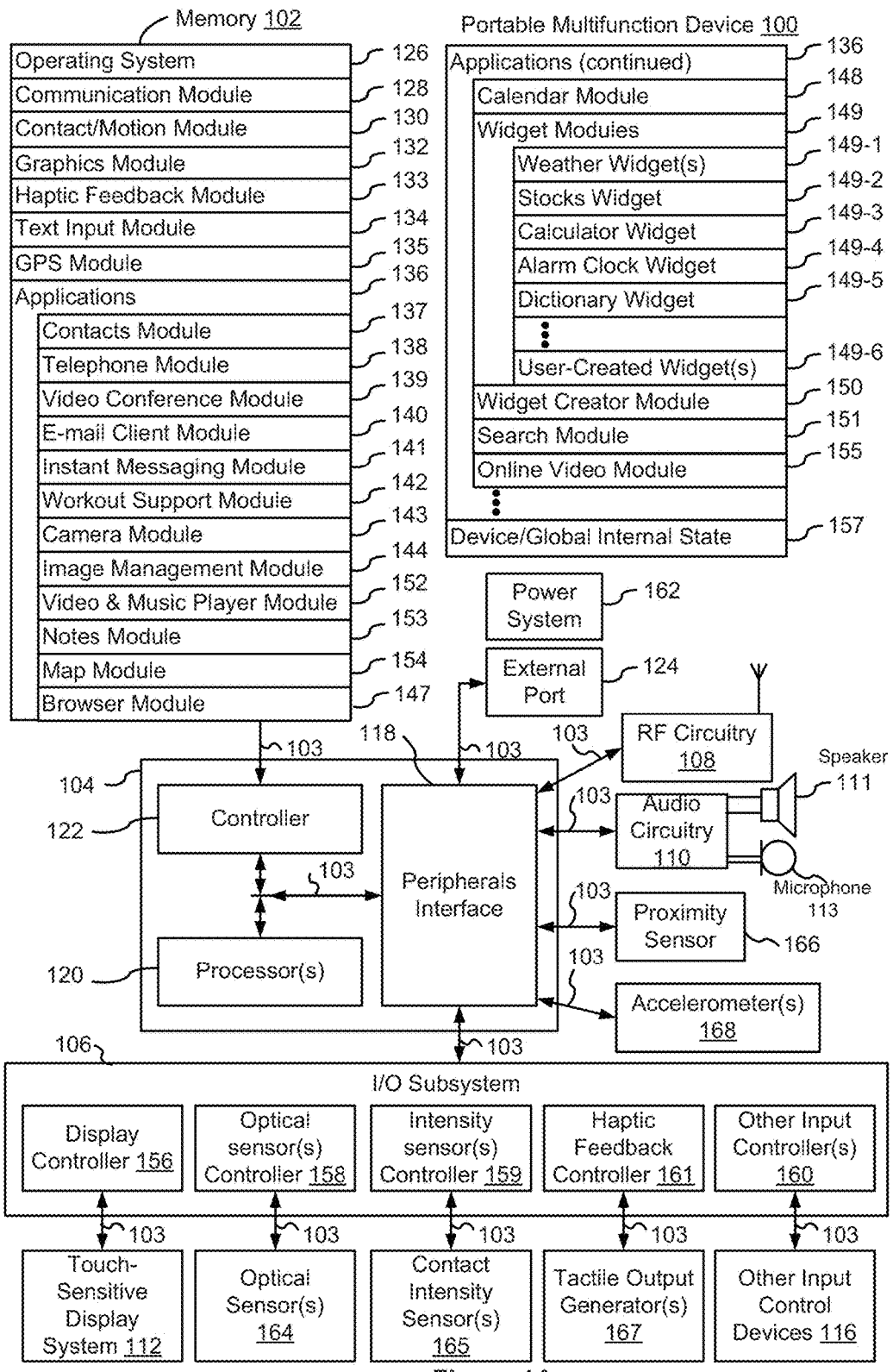
FIG. 1A is a block diagram illustrating a portable multifunction device with a touch-sensitive display in accordance with some embodiments.

The methods, devices and GUIs described herein provide visual and/or haptic feedback that makes manipulation of user interface objects more efficient and intuitive for a user. For example, in a system where the clicking action of a trackpad is decoupled from the contact intensity (e.g., contact force, contact pressure, or a substitute therefore) that is needed to reach an activation threshold, the device can generate different tactile outputs (e.g., "different clicks") for different activation events (e.g., so that clicks that accomplish a particular result are differentiated from clicks that do not produce any result or that accomplish a different result from the particular result). Additionally, tactile outputs can be generated in response to other events that are not related to increasing intensity of a contact, such as generating a tactile output (e.g., a "detent") when a user interface object is moved to a particular position, boundary or orientation, or when an event occurs at the device.

Additionally, in a system where a trackpad or touch-screen display is sensitive to a range of contact intensity that includes more than one or two specific intensity values (e.g., more than a simple on/off, binary intensity determination), the user interface can provide responses (e.g., visual or tactile cues) that are indicative of the intensity of the contact within the range. In some implementations, a pre-activation-threshold response and/or a post-activation-threshold response to an input are displayed as continuous animations. As one example of such a response, a preview of an operation is displayed in response to detecting an increase in contact intensity that is still below an activation threshold for performing the operation. As another example of such a response, an animation associated with an operation continues even after the activation threshold for the operation has been reached. Both of these examples provide a user with a continuous response to the force or pressure of a user's contact, which provides a user with visual and/or haptic feedback that is richer and more intuitive. More specifically, such continuous force responses give the user the experience of being able to press lightly to preview an operation and/or press deeply to push "past" or "through" a predefined user interface state corresponding to the operation.

Additionally, for a device with a touch-sensitive surface that is sensitive to a range of contact intensity, multiple contact intensity thresholds can be monitored by the device and different functions can be mapped to different contact intensity thresholds. This serves to increase the available "gesture space" providing easy access to advanced features for users who know that increasing the intensity of a contact at or beyond a second "deep press" intensity threshold will cause the device to perform a different operation from an operation that would be performed if the intensity of the contact is between a first "activation" intensity threshold and the second "deep press" intensity threshold. An advantage of assigning additional functionality to a second "deep press" intensity threshold while maintaining familiar functionality at a first "activation" intensity threshold is that inexperienced users who are, in some circumstances, confused by the additional functionality can use the familiar functionality by just applying an intensity up to the first "activation" intensity threshold, whereas more experienced users can take advantage of the additional functionality by applying an intensity at the second "deep press" intensity threshold.

Additionally, for a device with a touch-sensitive surface that is sensitive to a range of contact intensity, the device can provide additional functionality by allowing users to perform complex operations with a single continuous contact. For example, when selecting a group of objects, a user can move a continuous contact around the touch-sensitive surface and can press while dragging (e.g., applying an intensity greater than a "deep press" intensity threshold) to add additional elements to a selection. In this way, a user can intuitively interact with a user interface where pressing harder with a contact causes objects in the user interface to be "stickier."

A number of different approaches to providing an intuitive user interface on a device where a clicking action is decoupled from the force that is needed to reach an activation threshold and/or the device is sensitive to a wide range of contact intensities are described below. Using one or more of these approaches (optionally in conjunction with each other) helps to provide a user interface that intuitively provides users with additional information and functionality, thereby reducing the user's cognitive burden and improving the human-machine interface. Such improvements in the human-machine interface enable users to use the device faster and more efficiently. For battery-operated devices, these improvements conserve power and increase the time between battery charges. For ease of explanation, systems, methods and user interfaces for including illustrative examples of some of these approaches are described below, as follows:

Many electronic devices have user interfaces for performing user interface operations, such as viewing user interface objects (photos, email message, etc.) and deleting user interface objects. In some circumstances, destructive operations are performed (e.g., deleting an email), and the devices require an extra input (e.g., a confirmation input) before performing these operations. However, providing a sequence of inputs can be confusing and time consuming for a user. In the embodiments described below, a device determines whether or not to perform a particular destructive operation based on the intensity of a contact corresponding to a request to perform a particular destructive operation, thereby providing a more intuitive and efficient user interface for performing destructive operations. In particular, FIGS. 5A-5I illustrate exemplary user interfaces for performing user interface operations. FIGS. 6A-6B are flow diagrams illustrating a method of performing user interface operations. The user interfaces in FIGS. 5A-5I are used to illustrate the processes in FIGS. 6A-6B.

Figure 8A:
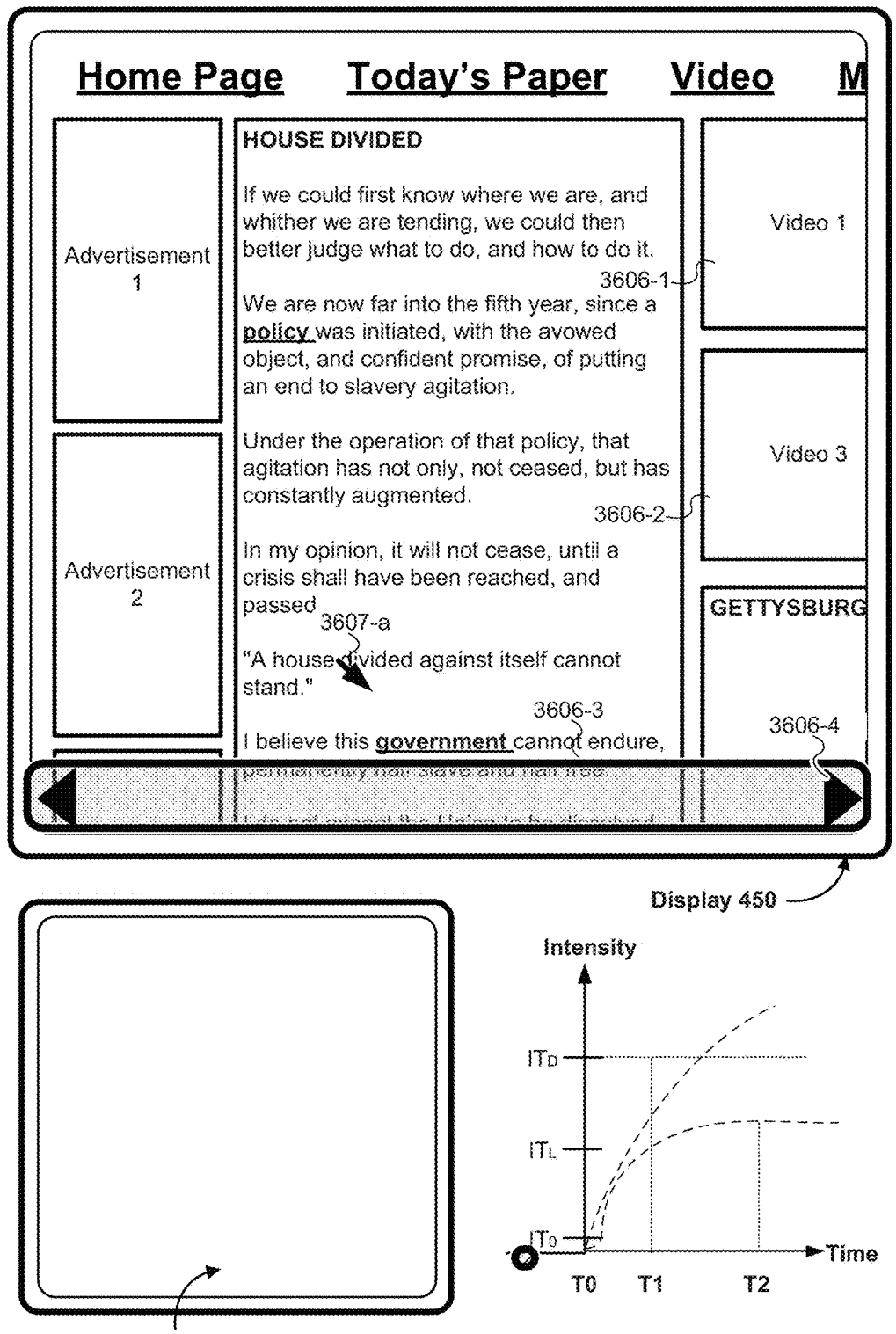
FIGS. 8A-8N illustrate exemplary user interfaces for displaying additional information associated with a location on a display based on contact intensity (e.g., pressure) and contact timing (e.g., duration) in accordance with some embodiments.
Figure 8B:
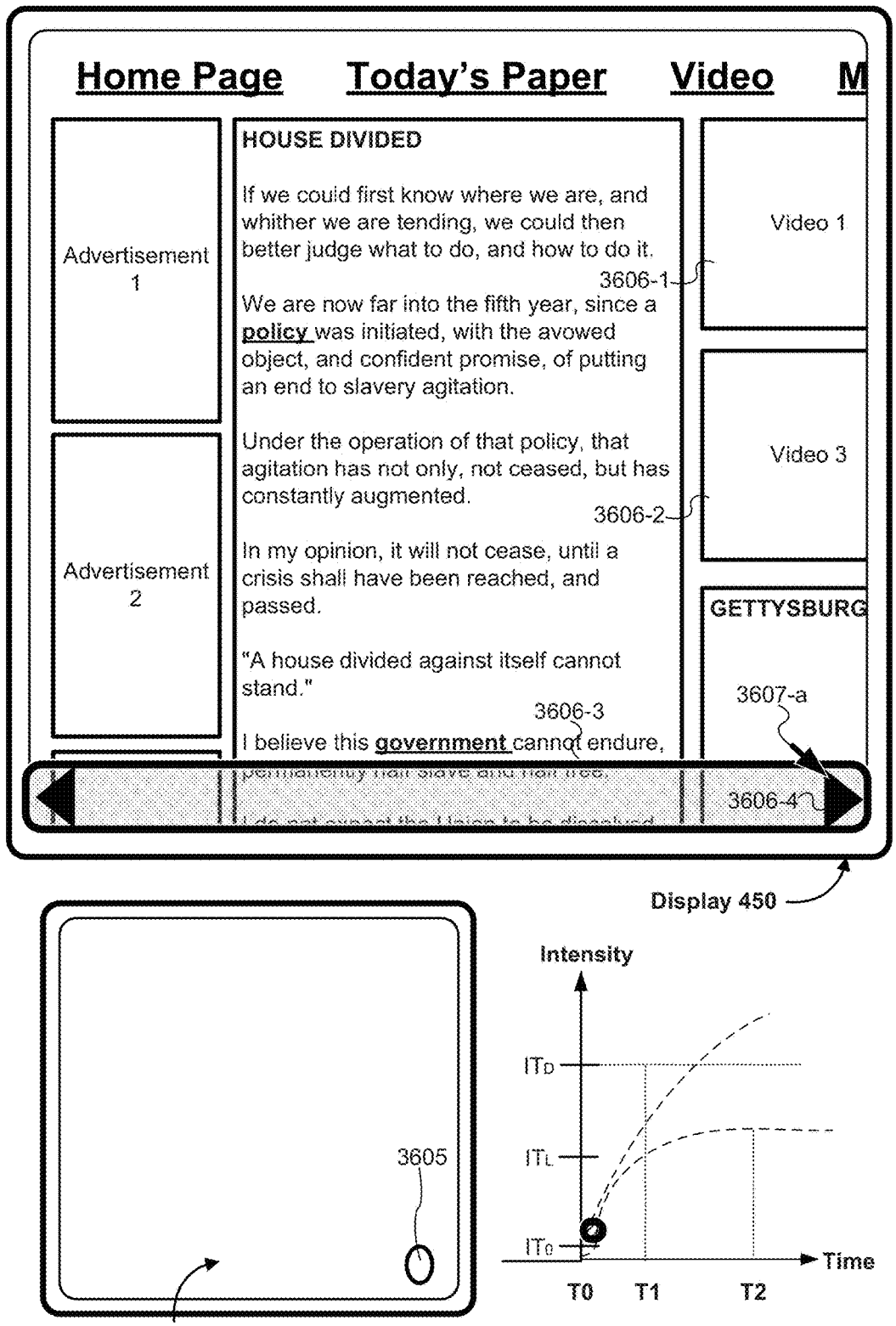
Figure 8C:
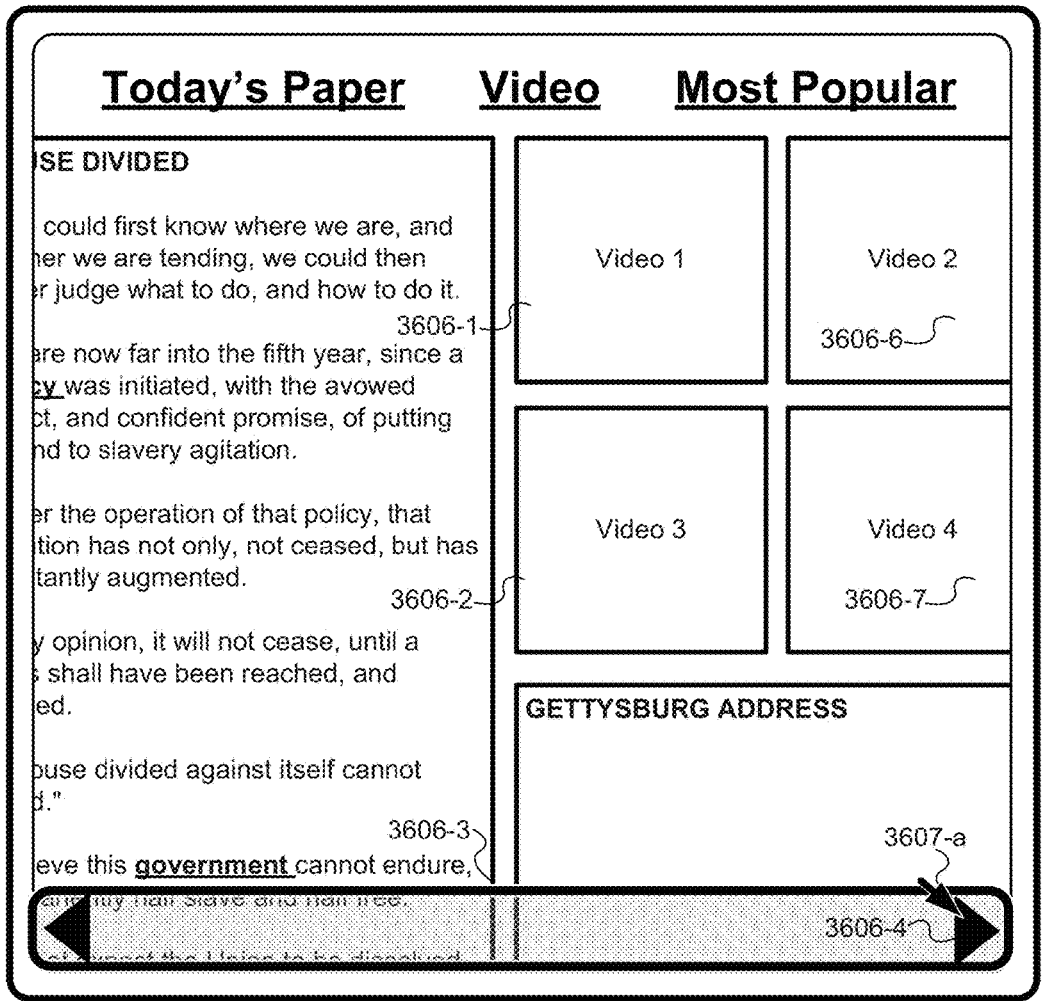
Figure 8C:
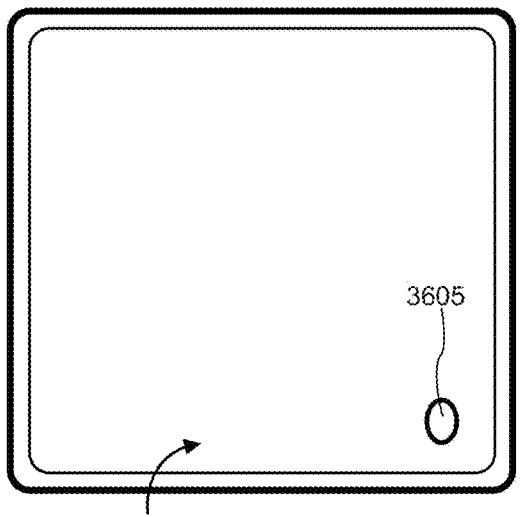
Figure 8C:
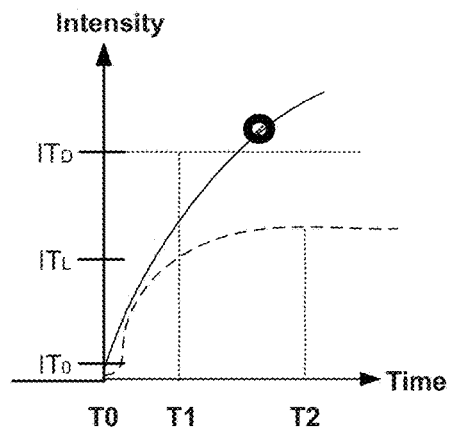
Figure 8N:
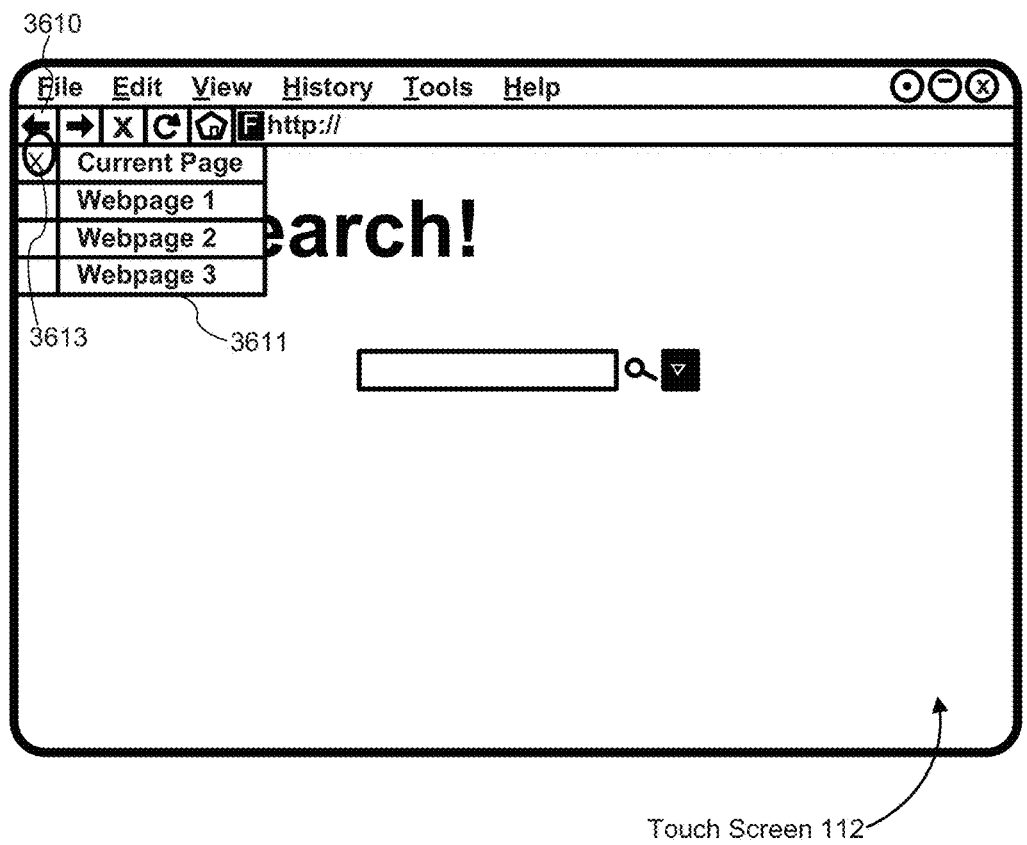
Figure 8N:
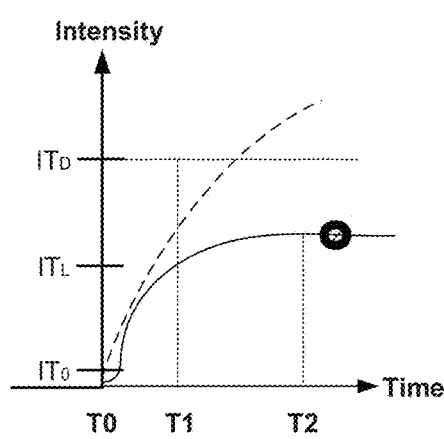
Figure 9A:
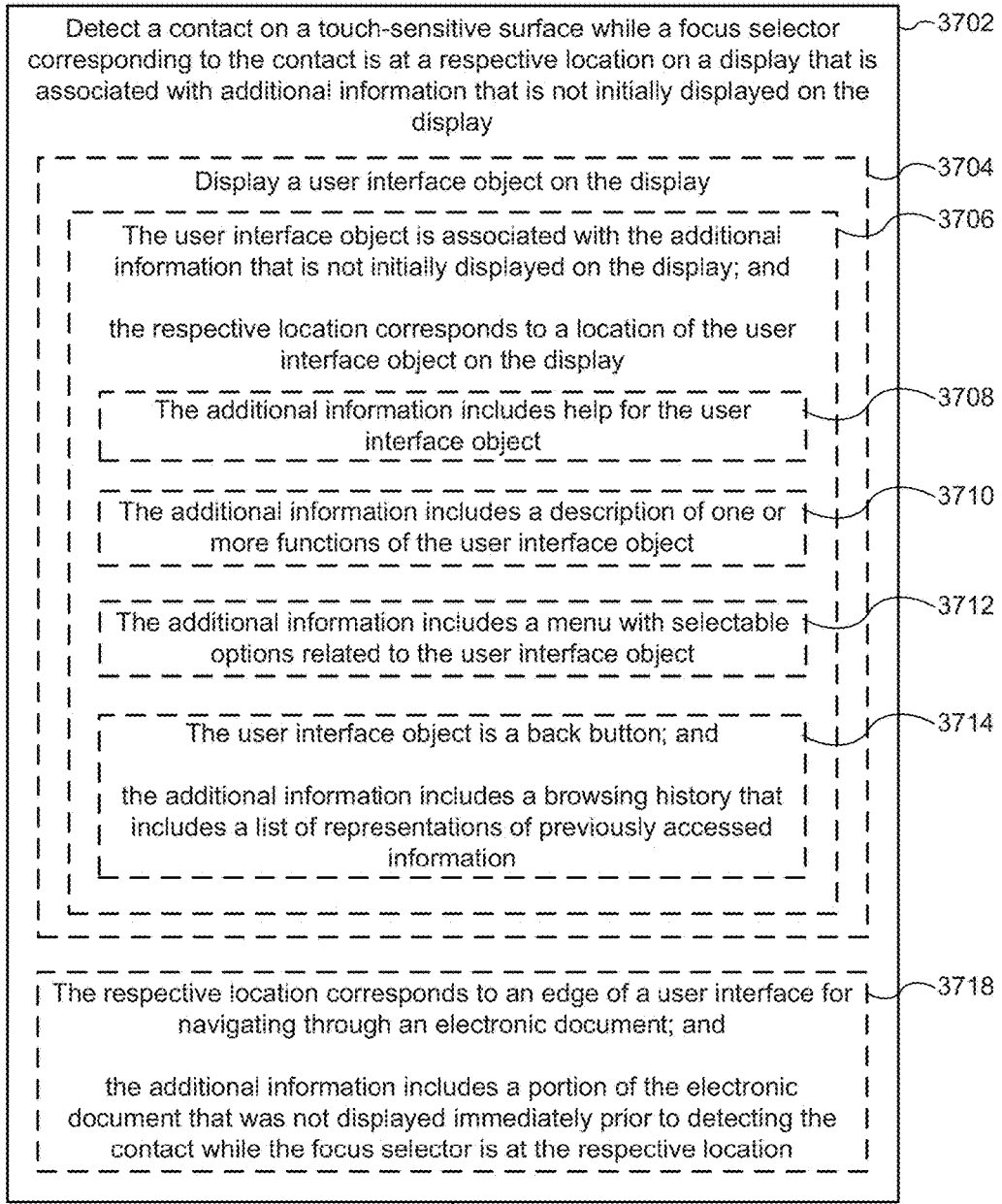
FIGS. 9A-9B are flow diagrams illustrating a method of displaying additional information associated with a location on a display based on contact intensity (e.g., pressure) and contact timing (e.g., duration) in accordance with some embodiments.
Figure 9B:
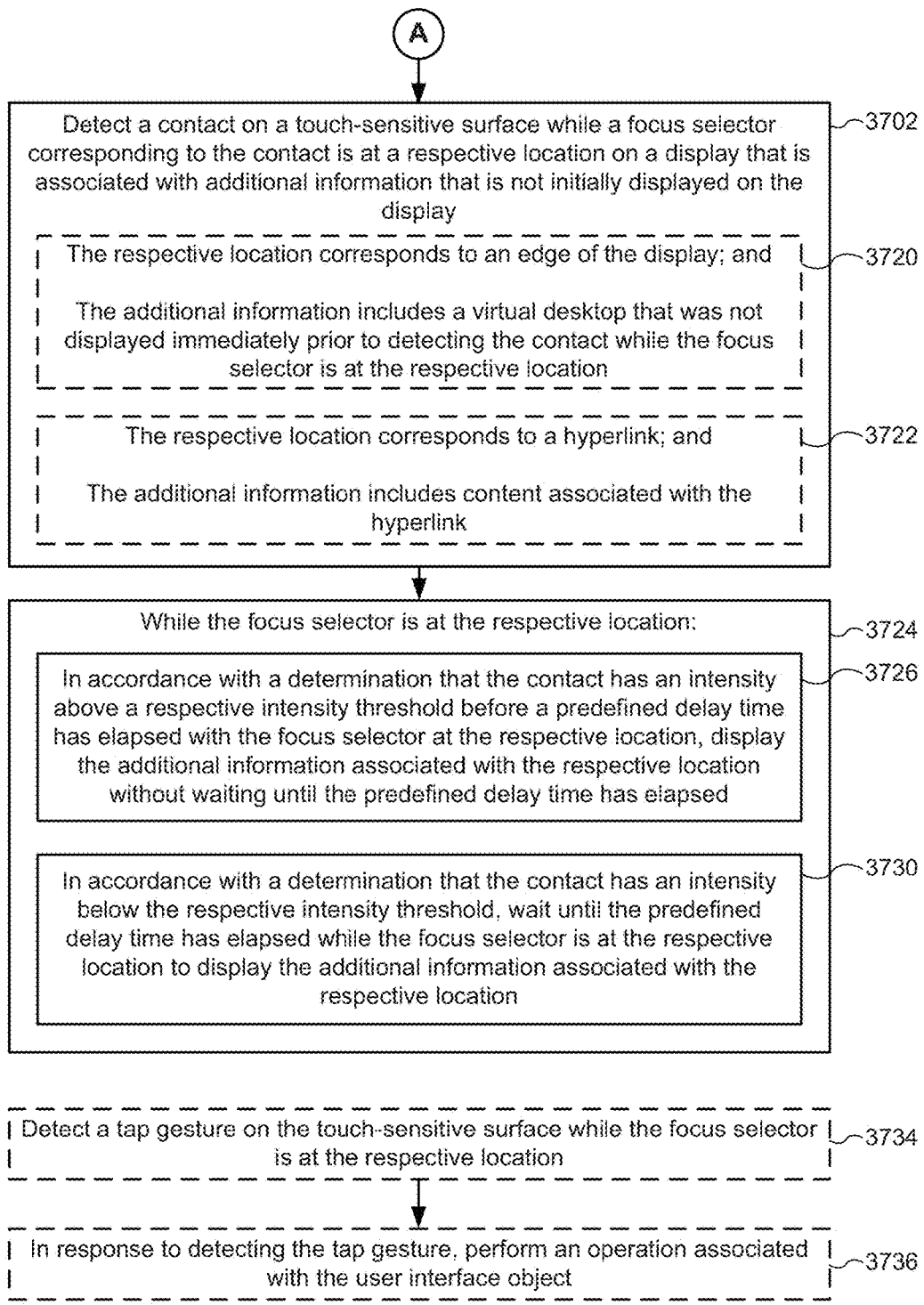

Many electronic devices have graphical user interfaces that include user interface objects. In some instances, additional (e.g., hidden) information associated with user interface objects is displayed at the request of a user. Some devices display such additional information after, for example, detecting a focus selector over the user interface object for an extended period of time. However, such methods are time consuming and frustrating to users. The embodiments described below provide improved methods of displaying additional information based on the intensity (e.g., pressure) of a contact on the touch-sensitive surface, thereby providing a more convenient and efficient user interface for displaying additional information. In particular, FIGS. 8A-8N illustrate exemplary user interfaces for displaying additional information associated with a location (for example, corresponding to a user interface object) on a display based on contact intensity (e.g., pressure) and contact timing (e.g., duration). FIGS. 9A-9B are flow diagrams illustrating a method of displaying additional information based on contact intensity (e.g., pressure) and contact timing (e.g., duration). The user interfaces in FIGS. 8A-8N are used to illustrate the processes in FIGS. 9A-9B.

Figure 11A:
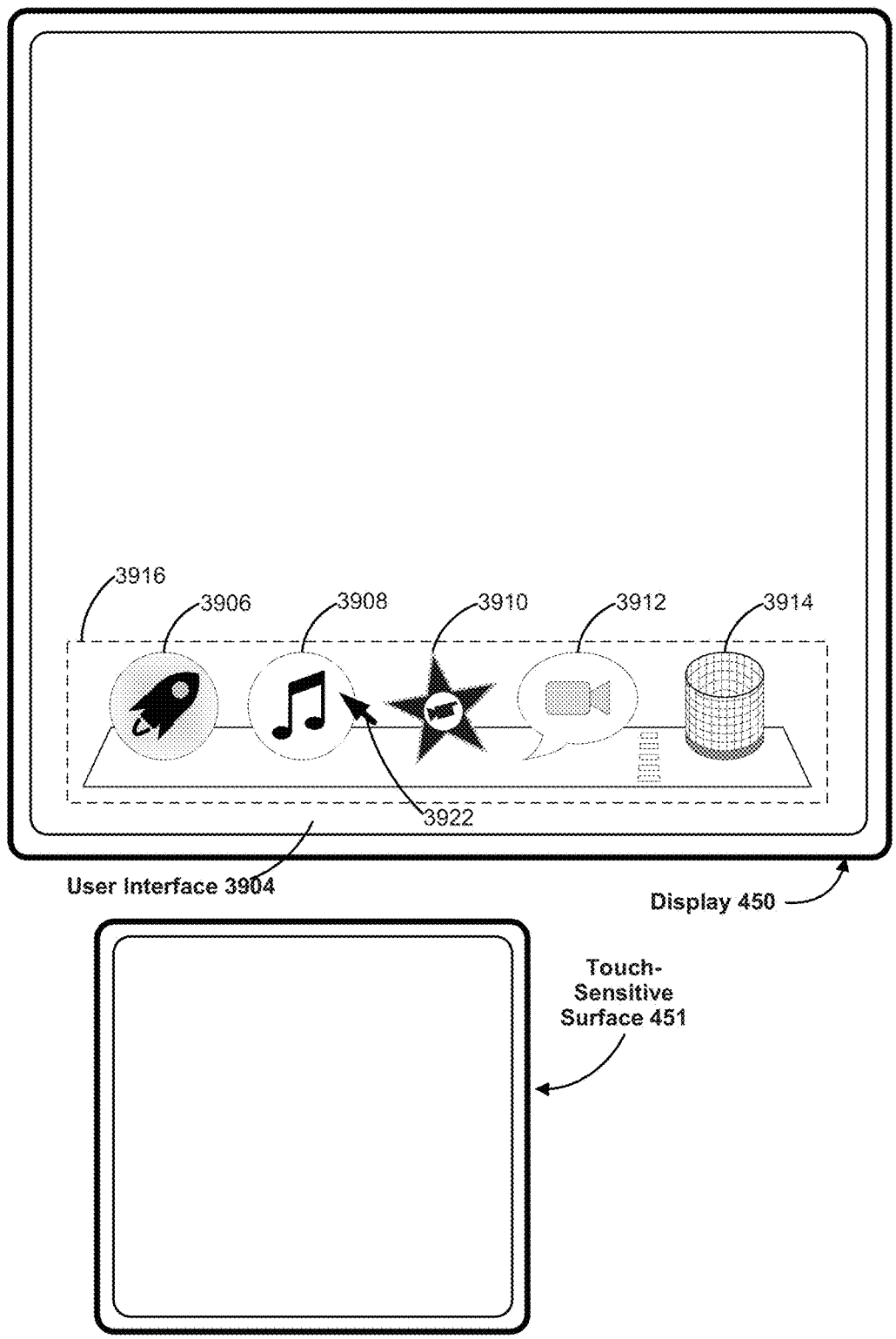
FIGS. 11A-11U illustrate exemplary user interfaces for removing an icon from a predefined area in accordance with some embodiments.

Many electronic devices have graphical user interfaces that include an application dock or launch bar. In some situations a user is enabled to remove or rearrange icons in an application dock or launch bar. However, when the icons are accidentally removed or rearranged the user can become frustrated or confused. Additionally, adding back accidentally removed icons and undoing an accidental rearranging operation is frustrating and inefficient for users. The embodiments described below provide improved methods for removing unwanted icons from a predefined area, such as a launchbar where the device determines whether or not to remove or rearrange icons in the predefined area in accordance with an intensity of a contact, thereby providing a more intuitive and efficient user interface that is less frustrating for users. In particular, FIGS. 11A-11U illustrate exemplary user interfaces for removing an icon from a predefined area. FIGS. 12A-12B are flow diagrams illustrating a method of removing an icon from a predefined area. The user interfaces in FIGS. 11A-11U are used to illustrate the processes in FIGS. 12A-12B.

Many electronic devices include applications or user interfaces where different corresponding content, such as layers of content, can be displayed. It is easy for a user to lose their place within the layers or become confused as to how to navigate through the layers. The embodiments described below provide an efficient and intuitive user interface for navigating and displaying layers of content by determining whether and, optionally, how much of an underlying layer to reveal based on the intensity of a contact on a touch-sensitive surface. In particular, FIGS. 14A-14L illustrate exemplary user interfaces for displaying content layers. FIGS. 15A-15C are flow diagrams illustrating a method of displaying content layers. The user interfaces in FIGS. 14A-14L are used to illustrate the processes in FIGS. 15A-15C.

Many electronic devices include user interfaces that include different representations of a same object (e.g., content such as an email or photo). Some methods for navigating between user interfaces on a device with a touch-sensitive surface typically require a user to locate an affordance (e.g., a key or a "button"). Such methods, however, are problematic because they are prone to inaccuracies (e.g., accidental selection of the affordance, accidental selection of a different key when intending to select the affordance). Such methods also increase the cognitive burden on the user by requiring additional independent gestures. The embodiments described below provide a convenient and intuitive method for navigating between user interfaces corresponding to different representations of an object using similar gestures performed with a contact while a focus selector is over a representation of the object. In particular, FIGS. 17A-17H illustrate exemplary user interfaces for navigating between displayed user interfaces. FIGS. 18A-18C are flow diagrams illustrating a method of navigating between displayed user interfaces. The user interfaces in FIGS. 17A-17H are used to illustrate the processes in FIGS. 18A-18C.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
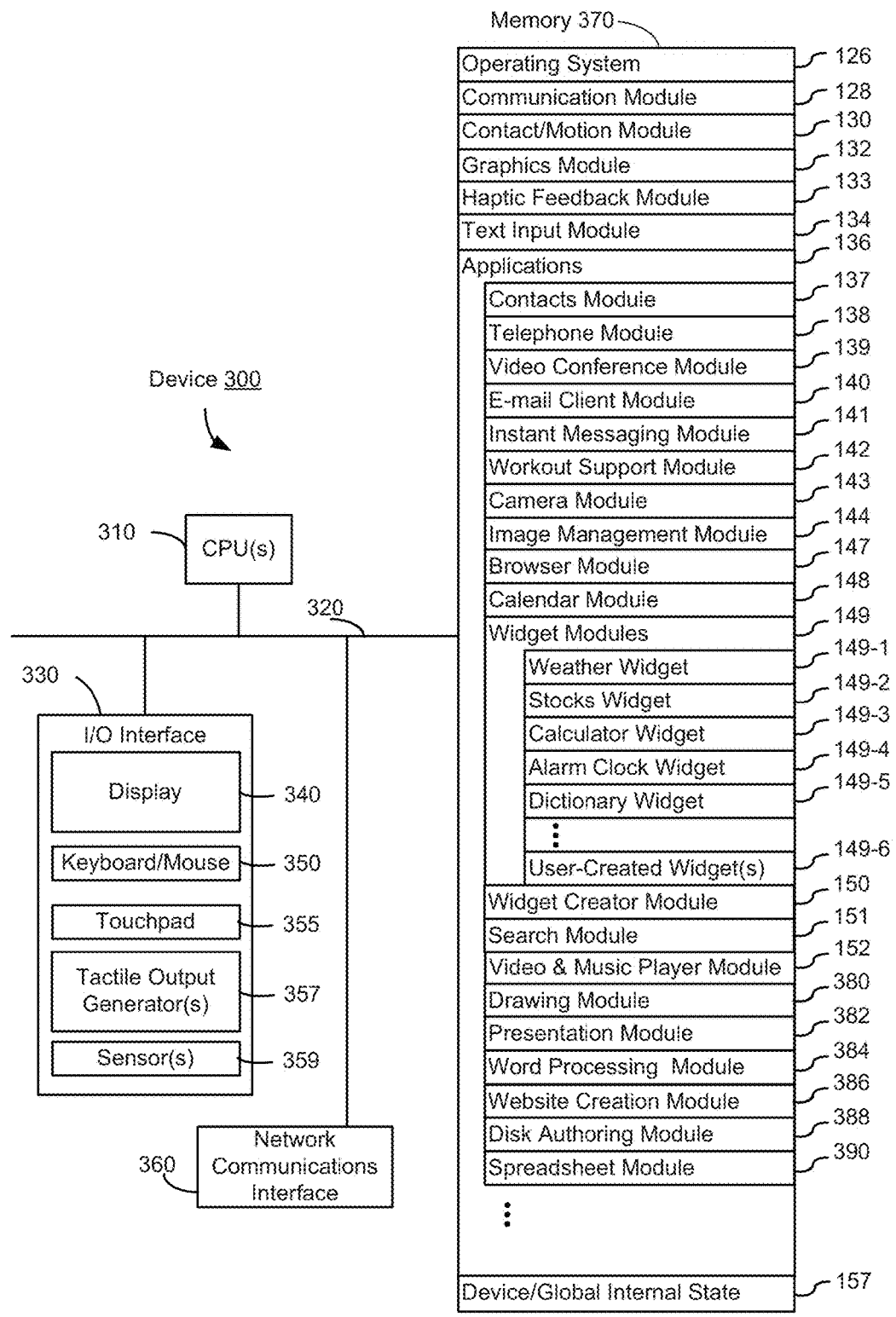
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
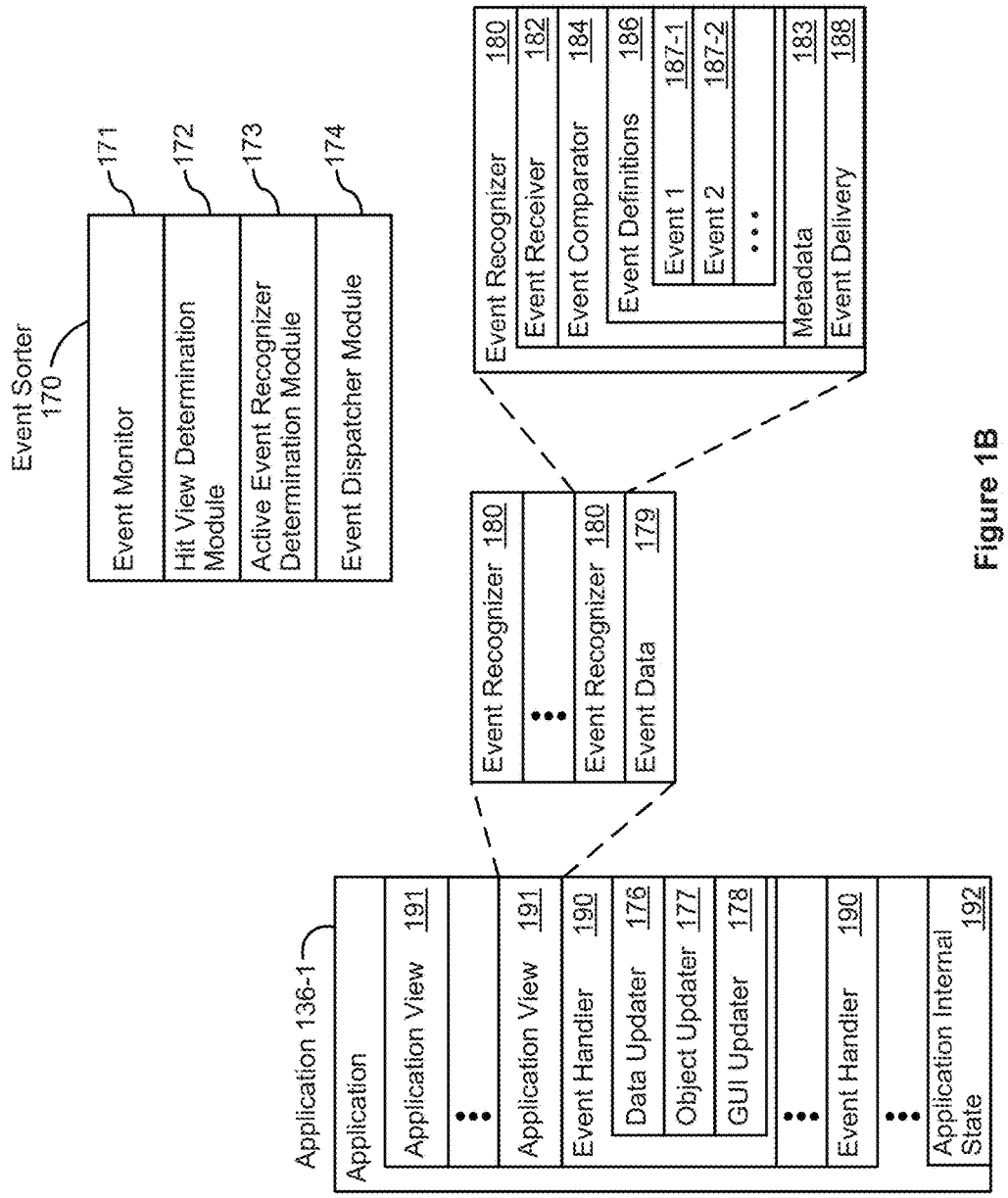
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
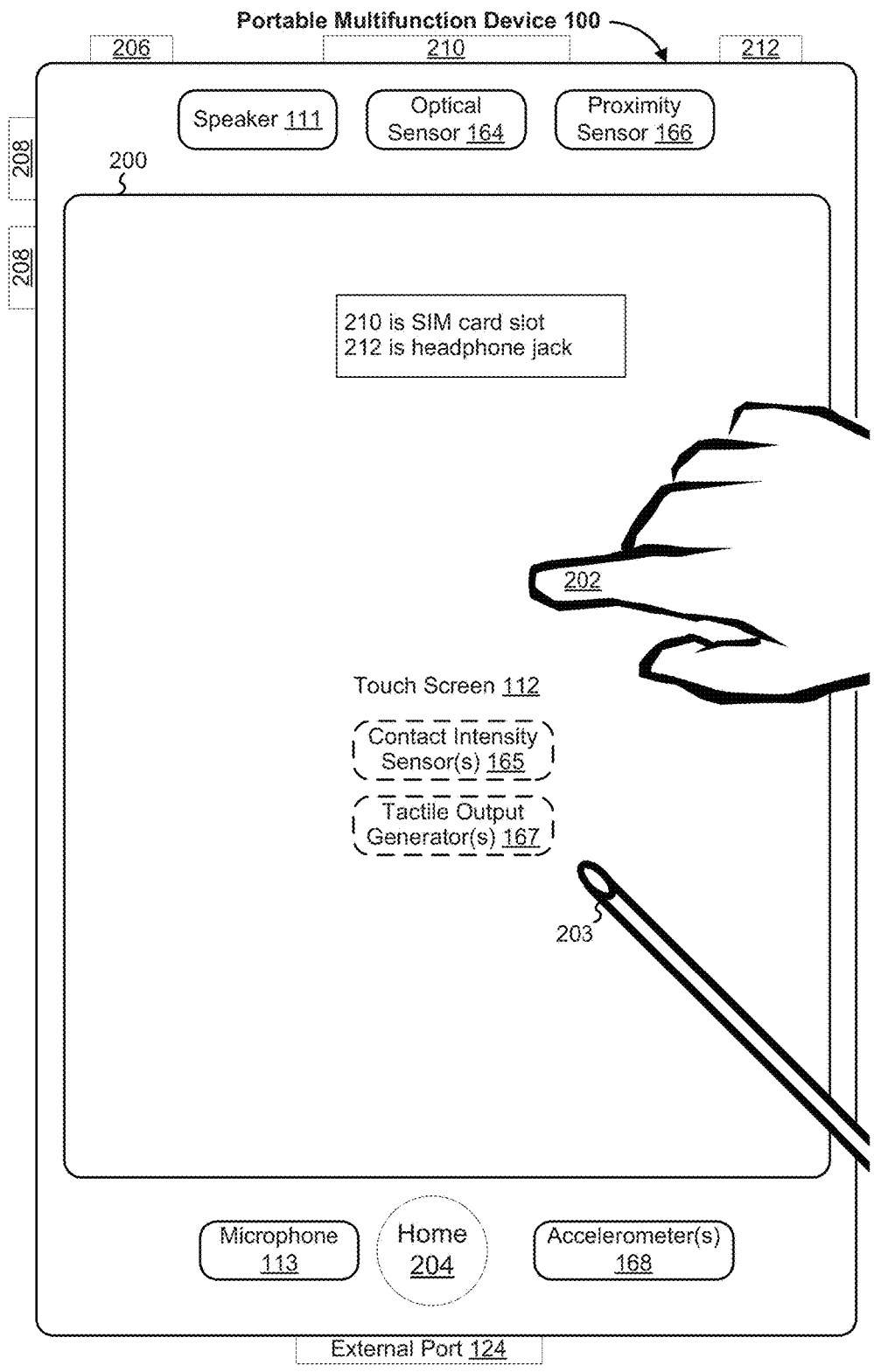
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
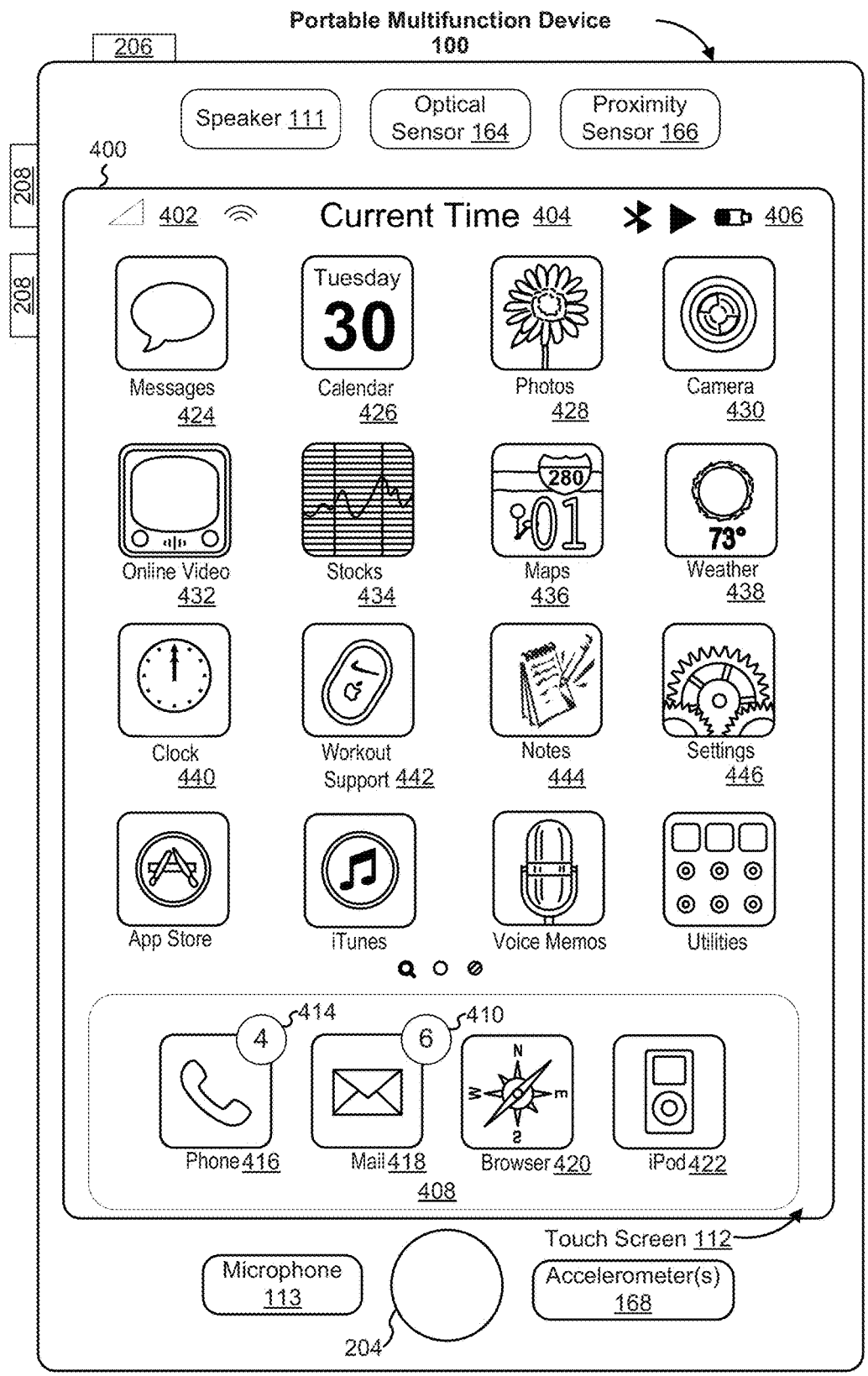
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Text;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video"
  Icon 434 for stocks widget 149-2, labeled "Stocks;"

Icon 436 for map module 154, labeled "Map;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
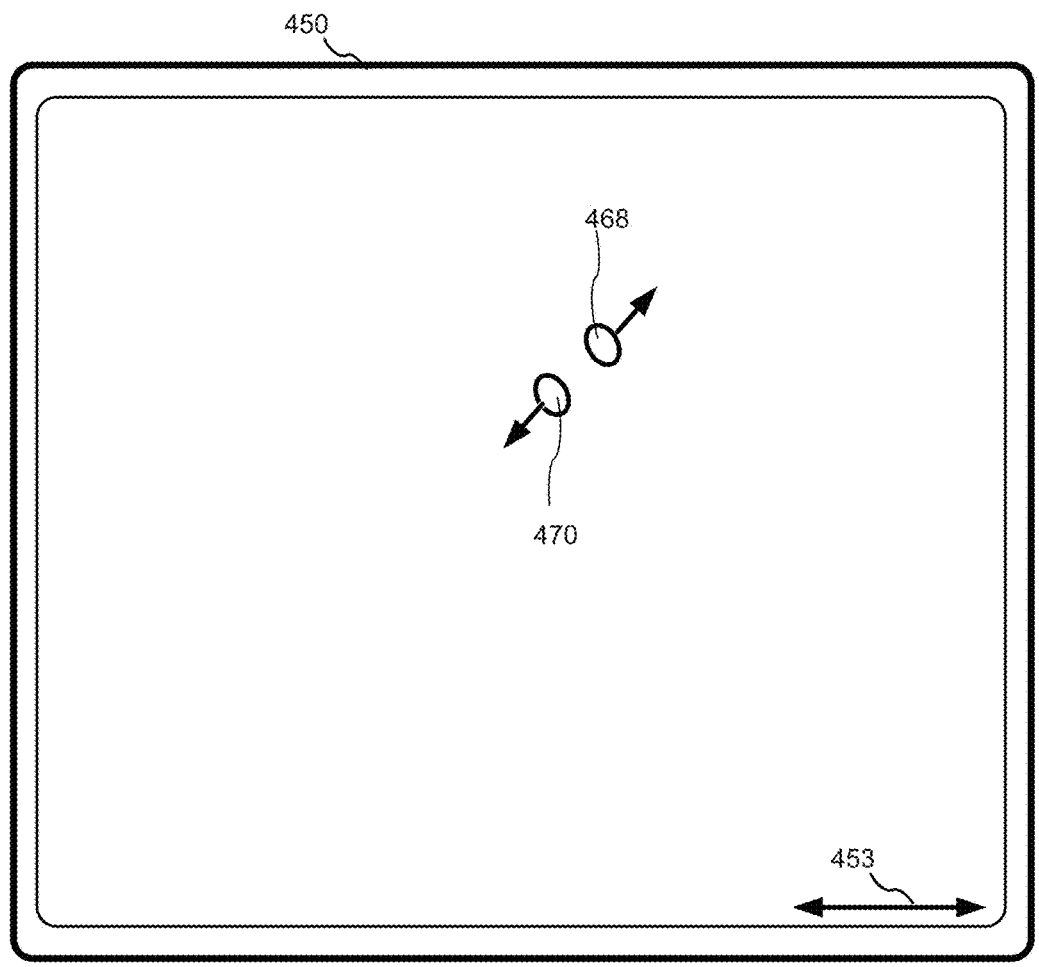
FIG. 4B illustrates an exemplary user interface for a multifunction device with a touch-sensitive surface that is separate from the display in accordance with some embodiments.
Figure 4B:
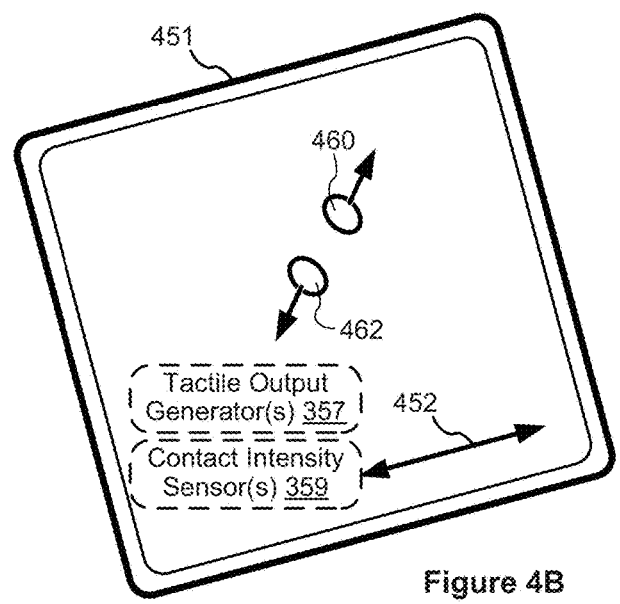

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

The user interface figures described below include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$, and/or one or more other intensity thresholds). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with an intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of intensity of the contact from an intensity below the light press intensity threshold $IT_L$ to an intensity between the light press intensity threshold $IT_L$ and the deep press intensity threshold $IT_D$ is sometimes referred to as a "light press" input. An increase of intensity of the contact from an intensity below the deep press intensity threshold $IT_D$ to an intensity above the deep press intensity threshold $IT_D$ is sometimes referred to as a "deep press" input. An increase of intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of intensity of the contact from an intensity above the contact-detection intensity threshold $IT_0$ to an intensity below the contact intensity threshold $IT_0$ is sometimes referred to as detecting liftoff of the contact from the touch-surface. In some embodiments $IT_0$ is zero. In some embodiments $IT_0$ is greater than zero. In some illustrations a shaded circle or oval is used to represent intensity of a contact on the touch-sensitive surface. In some illustrations a circle or oval without shading is used represent a respective contact on the touch-sensitive surface without specifying the intensity of the respective contact.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

User Interfaces and Associated Processes

Performing User Interface Operations

Many electronic devices have user interfaces for performing operations, such as viewing user interface objects (photos, email message, etc.) and deleting user interface objects. Some user interface operations, such as deleting a user interface object from a device or a separate server, are destructive, meaning that the operation is difficult or impossible to reverse. For example, a user who has unwittingly deleted an email message will, in some cases, have a limited amount of time to recover the email message from a trash folder before it is permanently deleted. To prevent such unwitting operations from occurring, some existing methods cause the electronic device to request confirmation from a user who has entered an input (e.g., into the electronic device) requesting such a destructive operation. One shortcoming of these existing methods is that they are time consuming and require the user to enter additional inputs to confirm that the operation should be performed.

In the embodiments described below, an improved method for performing user interface operations is provided. A gesture is detected that is associated with a respective operation by a user on a touch-sensitive surface (e.g., swipe over an email message to delete the email message). In response to detecting the gesture, the device performs the operation without requesting confirmation from the user if the gesture had a maximum intensity on the touch-sensitive surface above a first intensity threshold (e.g., a deep press swipe is interpreted by the device as an indication that the request to perform an operation is truly intentional). On the other hand, if the maximum intensity of the gesture is below the first intensity threshold, the device requests confirmation that the user wants to perform the operation, and thus still protects against performance of unwitting destructive operations. Some operations, such as scrolling, are performed without requesting confirmation from the user regardless of the intensity of a gesture associated with the request to perform the operation.

FIGS. 5A-5I illustrate exemplary user interfaces for performing user interface operations in accordance with some embodiments. The user interfaces in these figures are used to illustrate the processes described below, including the processes in FIGS. 6A-6B. Where applicable, FIGS. 5A-5I include intensity diagrams that show the current intensity of the contact on the touch-sensitive surface relative to a plurality of intensity thresholds including a first intensity threshold (e.g., "$IT_D$"). In some embodiments, operations similar to those described below with reference to "$IT_D$" are performed with reference to a different intensity threshold (e.g., "$IT_L$").

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 5A-5I and 6A-6B will be discussed with reference to a touch screen 112, however analogous operations are, optionally, performed on a device with a display 450 and a separate touch-sensitive surface 451 in response to detecting the contacts described in FIGS. 5A-5I on the touch-sensitive surface 451 while displaying the user interfaces shown in FIGS. 5A-5I on the display 450; in such embodiments, the focus selector is, optionally a cursor or pointer that is displayed at a location corresponding to (e.g., at or near) the location of the contacts (e.g., 1806, 1808 and 1810) shown in FIGS. 5A-5I.

Figure 5A:
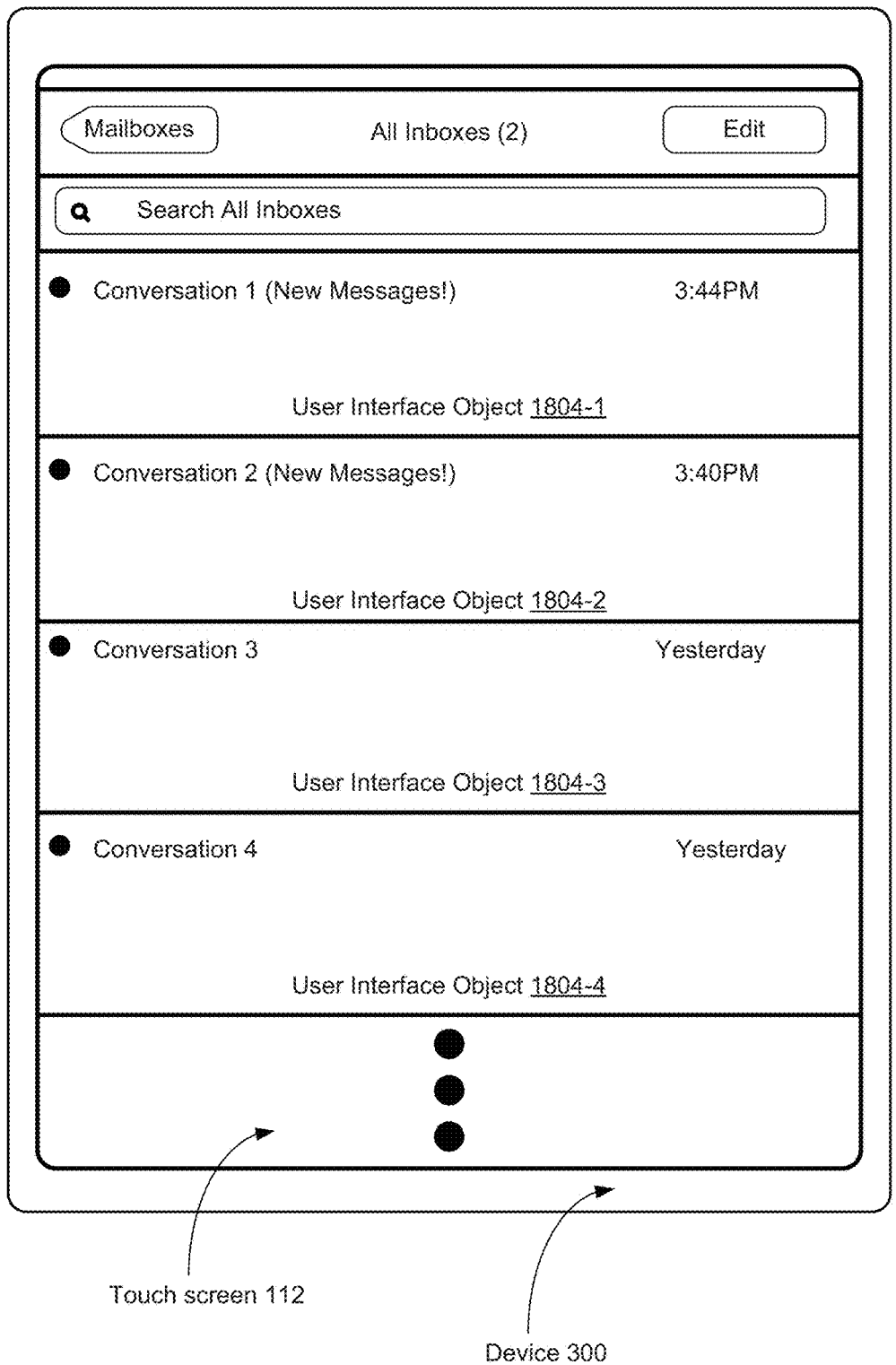
FIGS. 5A-5I illustrate exemplary user interfaces for performing user interface operations in accordance with some embodiments.

FIG. 5A illustrates an exemplary user interface for performing user interface operations on an electronic device 300 with a touch screen display 112. In some embodiments, the device displays one or more user interface objects (e.g., user interface objects 1804-1 through 1804-4 corresponding, respectively, to email conversations 1-4). In particular, FIGS. 5A-5I illustrate examples of deleting an email message from a list of email messages, and also illustrate examples of other user interface operations, such as scrolling through the list of emails, in accordance with some embodiments.

Figure 5B:
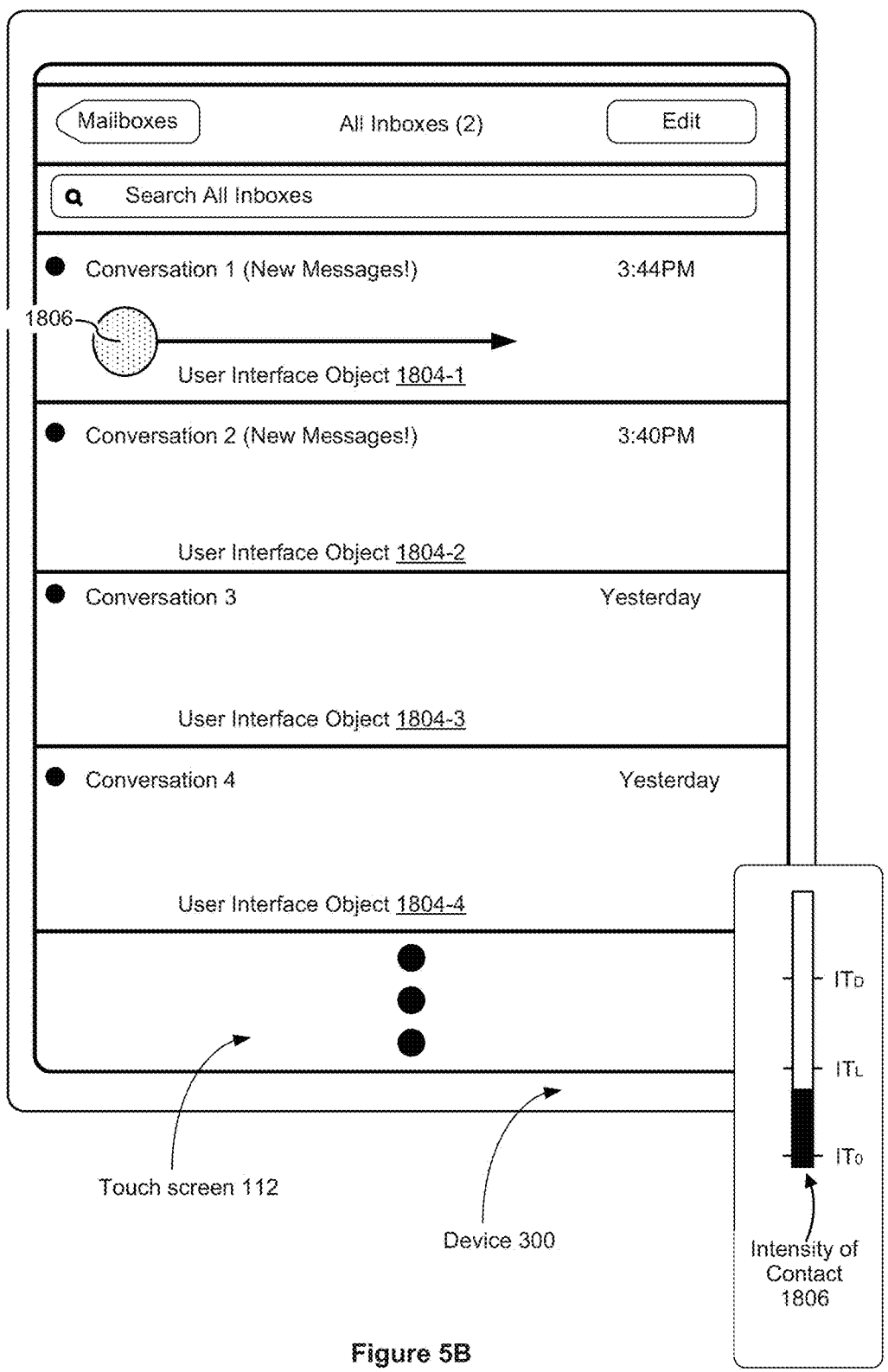
Figure 6A:
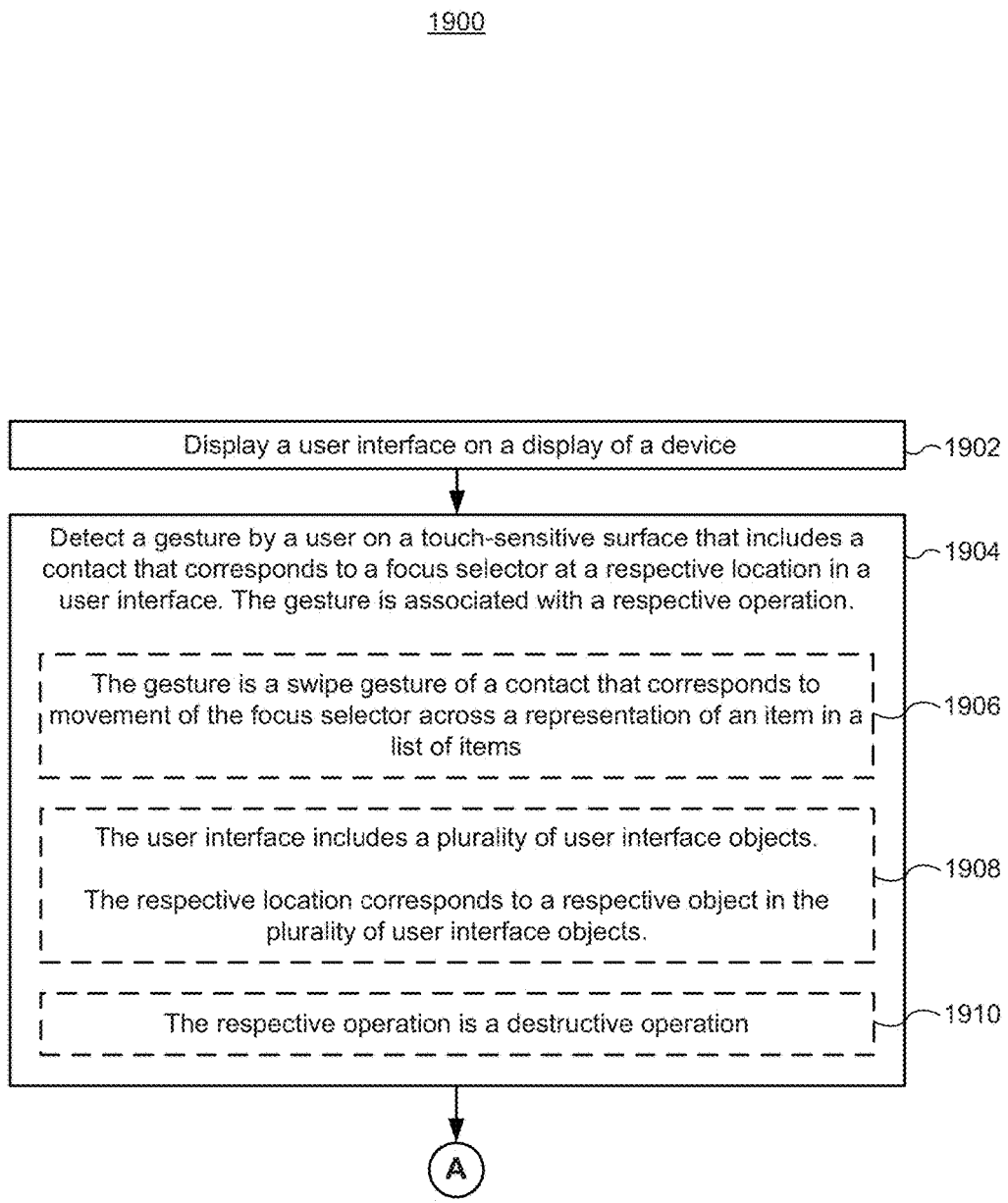
FIGS. 6A-6B are flow diagrams illustrating a method of performing user interface operations in accordance with some embodiments.
Figure 6B:
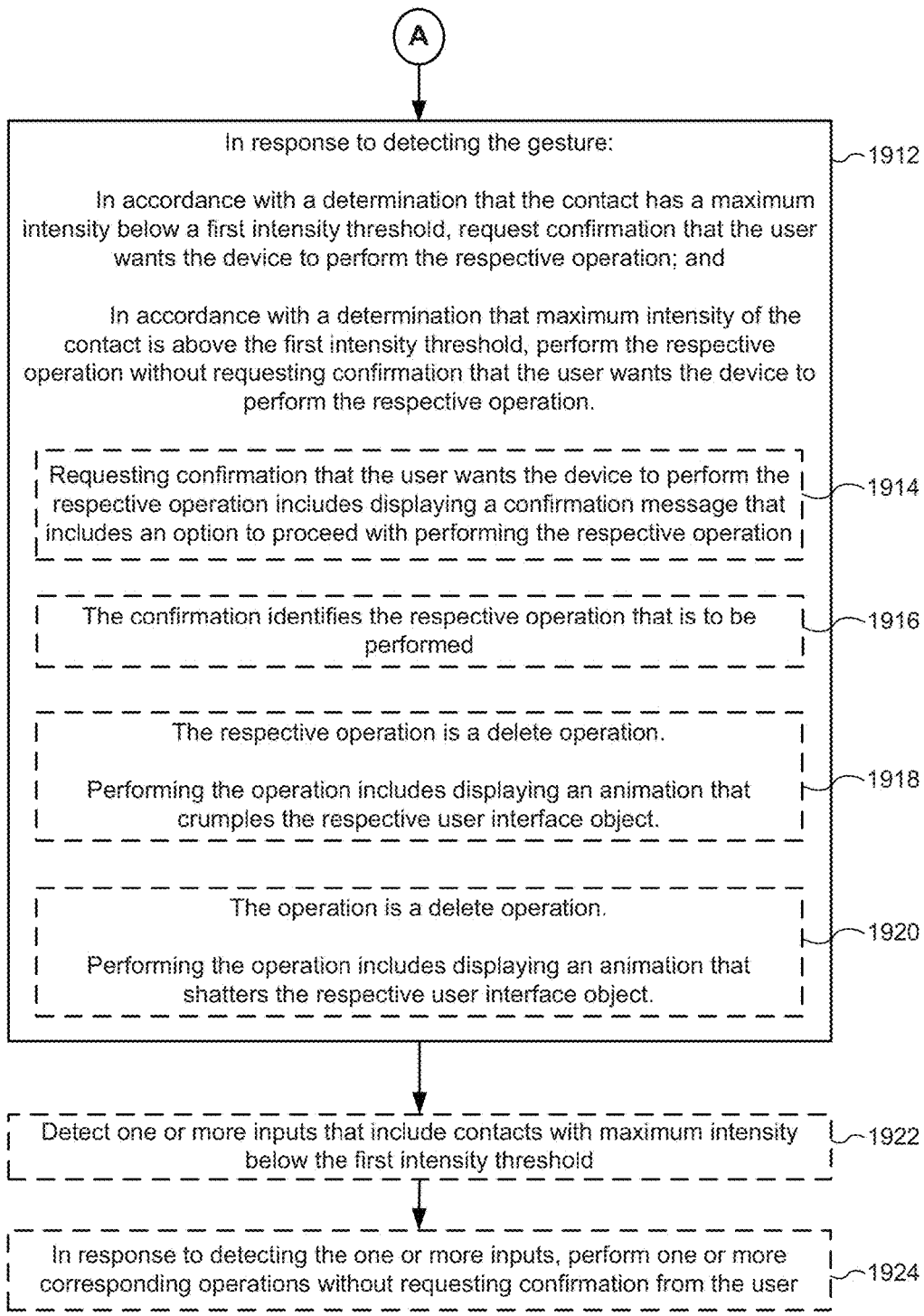

FIG. 5B illustrates detection of a contact 1806. In some embodiments, particular gestures are associated with a particular respective operation. For example, contact 1806 is included in a swipe gesture over user interface object 1804-1. FIG. 5B illustrates an example of embodiments in which a swipe gesture over an e-mail message (user interface item 1804-1) is interpreted as a request to delete or archive the message. In some embodiments, the swipe gesture is considered over the email message if the gesture begins in a predefined boundary of the email message. In some embodiments, the swipe gesture is considered over the email message if a substantial portion of the gesture occurs within the predefined boundary (or within a predefined area in which a representation of the email message is displayed).

In the example shown in FIG. 5B, contact 1806 has an intensity below a respective intensity threshold (e.g., $IT_D$). In this example, the device detects the gesture and, based on predefined criteria, either requests confirmation that the user wants to delete email message (e.g., if the criteria are not met) or deletes the email message without requesting confirmation from the user (e.g., if the criteria are met). In some embodiments, the predefined criteria include that a respective intensity (e.g., the maximum intensity) of the gesture is above a predefined threshold (e.g., $IT_D$). It is envisioned that the intensity of contact 1806 while gesture is detected over the e-mail message could be defined and measured in any number of ways. For example, in some embodiments, the intensity is measured at the beginning of the gesture. In some embodiments, the average intensity of the gesture is used. Other metrics for measuring and defining the intensity of the gesture will be apparent to those with skill in the art.

Figure 5C:
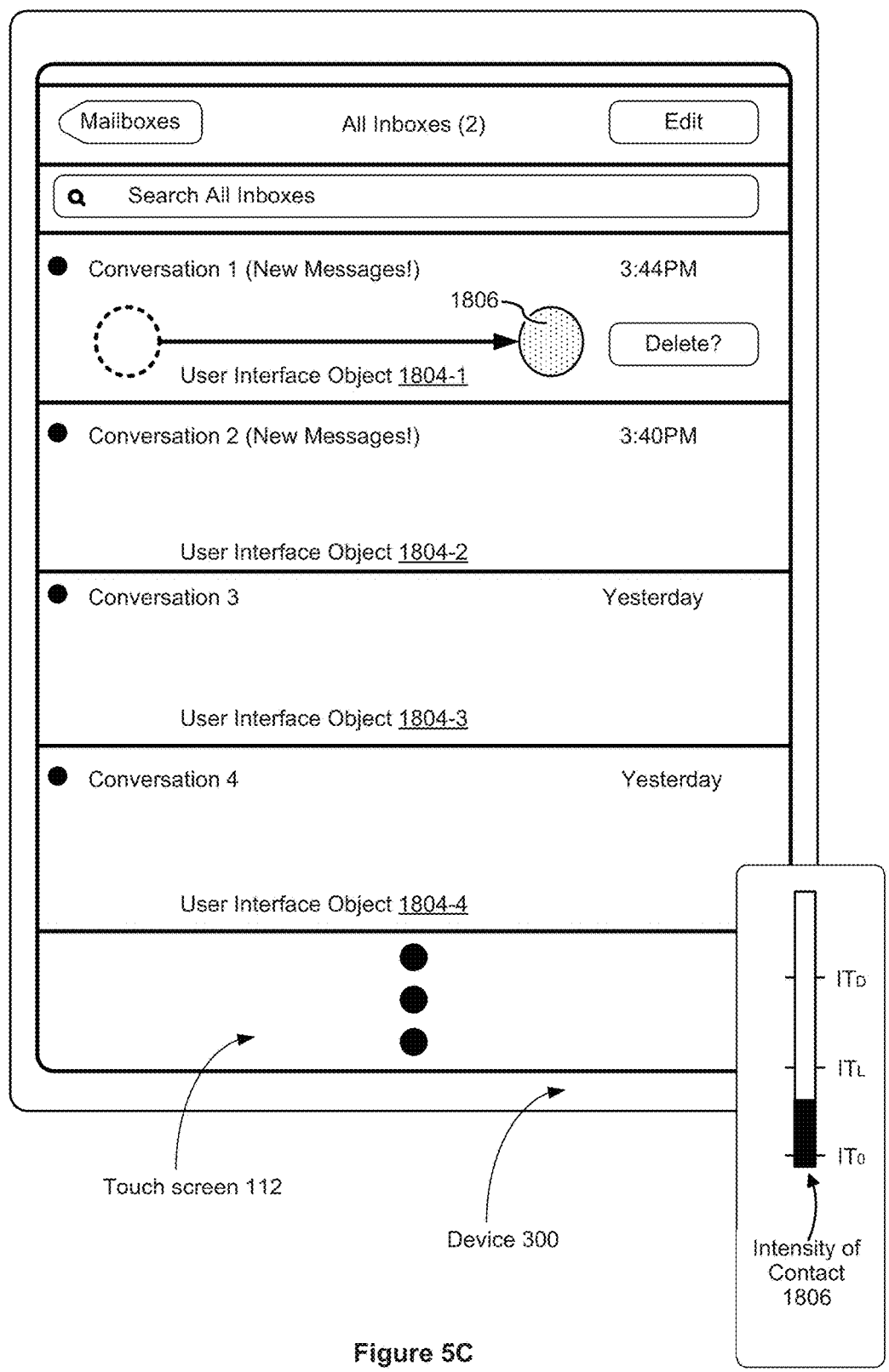

FIG. 5C illustrates the continuation of contact 1806 to form a swipe gesture across user interface object 1804-1. Contact 1806 in both FIGS. 5B and 5C has an intensity below the deep press intensity threshold. As a result, the device requests confirmation (e.g., displays an affordance with the word "Delete?") that the user wants to delete the email message. Requesting confirmation to perform an operation such as a destructive operation (such as deleting a user interface object) for low intensity gestures enables the device to protect against unintended operations that are difficult or impossible to reverse. In some embodiments, the user optionally selects the affordance (either with a separate contact or a continuation of the same gesture) to inform the device to proceed with the operation. In some embodiments, a separate gesture, distinct from selection of the affordance, cancels the operation. For example, in some embodiments, a second swipe over the email cancels the request to delete the email. In some embodiments, any of a plurality of gestures other than a gesture that includes selection of the affordance cancels the delete operation. In this example, contact 1806 is also below the light press intensity threshold. In this example, no additional functionality is associated with the light press intensity threshold. However, in some other embodiments, additional functionality is associated with the light press input (e.g., the light press intensity threshold is an intensity threshold used to identify light press inputs for activating affordances such as the delete affordance in FIG. 5B, the edit affordance in FIG. 5B and/or opening one of the conversations in response to detecting a light press input on one of user interface objects 1804 that includes an increase of a contact from an intensity below $IT_L$ to an intensity above $IT_L$).

Figure 5D:
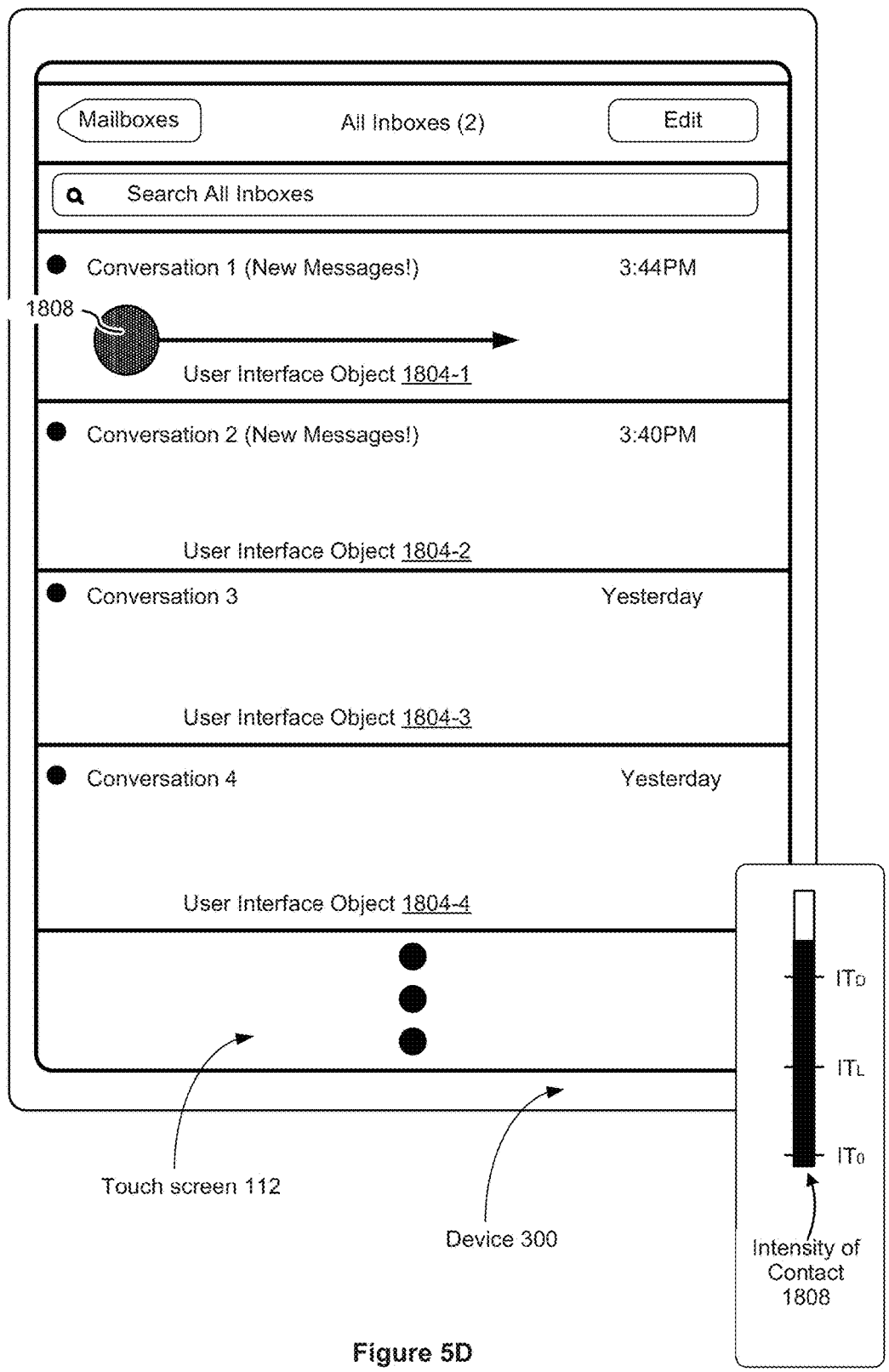
Figure 5E:
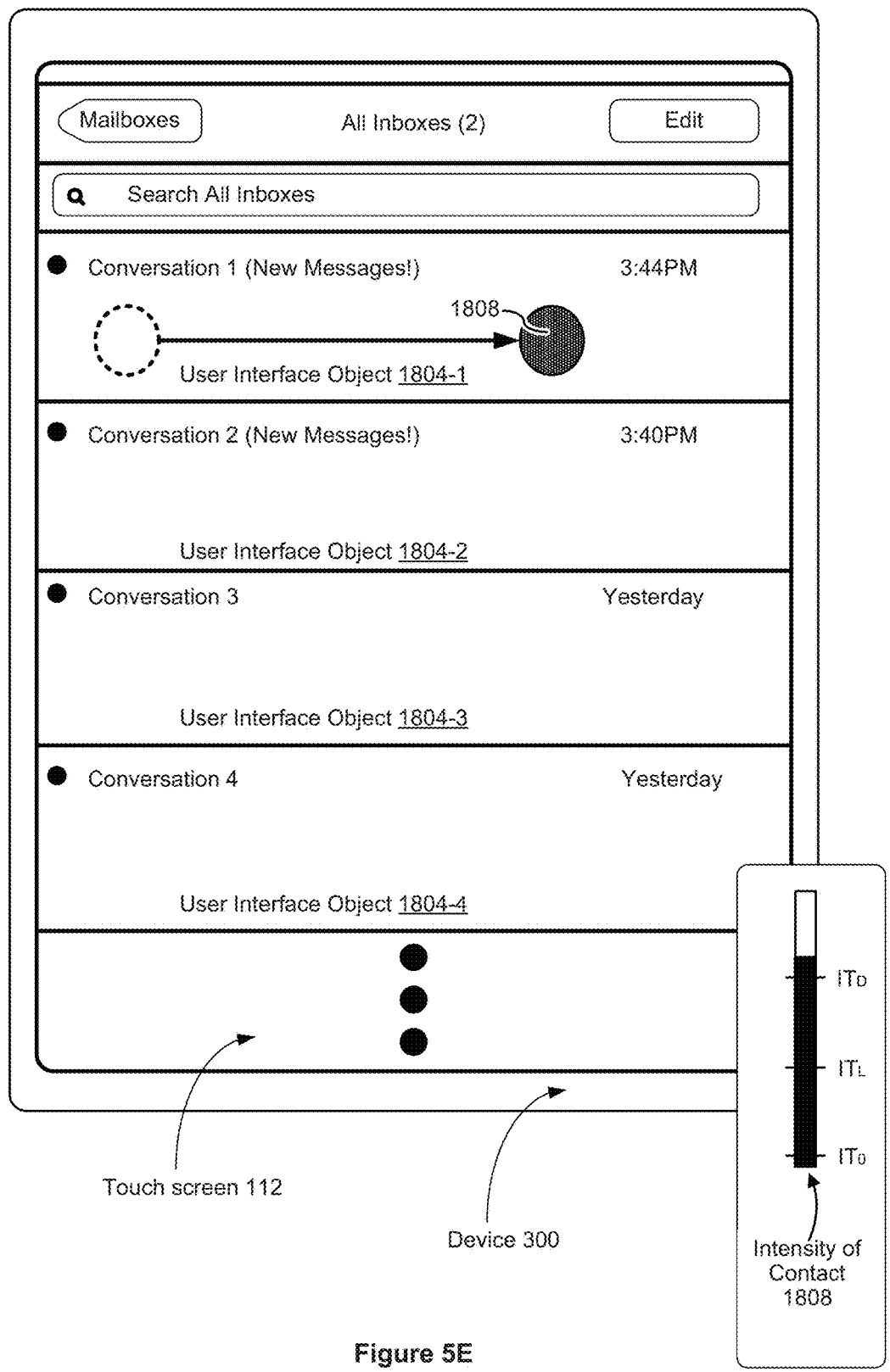

FIG. 5D is analogous to FIG. 5B with the difference that contact 1808 shown in FIG. 5D has an intensity above the deep press intensity threshold $IT_D$ (e.g., contact 1806 in FIG. 5B with an intensity below $IT_D$). FIG. 5E shows a continuation of the gesture that includes contact 1808. FIG. 5E is analogous to FIG. 5C with the difference that contact 1808 shown in FIG. 5E has an intensity above the deep press intensity threshold (e.g., contact 1806 in FIG. 5C). For brevity, additional details already described with reference to FIGS. 5B and 5C are not repeated here with reference to FIGS. 5D and 5E, respectively. In some embodiments, because contact 1808 has a maximum intensity above $IT_D$ while over the email message, the email message is deleted without requesting confirmation from the user. In this example, the device determines on the basis of a high intensity of the contact that the gesture is not accidental, and therefore proceeds with the operation (e.g., deletion) without requiring the user to enter more user inputs (e.g., a confirmation input), thus saving the user time and promoting efficiency. In some embodiments, contact 1808 has an intensity above $IT_D$ throughout the gesture shown in FIGS. 5D-5E. In some embodiments, contact 1808 has an intensity above $IT_D$ at the beginning of the gesture shown in FIGS. 5D-5E and an intensity below $IT_D$ at the end of the gesture shown in FIGS. 5D-5E. In some embodiments, contact 1808 has an intensity below $IT_D$ at the beginning of the gesture shown in FIGS. 5D-5E and an intensity above $IT_D$ at the end of the gesture shown in FIGS. 5D-5E.

Figure 5F:
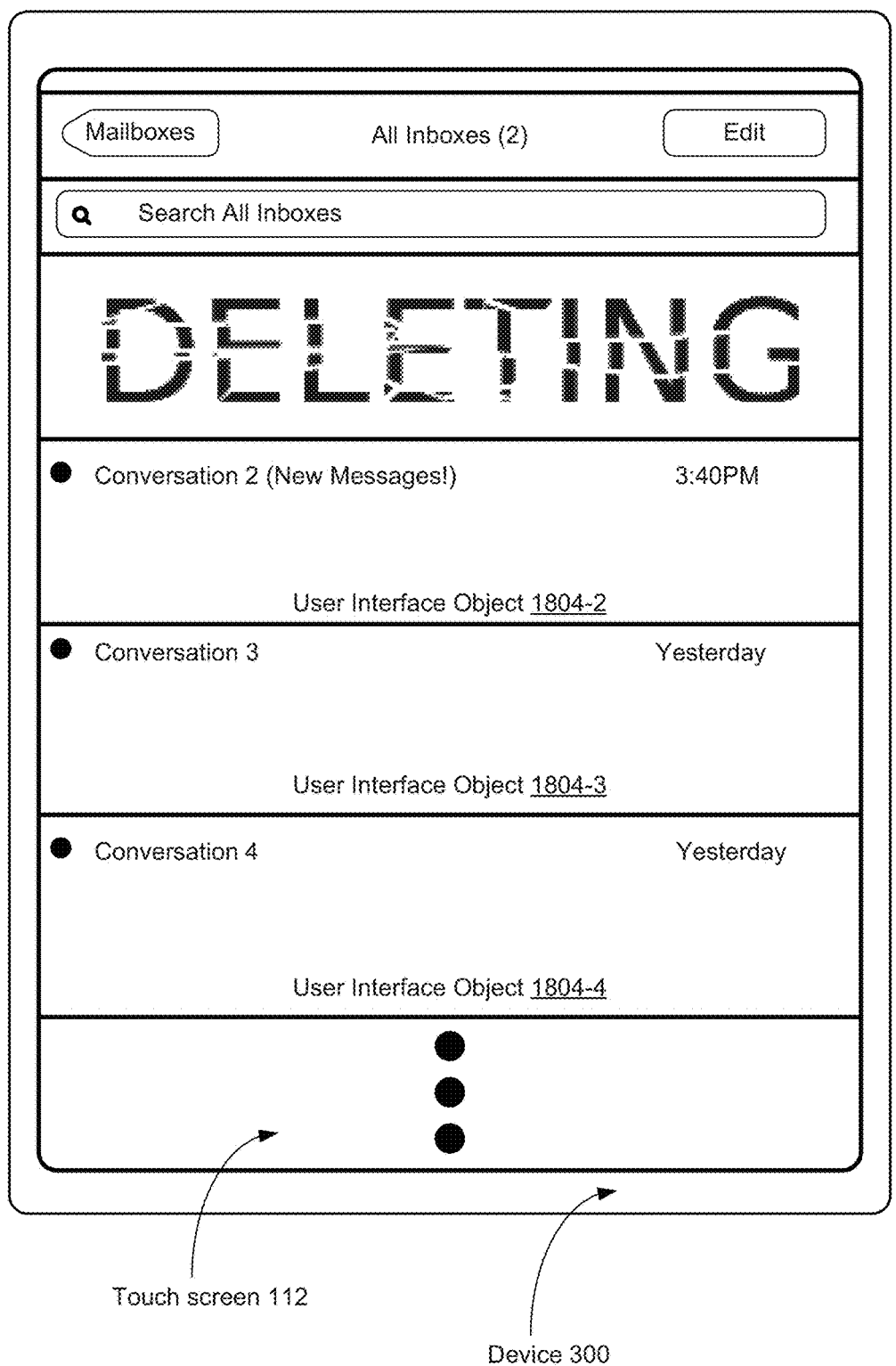

In some embodiments, it is helpful to display a dramatic animation (e.g., an animation of glass shattering or a representation of the email message being "crumpled up") that catches the user's attention to inform the user that the destructive operation has been performed. In some embodiments, after displaying the animation that corresponds to the destructive operation, the user is provided with an option to undo the destructive operation (e.g., display an "undo" affordance or instructions to shake to undo). FIG. 5F shows a still-frame illustration of such an animation. In this case, the animation displays the words "DELETING" in dramatic fashion.

Figure 5G:
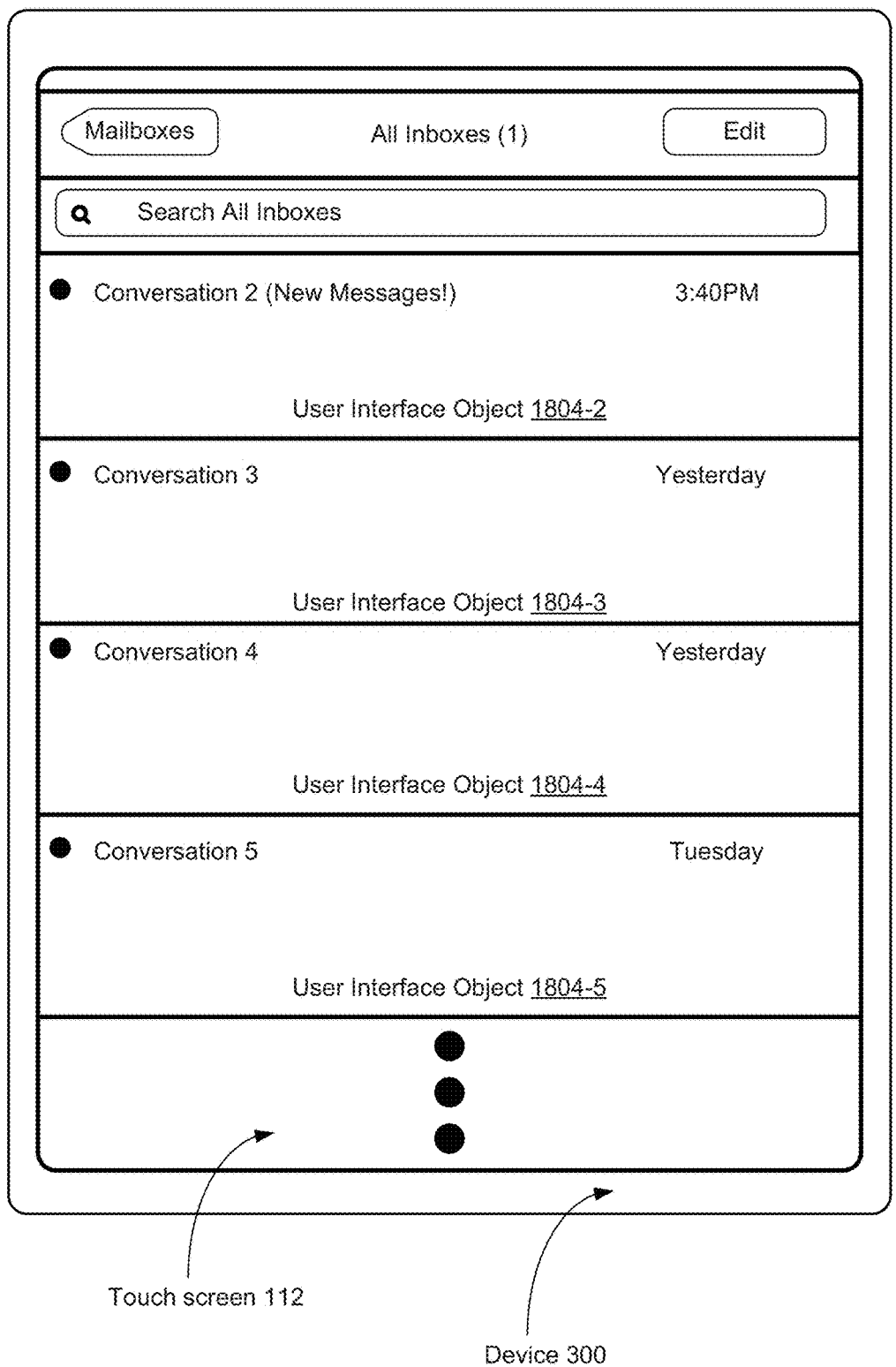

FIG. 5G illustrates that, after the animation described with reference to FIG. 5F, the email message is removed from the list. In some embodiments, one or more additional email messages that were previously not visible (e.g., a user would have to scroll through the list of email messages in order to view them) are now visible due to the removal of user interface object 1804-1. For example, user interface object 1804-5 is now visible to the user without scrolling.

Figure 5H:
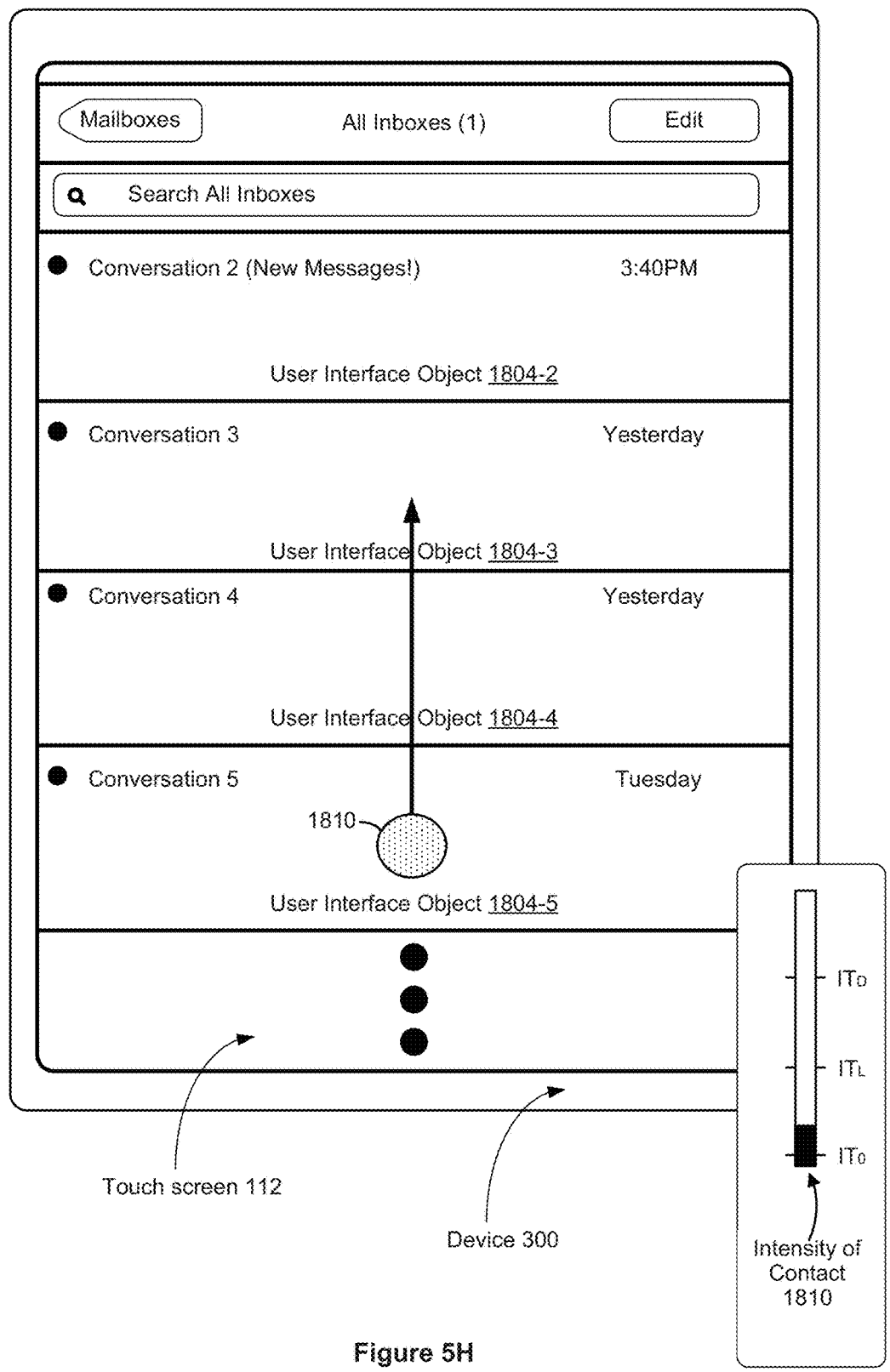
Figure 5I:
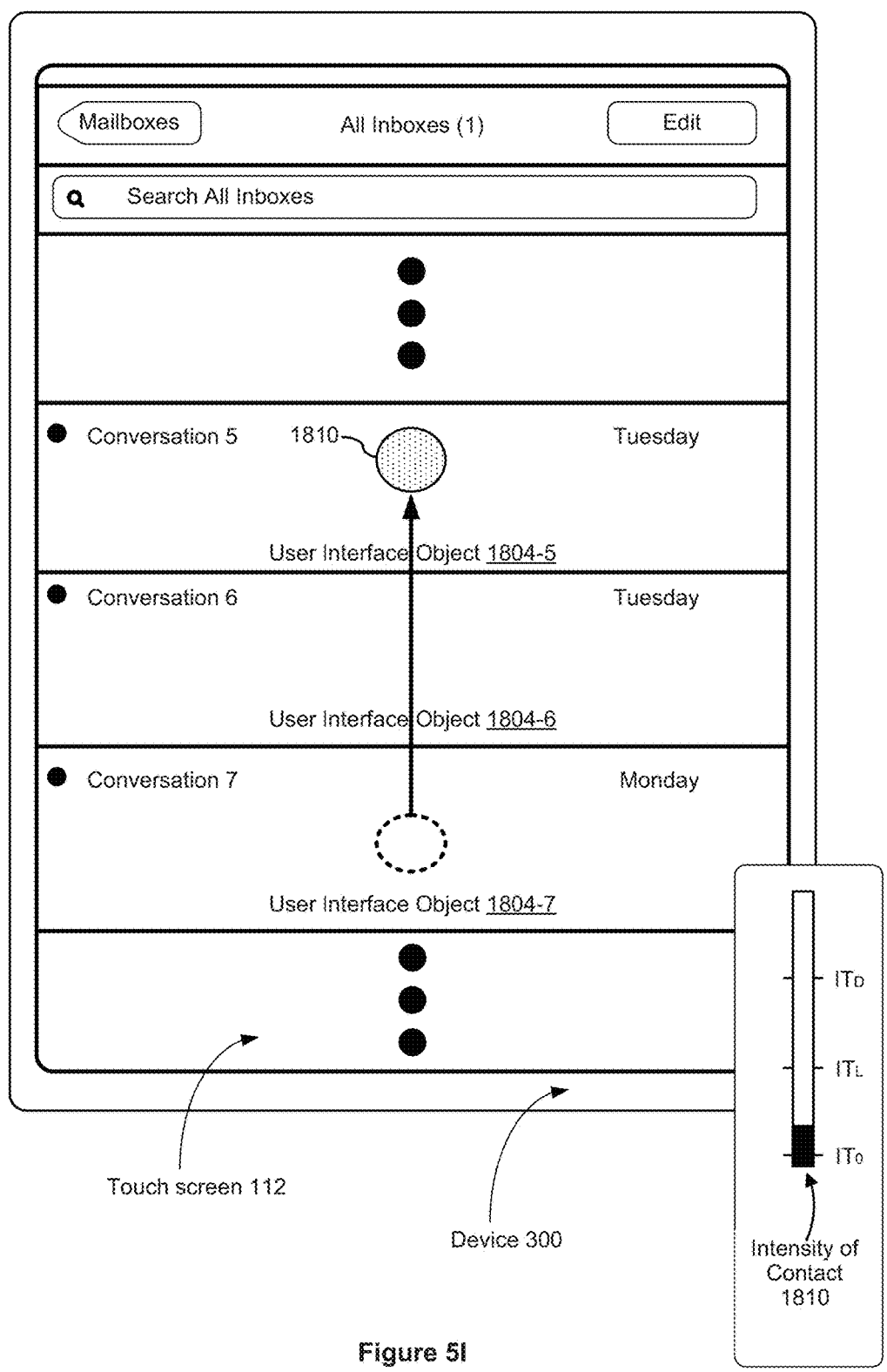

In some embodiments, certain inputs associated with certain operations can be performed without requesting confirmation from the user regardless of the intensity of contacts corresponding to the inputs. For example, FIG. 5H illustrates a vertical swipe input including upward movement of contact 1810. In this example, vertical swipe input performed with contact 1810 is interpreted by the device as a request to scroll through the list of email messages. FIG. 5I shows the resulting change in the displayed email messages (the list has been scrolled such that user interface objects 1804-5 through 1804-7 are now displayed). The maximum intensity of vertical swipe gesture performed with contact 1810 is below the deep press intensity threshold (and the light press intensity threshold, for that matter). However, because the operation of scrolling, in this example, does not require user confirmation, the list is scrolled without requesting user confirmation. In some embodiments, operations associated with light press gestures are categorized as requiring user confirmation or not requiring user confirmation based on the ease with which they can be reversed (e.g., whether they are destructive operations or non-destructive operations).

FIGS. 6A-6B are flow diagrams illustrating a method 1900 of performing user interface operations in accordance with some embodiments. The method 1900 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 1900 are, optionally, combined and/or the order of some operations are, optionally, changed.

As described below, the method 1900 provides an intuitive way to perform user interface operations. The method reduces the cognitive burden on a user when performing user interface operations, thereby creating a more efficient human-machine interface. For battery-operated electronic devices, enabling a user to perform user interface operations faster and more efficiently conserves power and increases the time between battery charges.

The device displays (1902) a user interface on a display of a device (e.g., the user interface displayed on touch screen 112 of device 300, FIG. 5A). The device detects (1904) a gesture by a user on a touch-sensitive surface that includes a contact (e.g., contact 1806, FIG. 5B) that corresponds to a focus selector at a respective location in a user interface. The gesture is associated with a respective operation.

In some embodiments, the gesture is (1906) a swipe gesture of a contact that corresponds to movement of the focus selector across a representation of an item in a list of items (e.g., a message or conversation in an email inbox). In some embodiments, the user interface includes (1908) a plurality of user interface objects, and the respective location corresponds to a respective object in the plurality of user interface objects. In some embodiments, the respective operation is (1910) a destructive operation (e.g., a delete operation).

In response to detecting the gesture, in accordance with a determination that the contact has a maximum intensity below a first intensity threshold, the device requests (1912) confirmation that the user wants the device to perform the respective operation (e.g., to confirm that the user did not accidentally perform the gesture). For example, FIGS. 5C-5D illustrate examples of a gesture with a maximum intensity below $IT_D$ and subsequent request for confirmation to delete an email message. In response to the gesture, in accordance with a determination that maximum intensity of the contact is above the first intensity threshold, the device performs the respective operation without requesting confirmation that the user wants the device to perform the respective operation. For example, FIGS. 5D-5E illustrate an example of a gesture with a maximum intensity above $IT_D$ and subsequent deletion of an email message without requesting confirmation. In some embodiments, the first intensity threshold is an intensity threshold that is higher than an input-detection intensity threshold at which the contact is initially detected. In some embodiments, the device determines whether to request confirmation or to perform the operation without requesting confirmation based on whether the gesture met the confirmation criteria. In some embodiments, the confirmation criteria are met when contact (e.g., contact 1808 in FIGS. 5D-5E) has an intensity that is maintained (e.g., continuously maintained) above $IT_D$ throughout the gesture. In some embodiments, the confirmation criteria are met when the contact (e.g., contact 1808 in FIGS. 5D-5E) has an intensity above $IT_D$ at the beginning of the gesture (or prior to detecting movement of the contact) without regard to whether or not the contact has an intensity above $IT_D$ at the end of the gesture. In some embodiments, the confirmation criteria are met when the contact (e.g., contact 1808 in FIGS. 5D-5E) has an intensity above $IT_D$ at the end of the gesture (or after ceasing to detect movement of the contact) without regard to whether or not the contact has an intensity above $IT_D$ at the beginning of the gesture.

In some embodiments, requesting confirmation that the user wants the device to perform the respective operation includes (1914) displaying a confirmation message that includes an option to proceed with performing the respective operation. In some embodiments, the confirmation message includes an explicit option to cancel performance of the respective operation. In some embodiments, the confirmation message does not include an explicit option to cancel performance of the respective operation, but tapping/pressing while a focus selector is outside of the confirmation message cancels performance of the respective operation. In some embodiments, the confirmation identifies (1916) the respective operation that is to be performed (e.g., a dialogue box that says "do you want to delete this message? Yes/No" or an affordance that simply says "Delete?" as in FIG. 5C).

In some embodiments, it is helpful to display a dramatic animation that catches the user's attention to inform the user that the destructive operation has been performed. In some embodiments, the respective operation is (1918) a delete operation, and performing the operation includes displaying an animation that crumples the respective user interface object (e.g., crumpling the object like a piece of paper). In some embodiments, the operation is (1920) a delete operation, and performing the operation includes displaying an animation that shatters the respective user interface object (e.g., shattering the object like a piece of glass). For example, FIG. 5F shows a still-frame of an animation of the word "DELETING" shattering like glass. In some embodiments, after displaying the animation that corresponds to the destructive operation, the user is provided with an option to undo the destructive operation (e.g., display an "undo" affordance or instructions to shake to undo). In some embodiments, the operation is a delete operation, and performing the operation includes displaying an animation that folds the respective user interface object up (e.g., folding the respective user interface object with itself and/or folding a plurality of user interface objects including the respective user interface object). In some embodiments, the operation is a delete operation, and performing the operation includes displaying an animation of the respective user interface object moving backwards into the display (e.g., the respective user interface object moves backwards and fades out).

In some embodiments, the device detects (1922) one or more inputs that include contacts with maximum intensity below the first intensity threshold. In response to detecting the one or more inputs, the device performs (1924) one or more corresponding operations (e.g., non-destructive operations such as scrolling operations or email viewing operations) without requesting confirmation from the user. For example, a user can view or scroll a list of email messages using one or more contacts with intensities below the first intensity threshold, as shown in FIGS. 5H-5I.

It should be understood that the particular order in which the operations in FIGS. 6A-6B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 1900 described above with respect to FIGS. 6A-6B. For example, the contacts, gestures, user interface objects, intensity thresholds, focus selectors, animations described above with reference to method 1900 optionally have one or more of the characteristics of the contacts, gestures, user interface objects, intensity thresholds, focus selectors, animations described herein with reference to other methods described herein (e.g., those listed in the fifth paragraph of the Description of Embodiments). For brevity, these details are not repeated here.

Figure 7:
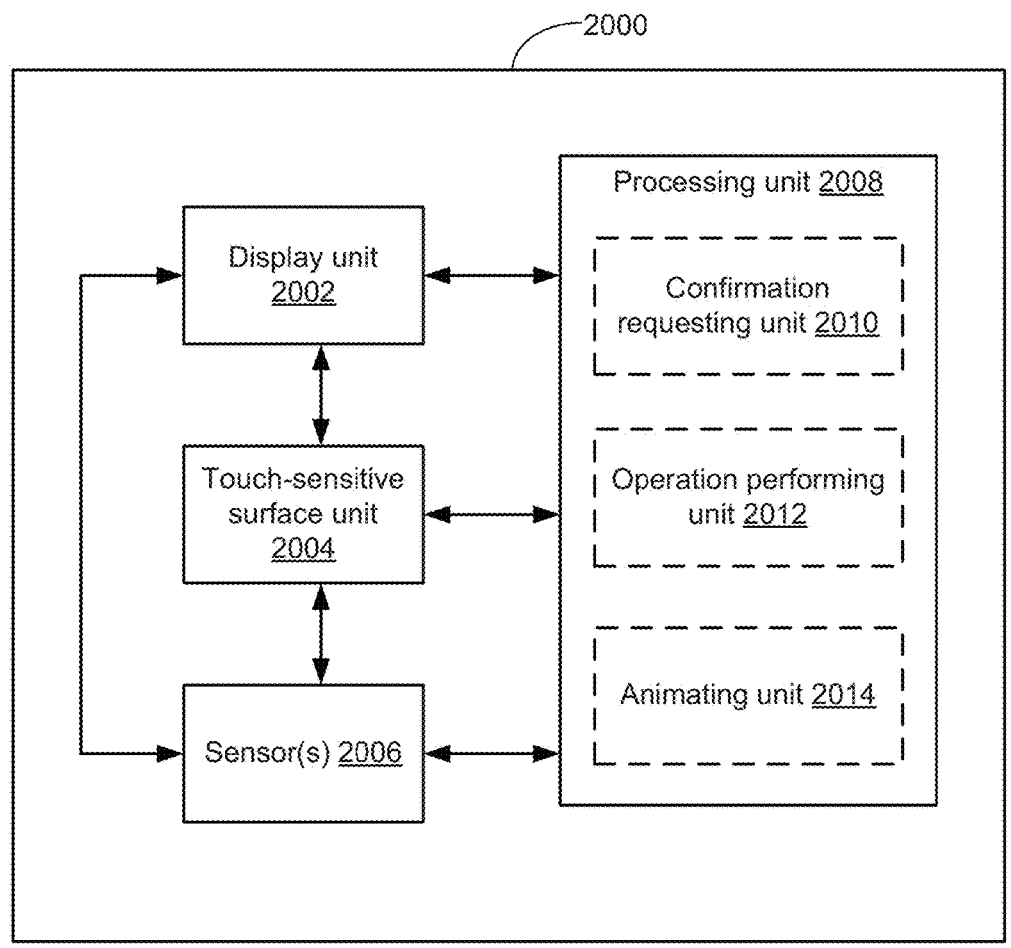
FIG. 7 is a functional block diagram of an electronic device in accordance with some embodiments.

In accordance with some embodiments, FIG. 7 shows a functional block diagram of an electronic device 2000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein. As shown in FIG. 7, an electronic device 2000 includes a display unit 2002 configured to display a user interface, a touch-sensitive surface unit 2004 configured to detect a gesture by a user on the touch-sensitive surface unit that includes a contact that corresponds to a focus selector at a respective location in the user interface, wherein the gesture is associated with a respective operation, one or more sensor units 2006 configured to detect intensity of contacts with the touch-sensitive surface unit 2004; and a processing unit 2008 coupled to the display unit 2002, the touch-sensitive surface unit 2004 and the one or more sensor units 2006. In some embodiments, the processing unit 2008 includes a confirmation requesting unit 2010, an operation performing unit 2012, and an animating unit 2014.

In some embodiments, the user interface includes a plurality of user interface objects; and the respective location corresponds to a respective object in the plurality of user interface objects.

The processing unit 2008 is configured to: in response to detecting the gesture: in accordance with a determination that the contact has a maximum intensity below a first intensity threshold, request confirmation (e.g., with confirmation requesting unit 2010) that the user wants the device to perform the respective operation; and in accordance with a determination that the maximum intensity of the contact is above the first intensity threshold, perform the respective operation (e.g., with operation performing unit 2012) without requesting confirmation that the user wants the device to perform the respective operation.

In some embodiments, the gesture is a swipe gesture of a contact that corresponds to movement of the focus selector across a representation of an item in a list of items.

In some embodiments, requesting confirmation (e.g., with confirmation requesting unit 2010) that the user wants to perform the respective operation includes displaying a confirmation message that includes an option to proceed with performing the respective operation.

In some embodiments, the confirmation identifies the respective operation that is to be performed.

In some embodiments, the respective operation is a destructive operation.

In some embodiments, the processing unit 2008 is further configured to: detect one or more inputs that include contacts with maximum intensity below the first intensity threshold; and in response to detecting the one or more inputs, perform one or more corresponding operations without requesting confirmation from the user.

In some embodiments, the respective operation is a delete operation; and performing the operation includes displaying an animation (e.g., with animating unit 2014) that crumples the respective user interface object.

In some embodiments, the operation is a delete operation; and performing the operation includes displaying an animation (e.g., with animating unit 2014) that shatters the respective user interface object.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6B are, optionally, implemented by components depicted in FIGS. 1A-1B or FIG. 7. For example, displaying operation 1902, detecting operation 1904, and crumple animating operation 1918 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Displaying Additional Information in Response to a User Contact

Many electronic devices have graphical user interfaces that include user interface objects displayed at specific locations on the display. In some instances, one or more user interface objects are associated with hidden information that is revealed when a user places a cursor or contact over the user interface object for a predefined period of time (e.g., tooltips) or clicks and holds on a user interface object for a predefined period of time (e.g., a back button on a browser). These instances require the user to wait for the predefined period of time to elapse to see the initially hidden information. It would be advantageous to provide the user with the option to avoid waiting and get immediate display of the additional information. In some instances, a single activation region or user interface object is associated with a plurality of operations of the device (e.g., a back button on a browser is associated with both navigating to a previous webpage and displaying a pop-up list of previously visited webpages). In these instances, a time delay is sometimes introduced as a way to determine which operation of the plurality of operations to perform in response to a user input associated with the activation region or user interface object. But such delays interrupt a user's workflow. Providing an intuitive way to immediately perform a particular operation can make a user's interaction with the device much more efficient.

The embodiments described below provide new, improved methods of displaying additional information (or activating user interface objects) using a touch-sensitive surface and sensors that detect the intensity (e.g., pressure) of a contact on the touch-sensitive surface. To avoid waiting a predefined delay time in order to view additional information associated with a user interface object or a region of a user interface, the user has the option to apply an intensity (e.g., pressure) of contact greater that a predefined intensity threshold to immediately see the additional information. For example, the user can immediately display a tool tip or pop-up menu by pressing on the touch-sensitive surface with an intensity above the intensity threshold, without having to wait for a delay time. Similarly, for a back button on a browser, the user can immediately display a list of previously accessed webpages by pressing on the touch-sensitive surface with an intensity above the intensity threshold. On the other hand, if the user does not press with sufficiently intensity, the additional information is not displayed until the delay time has elapsed. Accordingly, the described embodiments provide the user with a more efficient way to interact with user interface objects.

FIGS. 8A-8N illustrate exemplary user interfaces for displaying additional information associated with a location on a display based on contact intensity (e.g., pressure) and contact timing (e.g., duration) in accordance with some embodiments. The user interfaces in these figures are used to illustrate the processes described below, including the processes in FIGS. 9A-9B. FIGS. 8A-8N include intensity diagrams that show the current intensity of the contact on the touch-sensitive surface relative to a plurality of intensity thresholds including a respective threshold (e.g., "$IT_D$"). In some embodiments, operations similar to those described below with reference to $IT_D$ are performed with reference to a different intensity threshold (e.g., "$IT_L$").

FIG. 8A illustrates a user interface (e.g., a webpage), with a plurality of selectable objects (e.g., 3606-1 and 3606-2), that is displayed on a display 450. FIGS. 8A-8C illustrate displaying additional information (e.g., by scrolling the webpage) in response to detecting a contact without waiting for a predefined delay time from the time of detecting the contact, when the contact has an intensity that is above (e.g., greater than) an intensity threshold.

In FIG. 8A, at a time prior to T0, no contact is present or detected on touch-sensitive surface 451 and focus selector 3607-a is remote from scroll arrow 3606-4 in scroll bar 3606-3. In FIG. 8B, at time T0, a contact (e.g., contact 3605 in FIG. 8B) is detected on the touch-sensitive surface 451. In response to detecting the contact on the touch-sensitive surface 451, the device instructs display 450 to position a focus selector (e.g., focus selector 3607-a in FIG. 8B) at a location on display 450 (e.g., over scroll arrow 3606-4 in scroll bar 3606-3 in FIG. 8B). In FIG. 8C, after time T1 and prior to time T2, while focus selector 3607-a is still positioned at the location on the display 450 (e.g., over scroll arrow 3606-4 in scroll bar 366-3 in FIG. 8C), the intensity of the contact (e.g., contact 3605 in FIG. 8C) on the touch-sensitive surface 451 exceeds the intensity threshold $IT_D$. When the contact has an intensity that is above a predefined intensity threshold, additional information (e.g., additional selectable objects 3606-6 and 3606-7) is displayed on the display 450 (e.g., by scrolling the webpage) without waiting for a predefined delay time to elapse (e.g., without waiting until time T2 or without waiting until a predefined delay time, $T_{delay}$=T2−T0, has elapsed). In other words, if the user places a contact with an intensity above the intensity threshold when the focus selector 3607-a is over scroll arrow 3606-4, the user interface is scrolled, even if the delay time has not yet elapsed. In some embodiments, the portion of the user interface that controls scrolling of the user interface includes a displayed scroll user interface (e.g., as illustrated in FIG. 8A). In some embodiments, the portion of the user interface that controls scrolling of the user interface is a hidden hit region that is not displayed, but is present at the edges of a scrollable window of an application. For example, if user moves cursor 3607 to a bottom edge of the display while moving a respective icon or other user interface object or while selecting text, the device scrolls the user interface either in response to detecting the cursor in the hidden hit region for longer than the delay time or in response to detecting an increase in the intensity of the contact above the predefined intensity threshold.

FIGS. 8D-8G illustrate waiting until a predefined delay time has elapsed from the time of detecting a contact on the touch-sensitive surface 451 (or from a time that the contact reached a lower intensity threshold, such as $IT_L$) to display additional information (e.g., by scrolling the webpage) in response to the detected contact, when the contact has an intensity that is below (e.g., lower than) an intensity threshold (e.g., "$IT_D$").

Figure 8D:
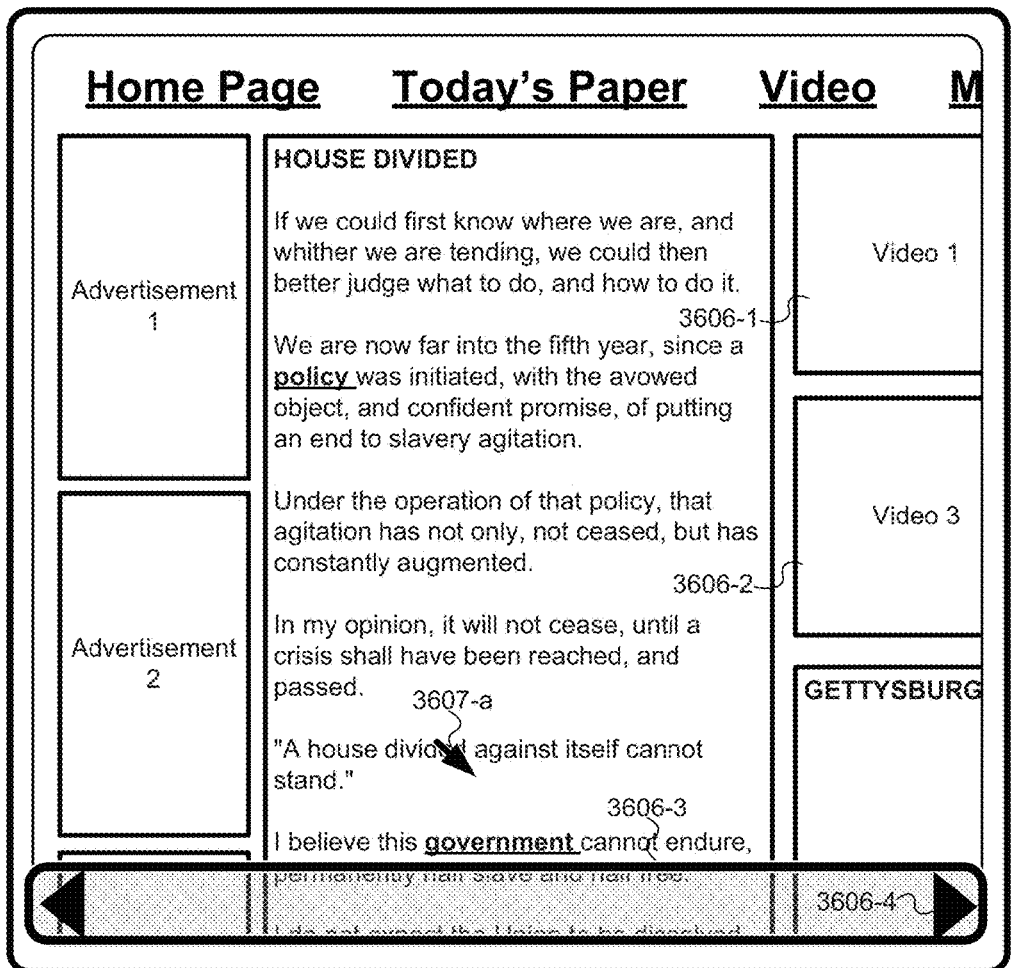
Figure 8D:
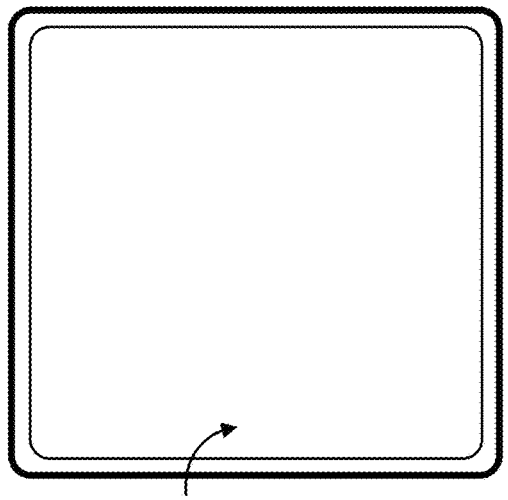
Figure 8D:
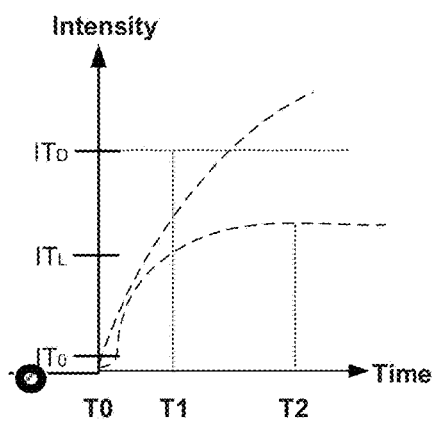
Figure 8E:
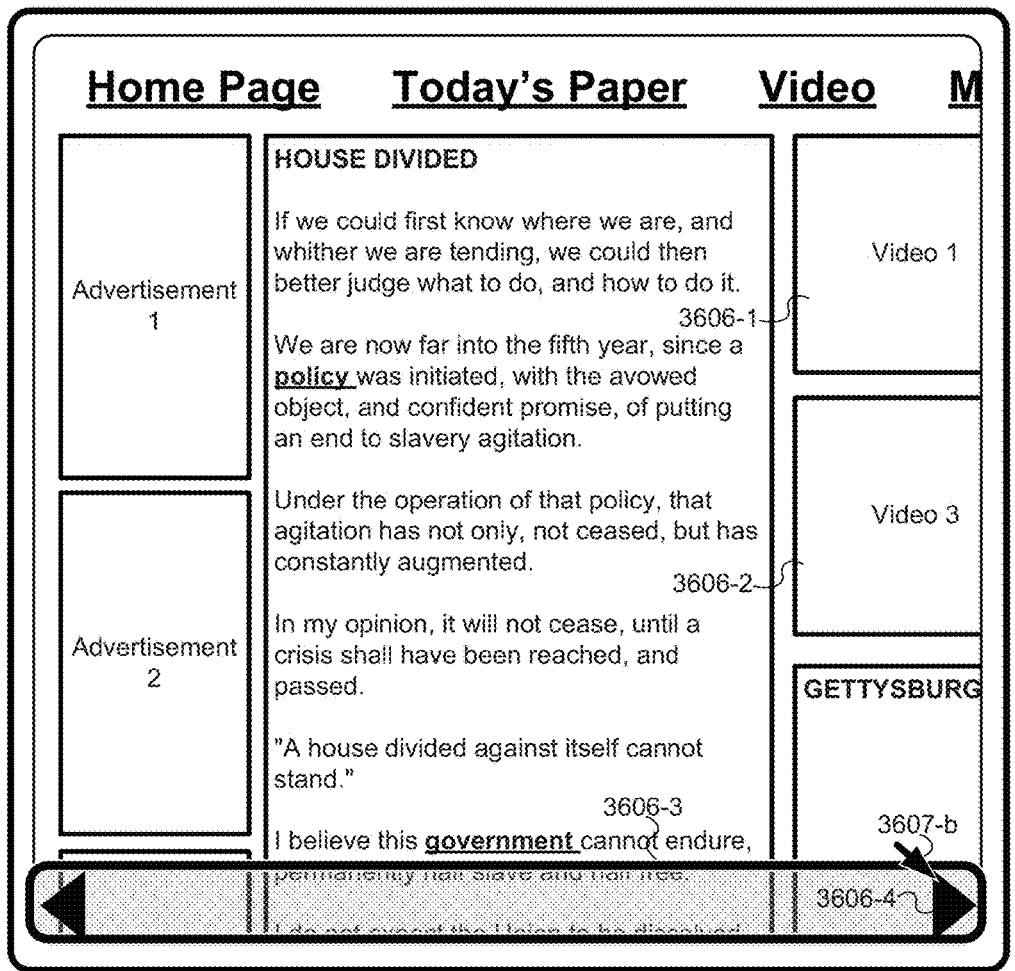
Figure 8E:
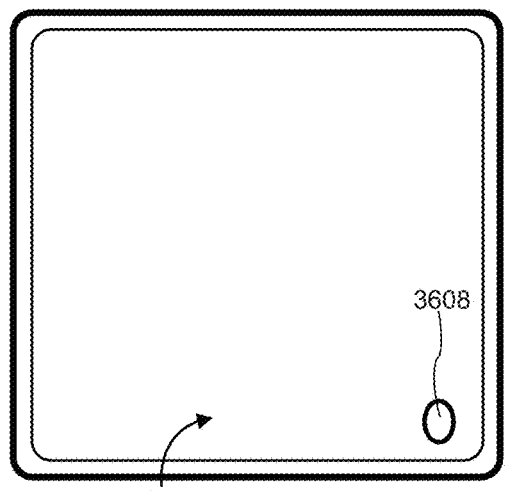
Figure 8E:
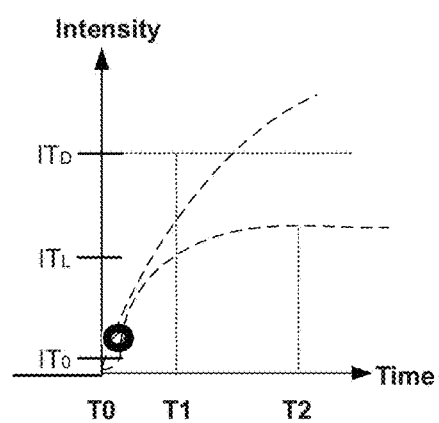
Figure 8F:
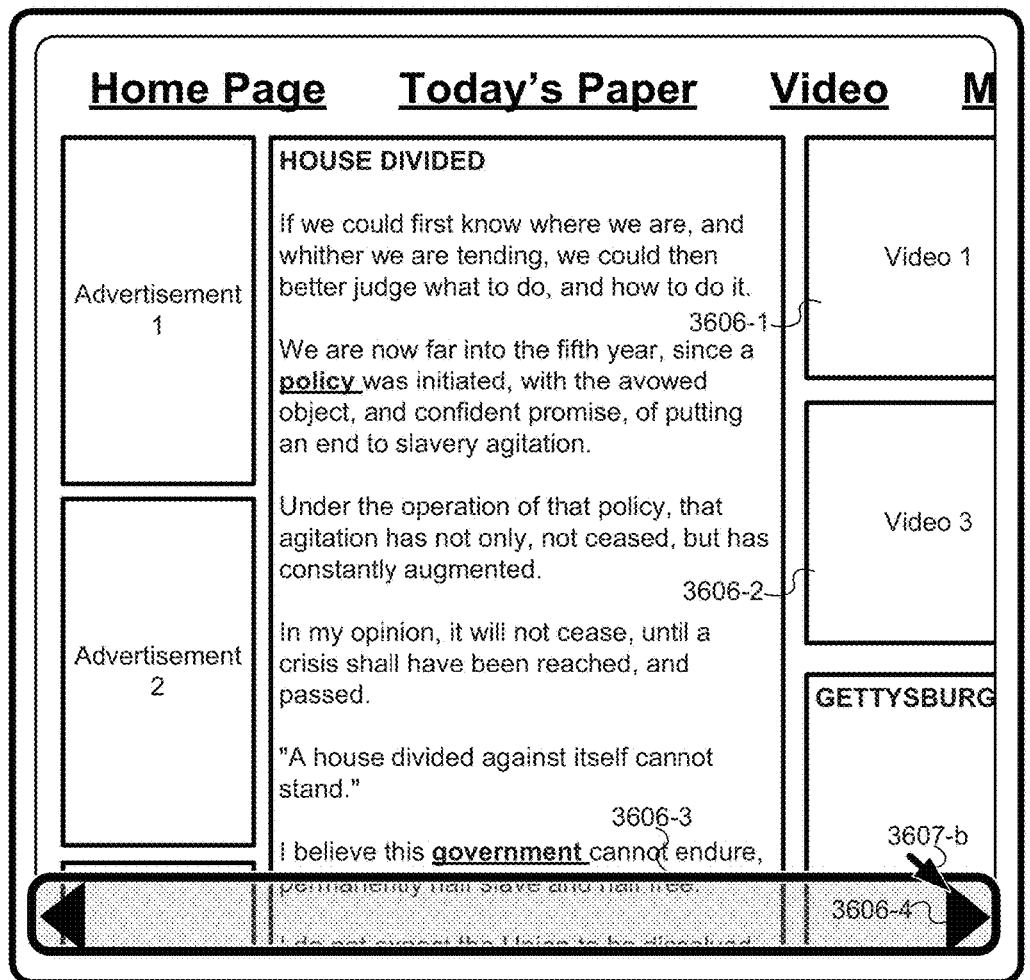
Figure 8F:
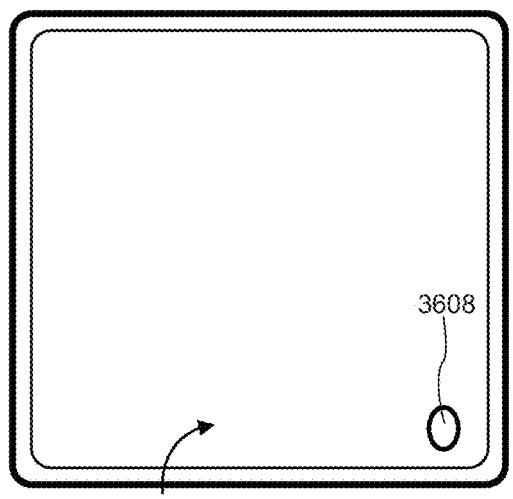
Figure 8F:
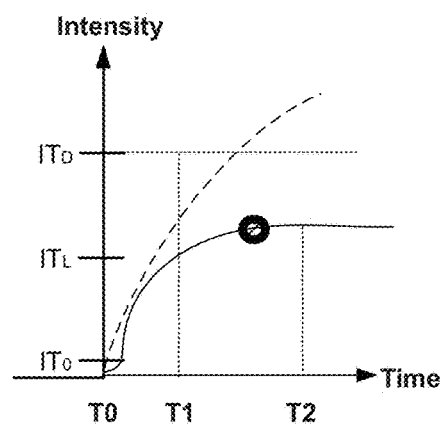
Figure 8G:
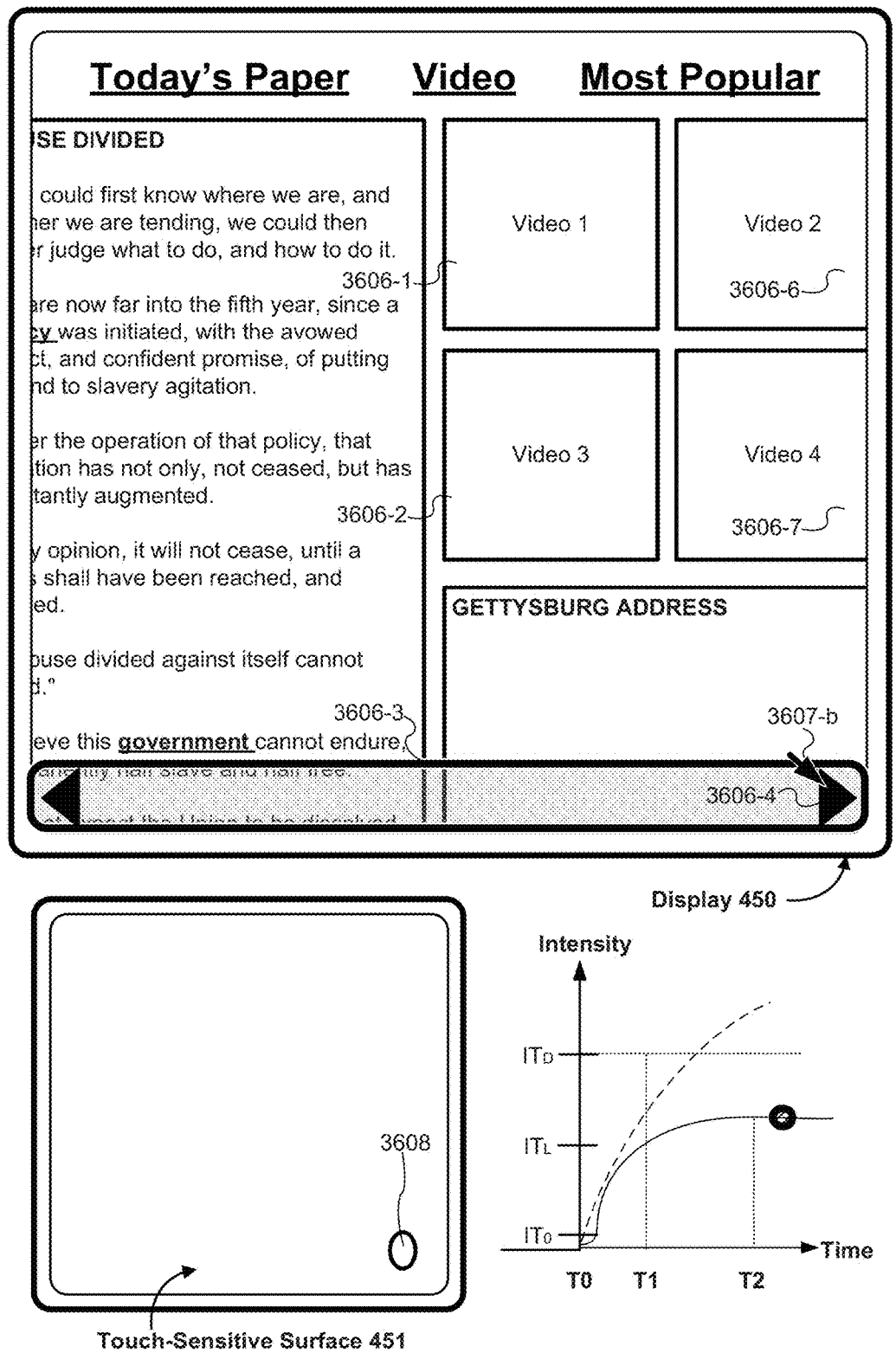

In FIG. 8D, at a time prior to T0, no contact is present or detected on a touch-sensitive surface 451 and focus selector 3607-*a* is remote from scroll arrow 3606-4 in scroll bar 3606-3. In FIG. 8E, at time T0, a contact (e.g., contact 3608 in FIG. 8E) is detected on the touch-sensitive surface 451. In response to detecting the contact on the touch-sensitive surface 451, the device instructs the display 450 to position a focus selector (e.g., focus selector 3607-*b* in FIG. 8E) at a respective location on the display 450 (e.g., at edge 3606-4 of scroll bar 3606-3 in FIG. 8E). In FIG. 8F, at a time prior to time T2, while focus selector 3607-*b* is still positioned at the respective location on the display 450 (e.g., over scroll arrow 3606-4 in scroll bar 3606-3 in FIG. 8F), the intensity of the contact (e.g., contact 3608 in FIG. 8F) on the touch-sensitive surface 451 is below the intensity threshold $IT_D$. While contact 3608 has an intensity that is below the intensity threshold and while focus selector 3607-*b* is still positioned at the respective location on the display 450, the device does not display additional information associated with the respective location of focus selector 3607-*b* until a predefined delay time (e.g., predefined delay time, $T_{delay}$=T2−T0) has elapsed or until time T2. In FIG. 8G, while the intensity of the contact (e.g., contact 3608 in FIG. 8G) on the touch-sensitive surface 451 is still below the intensity threshold $IT_D$, after a predefined delay time ($T_{delay}$=T2−T0) has elapsed or after time T2, and while the focus selector 3607-*b* is still positioned at the location on the display 450 (e.g., over scroll arrow 3606-4 in scroll bar 3606-3 in FIG. 8G), additional information (e.g., additional selectable objects 3606-6 and 3606-7) is displayed on the display 450 (e.g., by scrolling the webpage). For example, if the user places a contact with an intensity below the intensity threshold over a scroll arrow in a scroll region and waits longer than the delay time, the user interface is scrolled accordingly. In some embodiments, the delay time $T_{delay}$=T2−T1, and the contact reaches a lower intensity threshold (e.g., "$IT_L$") at time T1 and the additional information is displayed on the display after waiting until the intensity of the contact has been maintained above intensity threshold $IT_L$ from time T1 until time T2.

In other words, in some embodiments, the device determines if the intensity of the contact is above an intensity threshold while the focus selector is at a respective location on the display. If the intensity of the contact is above the intensity threshold, the device does not wait for the predefined delay time to display the additional information on the display, but rather displays the additional information immediately. On the other hand, if the intensity of the contact is below the intensity threshold, the device waits until the predefined delay time to display the additional information on the display, and therefore displays the additional information at a later time (e.g., as determined from the predefined delay time). As a result, the user can display the additional (e.g., initially undisplayed) information associated with a location on the display corresponding to a contact, sooner—without having to wait for a predefined delay time—if the user increases the intensity of the contact above the intensity threshold.

In some embodiments, while the focus selector is displayed at a respective location, the device determines if a predefined delay time has elapsed from the time the contact was detected. If the predefined delay time has elapsed since the detection of the contact, the device displays additional information on the display 450. On the other hand, if the predefined delay time has not elapsed, the device determines (e.g., checks repeatedly, iteratively, or a plurality of times) if the intensity of the contact is above the predefined threshold. If the device determines the intensity of the contact to be above the predefined threshold, the device displays the additional information without waiting until the predefined delay time has elapsed.

Figure 8H:
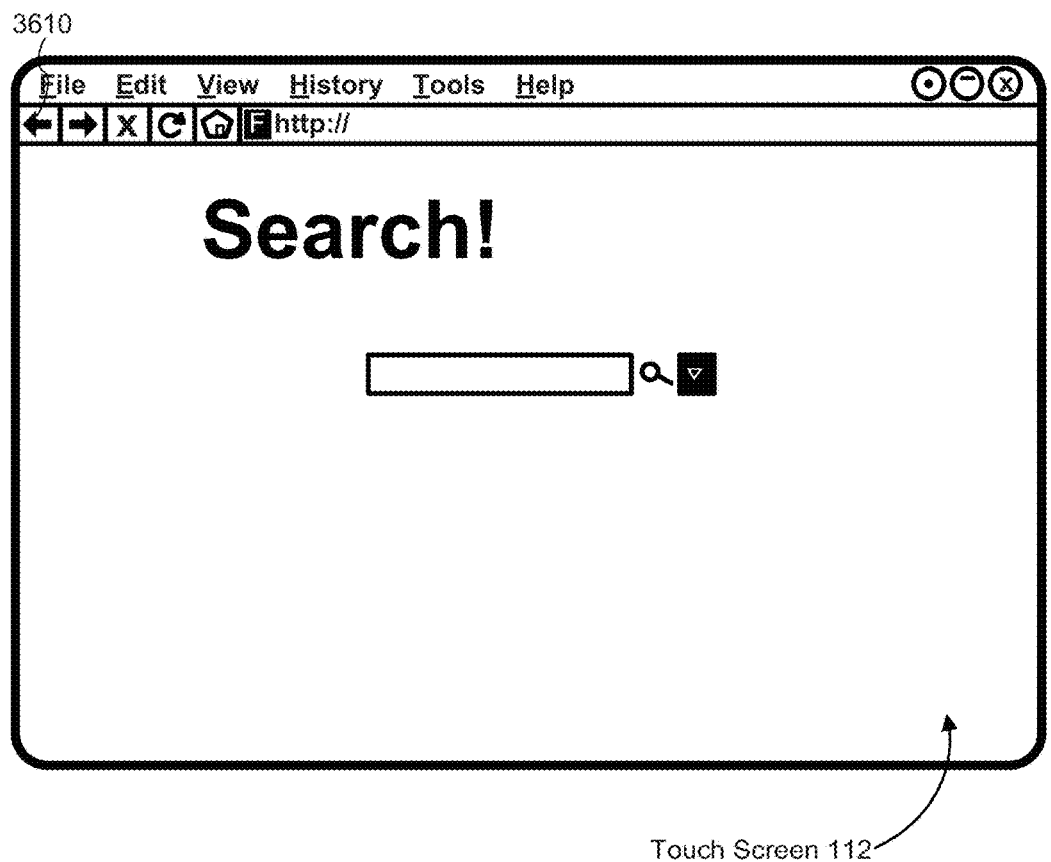
Figure 8H:
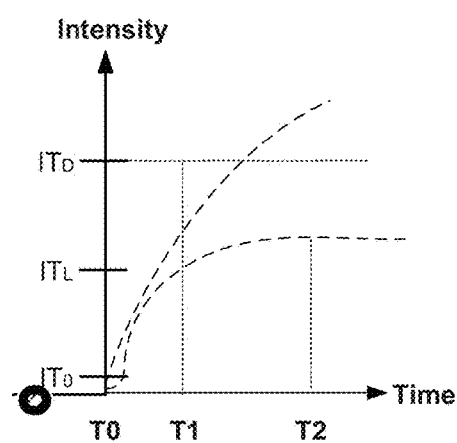
Figure 8I:
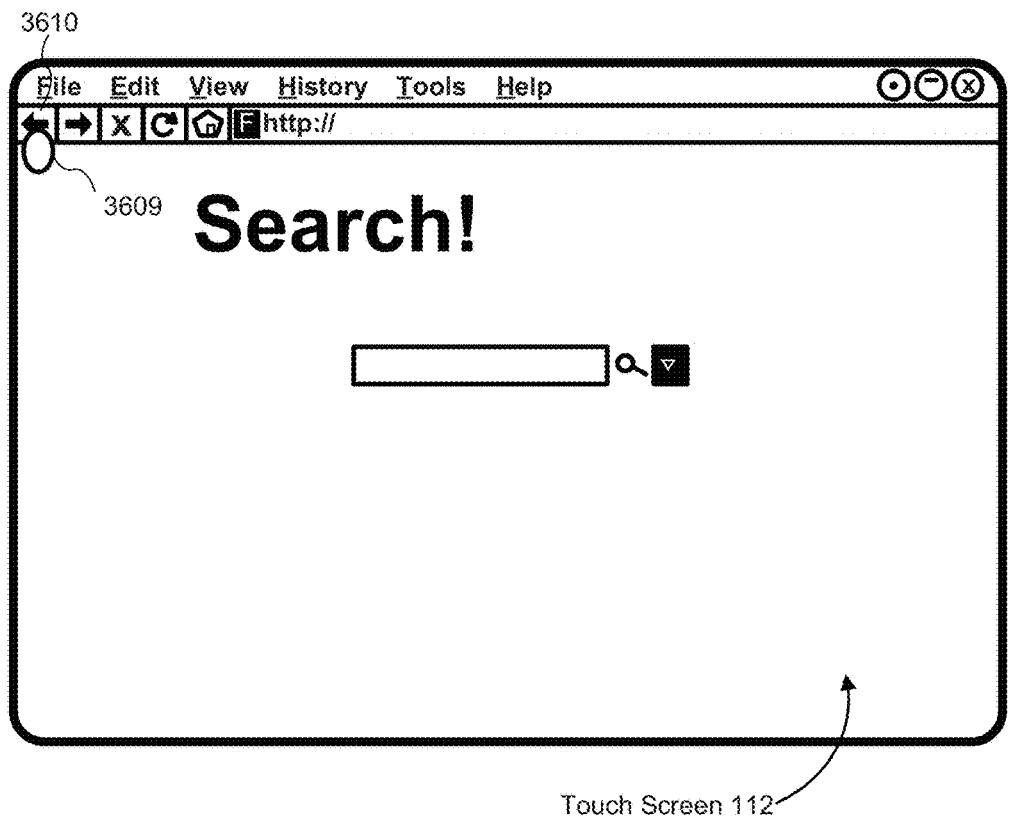
Figure 8I:
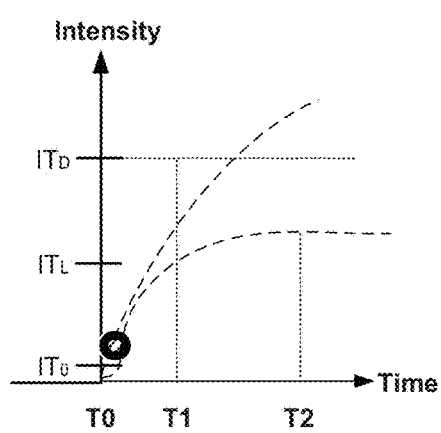
Figure 8J:
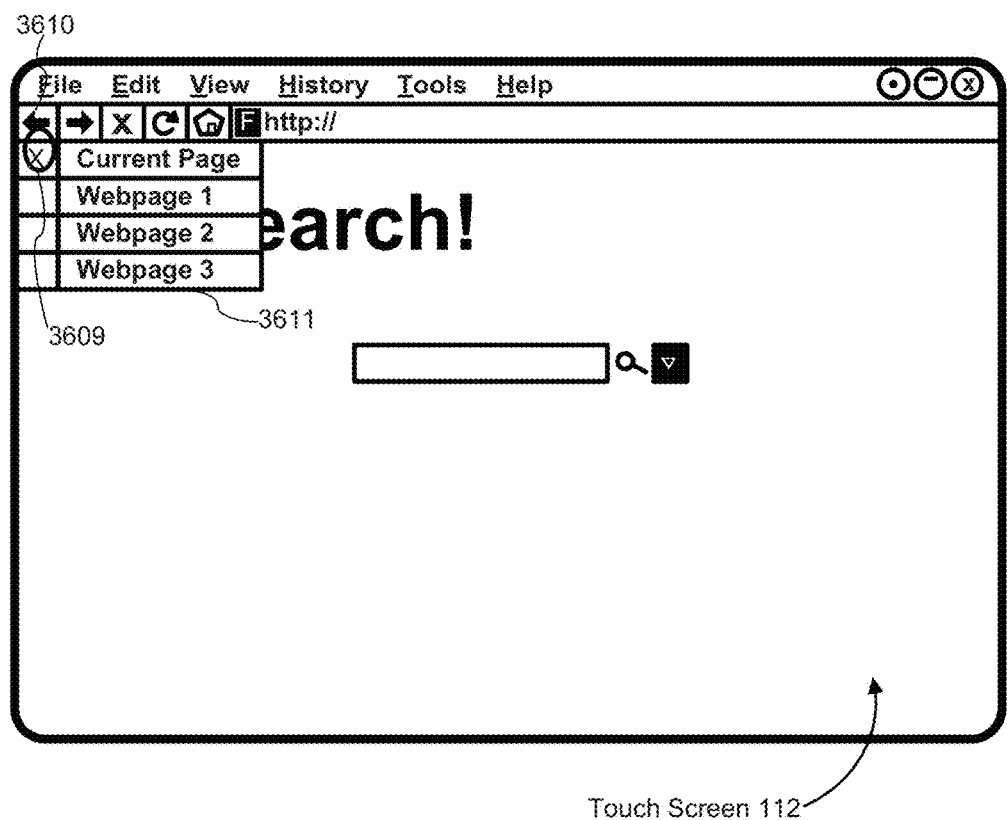
Figure 8J:
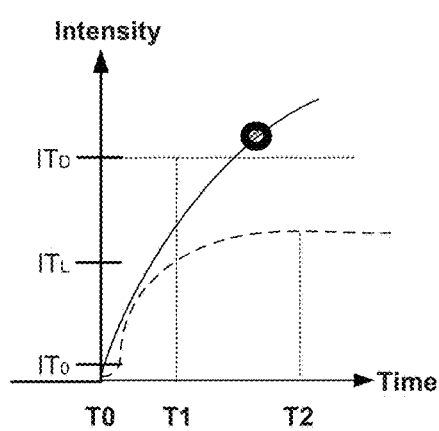

FIG. 8H illustrates a user-interface (e.g., a webpage) that is displayed on a touch-screen 112. FIGS. 8H-8J further illustrate displaying additional information (e.g., a browsing history, including a list of previously accessed webpages) in response to a contact detected directly on touch-screen 112 without waiting for a predefined delay time from the time of detecting the contact, when the contact has an intensity (e.g., pressure) that is above (e.g., greater than) an intensity threshold (e.g., $IT_D$).

In FIG. 8H, at a time prior to T0, no contact is present or detected on touch-screen 112 at a location corresponding to browser back button 3610 (however, a contact is, optionally, present at another location on touch-screen 112). In FIG. 8I, at time T0, a contact (e.g., contact 3609 in FIG. 8I) is detected on the touch-screen 112 at a respective location (e.g., at the location of a back button 3610 in FIG. 8I). In some embodiments, when the device has a touch-screen display and the contact is detected on the touch-screen, the position of a focus selector coincides with the position of the contact on the touch-screen. In FIG. 8J, after time T1 and prior to time T2, while the contact 3609 is still positioned at the respective location on the touch-screen 112 (e.g., at the location of a back button 3610 in FIG. 8J), the intensity of the contact (e.g., contact 3609 in FIG. 8J) on touch-screen 112 exceeds the intensity threshold $IT_D$. When the contact has an intensity that is above a predefined intensity threshold, additional information (e.g., a browsing history, including a list 3611 of previously accessed webpages) is displayed on the touch-screen 112 without waiting for a predefined delay time to elapse (e.g., without waiting until time T2 or without waiting until a predefined delay time, $T_{delay}$=T2−T0, has elapsed). In other words if the user places a contact with an intensity above the intensity threshold $IT_D$ on the browser back button, the browser history is displayed even if the delay time has not yet elapsed.

FIGS. 8K-8N illustrate waiting until a predefined delay time has elapsed from the time of detecting a contact at a respective location on touch-screen 112 to display additional information (e.g., a browsing history, including a list 3611 of previously accessed webpages, sometimes called a browser history) corresponding to the detected contact, when the contact has an intensity that is below (e.g., lower than) an intensity threshold $IT_D$.

Figure 8K:
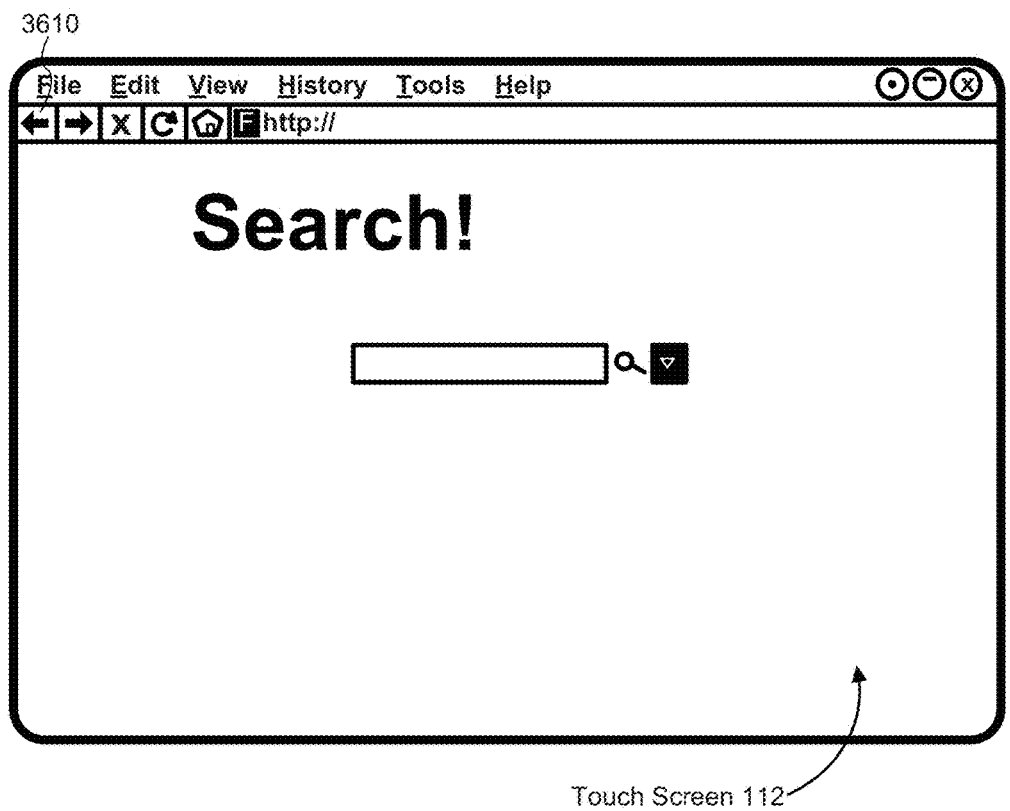
Figure 8K:
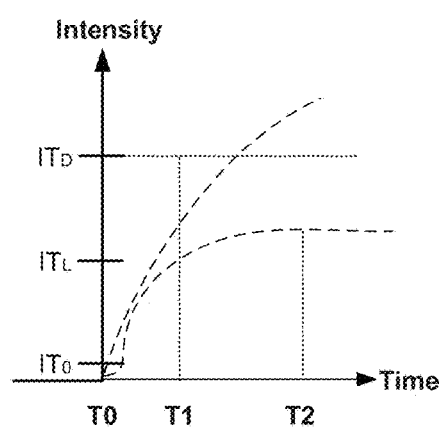
Figure 8L:
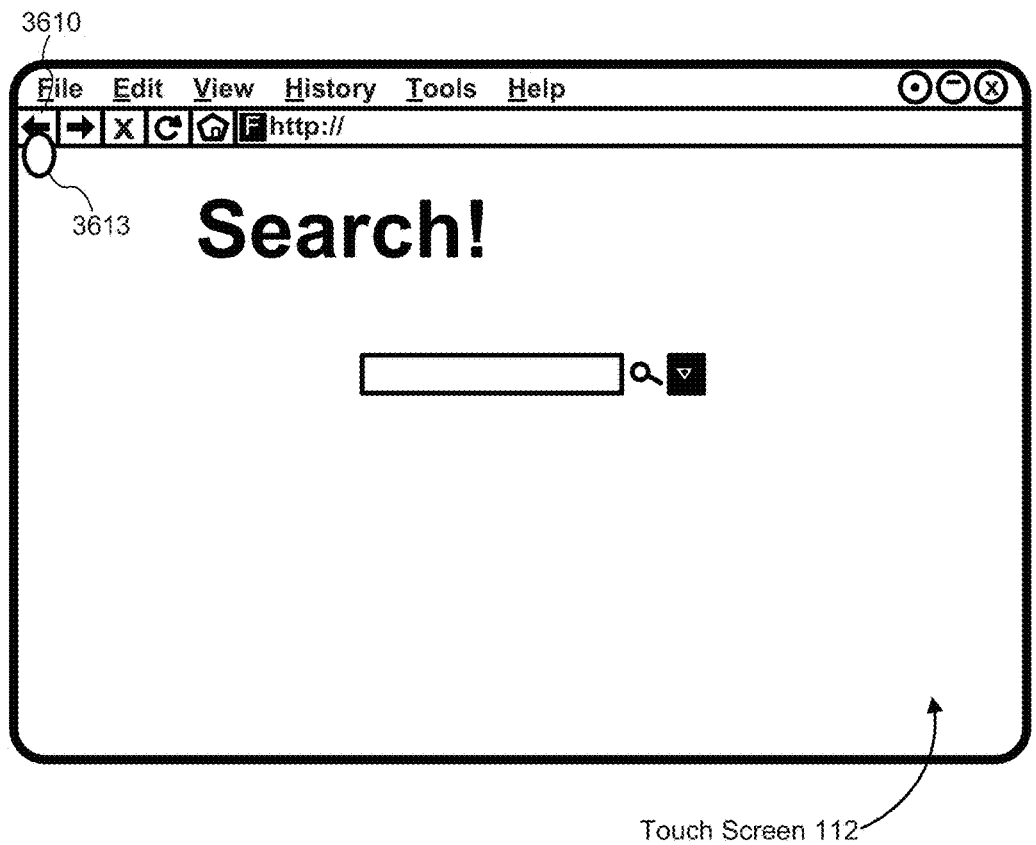
Figure 8L:
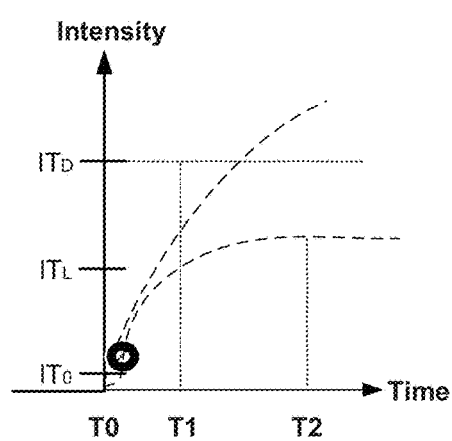
Figure 8M:
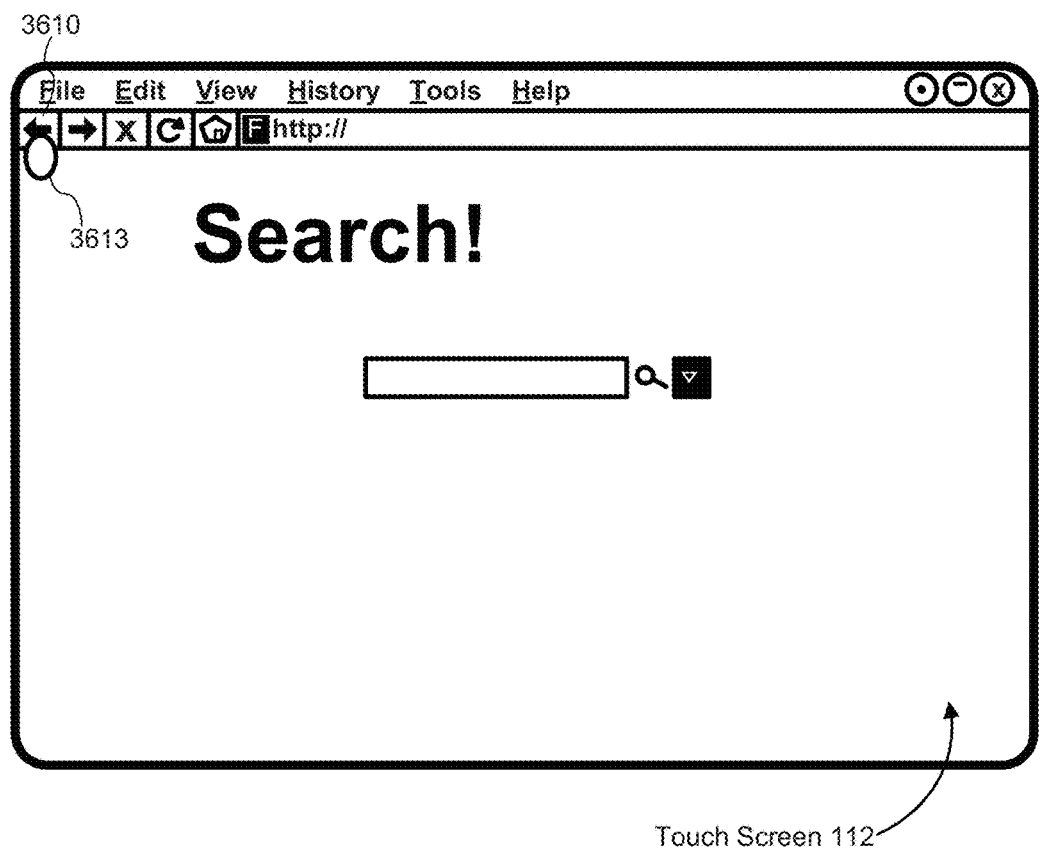
Figure 8M:
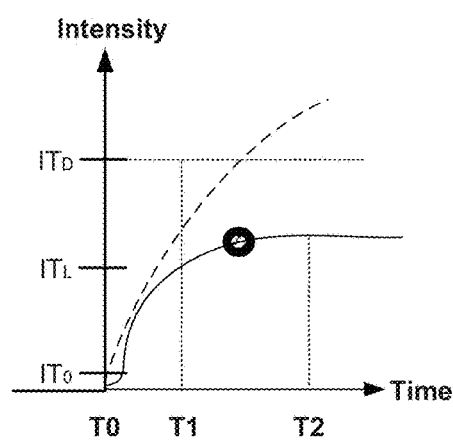

In FIG. 8K, at a time prior to T0, no contact is present or detected on the touch-screen 112 at a location corresponding to browser back button 3610 (however, a contact is, optionally, present at another location on touch-screen 112). In FIG. 8L, at time T0, a contact (e.g., contact 3613 in FIG. 8L) is detected on the touch-screen 112 at a location corresponding to browser back button 3610. In some embodiments, the location of the contact on the touch-screen 112 coincides with the location of a focus selector on the touch-screen 112 (e.g., at the location of a back button 3610 in FIG. 8L). In FIG. 8M, at a time prior to time T2, while the contact (or the focus selector) is still positioned at the respective location on the touch-screen 112 (e.g., at the location of a back button 3610 in FIG. 8M), the intensity of the contact (e.g., contact 3613 in FIG. 8L) on the touch-screen 112 is below the intensity threshold $IT_D$. When the contact has an intensity that is below the intensity threshold and the contact (or the focus selector) is still positioned at the respective location on the touch-screen 112, the device does not display additional information until a predefined delay time (e.g., predefined delay time, $T_{delay}=T2-T0$) has elapsed or until time T2. In FIG. 8N, after a predefined delay time ($T_{delay}=T2-T0$) has elapsed or after time T2 while the contact (or a focus selector corresponding to the contact) is still positioned at the respective location on the touch-screen 112 (e.g., at the location of a back button 3610 in FIG. 8N), additional information (e.g., a browsing history, including a list 3611 of previously accessed webpages) is displayed on the touch-screen 112. In other words if the user places a contact with an intensity below the intensity threshold $IT_D$ on the browser back button and waits longer than the delay time, the browser history is displayed.

FIGS. 9A-9B are flow diagrams illustrating a method 3700 of displaying additional information associated with a location on a display based on contact intensity (e.g., pressure) and contact timing (e.g., duration) in accordance with some embodiments. The method 3700 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. The device includes one or more sensors to detect intensity of contacts with the touch-sensitive surface. Some operations in method 3700 are, optionally, combined and/or the order of some operations is, optionally, changed.

As described below, the method 3700 provides an intuitive way to display additional (e.g., initially undisplayed) information associated with a location on a display based on contact intensity (e.g., pressure) and contact timing (e.g., duration). The method reduces the cognitive burden on a user when displaying the additional (e.g., initially undisplayed) information, thereby creating a more efficient human-machine interface by enabling a user to skip a delay time and immediately access the additional information. For battery-operated electronic devices, enabling a user to display additional (e.g., initially undisplayed) information faster and more efficiently conserves power and increases the time between battery charges.

The device detects (3702) a contact on the touch-sensitive surface while a focus selector corresponding to the contact is at a respective location on the display that is associated with additional information that is not initially displayed on the display (e.g., the additional information is not displayed immediately prior to detecting movement of the focus selector across the display to the respective location or detecting the contact on the touch screen at the respective location). In some embodiments, the additional information is "associated with" the respective location in that, when a predefined gesture (e.g., a finger press input) is performed at the respective location, the additional information is displayed on the display.

In some embodiments, the device detects a gesture including movement of the contact across the touch-sensitive surface that corresponds to movement of the focus selector to the respective location on the display (e.g., movement of a cursor across the display in response to movement of a contact on a touchpad). In such embodiments, the additional information is not displayed immediately prior to detecting movement of the focus selector across the display to the respective location. For example, as explained with reference to FIGS. 8A-8G, the device detects contact 3605 on the touch-sensitive surface 451 that is separate from display 450. In this example, a focus selector (e.g., cursor 3607 in FIGS. 8A-8G) corresponding to contact 3608 on touch-sensitive surface 451 is positioned at a respective location on display 450 (e.g., over scroll arrow 3606-4 in scroll bar 3606-3 in FIG. 8B) and moves in accordance with movement of contact 3605. Additional information (e.g., additional selectable objects 3606-6 and 3606-7 displayed on display 450, FIG. 8C) associated with the position of focus selector 3607-a is not initially displayed on display 450.

In some embodiments, the contact is a finger contact. In some embodiments, the additional information is not displayed immediately prior to detecting the contact on the touch screen at the respective location. In some embodiments, the device detects the contact on a portion of the touch-sensitive surface that corresponds to the respective location (e.g., the device detects the contact at a location of a button associated with additional information on a touch screen display). For example, as explained with reference to FIGS. 8I-8N, the device detects contact 3609 on the touch-screen 112 at a respective location (e.g., at the location of back button 3610 in FIG. 8I). In some embodiments, as shown in FIG. 8I, when the device has a touch-screen display (e.g., touch screen 112) and the contact (e.g., contact 3609, FIG. 8I) is detected on the touch-screen, the position of a focus selector coincides with the position of the contact. Additional information (e.g., a browsing history, including a list 3611 of previously accessed webpages, FIG. 8J) associated with the position of the focus selector is not initially displayed on touch screen 112.

In some embodiments, the device displays (3704) a user interface object on the display. In some embodiments, the user interface object is associated with (3706) the additional information that is not initially displayed on the display; and the respective location corresponds to a location of the user interface object on the display (e.g., the additional information is associated with an icon or other displayed element of the user interface). In some embodiments, the respective location is not associated with a particular user interface object on the display (e.g., the device detects the contact or cursor in an activation region or hidden hit region of the touch-sensitive surface and/or display that, when activated by waiting for the delay time or increasing the intensity of the contact above an intensity threshold, triggers display of the additional information).

In some embodiments, the additional information includes (3708) help for the user interface object (e.g., information describing the user interface object and one or more options for retrieving further help related to the user interface objects, such as a hyperlink or search box). In some embodiments, the additional information includes (3710) a description of one or more functions of the user interface object. In some embodiments, the additional information includes a brief description of the user interface object and/or a description of the functionality associated with the user interface object. For example, if the user interface object is a 'create a bookmark' icon in the browser, the additional information is, optionally: 'this creates a new bookmark; bookmarks are a way to save your favorite sites.'

In some embodiments, the additional information includes (3712) a menu with selectable options related to the user interface object. For example, if the user interface object is a file icon, the additional information includes a menu with selectable options such as 'open,' 'edit,' 'print,' 'copy,' 'delete,' 'rename' and the like.

In some embodiments, the user interface object is (3714) a back button. For example, the user interface object is back button of a web browser or a file browser such as back button 3610 shown in FIGS. 8H-8N. In some embodiments (e.g., where the user interface object is a back button), the additional information includes a browsing history that includes a list of representations of previously accessed information. For example, as shown in FIGS. 8J and 8N, the additional information includes a browsing history, including a list 3611 of previously accessed webpages. In this example, in response to detecting intensity of the contact above the respective intensity threshold (e.g., "$IT_D$") or detecting the contact for longer than the predefined delay time while the focus selector is over the back button, the device displays a list of previously visited websites or folders. In some embodiments, as described with reference to FIG. 8J, in response to detecting intensity of contact 3609 on touch screen 112 that is above the respective intensity threshold, the device displays a list 3611 of previously visited websites or folders on touch screen 112. In some embodiments, as described with reference to FIG. 8N, in response to detecting contact 3613 for longer than the predefined delay time ($T_{delay}$=T2−T0) while the focus selector (coinciding with contact 3613 on touch screen 112) is over back button 3610, the device displays list 3611 of previously visited websites or folders.

In some embodiments, the respective location corresponds to (3718) an edge of a user interface for navigating through an electronic document. In some embodiments, the edge of the user interface for navigating through an electronic document is a scroll bar. For example, as shown in FIGS. 8A-8E, the respective location corresponds to a scroll arrow 3606-4 in scroll bar 3606-3 for navigating through an electronic document, where scroll bar 3606-3 is located at the bottom edge of the user interface shown on display 450. In some embodiments, the edge of the user interface for navigating through the electronic document is a portion of the electronic document that is proximate to an edge of an application window displaying the electronic document. For example, in some circumstances a user selecting a portion of an electronic document (e.g., by dragging a cursor or contact over text in a word processing document or on a webpage) will reach the edge of the electronic document on the display. In this example, if the device would otherwise wait for a delay period (e.g., 0.1, 0.2, 0.3, 0.4 or 0.5 seconds) to elapse before scrolling the electronic document, the device will, alternatively, begin scrolling the electronic document in response to an increase in intensity above a respective intensity threshold (e.g., $IT_D$) before the delay period has elapsed.

In some embodiments (e.g., where the respective location corresponds to a hidden hit region at an edge of a user interface for navigating through an electronic document), the additional information includes a portion of the electronic document that was not displayed immediately prior to detecting the contact while the focus selector is at the respective location. For example, when the focus selector is at or near an edge of an application window while the user is selecting objects (e.g., file icons in a file manager application) or content (e.g., text in a word processing document) in the application window or moving a user interface object (e.g., a file icon in a file manager application) within the application window, the application window is scrolled when the focus selector pauses at the edge of the user interface for longer than the predefined delay time or if a press input above the respective intensity threshold is detected while the focus selector is at or near the edge of the application window. Scrolling the application window in this way enables the user to keep moving the user interface object or alternatively enables the user to keep selecting the objects or content without interruption (e.g., without putting a currently selected user interface object down or without unselecting previously selected content).

For example, in response to detecting intensity of the contact above the respective intensity threshold or detecting the contact for longer than the predefined delay time while the focus selector is at an edge of the user interface for navigating through the electronic document, the device scrolls the electronic document. In particular, as explained with reference to FIG. 8C, in response to detecting intensity of contact 3605 above the respective intensity threshold $IT_D$, while focus selector 3607-a is over scroll arrow 3606-4 in scroll bar 3606-3, where scroll bar 3606-3 is located at the bottom edge of the user interface shown on display 450, the device scrolls the electronic document to display additional information (e.g., additional selectable objects 3606-6 and 3606-7). Similarly, as explained with reference to FIG. 8G, in response to detecting contact 3608 for longer than the predefined delay time (e.g., longer than predefined delay time $T_{delay}$=T2−T0) while focus selector 3607-b is over scroll arrow 3606-4 in scroll bar 3606-3, the device scrolls the electronic document.

As another example, when the focus selector is proximate to a scroll bar or near an edge of an application window in which the electronic document is displayed, the device scrolls the document when the focus selector pauses in the location for longer than the predefined delay time or if a press input above the respective intensity threshold is detected. In some embodiments, the electronic document is scrolled in accordance with a determination that a user interface object was currently selected and being moved in accordance with movement of the focus selector when the press input was detected. For example, if the user is dragging a representation of a file or program (e.g., a file or program icon) in a window of a file manager application (e.g., a system file manager such as Finder from Apple Inc. of Cupertino, Calif. or a media manager such as iPhoto from Apple Inc. of Cupertino, Calif. or iTunes from Apple Inc. of Cupertino, Calif.), and the user drags the representation of the file or program to an edge of the window of the file manager application and pauses for longer than the predefined delay time or increases the intensity of the contact over the respective intensity threshold while at the edge of the virtual desktop, the device will scroll the window of the file manager program.

In some embodiments, the respective location corresponds to (3720) an edge of the display. For example, the respective location is located on an area or strip within a predefined distance of the edge of the display (e.g., 0.1, 0.5, or 1.0 mm, or 5, 10 or other appropriate number of pixels). In some embodiments (e.g., where the respective location corresponds to an edge of the display), the additional information includes a virtual desktop that was not displayed immediately prior to detecting the contact while the focus selector is at the respective location (e.g., in response to detecting intensity of the contact over the respective intensity threshold or detecting the contact for longer than the predefined delay time while the focus selector is at the edge of the display, switching between virtual desktops). For example, if the user is dragging a window on a workspace or virtual desktop of an operating system that has multiple virtual desktops, and the user drags the window of an application to an edge of the virtual desktop and pauses or increases the intensity of the contact over the respective intensity threshold while at the edge of the virtual desktop, the device will optionally switch from the current/first virtual desktop to a different/second virtual desktop that is associated with the respective edge of the current virtual desktop. In this example, the edge of the display is associated with the virtual desktop in that a press input while the focus selector is proximate to the edge of the display causes the different virtual desktop to be displayed. In some embodiments, the different virtual desktop is displayed in accordance with a determination that a user interface object was currently selected and being moved in accordance with movement of the focus selector when the press input was detected. In other words, the different virtual desktop is displayed in accordance with a determination that the user has performed a gesture associated with moving the user interface object from the current virtual desktop to the different virtual desktop.

In some embodiments, the respective location corresponds to (3722) a hyperlink (e.g., a hyperlink in a webpage), and the additional information includes content associated with the hyperlink. For example, in response to detecting intensity of the contact over the respective intensity threshold or detecting the contact for longer than the predefined delay time on a hyperlink in a webpage displayed in a web browser, the device loads a webpage associated with the hyperlink in a new application window or the current application window of the web browser (e.g., immediately after detecting the increase in intensity of the contact or after detecting liftoff of the contact following detecting the increase in intensity of the contact).

While the focus selector is (3724) at the respective location: in accordance with a determination (3726) that the contact has an intensity above a respective intensity threshold (e.g., "$IT_D$" in FIGS. 8A-8N) before a predefined delay time has elapsed with the focus selector at the respective location, the device displays the additional information associated with the respective location without waiting until the predefined delay time has elapsed. For example, as explained with reference to FIG. 8C, while focus selector (e.g., cursor 3607-a) is at the respective location (e.g., at scroll arrow 3606-4 in scroll bar 3606-3) in accordance with a determination that contact 3605 has an intensity above a respective intensity threshold before a predefined delay time (e.g., $T_{delay}$=T2–T0) has elapsed with focus selector 3607-a at the respective location, the device displays the additional information (e.g., additional selectable objects 3606-6 and 3606-7) associated with the respective location without waiting until the predefined delay time has elapsed (e.g., waiting until time T2).

While the focus selector is (3724) at the respective location: in accordance with a determination (3730) that the contact has an intensity below the respective intensity threshold, the device waits until the predefined delay time has elapsed while the focus selector is at the respective location to display the additional information associated with the respective location. For example, as explained with reference to FIGS. 8F-8G, while focus selector (e.g., cursor 3607-b) is at the respective location (e.g., scroll arrow 3606-4 in scroll bar 3606-3) in accordance with a determination that contact 3608 has an intensity below the respective intensity threshold, the device waits until the predefined delay time (e.g., $T_{delay}$=T2–T0) has elapsed while the focus selector (e.g., cursor 3607-b) is at the respective location to display the additional information (e.g., additional selectable objects 3606-6 and 3606-7) associated with the respective location. For example, the device waits until time T2 to display the additional information associated with the respective location.

In some embodiments, the device detects (3734) a tap gesture on the touch-sensitive surface while the focus selector is at the respective location. For example, the device detects a contact on the touch sensitive surface that has a duration less than a predefined maximum tap-gesture duration and/or a maximum intensity that is between a minimum contact-detection intensity (e.g., $IT_0$) and the respective intensity threshold $IT_D$ (e.g., a brief, regular press gesture that is not a "deep press" input). In some embodiments, in response to detecting the tap gesture, the device performs (3736) an operation associated with the user interface object (e.g., without displaying the additional information associated with the respective location). In other words, in some embodiments, a regular press input (e.g., a non-deep press interaction) that corresponds to the user interface object performs a different operation from the deep press input that immediately displays additional information associated with the respective location (e.g., non-deep press interaction results in navigating "back" in the browser by loading a most recent previously visited webpage in the browser rather than displaying a list of previously accessed websites).

It should be understood that the particular order in which the operations in FIGS. 9A-9B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 3700 described above with respect to FIGS. 9A-9B. For example, the contacts, gestures, user interface objects, intensity thresholds, and focus selectors, described above with reference to method 3700 optionally has one or more of the characteristics of the contacts, gestures, user interface objects, intensity thresholds, and focus selectors, described herein with reference to other methods described herein (e.g., those listed in the fifth paragraph of the Description of Embodiments). For brevity, these details are not repeated here.

Figure 10:
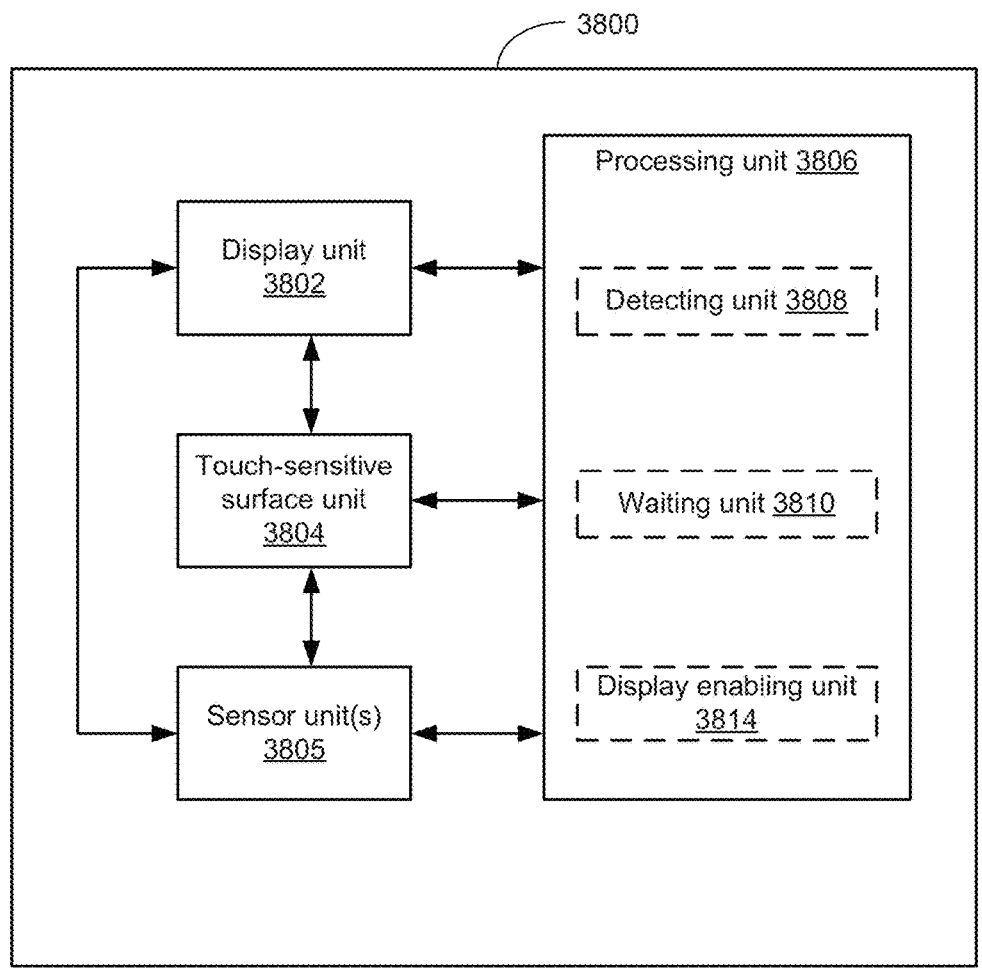
FIG. 10 is a functional block diagram of an electronic device in accordance with some embodiments.

In accordance with some embodiments, FIG. 10 shows a functional block diagram of an electronic device 3800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 3800 includes a display unit 3802 configured to display additional information associated with a respective location; a touch sensitive surface unit 3804 configured to receive a contact on the touch-sensitive surface unit; one or more sensor units 3805 configured to detect intensity of contacts with the touch-sensitive surface unit 3804; and a processing unit 3806 coupled to the display unit 3802, the touch-sensitive surface unit 3804, and the sensor units 3805. In some embodiments, the processing unit 3806 includes a detecting unit 3808, a waiting unit 3810, and a display enabling unit 3814.

The processing unit 3806 is configured to: detect a contact on the touch-sensitive surface unit 3804 (e.g., with detecting unit 3808) while a focus selector corresponding to the contact is at a respective location on the display unit 3802 that is associated with additional information that is not initially displayed on the display unit 3802; and while the focus selector is at the respective location: in accordance with a determination that the contact has an intensity above a respective intensity threshold before a predefined delay time has elapsed with the focus selector at the respective location, enable display of the additional information (e.g., with display enabling unit 3814) associated with the respective location without waiting until the predefined delay time has elapsed; and in accordance with a determination that the contact has an intensity below the respective intensity threshold, wait until the predefined delay time has elapsed (e.g., with waiting unit 3810) while the focus selector is at the respective location to enable display of the additional information (e.g., with display enabling unit 3814) associated with the respective location.

In some embodiments, the processing unit 3806 is further configured to enable display of a user interface object on the display unit 3802 (e.g., with display enabling unit 3814), where the user interface object is associated with the additional information that is not initially displayed on the display unit 3802; and the respective location corresponds to a location of the user interface object on the display unit 3802.

In some embodiments, the additional information is information selected from the group consisting of: help for the user interface object, a description of one or more functions of the user interface object, and a menu with selectable options related to the user interface object.

In some embodiments, the processing unit 3806 is further configured to detect a tap gesture on the touch-sensitive surface unit (e.g., with detecting unit 3808) while the focus selector is at the respective location; and in response to detecting the tap gesture, perform an operation associated with the user interface object.

In some embodiments, the user interface object is a back button; and the additional information includes a browsing history that includes a list of representations of previously accessed information.

In some embodiments, the respective location corresponds to an edge of a user interface for navigating through an electronic document; and the additional information includes a portion of the electronic document that was not displayed immediately prior to detecting the contact while the focus selector is at the respective location.

In some embodiments, the respective location corresponds to an edge of the display unit 3802; and the additional information includes a virtual desktop that was not displayed immediately prior to detecting the contact while the focus selector is at the respective location.

In some embodiments, the respective location corresponds to a hyperlink; and the additional information includes content associated with the hyperlink.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9B are, optionally, implemented by components depicted in FIGS. 1A-1B or FIG. 10. For example, detecting operation 3702, display operations 3704 and 3726, and waiting operation 3730 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Removing an Icon from a Predefined Area

Many electronic devices have graphical user interfaces that include an application dock or launch bar. The application dock or launch bar includes application icons that the user may activate to launch applications. The user may add application icons corresponding to the applications they prefer or use often into the application dock, for quick access, and to remove application icons from the application dock. The user may also rearrange the application icons within the application dock. Some methods require multiple inputs for removal of the application icon from the application dock or sometimes result in accidental removal of an icon from the application dock. The embodiments described below improve on these methods by allowing the user to make a gesture on a touch-sensitive surface and, based on the intensity of the contact in the gesture, move an application icon for rearrangement or remove the application icon from the application dock based on the intensity. When the user performs a gesture with a heavy contact, the user can remove an application icon from the application dock. When the user performs a gesture with a light contact, the application icon is retained in the application dock. The user thus has a more convenient way to remove application icons from the application dock and the likelihood of accidental removal of icons from the application dock is reduced.

FIGS. 11A-11U illustrate exemplary user interfaces for removing an icon from a predefined area in accordance with some embodiments. The user interfaces in these figures are used to illustrate the processes described below, including the processes in FIGS. 12A-12B. FIGS. 11A-11U include intensity diagrams that show the current intensity of the contact on the touch-sensitive surface relative to a plurality of intensity thresholds including a light press intensity threshold (e.g., "$IT_L$") and a deep press intensity threshold (e.g., "$IT_D$"). In some embodiments, operations similar to those described below with reference to $IT_D$ are performed with reference to a different intensity threshold (e.g., "$IT_L$").

FIG. 11A illustrates user interface 3904 displayed on display 450 of a device (e.g., device 300). Displayed in user interface 3904 is application dock or tray area 3916. One or more icons are, optionally, displayed in application dock area 3916. For example, in FIG. 11A, application icons 3906, 3908, 3910, 3912, and 3914 are displayed in application dock 3912. Each application icon 3906, 3908, 3910, 3912, and 3914 is associated with a respective application. For example, icon 3908 is associated with a media player or audio application. In some embodiments, application dock or tray area 3916 is a predefined area displayed on display 450, where one or more application icons (such as icon 3906, 3908, 3910, 3912, and 3914) are, optionally, placed for quick access.

Cursor 3922 is also displayed on display 450. Cursor 3922 is an example of a focus selector. A user optionally moves cursor 3922 on display 450 (e.g., using touch-sensitive surface 451 of the device) to point at a user interface object (e.g., icons 3906, 3908, 3910, 3912, or 3914) and select and manipulate the object with additional inputs.

Figure 11B:
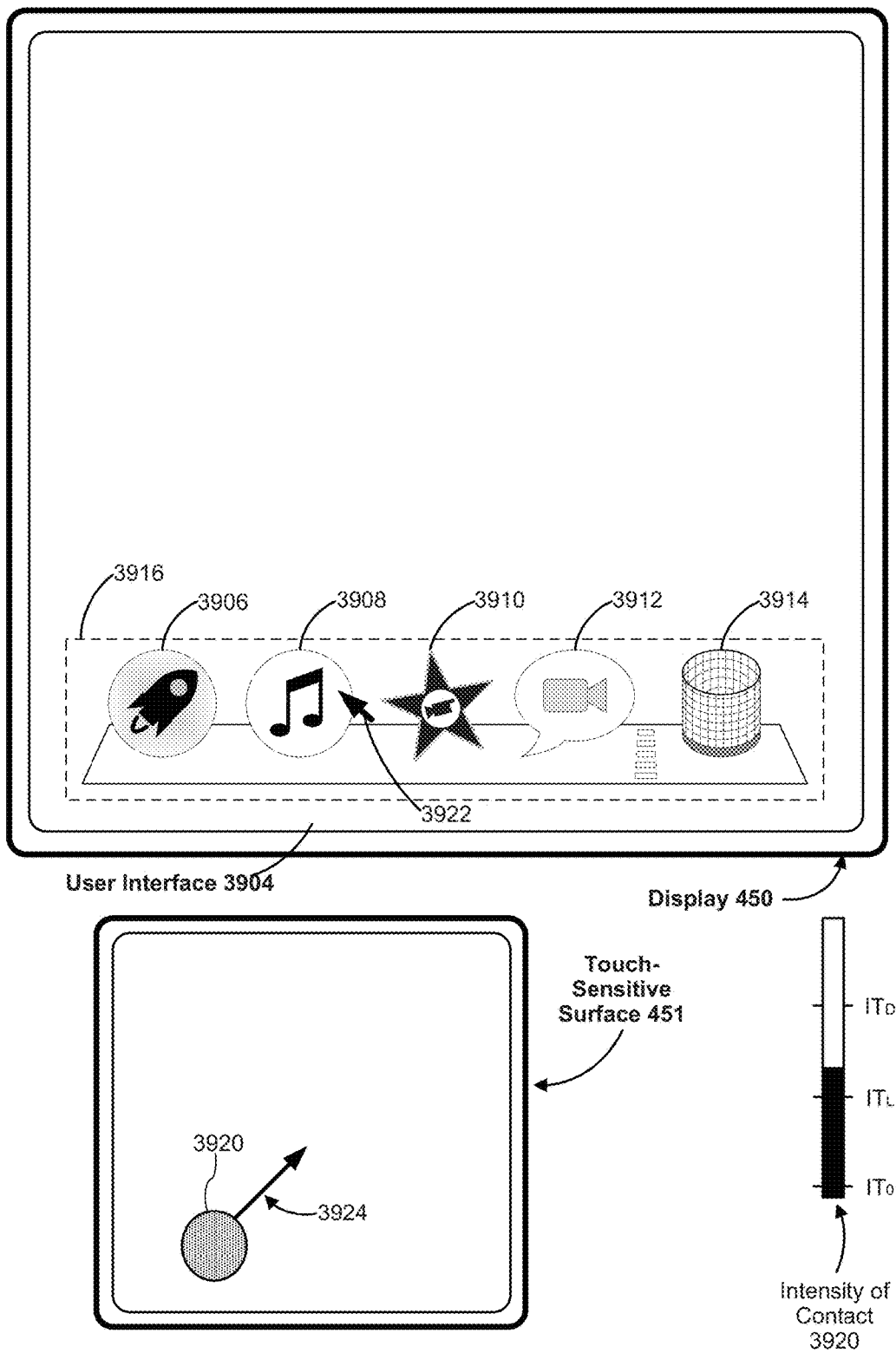
Figure 11C:
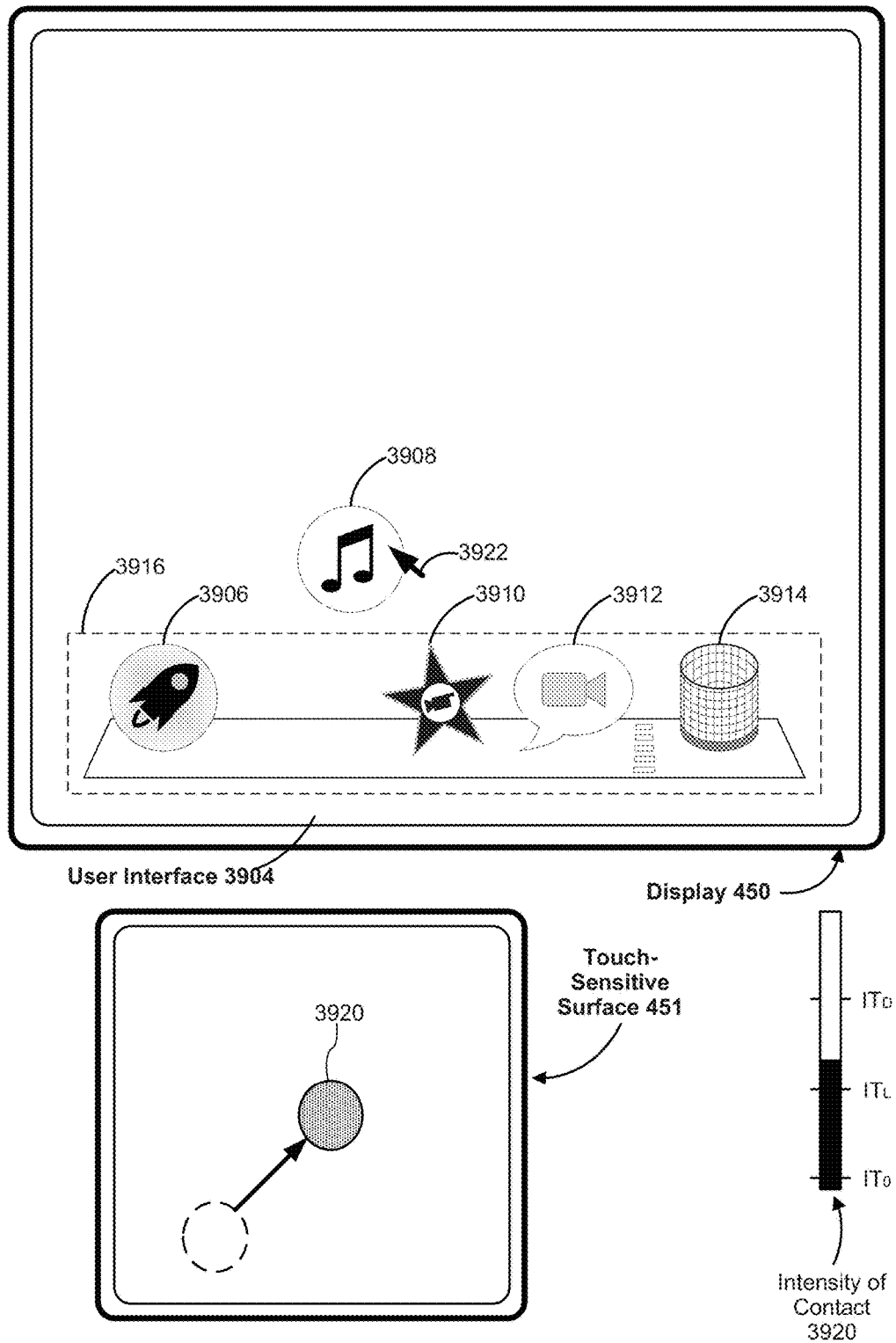

FIGS. 11B-11C show a gesture detected on touch-sensitive surface 451 of the device while cursor 3922 is over icon 3908. The gestures is performed with contact 3920. The gesture includes movement 3924 of contact 3920 across touch-sensitive surface 451, as shown in FIG. 11C. Movement 3924 corresponds to movement of cursor 3922 outside of application dock area 3916; cursor 3922 moves outside of application dock area 3916 in accordance with movement 3924.

An intensity of contact 3920 is detected by one or more sensors in the device. The intensity is detected throughout the duration of the gesture. In response to detection of the gesture that includes contact 3920, and in accordance with a determination by the device that contact 3920 had a maximum intensity during the gesture that was below a deep press intensity threshold (e.g., "$IT_D$"), an indication that the gesture is being performed is displayed during the gesture, and icon 3908 (the icon over which cursor 3922 was located when the gesture was detected) is retained in application dock area 3916 after the end of the gesture. The indication is, optionally, for example, a display of movement of icon 3908 in accordance with movement of cursor 3922, as shown in FIG. 11C. After detecting the end of the gesture (e.g., detecting liftoff of contact 3920 or detecting a decrease in intensity of contact 3920 from an intensity above $IT_L$ to an intensity below $IT_L$), icon 3908 is retained in application dock area 3916, as shown FIG. 11D.

Figure 11D:
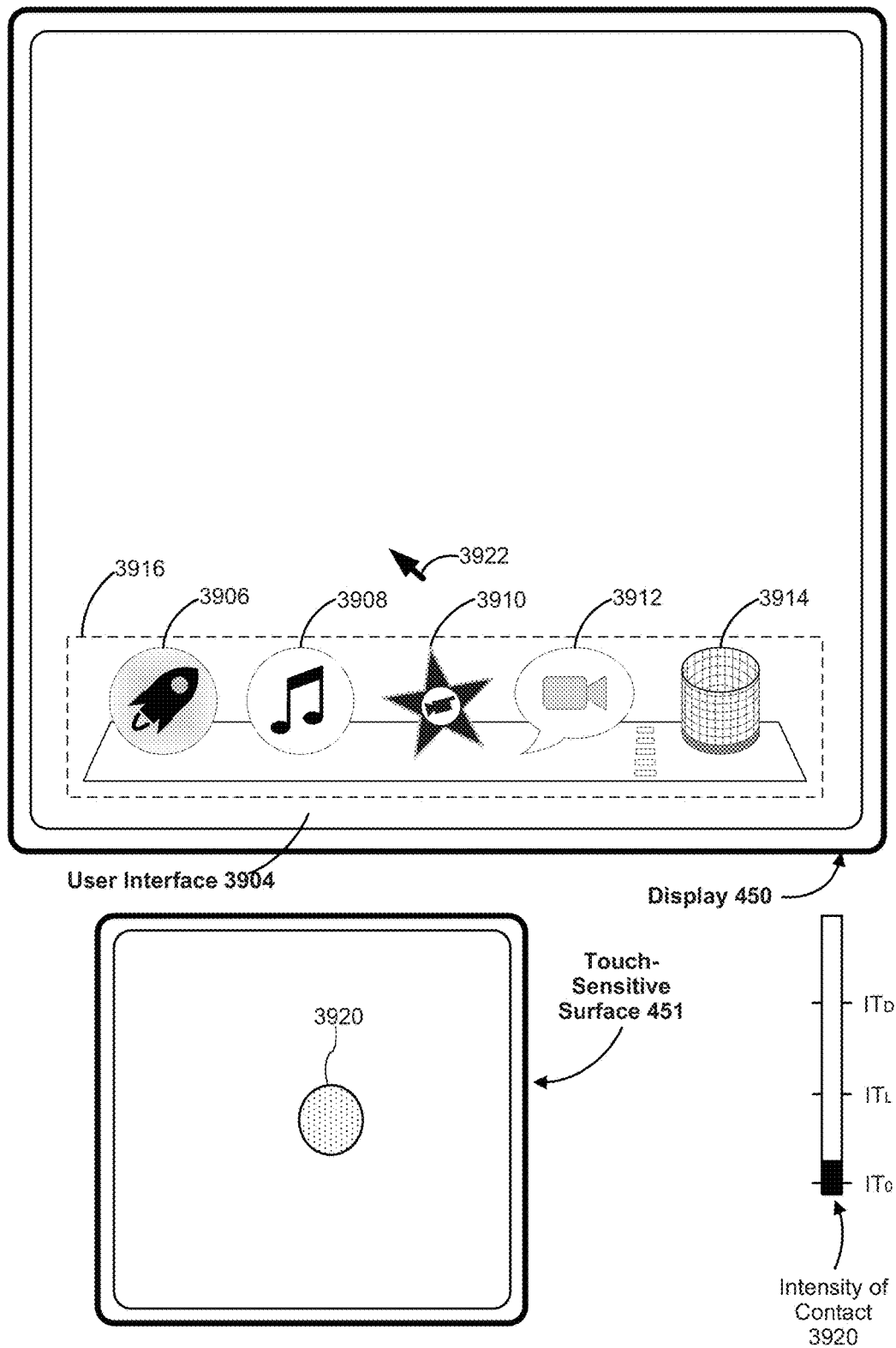
Figure 11E:
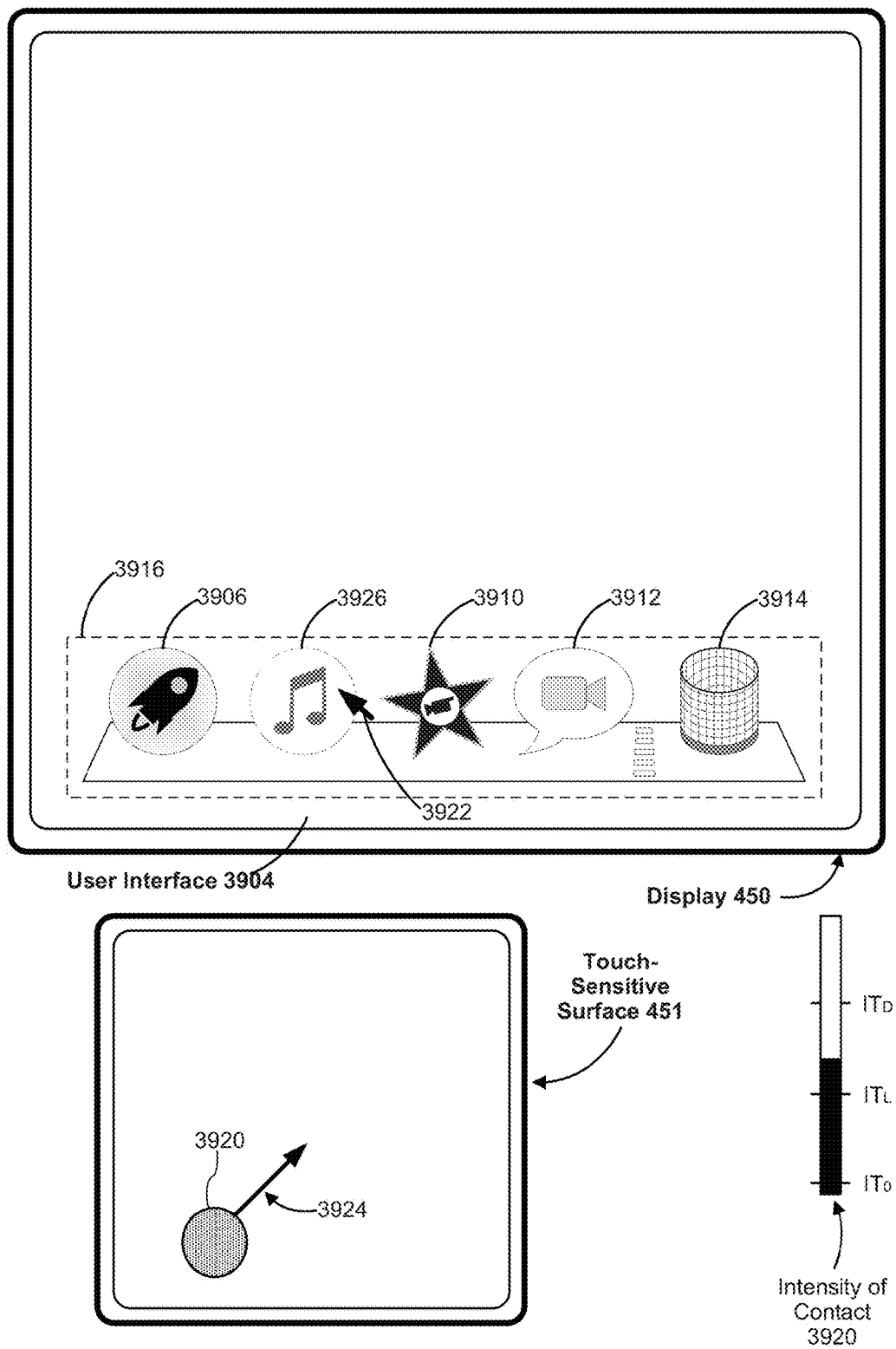
Figure 11F:
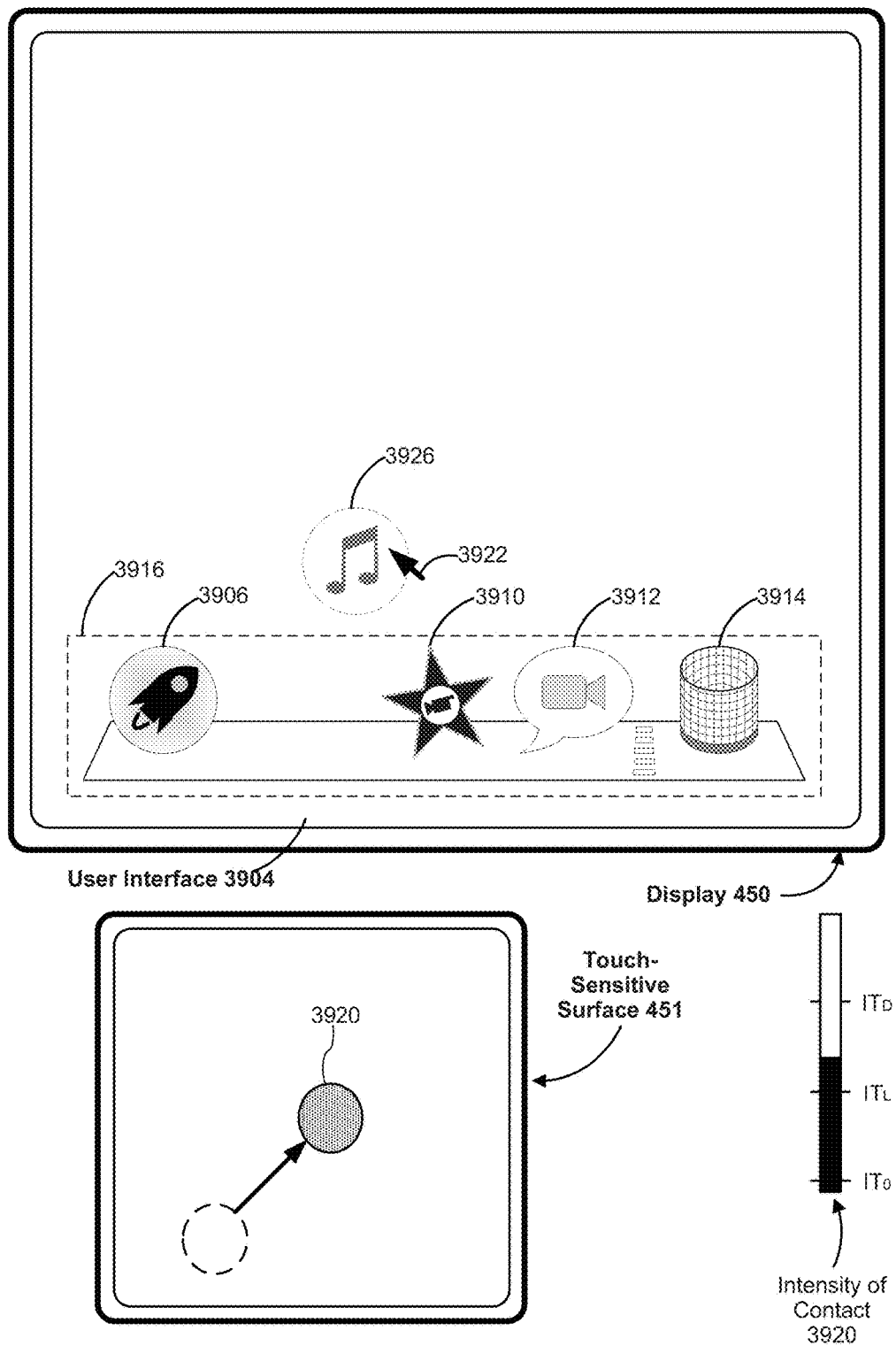
Figure 11G:
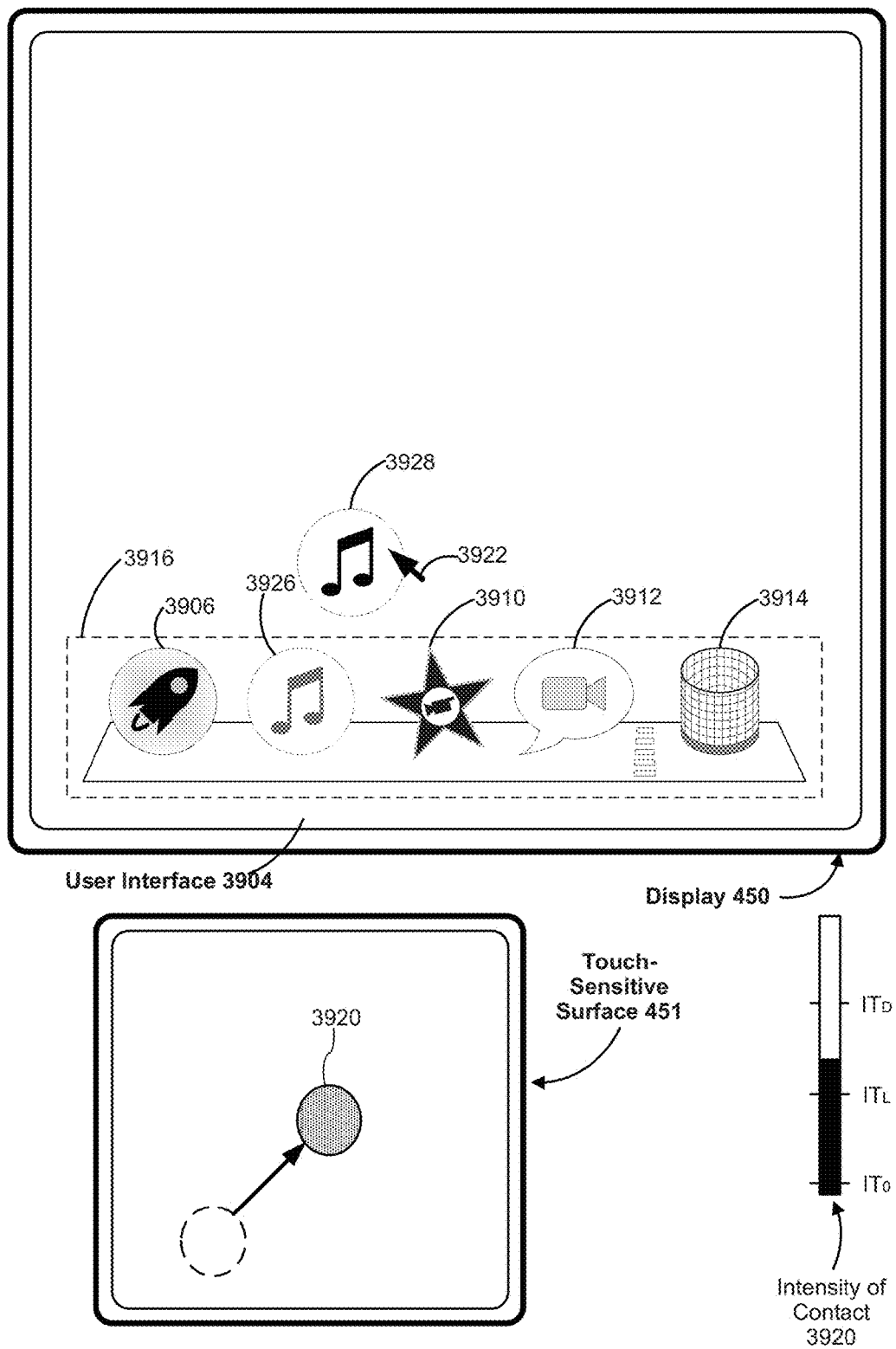

In some embodiments, displaying an indication of the gesture being performed includes changing the appearance of icon 3908 to, e.g., displaying ghost image 3926 of icon 3908, as shown in FIGS. 11E-11F. While ghost image 3926 is displayed, a representation of icon 3908 is displayed as moving in accordance with movement 3924 of contact 3920. The representation of icon 3908 that moves in accordance with movement 3924 is, optionally, ghost image 3926 (as shown in FIG. 11F) or duplicate icon 3928 of icon 3908 (as shown in FIG. 11G). After the end of the gesture, icon 3908 is again displayed in application dock area 3916, as shown in FIG. 11D.

Figure 11H:
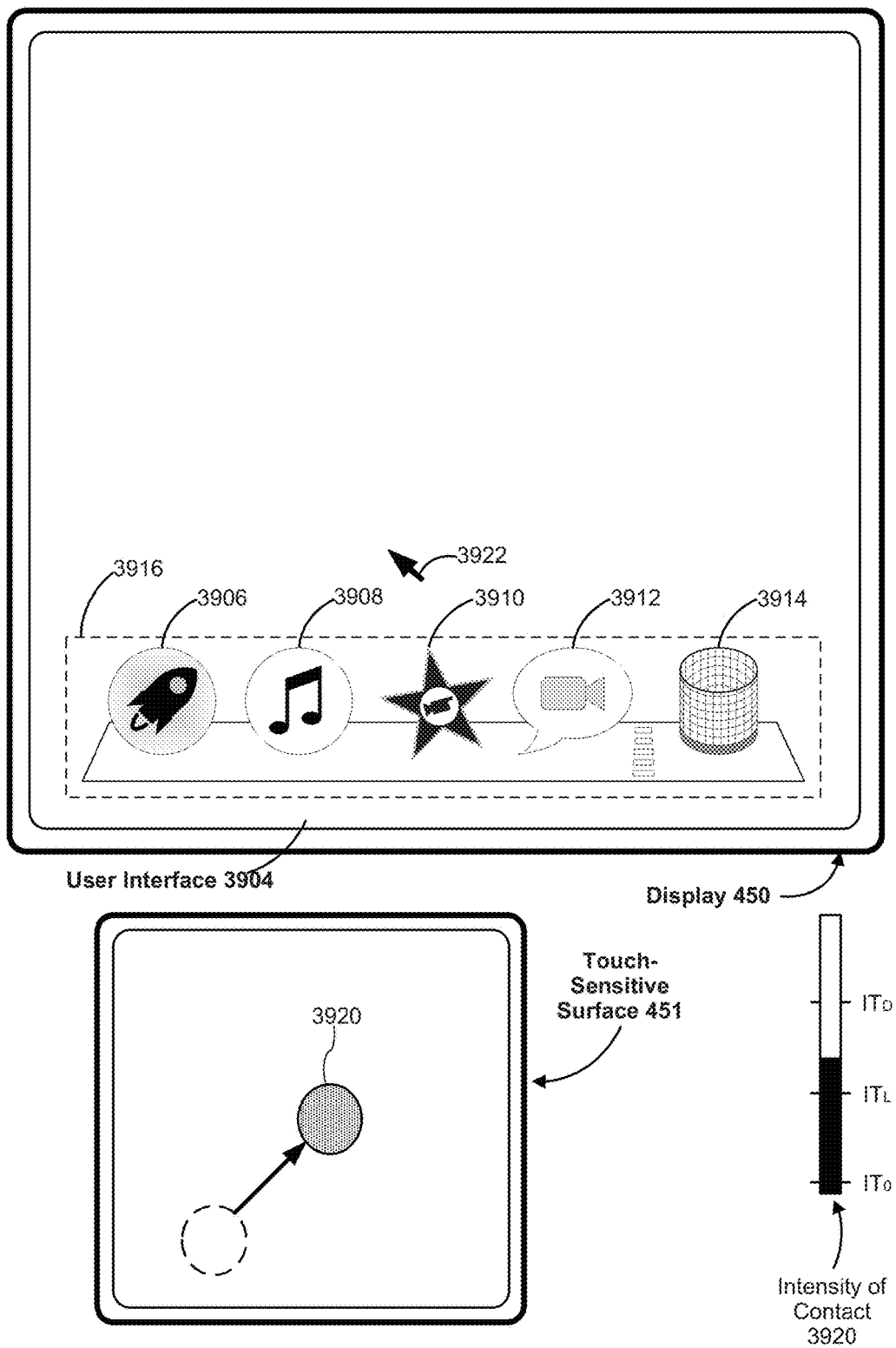
Figure 11I:
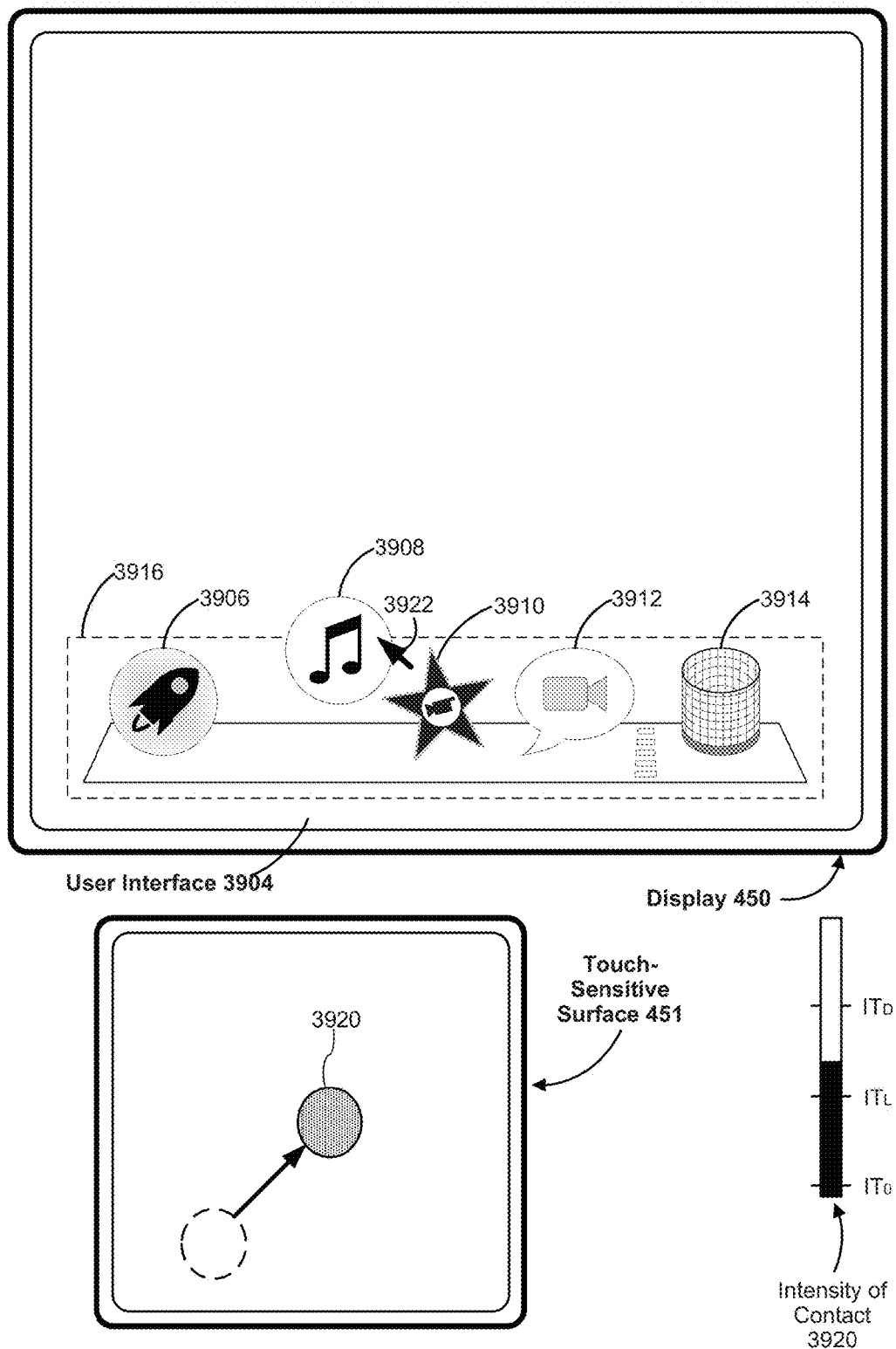

In some embodiments, displaying an indication of the gesture being performed includes displaying movement of cursor 3922 while leaving icon 3908 in place in application dock area 3916. For example, FIG. 11H shows cursor 3922 moving outside of application dock area 3916 in accordance with movement 3924 of contact 3920 while icon 3908 remains fixed at its location in application dock area 3916.

In some embodiments, displaying an indication of the gesture being performed includes displaying movement of icon 3908 during the gesture but constraining movement of icon 3908 to application dock area 3916, as shown in Figure M. In other words, icon 3908 does not move completely outside of application dock area 3916 (or, optionally, does not move out of application dock area 3916 at all). After the end of the gesture, icon 3908 is again displayed in application dock area 3916 at its original location, as in FIG. 11D. In some embodiments, icon 3908 is moved to the left or right within application dock area 3916.

Figure 11J:
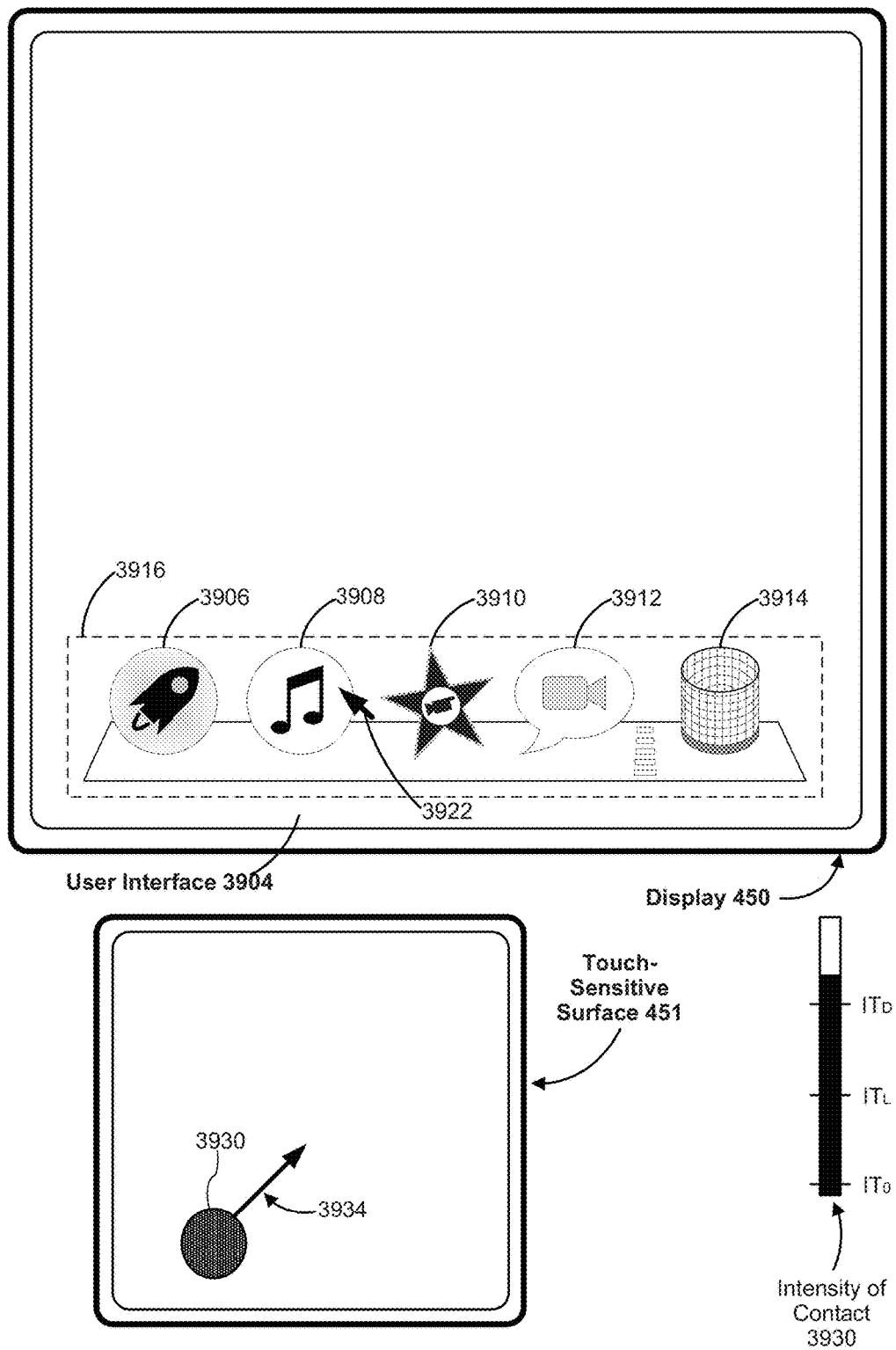

FIG. 11J illustrates user interface 3904, icons 3906, 3908, 3910, 3912, and 3914, application dock area 3916, and cursor 3922 displayed on display 450 of the device, as in FIG. 11A. A gesture performed with contact 3930 and movement 3934 of contact 3930 is detected on touch-sensitive surface 451. In FIG. 11J, the device detects that contact 3930 reached an intensity during the gesture that was above the deep press intensity threshold (e.g., "$IT_D$").

Figure 11K:
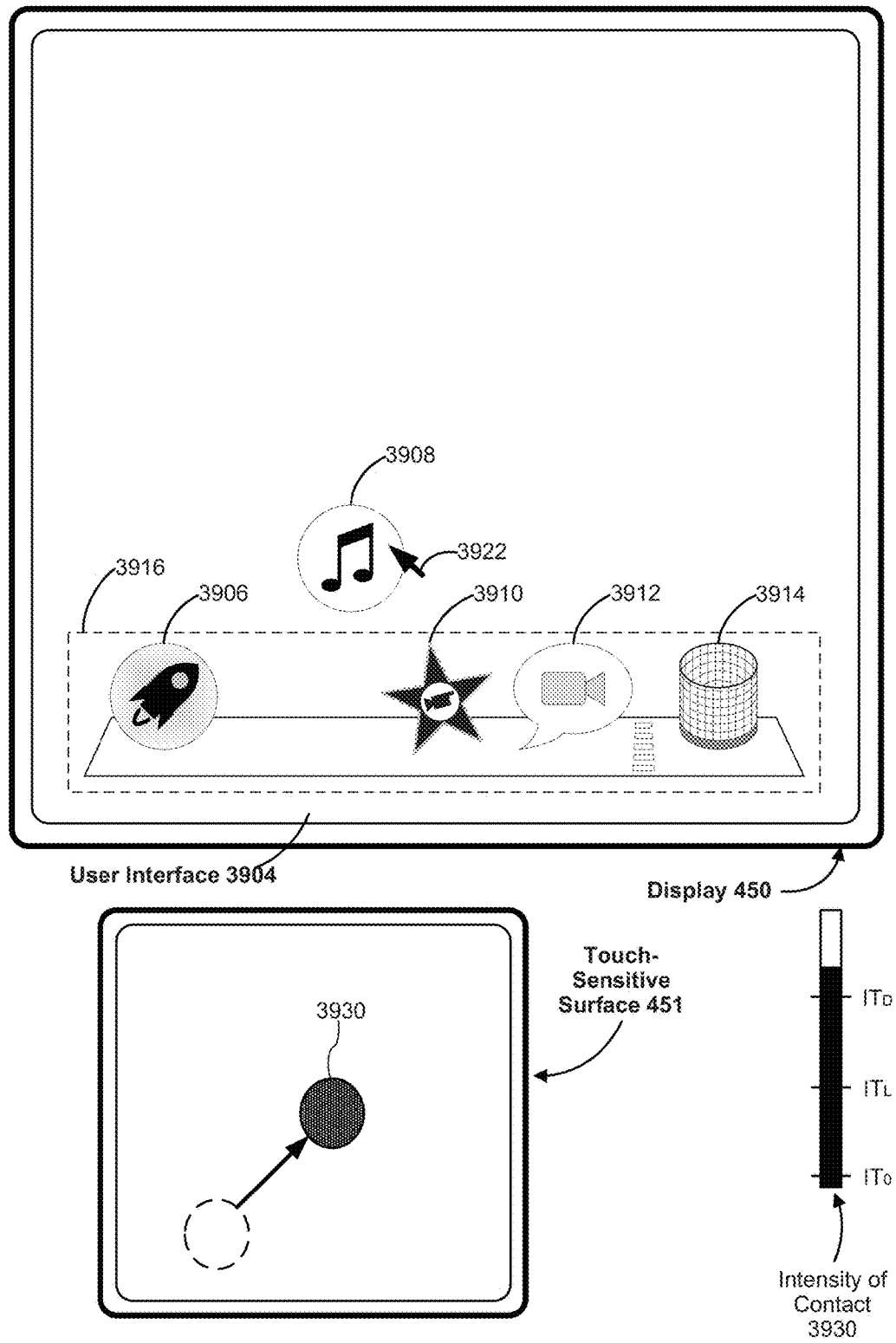
Figure 11L:
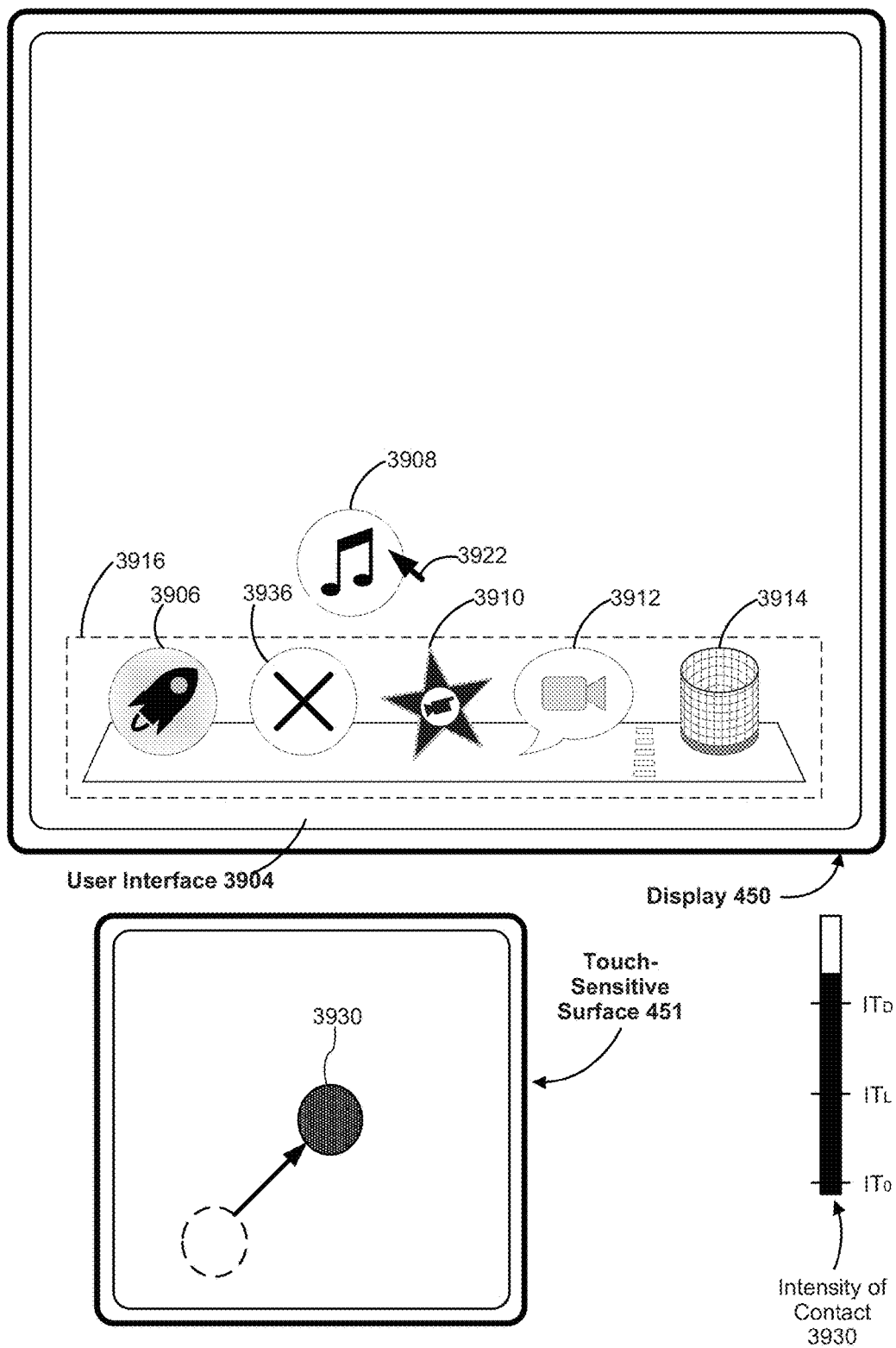
Figure 11M:
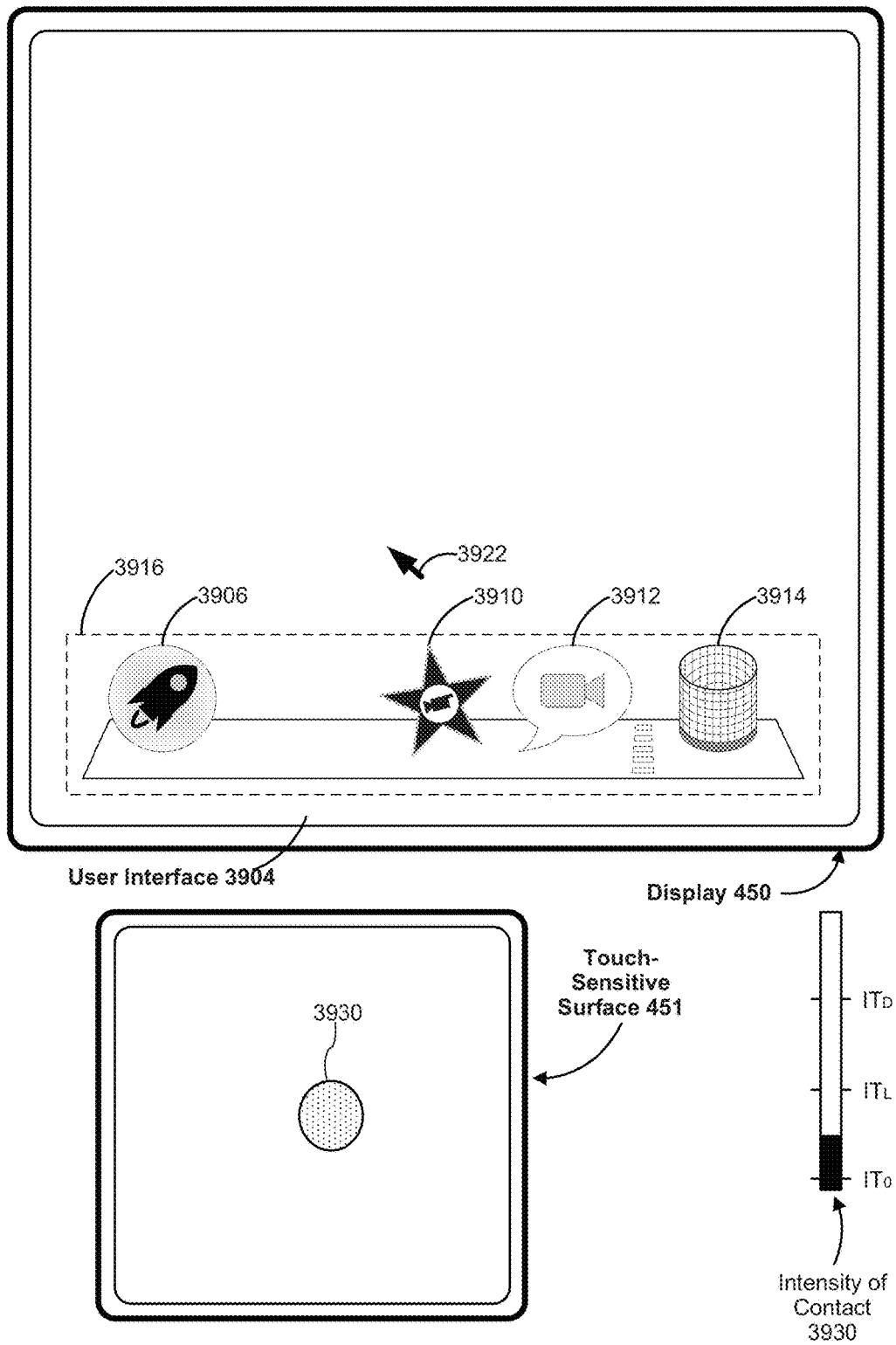

In response to detection of the gesture that includes contact 3930, and in accordance with a determination by the device that contact 3930 reached an intensity during the gesture that was above the deep press intensity threshold (e.g., "$IT_D$"), icon 3908 (the icon over which cursor 3922 was located when the gesture was detected) is moved in accordance with movement 3934 of contact 3930, as shown in FIG. 11K, and icon 3908 is removed from application dock area 3916 after the device detects the end of the gesture (e.g., detecting liftoff of contact 3930 or detecting a decrease in intensity of contact 3930 below $IT_L$), as shown in FIG. 11M. Icon 3908 that is removed from application dock area 3916 is, optionally, displayed outside of application dock area 3916 or deleted. In some embodiments, while icon 3908 is moved, an indication that icon 3908 will be removed from application dock area 3916 is displayed prior to the actual removal. The indication is, optionally, icon 3936 taking the place of icon 3908 in application dock area 3916, as shown in FIG. 11L.

Figure 11N:
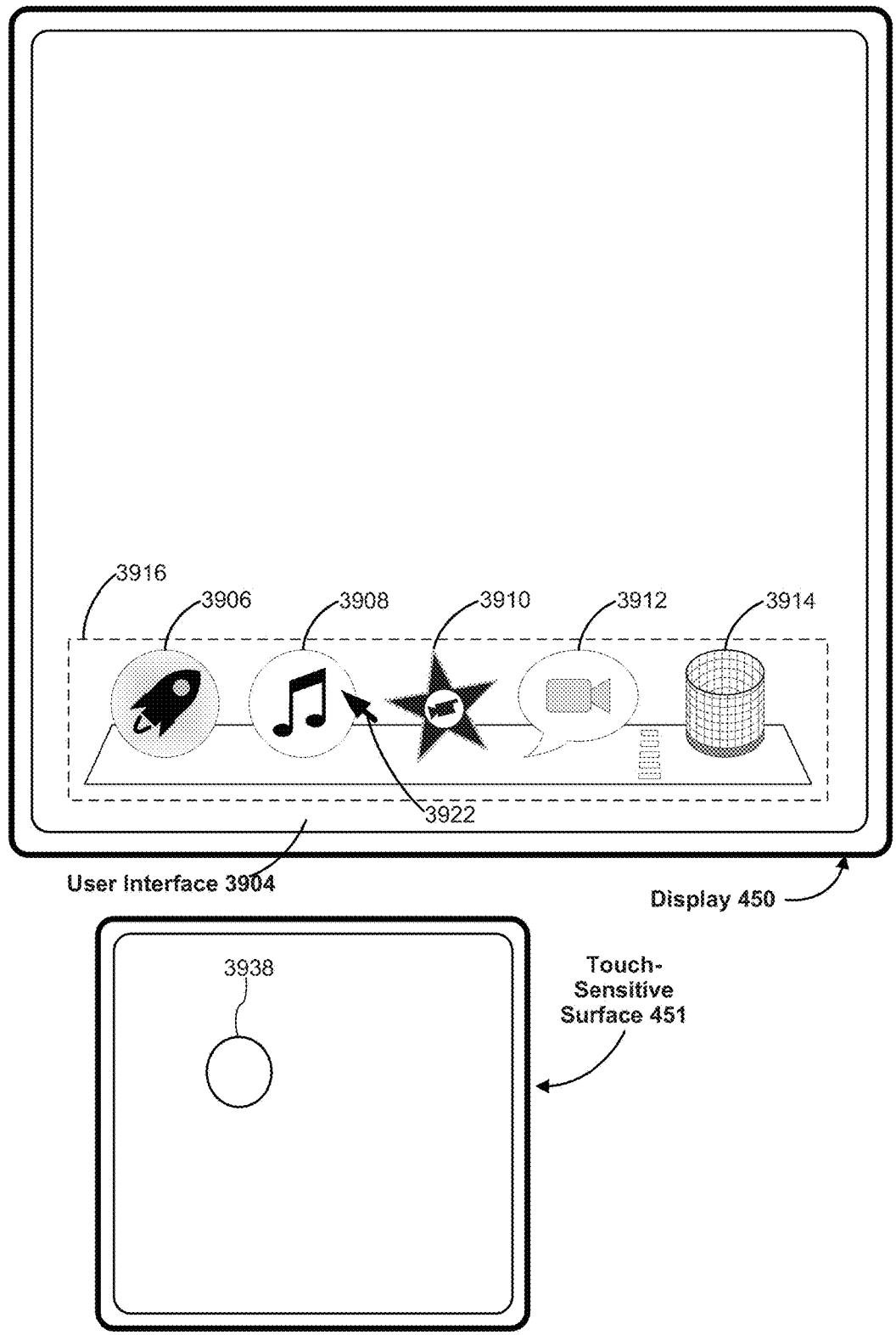
Figure 11O:
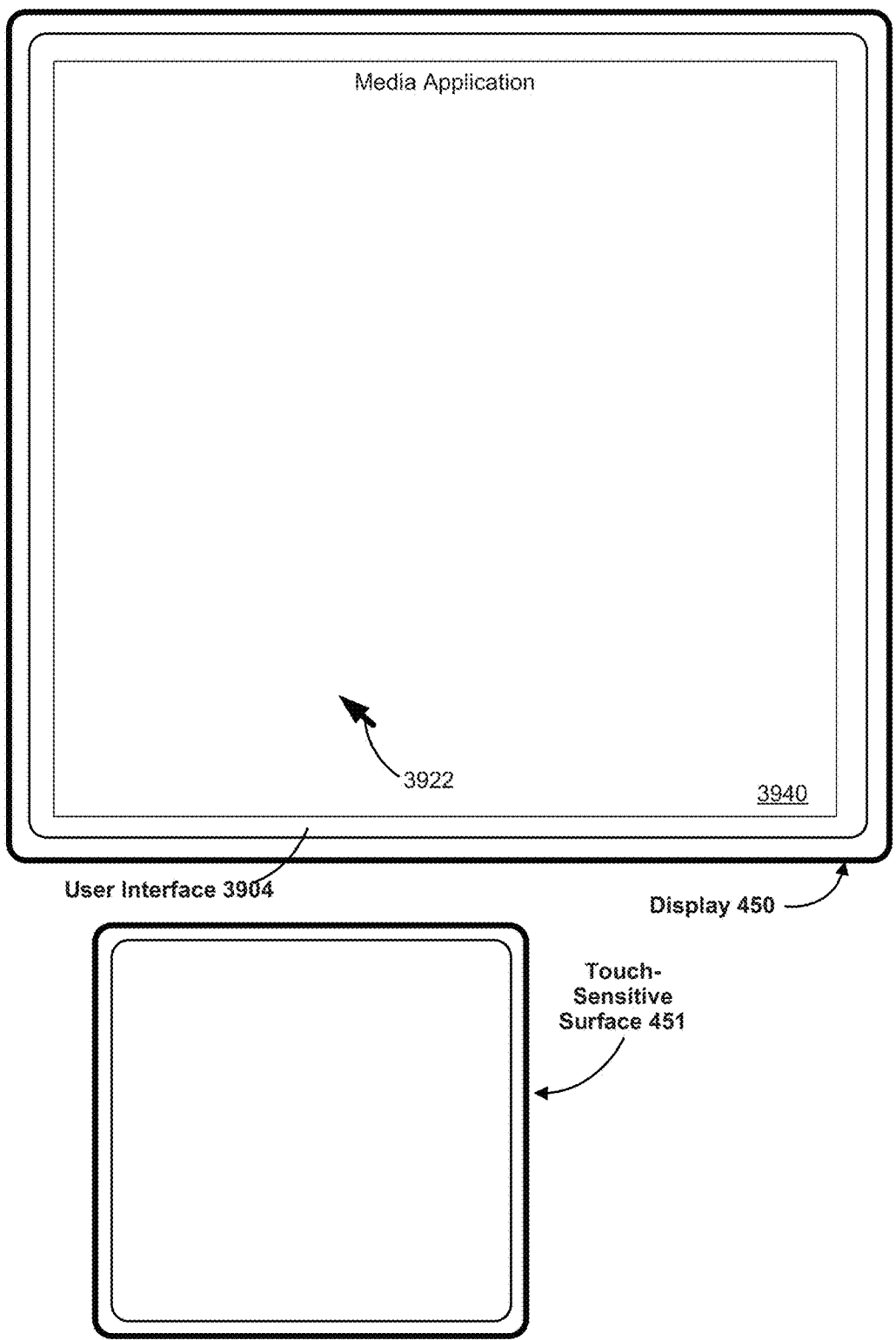

FIG. 11N shows a gesture performed with contact 3938 detected on touch-sensitive surface 451 while cursor 3922 is located over icon 3908. The gesture performed with contact 3938 is, optionally, a tap gesture or a press input (or stationary press input) including an increase and subsequent decrease in intensity of a contact above a light press intensity threshold (e.g., "$IT_L$"). In response to detection the gesture performed with contact 3938 in FIG. 11N, an application corresponding to icon 3908 (FIG. 11N) is launched, as shown in FIG. 11O.

Figure 11P:
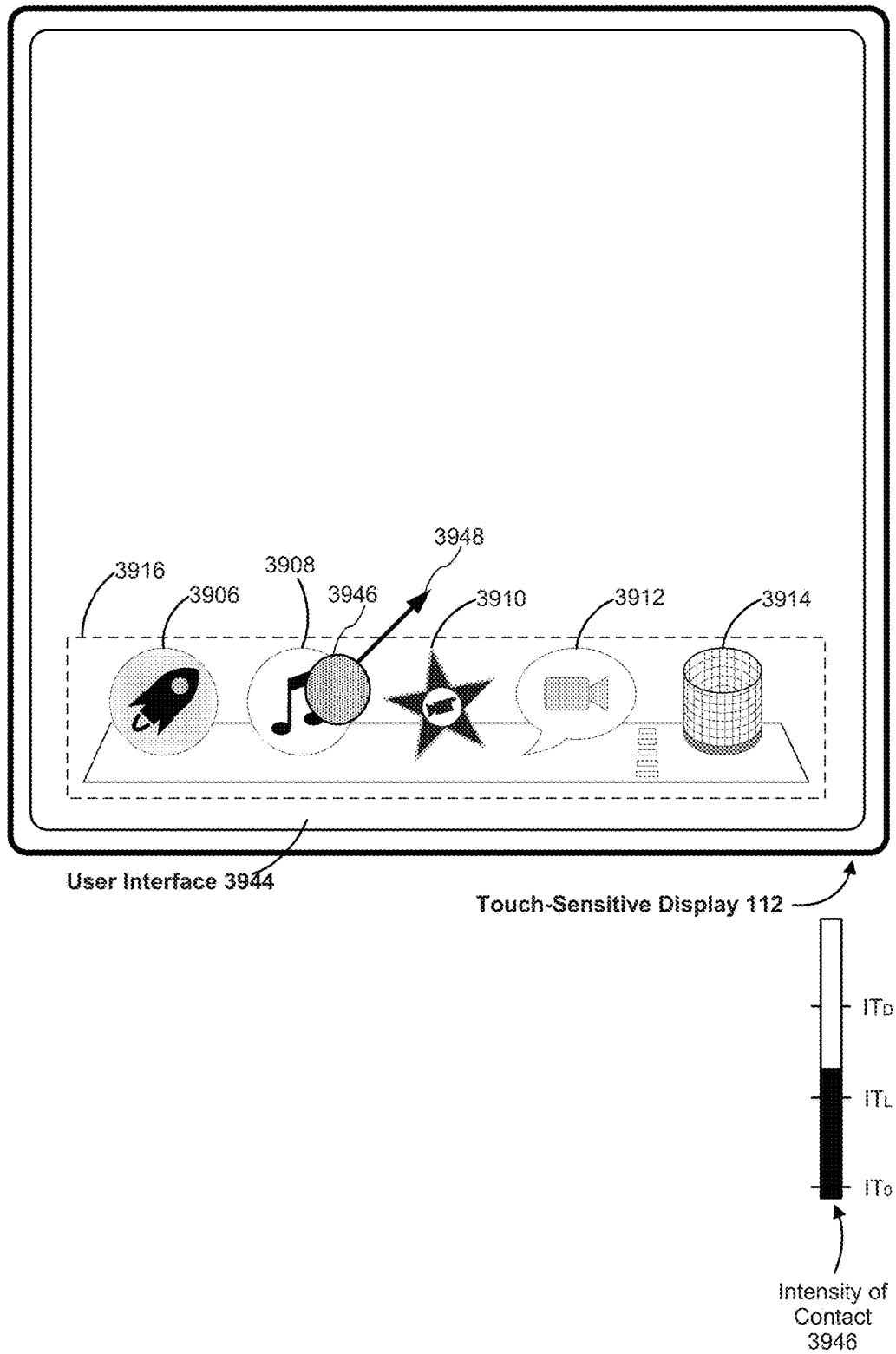
Figure 11Q:
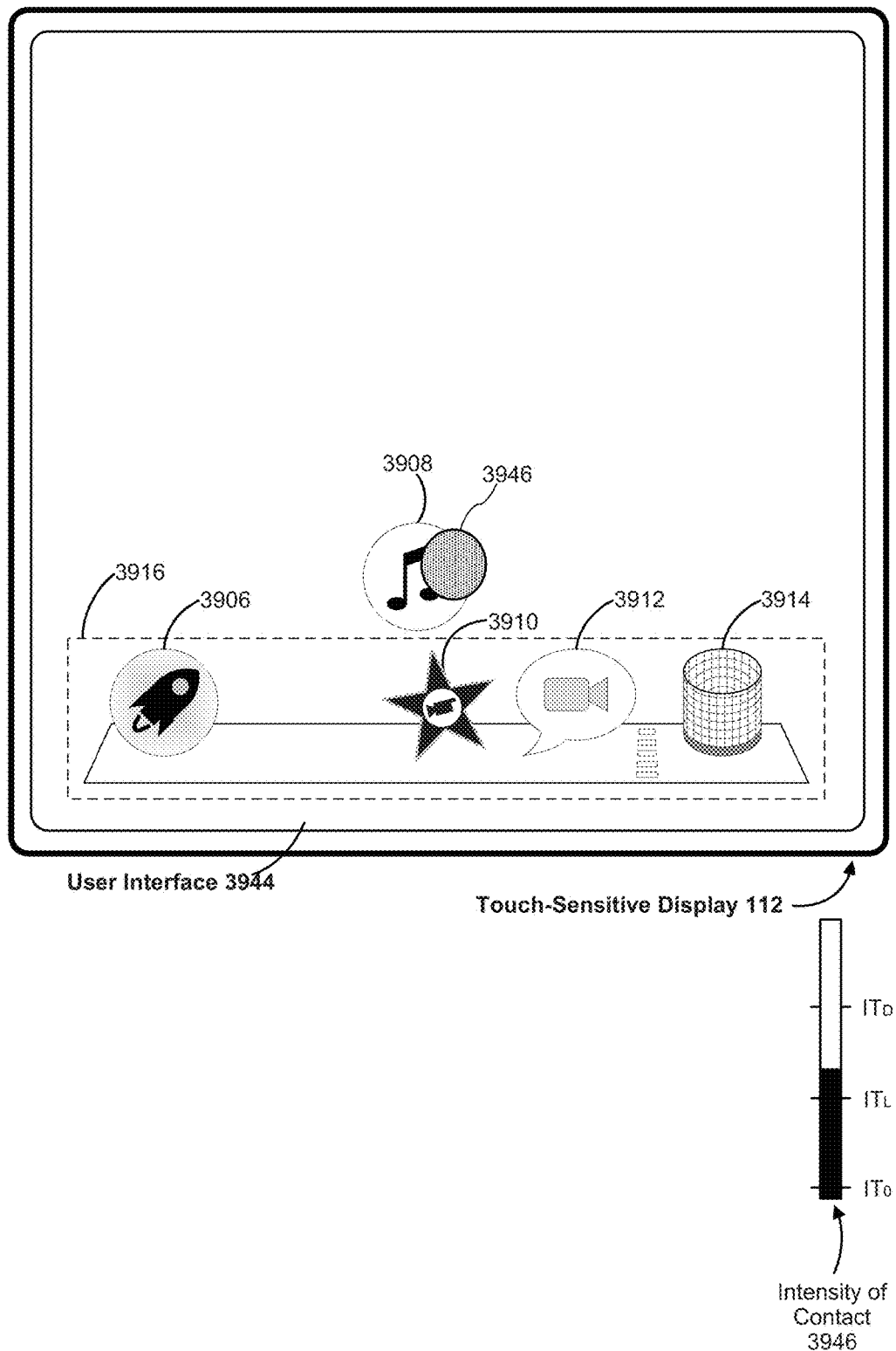
Figure 11R:
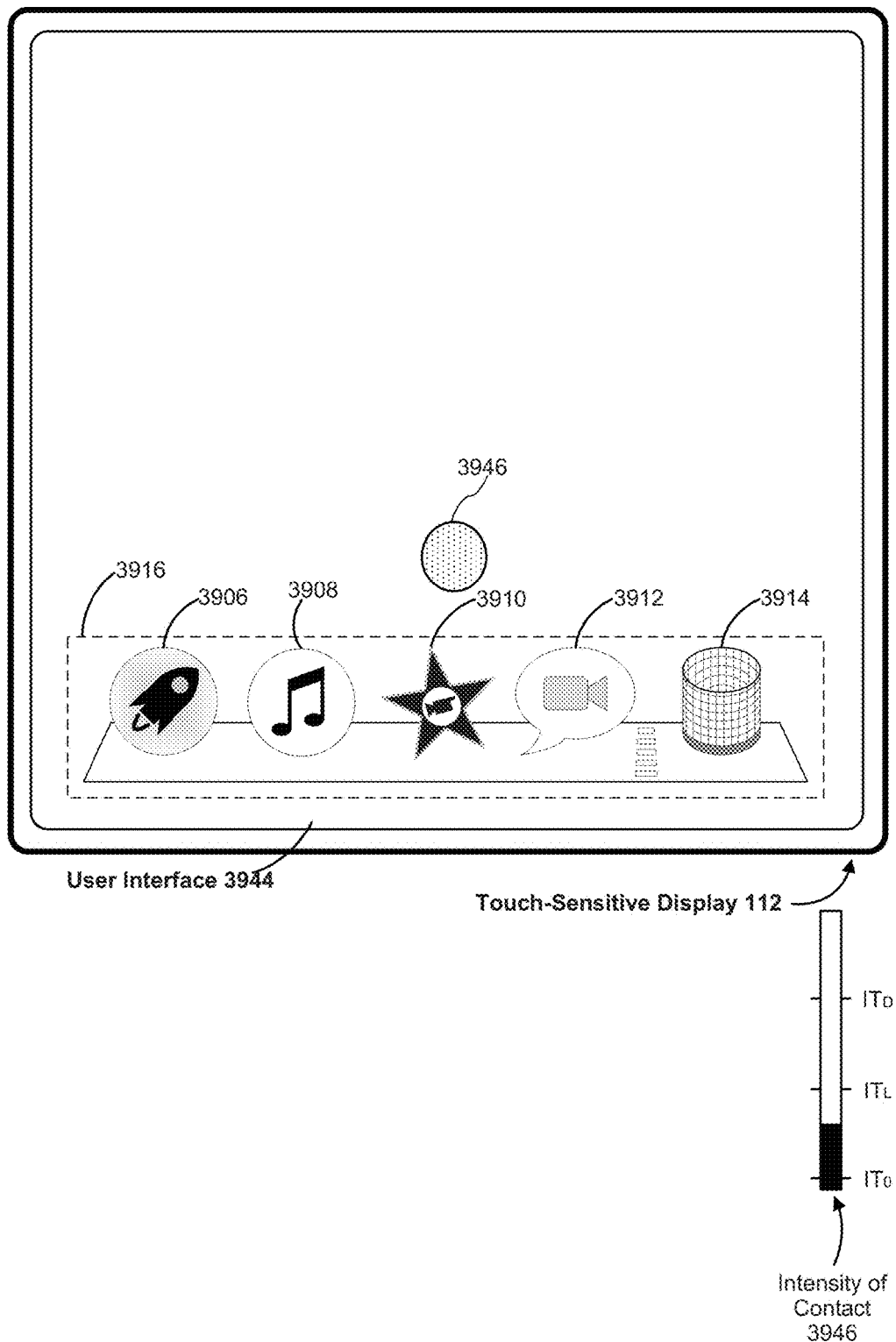
Figure 11S:
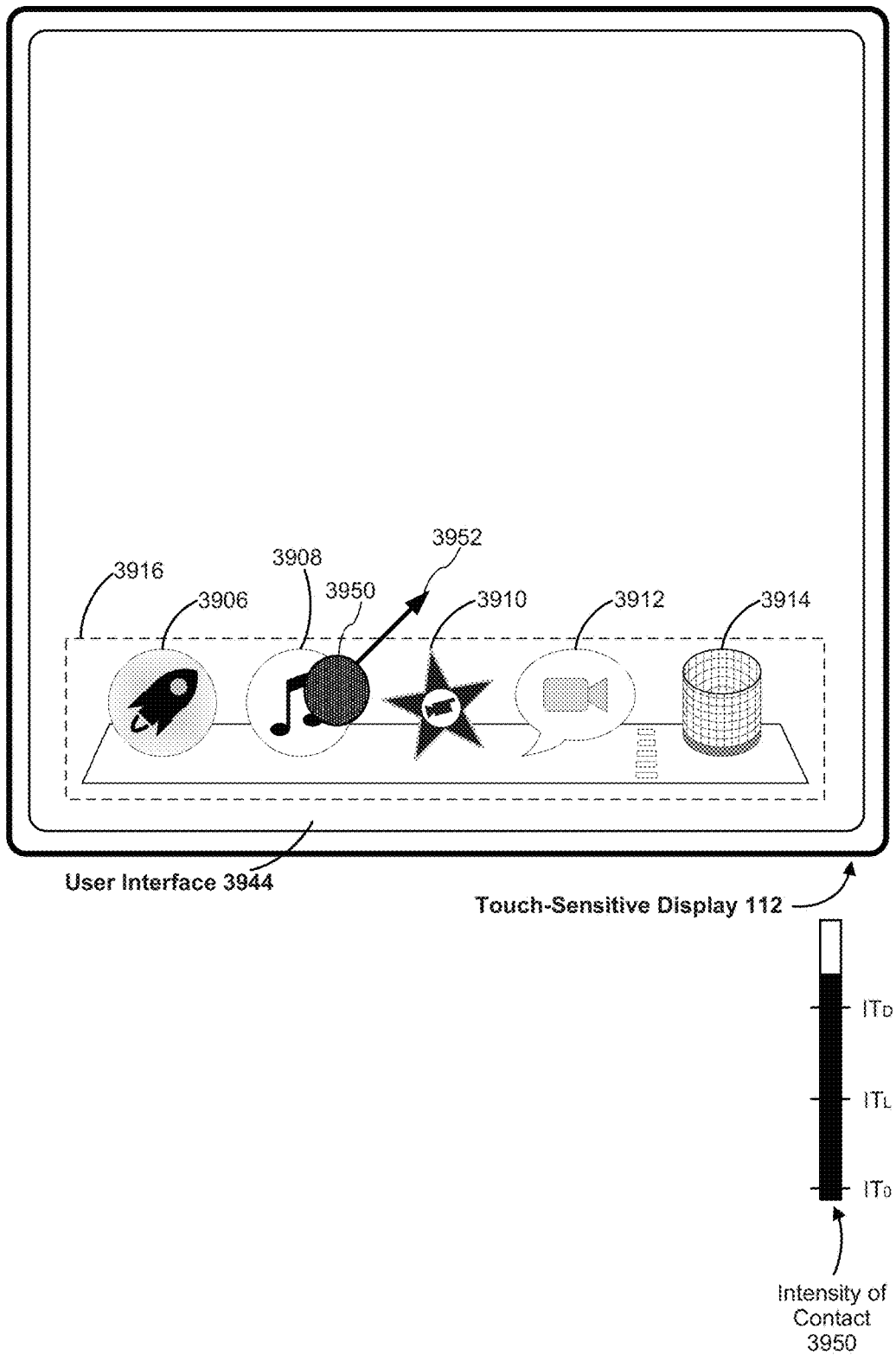
Figure 11T:
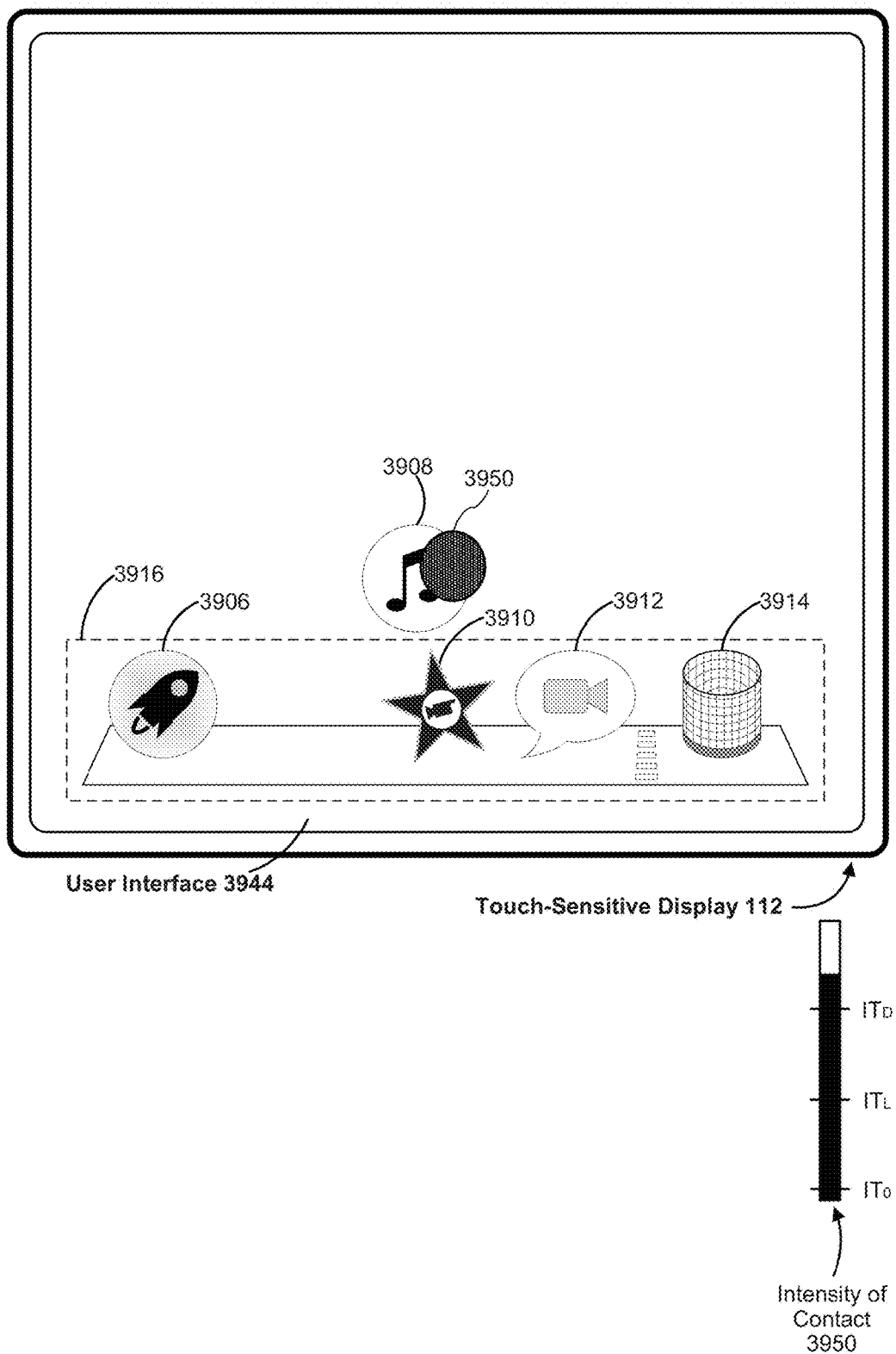
Figure 11U:
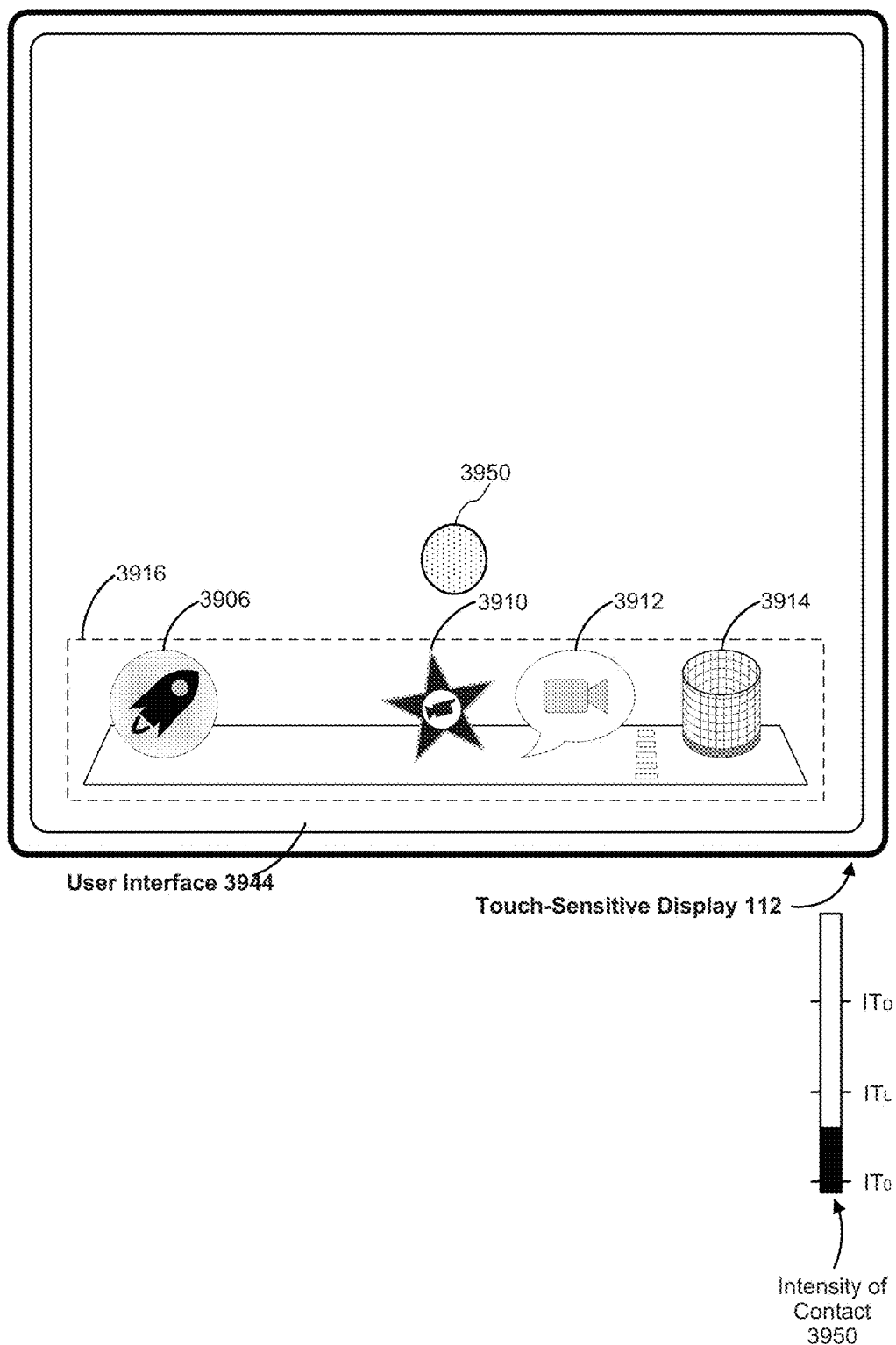
Figure 12B:
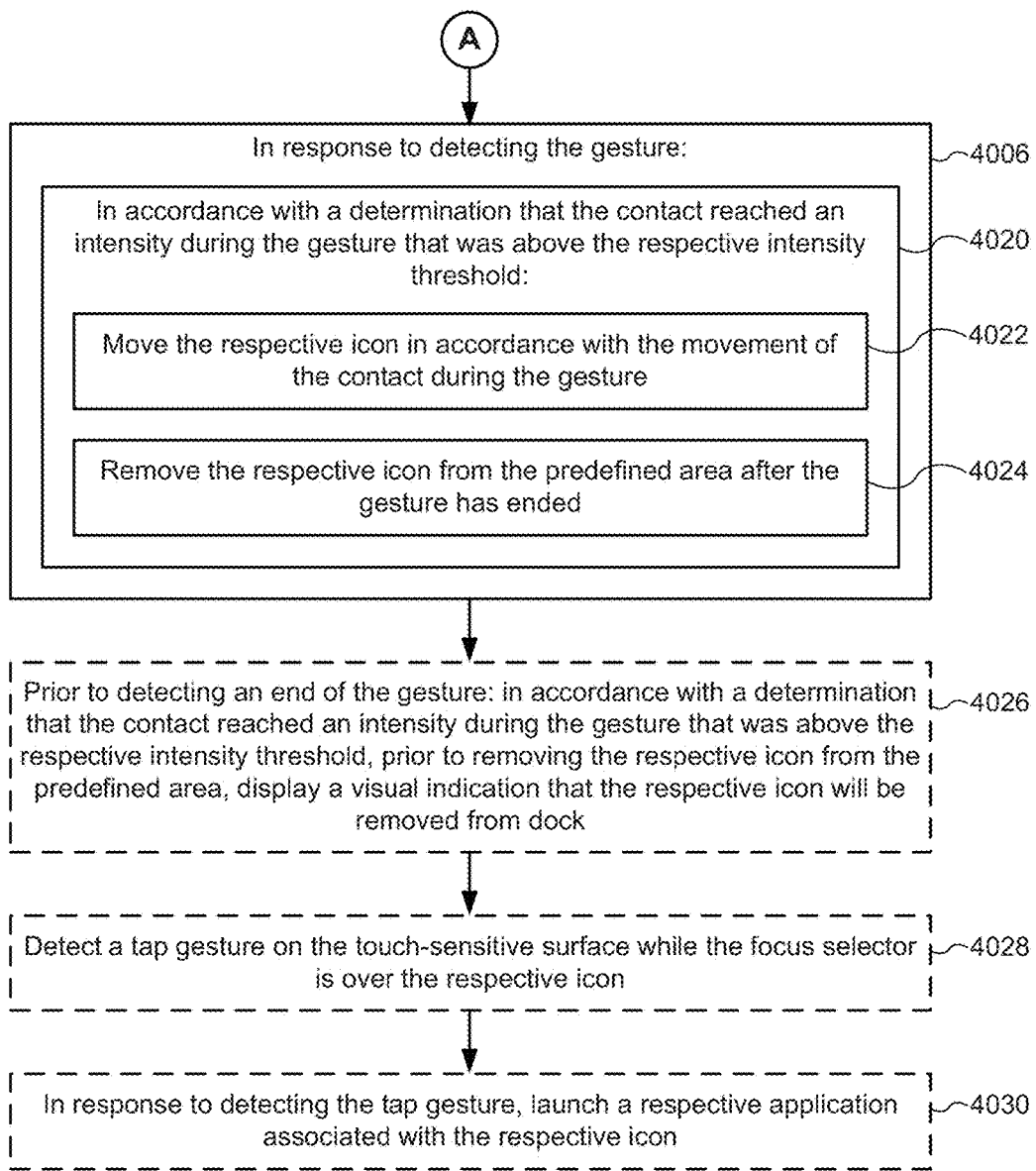

FIGS. 11P-11U illustrate an example of the user interfaces described above with reference to FIGS. 11A-11O implemented on a touch screen 112 of a device (e.g., device 100). FIG. 11P illustrates user interface 3944 displayed on touch-sensitive display 112 of a device. Displayed in user interface 3944 is application dock or tray area 3916. One or more icons are, optionally, displayed in application dock area 3916. For example, in FIG. 11P, application icons 3906, 3908, 3910, 3912, and 3914 are displayed in application dock 3916.

FIGS. 11P-11Q show a gesture detected on touch-sensitive display 112 of the device. The gestures is performed with contact 3946 detected on icon 3908. The gesture includes movement 3948 of contact 3946 across touch-sensitive display 112, as shown in FIG. 11Q. Movement 3948 includes movement outside of application dock area 3916.

An intensity of contact 3946 is detected by one or more sensors in the device. The intensity is detected throughout the duration of the gesture. In response to detection of the gesture that includes contact 3946, and in accordance with a determination by the device that contact 3946 had a maximum intensity during the gesture that was below a deep press intensity threshold (e.g., "$IT_D$"), an indication that the gesture is being performed is displayed during the gesture, and icon 3908 (the icon on which contact 3946 was detected when the gesture was detected) is retained in application dock area 3916 after the end of the gesture. The indication is, optionally, for example, a display of movement of icon 3908 in accordance with movement 3948, as shown in FIG. 11Q. After the end of the gesture (e.g., detecting liftoff of contact 3946 or detecting a decrease in intensity of contact 3946 from an intensity above $IT_L$ to an intensity below $IT_L$), icon 3908 is retained in application dock area 3916, as shown FIG. 11R.

FIGS. 11S-11T show a gesture detected on touch-sensitive display 112 of the device. The gestures is performed with contact 3950 detected on icon 3908. The gesture includes movement 3952 of contact 3950 across touch-sensitive display 112, as shown in FIG. 11T. Movement 3952 includes movement outside of application dock area 3916.

An intensity of contact 3950 is detected by one or more sensors in the device. The intensity is detected throughout the duration of the gesture. In response to detection of the gesture that includes contact 3950, and in accordance with a determination by the device that contact 3950 reached an intensity during the gesture that was above the deep press intensity threshold (e.g., "$IT_D$"), icon 3908 (the icon on which contact 3950 was located when the gesture was detected) is moved in accordance with movement 3952 of contact 3950, as shown in FIG. 11T, and icon 3908 is removed from application dock area 3916 after the end of the gesture, as shown in FIG. 11U.

FIGS. 12A-12B are flow diagrams illustrating a method 4000 of removing an icon from a predefined area in accordance with some embodiments. The method 4000 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 4000 are, optionally, combined and/or the order of some operations is, optionally, changed.

As described below, the method 4000 provides an intuitive way to remove an icon from a predefined area. The method reduces the cognitive burden on a user when removing an icon from a predefined area, thereby creating a more efficient human-machine interface. For battery-operated electronic devices, enabling a user to remove an icon from a predefined area faster and more efficiently conserves power and increases the time between battery charges.

The device displays a plurality of icons in a predefined area (e.g., an application dock or quick launch tray) on the display, where the plurality of icons include (4002) a respective icon. For example, in FIG. 11A or FIG. 11P, icons 3906, 3908, 3910, 3912, and 3914 are displayed in application dock area 3916.

The device detects a gesture that includes (4004) a contact (e.g., a finger contact) on the touch-sensitive surface while a focus selector is over the respective icon and subsequent movement of the contact across the touch-sensitive surface that corresponds to movement of the focus selector outside of the predefined area. FIGS. 11B-11C, for example, show a gesture that includes contact 3920 and movement 3924 of contact 3920 detected on touch-sensitive surface 451. The gesture is detected while cursor 3922 is located over icon 3908. Movement 3924 corresponds to movement of cursor 3922 outside of application dock area 3916. As another example, FIGS. 11J-11K show a gesture that includes contact 3930 and movement 3934 of contact 3930 detected on touch-sensitive surface 451. The gesture is detected while cursor 3922 is located over icon 3908. Movement 3934 corresponds to movement of cursor 3922 outside of application dock area 3916.

As further examples, FIGS. 11P-11Q show a gesture that includes contact 3946 and movement 3948 of contact 3946 detected on touch-sensitive display 112. Contact 3946 is detected over icon 3908, and movement 3948 includes movement of contact 3946 outside of application dock area 3916. FIGS. 11S-11T show a gesture that includes contact 3950 and movement 3952 of contact 3950 detected on touch-sensitive display 112. Contact 3950 is detected over icon 3908, and movement 3952 includes movement of contact 3950 outside of application dock area 3916. In these examples, the position of the contact (contact 3946 or 3950) is the analogue of the position of the focus selector.

In response (4006) to detecting the gesture, and in accordance with a determination (4008) that the contact had a maximum intensity during the gesture that was below a respective intensity threshold, the device displays (4010) an indication that the gesture is being performed during the gesture (e.g., display movement of the respective icon or a ghost image of the respective icon), and retains (4018) the respective icon in the predefined area after the gesture has ended (e.g., the respective icon bounces back or otherwise returns to its original location, or ceases movement at a boundary of the predefined area, in response to detecting lift off of the contact). In response to detection of the gesture performed with contact 3920 and in accordance with a determination that contact 3920 had a maximum intensity during the gesture that was below a defined intensity threshold, the device displays, for example, movement of icon 3908 (FIG. 11C) or ghost image 3926 (FIG. 11F) or duplicate icon 3928 (FIG. 11G) in accordance with movement 3924 of contact 3920, and retains icon 3908 in application dock area 3916 after the end of the gesture, as shown in FIG. 11D. As another example, in response to detection of the gesture performed with contact 3946 (FIG. 11P), icon 3908 is moved in accordance with movement 3948 of contact 3946 and then retained in application dock area 3916 after the end of the gesture, as shown in FIG. 11R.

In some embodiments, displaying the indication that the gesture is being performed includes (4012) changing the appearance of the respective icon in the predefined area (e.g., replacing the respective icon with a ghost image of the icon) and, while displaying the respective icon with the changed appearance on the display, moving a representation of the respective icon in accordance with movement of the contact during the gesture. For example, in response to detection of the gesture performed with contact 3920, icon 3908 is, optionally, changed to ghost image 3926 and, while ghost image 3926 is displayed, a representation of icon 3908 (e.g., duplicate icon 3928 or ghost image 3926) is moved in accordance with movement 3924, as shown in FIGS. 11E-11G.

In some embodiments, displaying the indication that the gesture is being performed includes (4014), while maintaining the respective icon in a fixed location in the predefined area, moving a cursor on the display in accordance with movement of the contact (e.g., unless the user presses hard enough, the icons in the dock are stationary or "stuck" in place). For example, in response to detection of the gesture performed with contact 3920, cursor 3922 is, optionally, moved in accordance with movement 3924 while icon 3908 remains in place, as shown in FIG. 11H.

In some embodiments, displaying the indication that the gesture is being performed includes (4016), while constraining movement of the respective icon to the predefined area, moving the respective icon in accordance with the movement of the contact during the gesture (e.g., the icon can still be repositioned within the dock during the gesture but cannot be moved outside of the dock unless the user presses harder). In some embodiments, if the icon is constrained to the predefined area, the icon moves along an edge of the predefined area that is closest to the contact. For example, if the predefined area is horizontal strip near the bottom edge of the display and the focus selector is above the predefined area, movement of the icon would track horizontal movement of the contact but would not track vertical movement of the contact unless the focus selector moved into the predefined area. For example, movement of icon 3908 in accordance with movement 3924 of contact 3920 is, optionally, constrained to within application dock area 3916, as shown in FIG. 11I.

In response (4006) to detecting the gesture, and in accordance with a determination (4020) that the contact reached an intensity during the gesture that was above the respective intensity threshold, the device moves (4022) the respective icon in accordance with the movement of the contact during the gesture (e.g., moving the respective icon outside of the predefined area during the gesture so that it follows the movement of the contact), and removes (4024) the respective icon from the predefined area after the gesture has ended (e.g., deleting the icon or moving the icon to a location outside of the predefined area in response to detecting liftoff of the contact). For example in FIGS. 11J-11K, in response to detection of the gesture performed with contact 3930 and in accordance with a determination that contact 3930 reached an intensity during the gesture that was above the defined intensity threshold, the device displays, for example, movement of icon 3908 in accordance with movement 3934 of contact 3930, and icon 3908 is removed from application dock area 3916 after the end of the gesture, as shown in FIG. 11M. As another example, in FIGS. 11S-11T, in response to detection of the gesture performed with contact 3950, icon 3908 is moved in accordance with movement 3952 of contact 3950 and then removed from application dock area 3916 after the end of the gesture, as shown in FIG. 11U.

In some embodiments, prior to detecting an end of the gesture, in accordance with a determination that the contact reached an intensity during the gesture that was above the respective intensity threshold, prior to removing the respective icon from the predefined area, the device displays (4026) a visual indication that the respective icon will be removed from dock (e.g., prior to detecting an end of the gesture, display the respective icon moving out of the predefined area and/or display an icon removal symbol such as a "cloud" or a red "X" in situations where the respective icon would be permanently removed from the predefined area). FIG. 11L shows, for example, prior to the end of the gesture performed with contact 3930, icon 3936 (e.g., an application icon deletion indication) is displayed in application dock area 3916 where icon 3908 was located.

In some embodiments, the device detects (4028) a tap gesture on the touch-sensitive surface while the focus selector is over the respective icon, and in response to detecting the tap gesture, the device launches (4030) a respective application associated with the respective icon. In some embodiments, the respective icon is a document icon that opens a particular document with a default application. In some embodiments, the respective icon is an application icon that opens an application with no document or a default/blank document initially displayed. For example, in FIGS. 11N-11O, in response to detection of tap gesture 3938 on touch-sensitive surface 451 while cursor 3922 is over icon 3908, an application associated with icon 3908 is launched and the corresponding interface 3940 is displayed.

In some embodiments, instead of determining whether or not to remove the respective icon from the predefined area based on whether or not the contact has a maximum intensity that is above or below the respective intensity threshold during a gesture that corresponds to movement outside of the predefined area, the device determines whether or not to rearrange a plurality of icons in the predefined area based on whether or not the contact has a maximum intensity that is above or below the respective intensity threshold. Thus, in some embodiments, the device displays a plurality of icons in a predefined area on the display, wherein the plurality of icons include a respective icon. The device detects a gesture that includes a contact on the touch-sensitive surface while a focus selector is over the respective icon; and subsequent movement of the contact across the touch-sensitive surface that corresponds to movement of the focus selector within the predefined area. In response to detecting the gesture: in accordance with a determination that the contact had a maximum intensity during the gesture that was below a respective intensity threshold, the device displays an indication that the gesture is being performed during the gesture; and does not rearrange (e.g., reorder) the respective icon in the predefined area after the gesture has ended. In contrast, in accordance with a determination that the contact reached an intensity during the gesture that was above the respective intensity threshold, the device moves the respective icon in accordance with the movement of the contact during the gesture; and rearranges (e.g., reorders) the respective icon relative to other icons in the plurality of icons in the predefined area after the gesture has ended. For example, in FIG. 11P, if the device detected movement of contact 3946, with a maximum intensity below $IT_D$, to a position between icon 3910 and icon 3912, when the intensity of contact dropped below $IT_L$, icon 3908 would return to its original position and the icons in predefined area 3916 would not be rearranged as shown in FIG. 11R (e.g., because contact 3946 had a maximum intensity below $IT_D$). In contrast, in FIG. 11S, if the device detected movement of contact 3950, with a maximum intensity above $IT_D$, to a position between icon 3910 and icon 3912, when the intensity of contact dropped below $IT_L$, icon 3908 would be place between icon 3910 and icon 3912 and the icons in predefined area 3916 would accordingly be rearranged (e.g., because contact 3950 has a maximum intensity above $IT_D$). Unintentionally rearranging icons in a predefined area can be frustrating for users who may not realize that the icons have been rearranged and then have difficulty finding icons that have moved from their usual locations. Using a higher intensity threshold (e.g., $IT_D$) to control whether user gestures rearrange icons in the predefined area helps to prevent users from unintentionally rearranging icons within the predefined area thereby improving the efficiency and predictability of the user interface.

It should be understood that the particular order in which the operations in FIGS. 12A-12B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 4000 described above with respect to FIGS. 12A-12B. For example, the contacts, gestures, user interface objects, intensity thresholds, and focus selectors described above with reference to method 4000 optionally has one or more of the characteristics of the contacts, gestures, user interface objects, intensity thresholds, and focus selectors described herein with reference to other methods described herein (e.g., those listed in the fifth paragraph of the Description of Embodiments). For brevity, these details are not repeated here.

Figure 13:
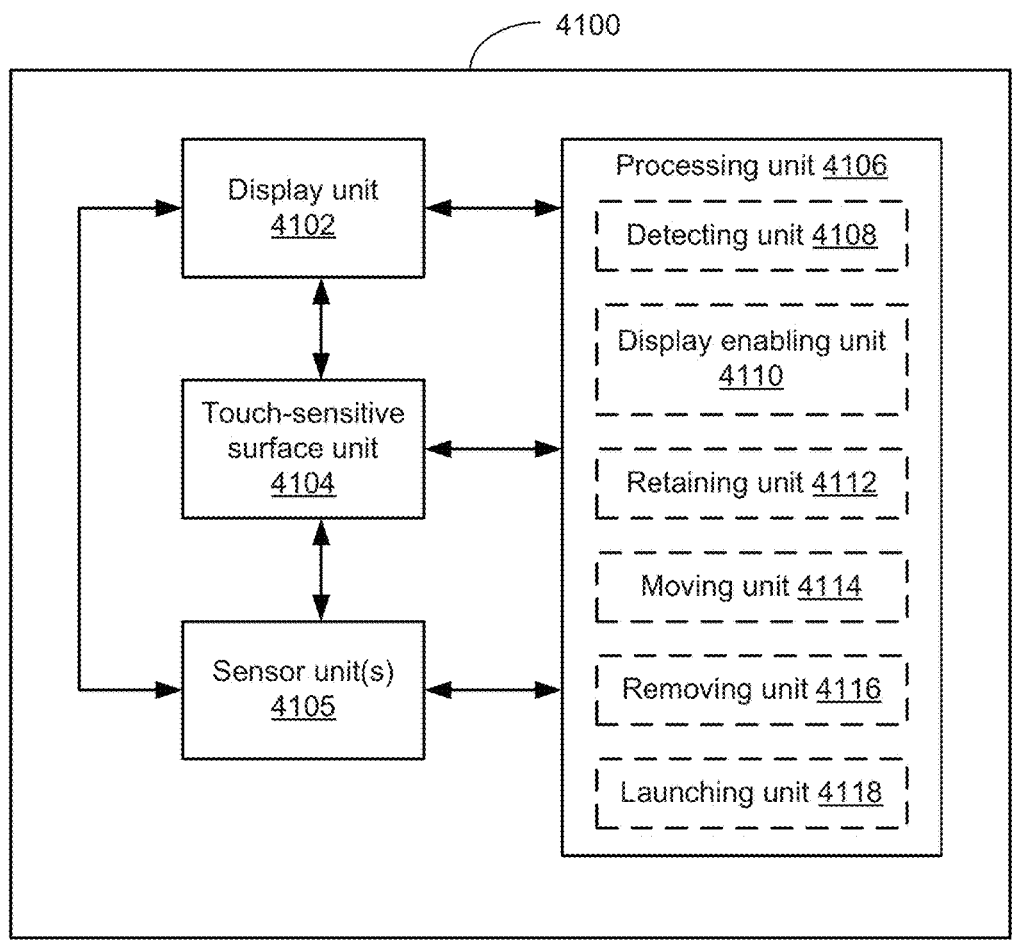
FIG. 13 is a functional block diagram of an electronic device in accordance with some embodiments.

In accordance with some embodiments, FIG. 13 shows a functional block diagram of an electronic device 4100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 4100 includes a display unit 4102 configured to display a plurality of icons in a predefined area on the display unit 4102, wherein the plurality of icons include a respective icon; a touch-sensitive surface unit 4104 configured to receive gestures; one or more sensor units 4105 configured to detect intensity of contacts with the touch-sensitive surface unit 4104; and a processing unit 4106 coupled to the display unit 4102, the touch-sensitive surface unit 4104, and the sensor units 4105. In some embodiments, the processing unit 4106 includes a detecting unit 4108, a display enabling unit 4110, a retaining unit 4112, a moving unit 4114, a removing unit 4116, and a launching unit 4118.

The processing unit 4106 is configured to: detect a gesture that includes a contact on the touch-sensitive surface unit 4104 while a focus selector is over the respective icon and subsequent movement of the contact across the touch-sensitive surface unit 4104 that corresponds to movement of the focus selector outside of the predefined area (e.g., with the detecting unit 4108), and in response to detecting the gesture: in accordance with a determination that the contact had a maximum intensity during the gesture that was below a respective intensity threshold, enable display of an indication that the gesture is being performed during the gesture (e.g., with the display enabling unit 4110) and retain the respective icon in the predefined area after the gesture has ended (e.g., with the retaining unit 4112); and in accordance with a determination that the contact reached an intensity during the gesture that was above the respective intensity threshold, move the respective icon in accordance with the movement of the contact during the gesture (e.g., with the moving unit 4114) and remove the respective icon from the predefined area after the gesture has ended (e.g., with the removing unit 4116).

In some embodiments, displaying the indication that the gesture is being performed includes: changing the appearance of the respective icon in the predefined area, and while displaying the respective icon with the changed appearance on the display unit 4102, moving a representation of the respective icon in accordance with movement of the contact during the gesture.

In some embodiments, displaying the indication that the gesture is being performed includes, while maintaining the respective icon in a fixed location in the predefined area, moving a cursor on the display unit 4102 in accordance with movement of the contact.

In some embodiments, displaying the indication that the gesture is being performed includes, while constraining movement of the respective icon to the predefined area, moving the respective icon in accordance with the movement of the contact during the gesture.

In some embodiments, the processing unit 4106 is configured to: detect a tap gesture on the touch-sensitive surface unit 4104 while the focus selector is over the respective icon (e.g., with the detecting unit 4108), and in response to detecting the tap gesture, launch a respective application associated with the respective icon (e.g., with the launching unit 4118).

In some embodiments, the processing unit 4106 is configured to: prior to detecting an end of the gesture, in accordance with a determination that the contact reached an intensity during the gesture that was above the respective intensity threshold, prior to removing the respective icon from the predefined area, enable display of a visual indication that the respective icon will be removed from dock (e.g., with the display enabling unit 4110).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 12A-12B are, optionally, implemented by components depicted in FIGS. 1A-1B or FIG. 13. For example, detection operation 4004, displaying operation 4010, retaining operation 4018, moving operation 4022, and removing operation 4024 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Displaying Content Layers

Many electronic devices include applications or user interfaces where different corresponding content, such as layers of content, can be displayed. For example, the corresponding content can be images of a location at different times, or different types of maps for a location. In some methods, in order to display a different content layer, the user has to open a menu and choose the desired content layer, which can be tedious and time-consuming. The embodiments described below improve on these methods. The user increases the intensity of a contact on a touch-sensitive surface while a focus selector is located over a content layer. If the intensity is increased above a threshold, a corresponding portion of a different content layer is displayed. The different content layer can also be brought up gradually in accordance with the contact intensity, or panned by moving a focus selector. These features make the displaying and manipulation of content layers more efficient.

FIGS. 14A-14L illustrate exemplary user interfaces for displaying content layers in accordance with some embodiments. The user interfaces in these figures are used to illustrate the processes described below, including the processes in FIGS. 15A-15C. FIGS. 14A-14L include intensity diagrams that show the current intensity of the contact on the touch-sensitive surface relative to a plurality of intensity thresholds including a light press intensity threshold (e.g., "$IT_L$") and a transition-initiation intensity threshold (e.g., "$IT_1$"). In some embodiments, operations similar to those described below with reference to "$IT_L$" are performed with reference to a different intensity threshold (e.g., "$IT_D$").

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 14A-14L and 15A-15C will be discussed with reference to display 450 and a separate touch-sensitive surface 451, however analogous operations are, optionally, performed on a device with a touch-sensitive display system 112 in response to detecting the contacts described in FIGS. 14A-14L on the touch-sensitive display system 112 while displaying the user interfaces shown in FIGS. 14A-14L on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 6904.

Figure 14A:
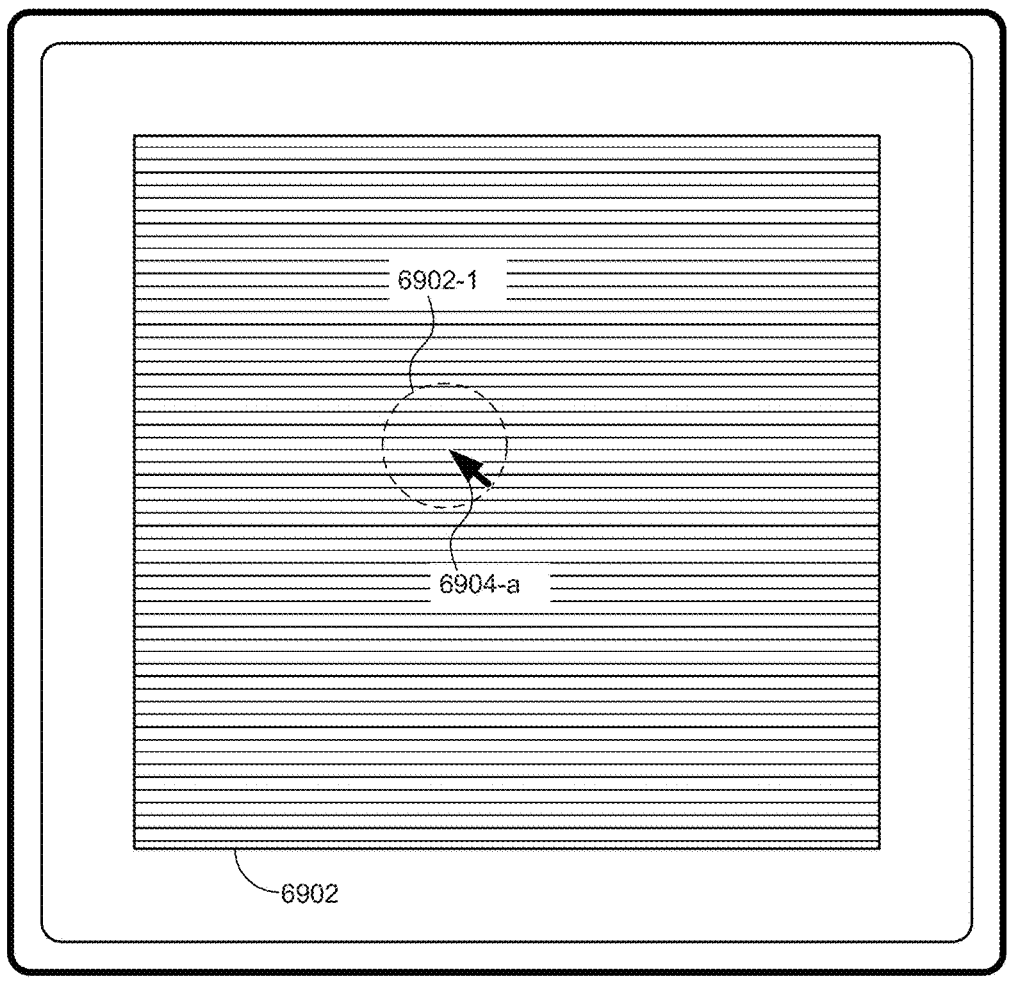
FIGS. 14A-14L illustrate exemplary user interfaces for displaying content layers in accordance with some embodiments.
Figure 14A:
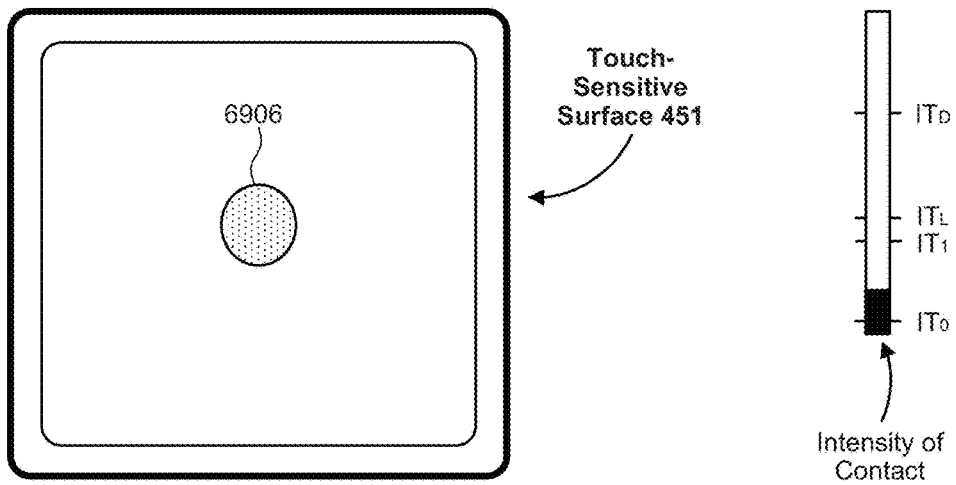
Figure 15A:
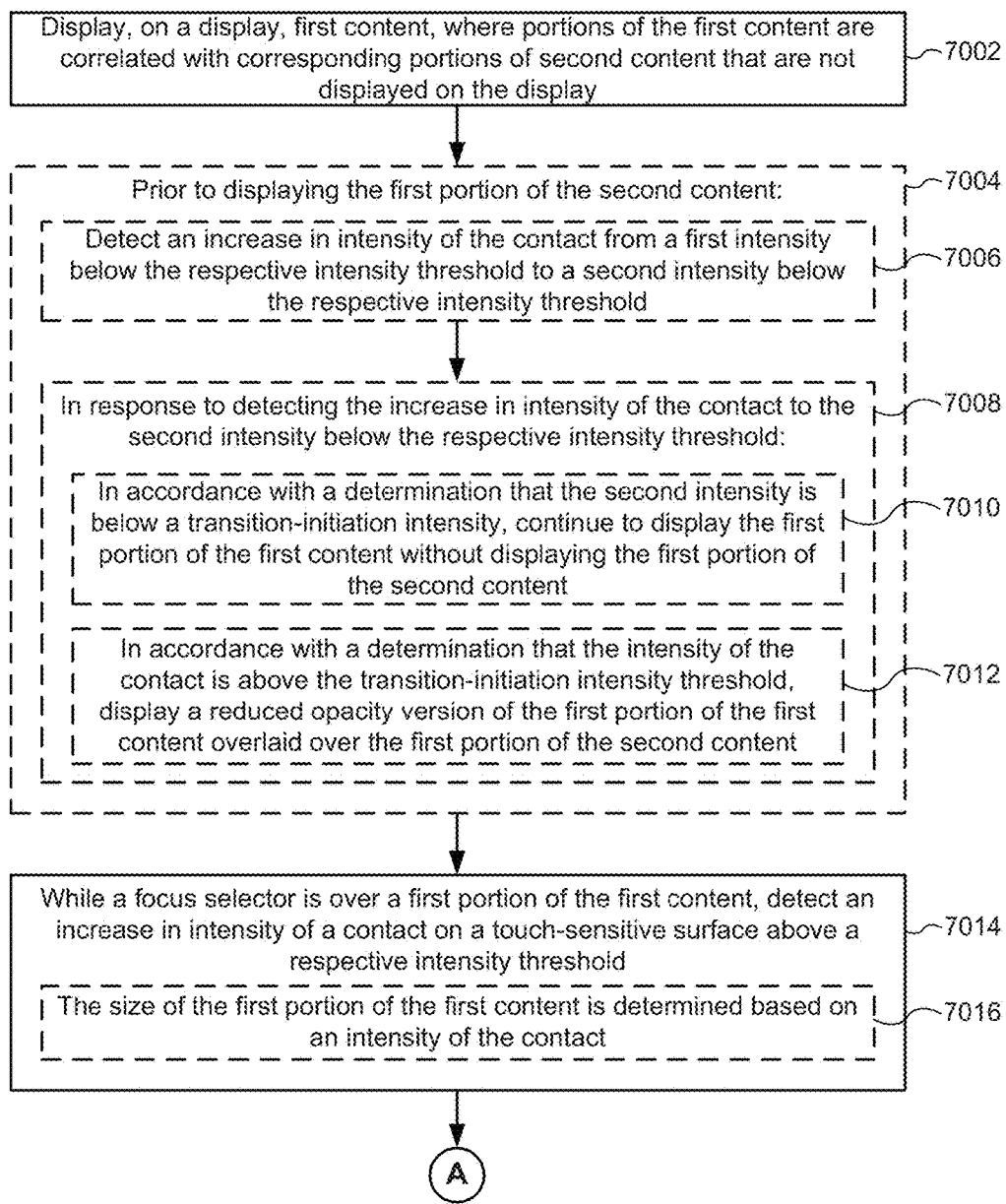
FIGS. 15A-15C are flow diagrams illustrating a method of displaying content layers in accordance with some embodiments.
Figure 15B:
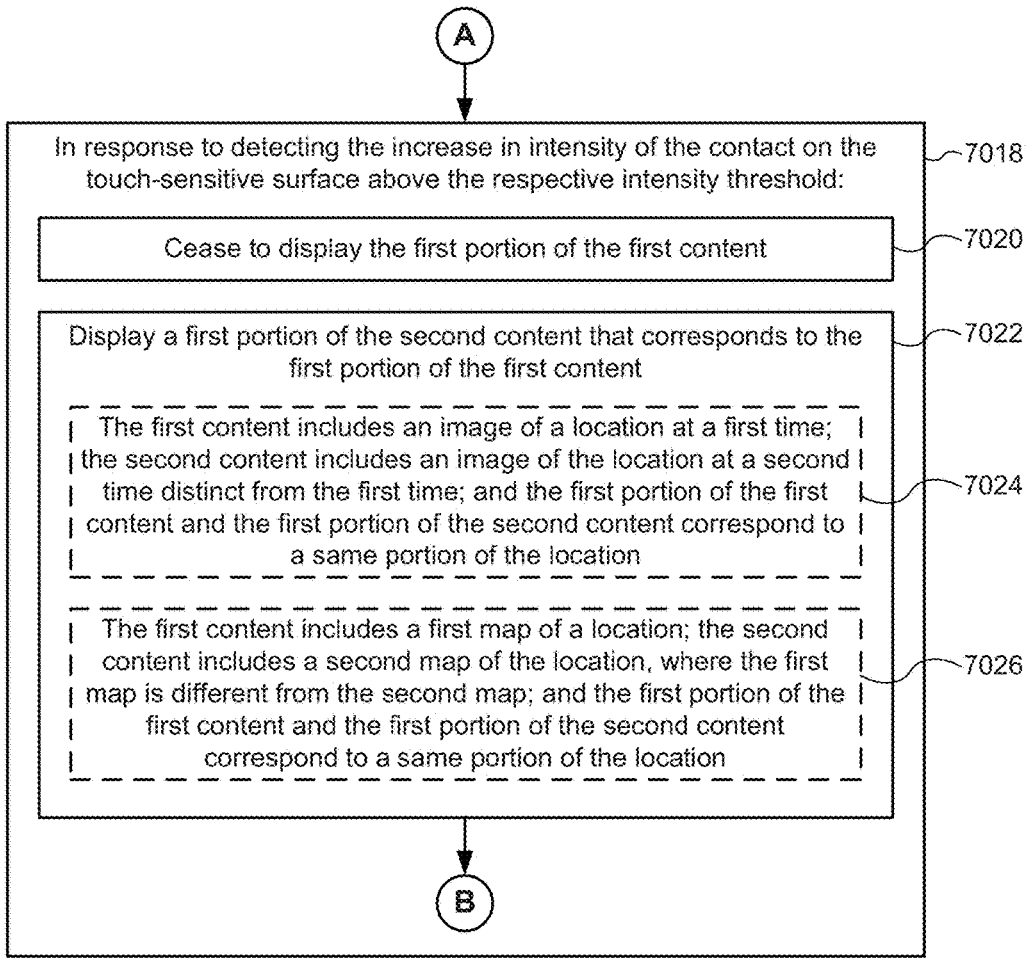
Figure 15C:
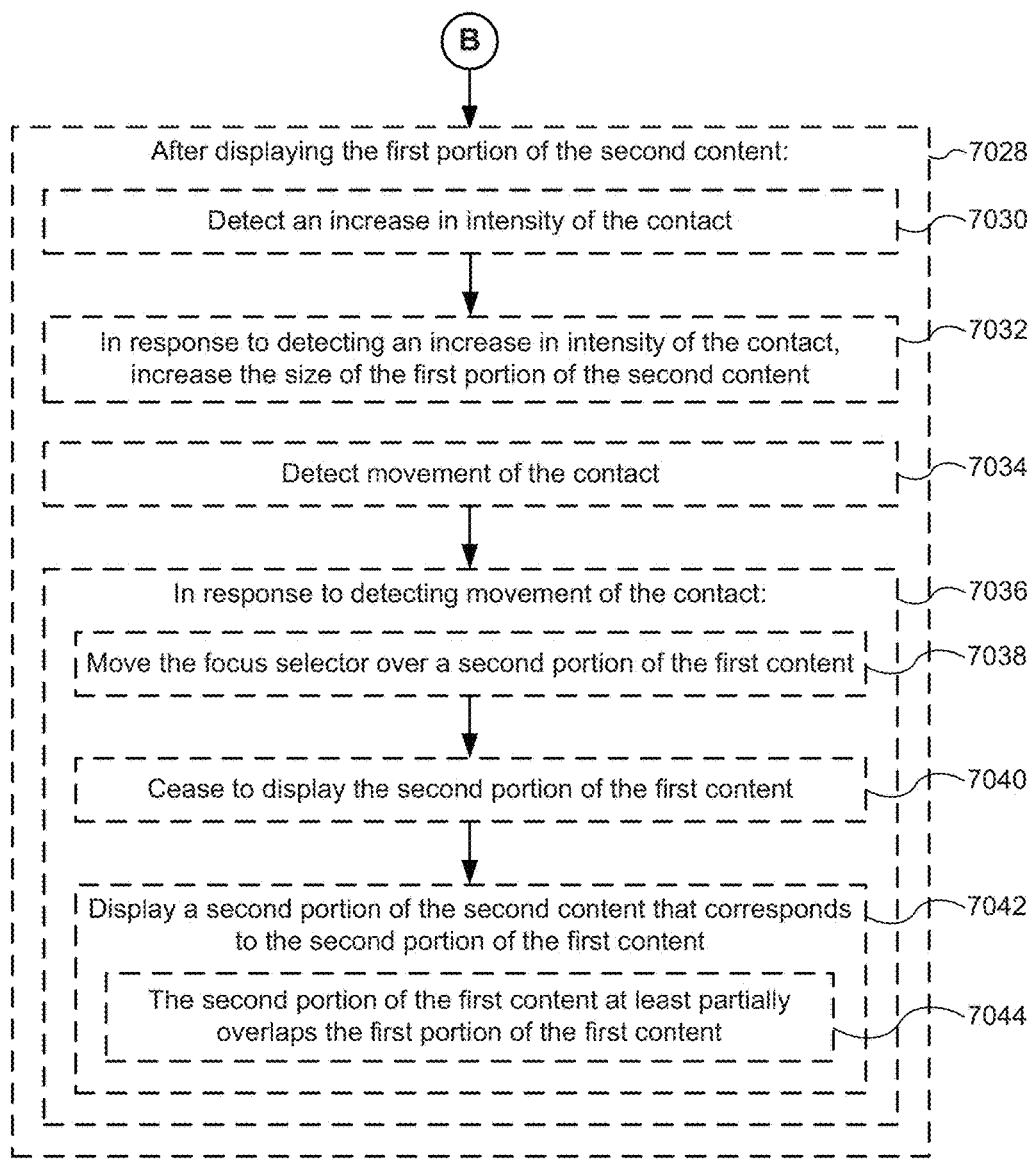

FIG. 14A illustrates the device displaying content 6902 on display 450. In some embodiments, content 6902 is an image of a location (e.g., overhead or satellite image of the location) at a first time (e.g., at a particular date and time). In some other embodiments, content 6902 is a map, of a first type (e.g., a street map), of a location.

The device also displays a focus selector (e.g., cursor 6904) on display 450. In some embodiments, cursor 6904 is a pointer (e.g., a mouse pointer). In FIG. 14A, cursor 6904 is located at location 6904-*a* over content 6902. Cursor 6904 is associated with a portion of content 6902 over which cursor 6904 is located. For example, in FIG. 14A, cursor 6904, at location 6904-*a*, is associated with portion 6902-1. As cursor 6904 is moved across content 6902, the associated portion of content 6902 also changes with the location of cursor 6904 (e.g., the portion of content 6902 associated with the focus selector corresponds to content within a predefined radius or distance of cursor 6904 or within a predefined area centered at cursor 6904).

While the portion of content with which cursor 6904 is associated has a finite size, the extent (e.g., size and boundaries) of that portion is not displayed to the user, and thus the delineation of the portion from the rest of content 6902 is, optionally, not apparent to the user until the device begins to replace the portion of the first content with a corresponding portion of second content, as described below. For example, in FIG. 14A, the boundaries of portion 6902-1 are not displayed on display 450 to the user.

Figure 14B:
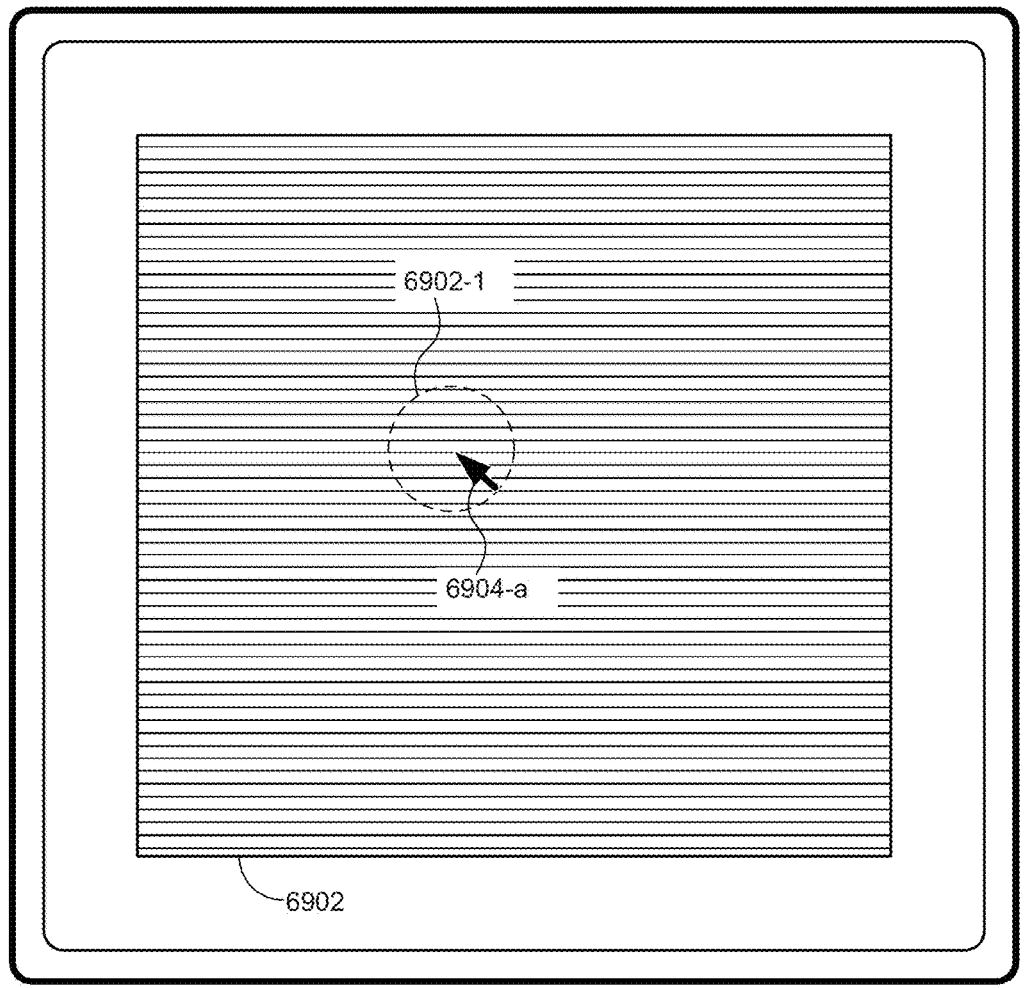
Figure 14B:
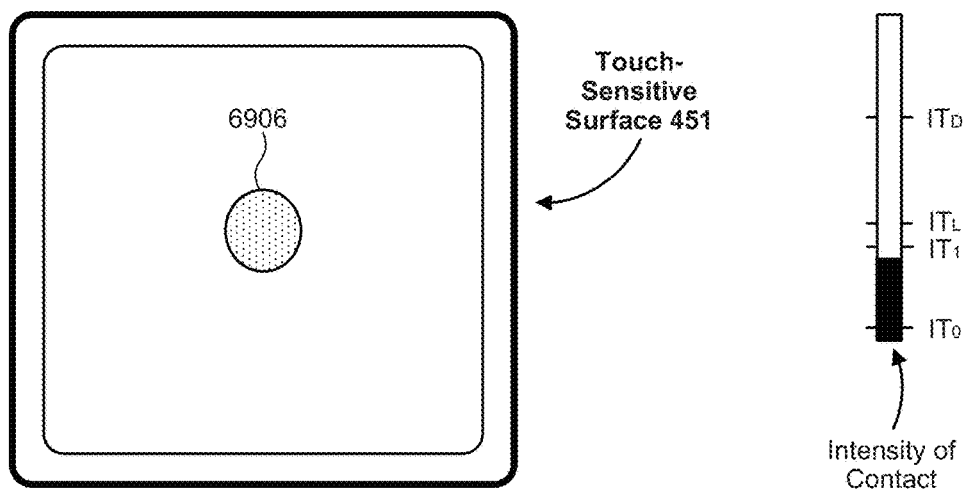
Figure 14C:
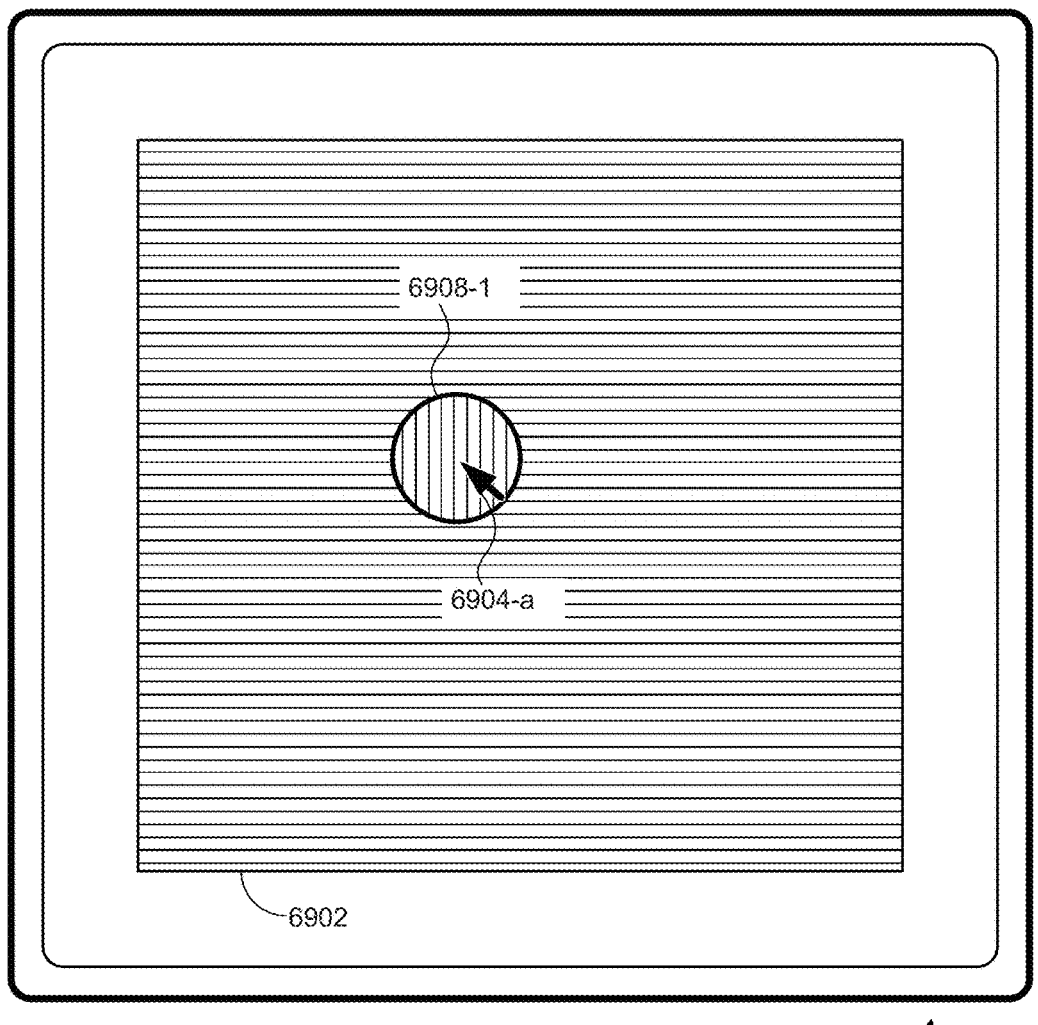
Figure 14C:
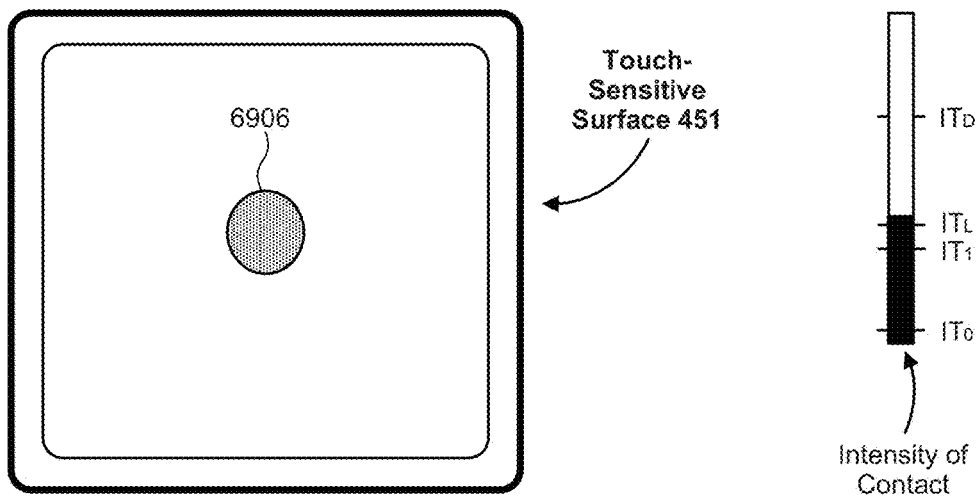

In FIG. 14A, the device detects contact 6906 on touch-sensitive surface 451 while cursor 6904 is located over portion 6902-1. The device detects an increase in the intensity of contact 6906, from below a light press intensity threshold (e.g., $IT_L$) to above the light press intensity threshold (e.g., $IT_L$), while cursor 6904 is located over portion 6902-1, as shown in FIGS. 14B-14C. In response to detecting the increase in the intensity of contact 6906 (e.g., from an intensity below $IT_L$ in FIG. 14B to an intensity above the $IT_L$ in FIG. 14C), the device ceases to display portion 6902-1 and displays portion 6908-1 of content 6908, as shown in FIG. 14C. Portion 6908-1 has the same size and position as portion 6902-1. In FIG. 14C, content 6908 is not displayed in its entirety; just portion 6908-1 is displayed. In some embodiments, portion 6908-1 is displayed to give a visual appearance of being viewed through a virtual loupe or viewport, as though the user is looking through a hole in content 6902 at content 6908 that is "underneath" content 6902.

In some embodiments where content 6902 is an image of a location at a first time, content 6908 is an image of the same location at a second time different from the first time (e.g., a different time and date). In some embodiments where content 6902 is a map of a first type of a location, content 6908 is a map, of a second type different from the first type (e.g., public transit map), of the same location. Portions of content 6908 are correlated with corresponding portions of content 6902. Thus, portion 6908-1 corresponds to portion 6902-1. For example, if content 6902 and 6908 are different types of maps for the same location, then portions 6902-1 and 6908-1 are portions of the respective maps for the vicinity of the same street intersection. In some embodiments, content 6902 is a first image and content 6908 is a second image that corresponds to the first image (e.g., an image of the same object or set of objects that differs from the first image based on media-capture settings such as exposure, white balance, focus, etc., or based on image capture conditions such as time of day, lighting, etc.). In some embodiments, content 6902 is a first document and content 6908 is an earlier version of the first document (e.g., an earlier version of a word processing, spreadsheet, presentation, or PDF document). While numerous examples have been provided, these examples are not limiting, and analogous operations are optionally performed on any set of first content and second content for which it is advantageous to replace a particular portion of the first content with the second content while continuing to display other portions of the first content.

In some embodiments, in response to detecting a decrease in the intensity of contact 6906 below the light press intensity threshold (e.g., $IT_L$), content 6908-1 ceases to be displayed, and content 6902-1 is re-displayed as part of content 6902 as a whole (e.g., if contact 6906 drops back down to the intensity shown in FIG. 14B that is below $IT_L$, the first portion 6908-1 of the second content ceases to be displayed).

In FIG. 14C, portion 6908-1 has a first size that is the same as the size of portion 6902-1 in FIGS. 14A-14B. In some embodiments, that first size is based on the intensity of contact 6906 (e.g., as the intensity of contact 6906 increases above a predefined intensity threshold, the size of the area of the first content 6902 that is replaced with the second content 6908 is increased in a corresponding manner). In response to detecting an increase in the intensity of contact 6906, the device increases the size of portion 6902-1 to a second size. If the intensity increase is detected while portion 6908-1 is displayed, then the size of portion 6908-1 is increased to the second size, to match the increase in the size of portion 6902-1.

Figure 14D:
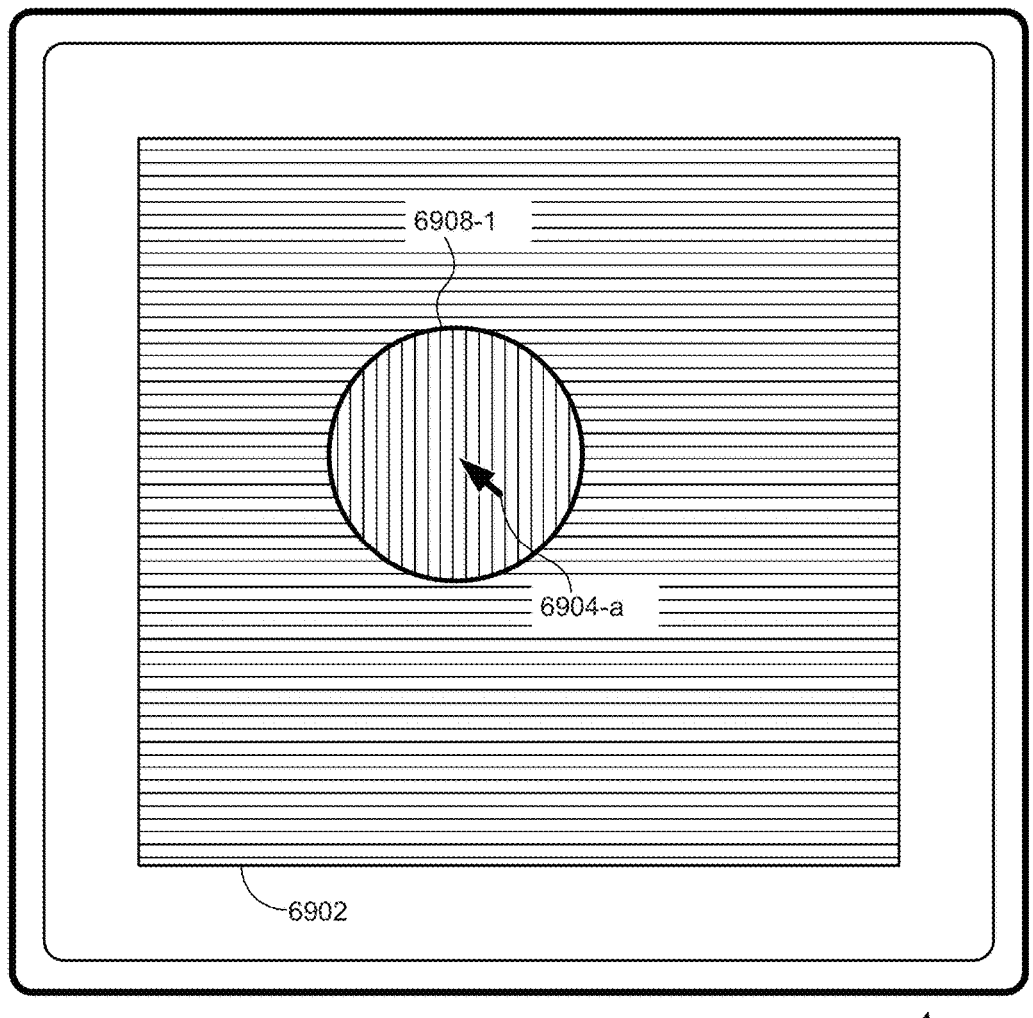
Figure 14D:
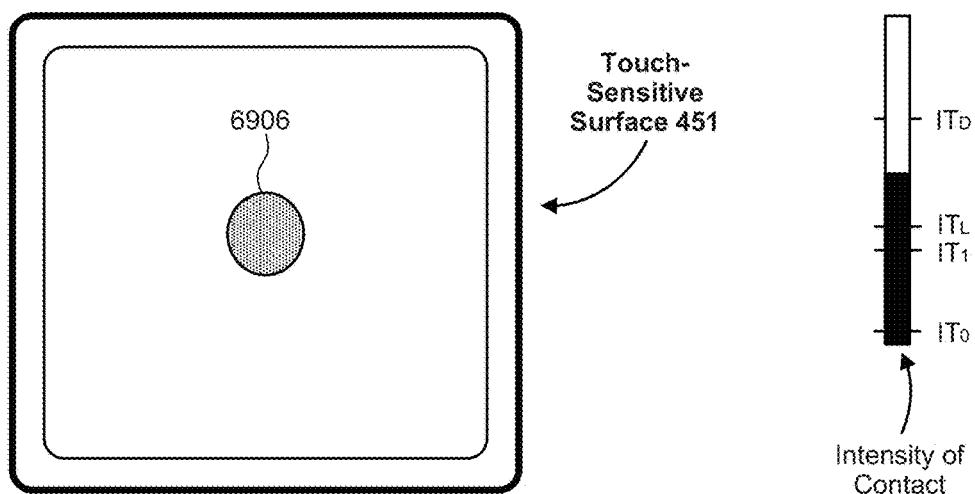
Figure 14E:
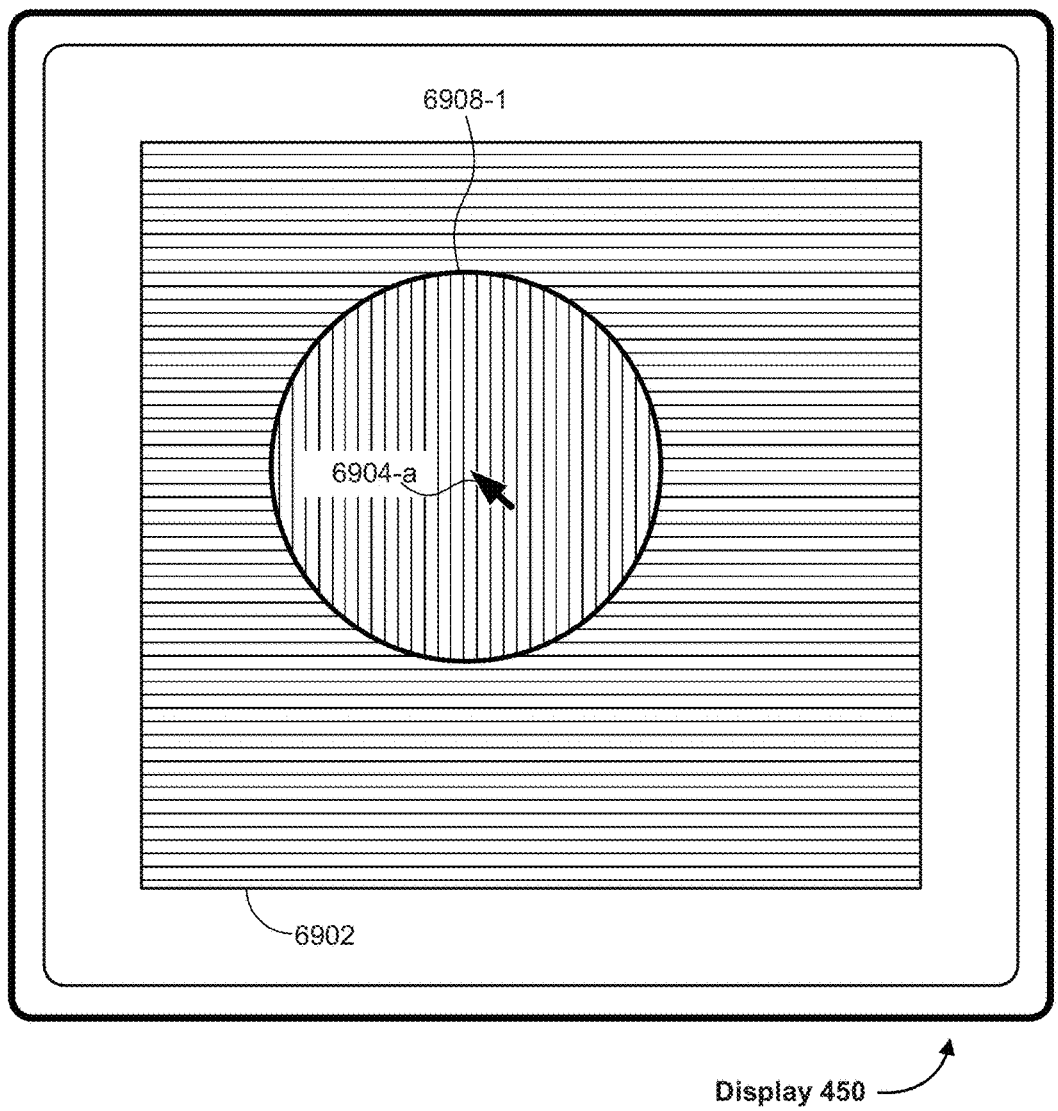
Figure 14E:
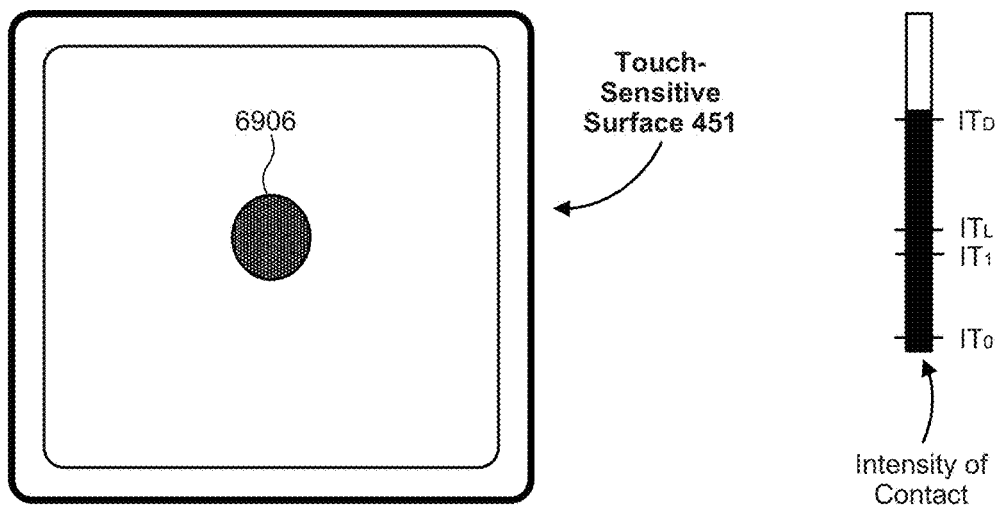

For example, FIG. 14D shows the intensity of contact 6906 increased above the intensity shown in FIG. 14C. The sizes of portion 6902-1 and portion 6908-1 are increased in response to detection of the intensity increase by an amount corresponding to the amount of increase in intensity of contact 6906. The size increase for portion 6908-1 is displayed on display 450, but the size increase for portion 6902-1 is displayed as the size of the hole in content 6902 in FIG. 14D. Similarly, FIG. 14E shows the intensity of contact 6906 increased above the intensity shown in FIG. 14D. The sizes of portion 6902-1 and portion 6908-1 are further increased, from the size shown in FIG. 14D, in response to detection of the intensity increase. Again, the size increase for portion 6908-1 is displayed on display 450, but the size increase for portion 6902-1 is displayed as the size of the hole in content 6902 in FIG. 14E. In some embodiments, the sizes of portion 6902-1 and 6908-1 are decreased in response to a decrease in the intensity of contact 6906 (e.g., the device reverses of the size increase that was performed in response to the intensity increase shown in FIGS. 14C-14E).

Figure 14F:
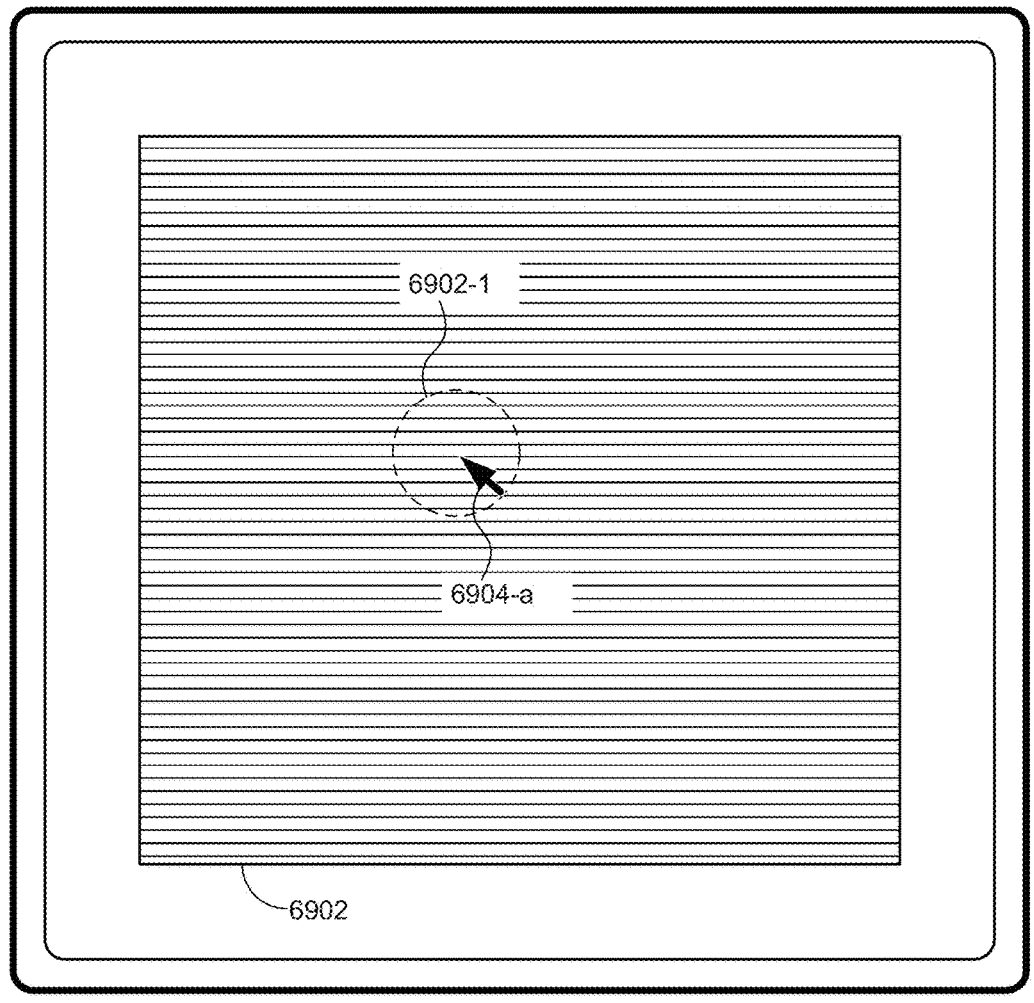
Figure 14F:
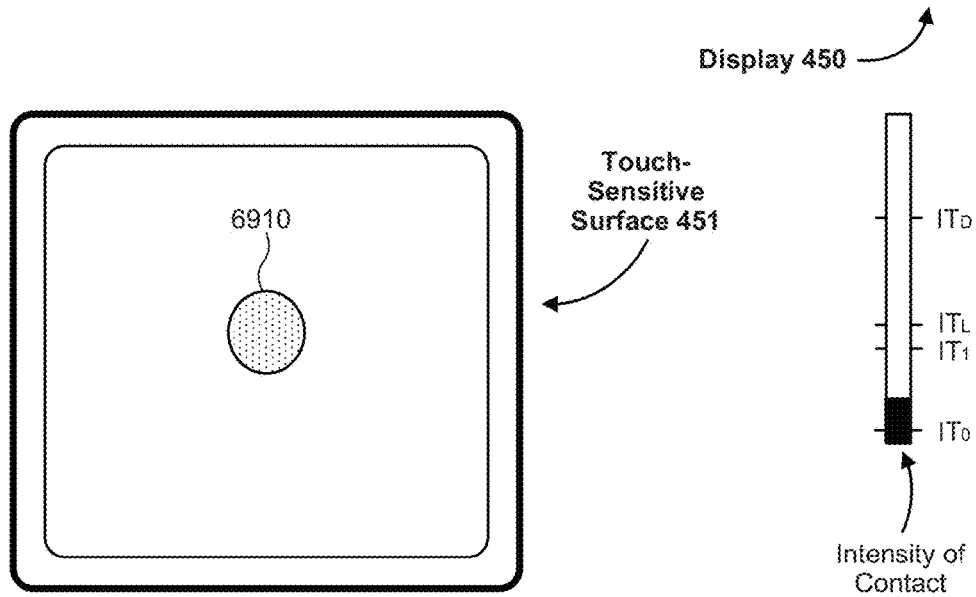

FIG. 14F illustrates content 6902, including portion 6902-1, and cursor 6904 displayed on display 450, as in FIG. 14A. The device detects contact 6910, on touch-sensitive surface 451, with an intensity below the light press intensity threshold (e.g., $IT_L$) and below a transition-initiation intensity threshold (e.g., $IT_1$). In FIGS. 14A-14L, the transition-initiation intensity threshold (e.g., $IT_1$) is below the light press intensity threshold (e.g., $IT_L$).

Figure 14G:
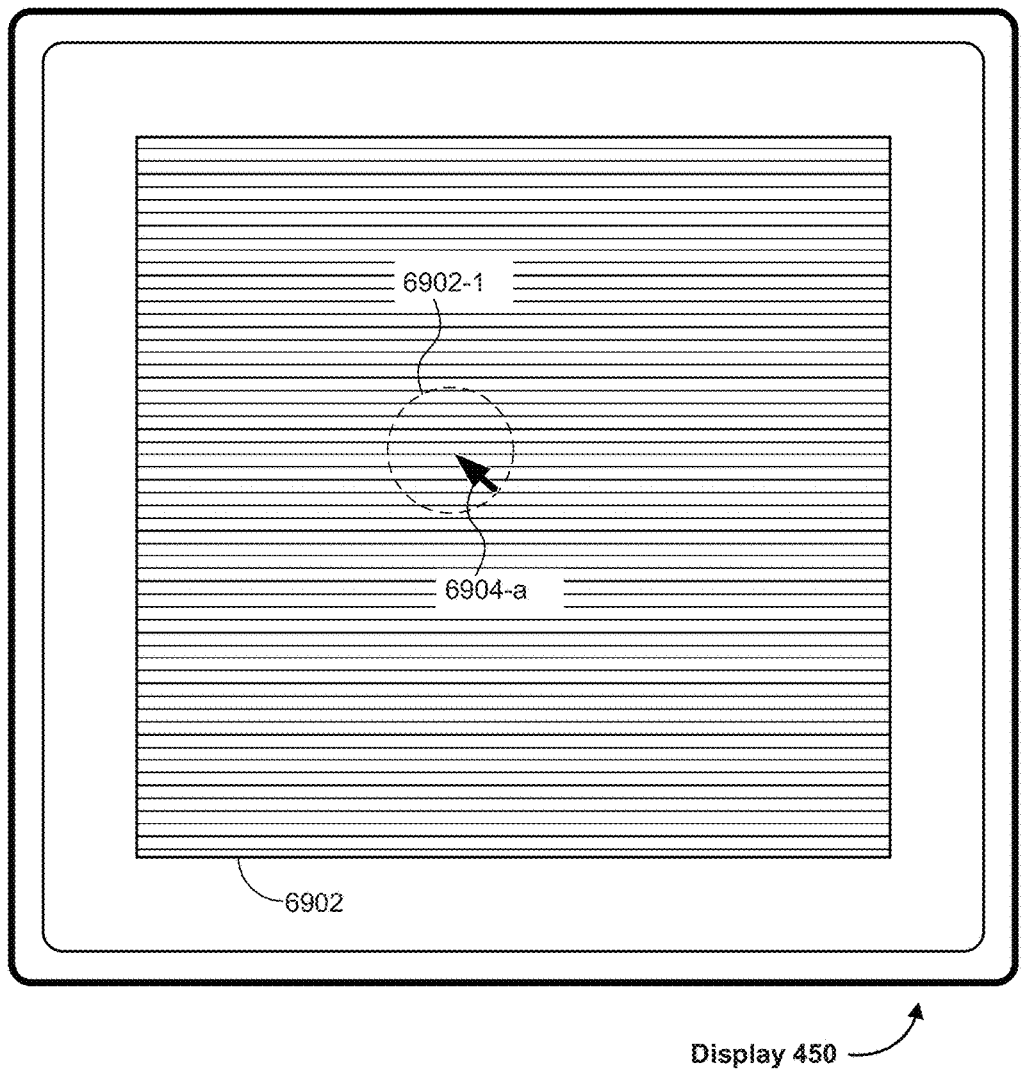
Figure 14G:
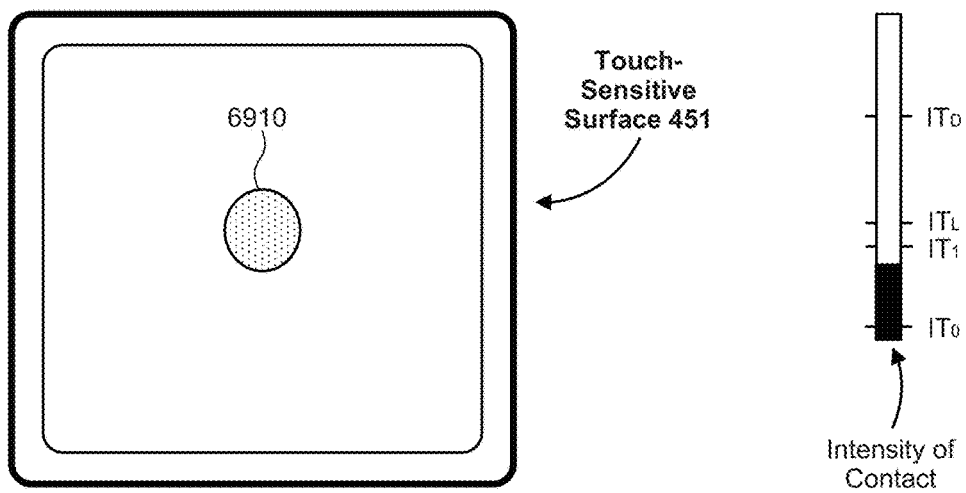

The device detects an increase in the intensity of contact 6910 to a higher intensity that is still below the transition-initiation intensity threshold (e.g., $IT_1$), as shown in FIG. 14G. In accordance with a determination that the new intensity is below the transition-initiation intensity threshold (e.g., $IT_1$), portion 6902-1 continues to be displayed without displaying portion 6908-1.

Figure 14H:
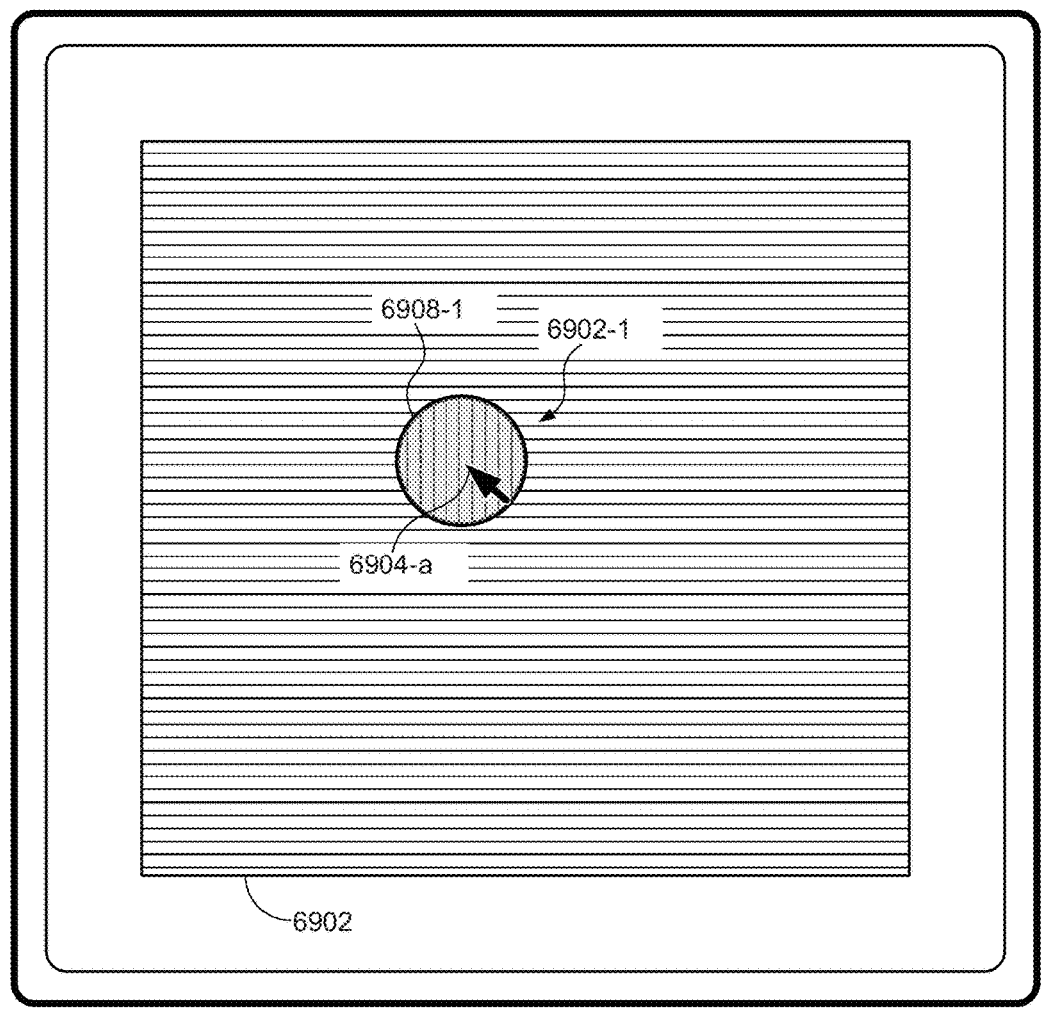
Figure 14H:
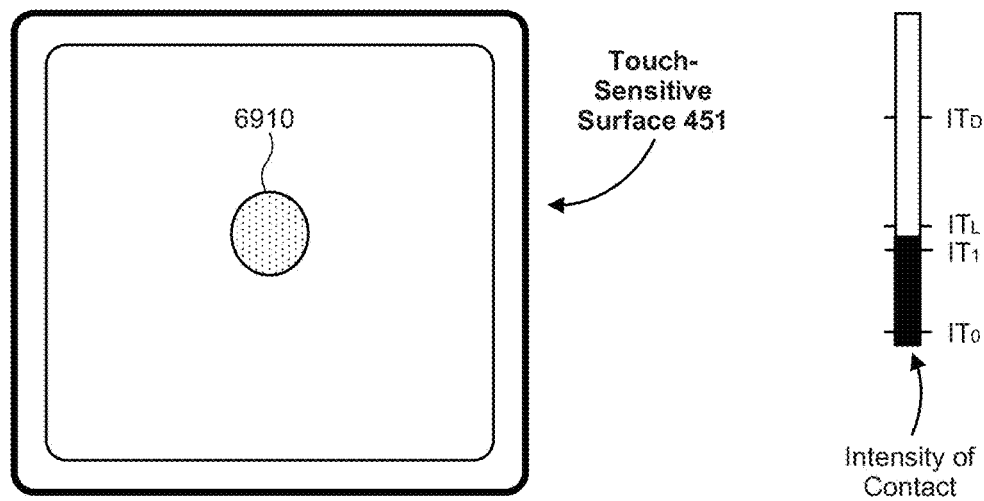

In FIG. 14H, the device detects a further increase in the intensity of contact 6910 to an intensity above the transition-initiation intensity threshold (e.g., $IT_1$) and below the light press intensity threshold (e.g., $IT_L$). In accordance with a determination that the new intensity is above the transition-initiation intensity threshold (and below the light press intensity threshold $IT_L$), portion 6908-1 is displayed, and a reduced opacity (e.g., more visually transparent) version of portion 6902-1 is displayed as overlaid over portion 6908-1. Thus, from the user's perspective, both portion 6908-1 and portion 6902-1 can be seen, with portion 6908-1 being seen through a more-transparent portion 6902-1.

In some embodiments, the opacity of reduced-opacity portion 6902-1 is based on the intensity of contact 6910 between the transition-initiation intensity threshold (e.g., $IT_1$) and the light press intensity threshold (e.g., $IT_L$). The opacity is reduced in response to an increase in the intensity of contact 6910, and the opacity is increased in response to a decrease in the intensity of contact 6910. Thus, portion 6908-1, optionally, has an appearance of being gradually revealed and gradually replacing portion 6902-1 on display 450.

Figure 14I:
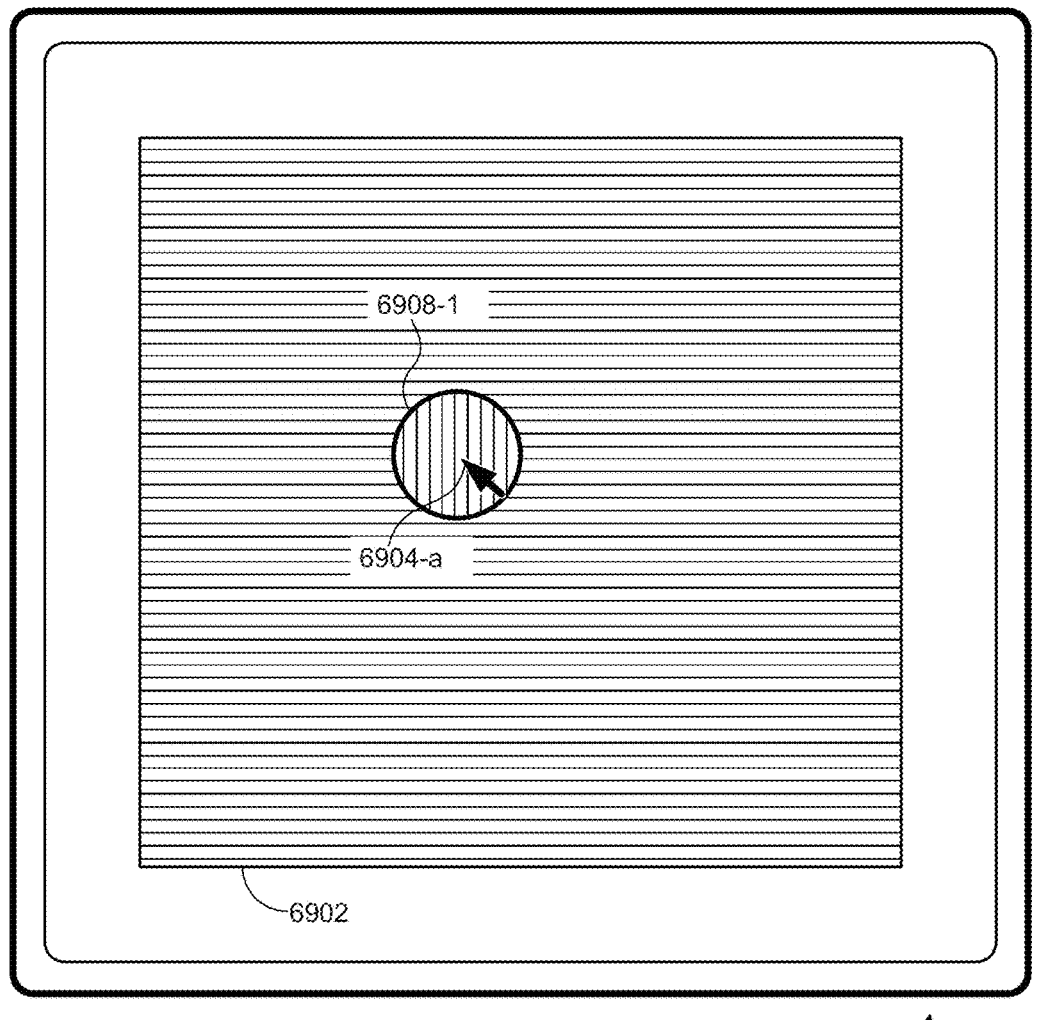
Figure 14I:
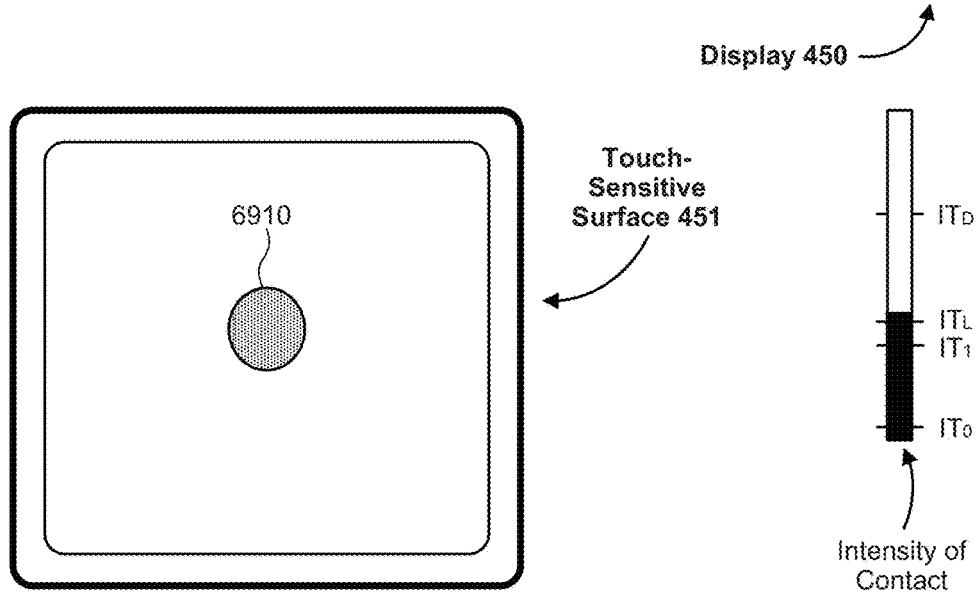

In FIG. 14I, the device detects an increase in the intensity of contact 6910 above the light press intensity threshold (e.g., $IT_L$). In response to detecting the increase in the intensity of contact 6910 above the light press intensity threshold (e.g., $IT_L$), the device ceases to display portion 6902-1 (reduced-opacity or otherwise) and displays content portion 6908-1. While the foregoing example of the first portion of the first content 6902 gradually ceasing to be displayed has been described with reference to transition-initiation threshold IT' and light press intensity threshold $IT_L$, in some embodiments, $IT_L$ is the intensity threshold at which the first portion of the first content 6902 starts to gradually disappear to reveal the first portion of the second content 6908, and the deep press intensity threshold $IT_D$ is the intensity threshold at which the first portion of the first content completely disappears to reveal the first portion of the second content 6908.

Figure 14J:
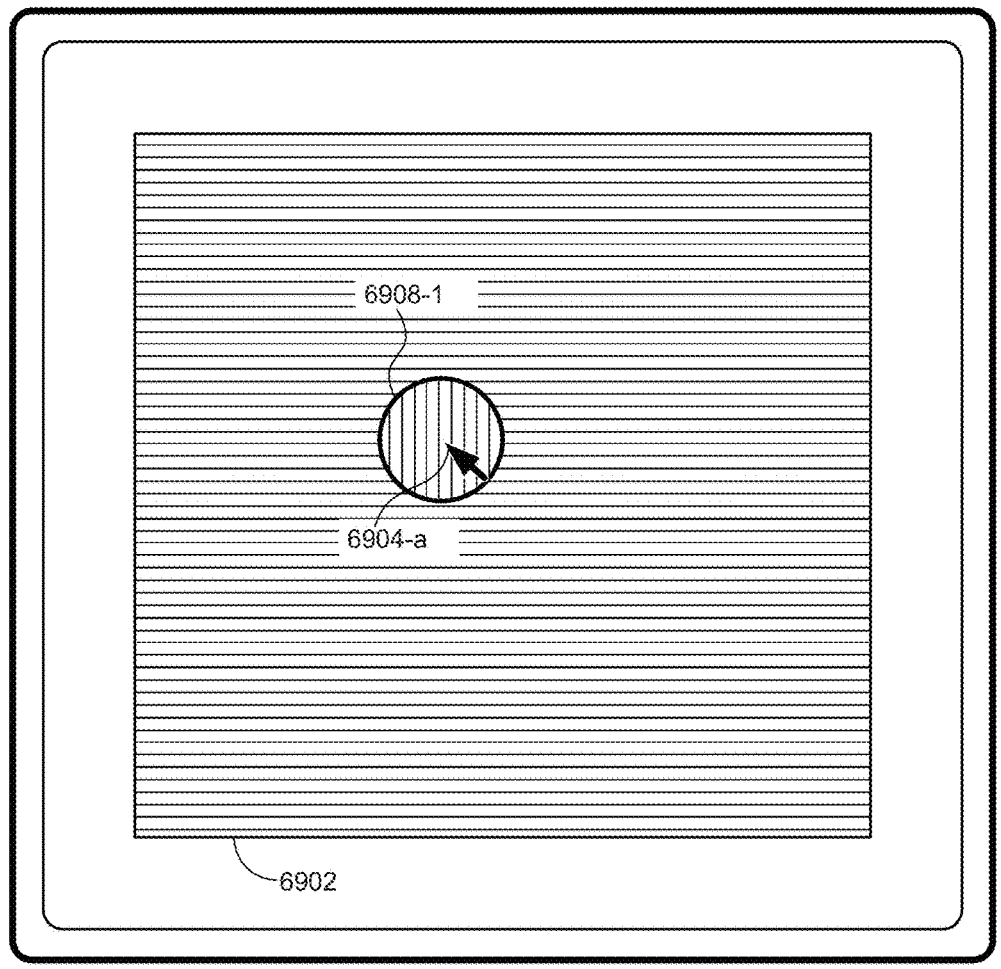
Figure 14J:
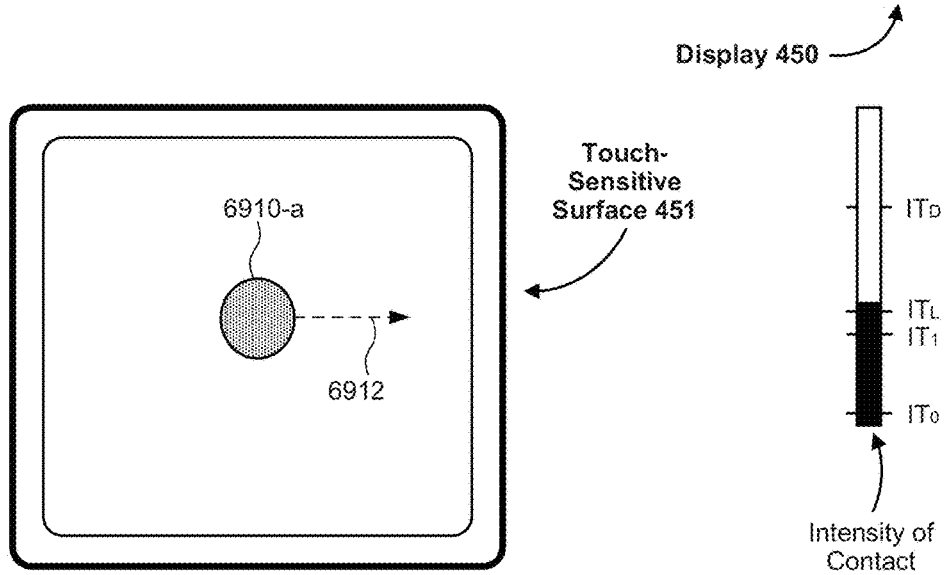
Figure 14K:
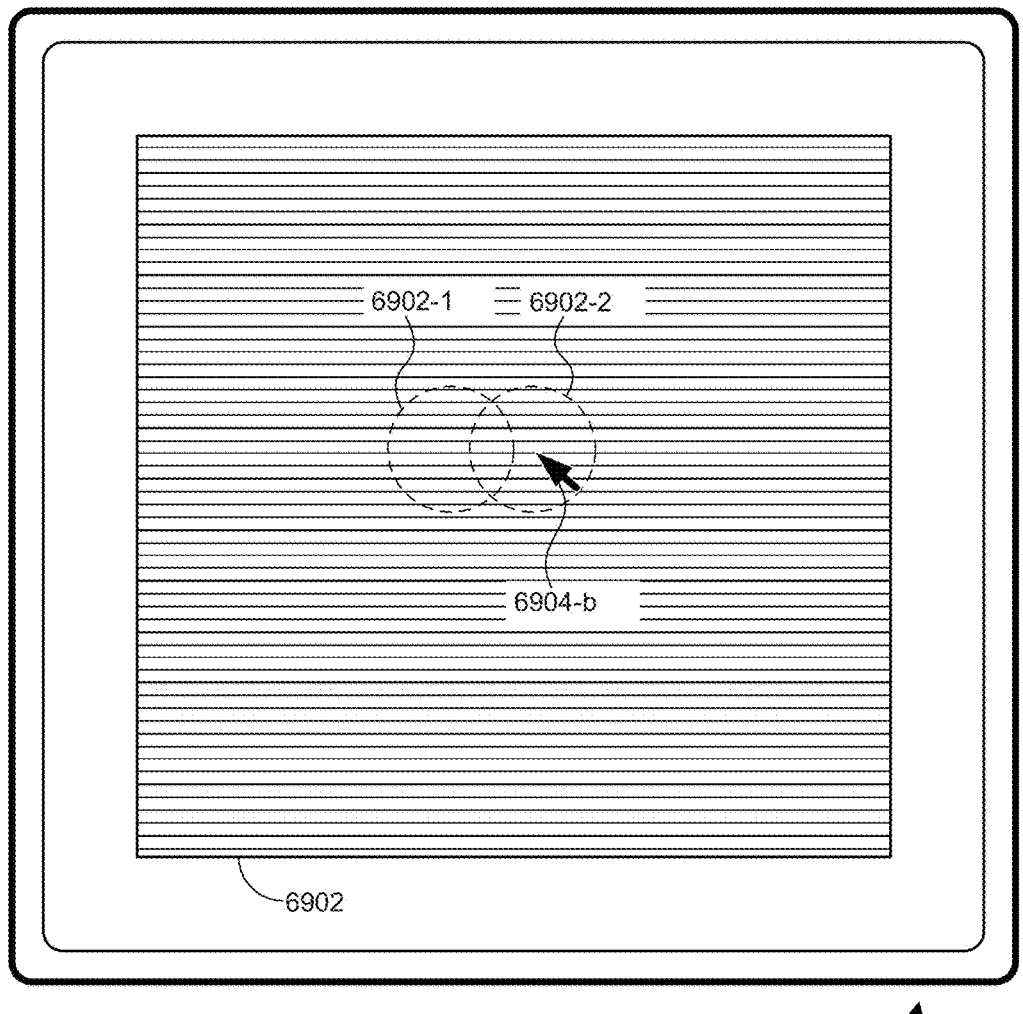
Figure 14K:
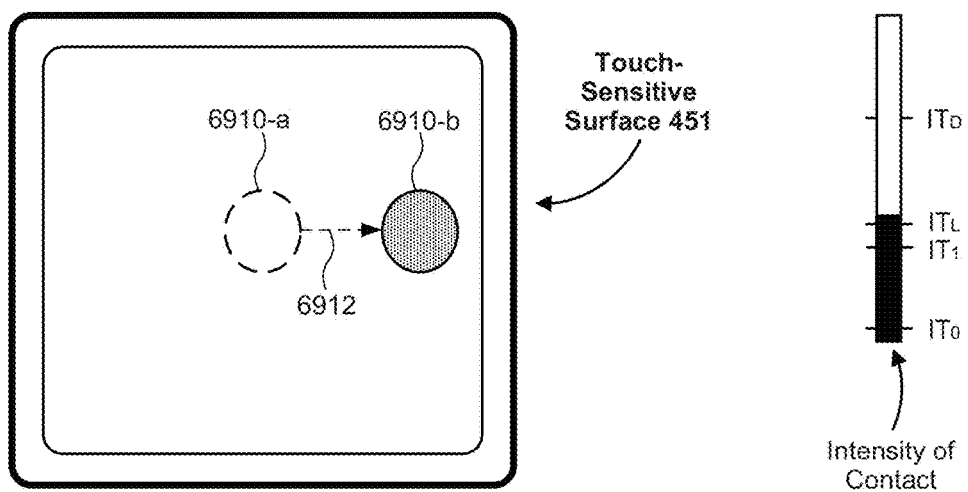
Figure 14L:
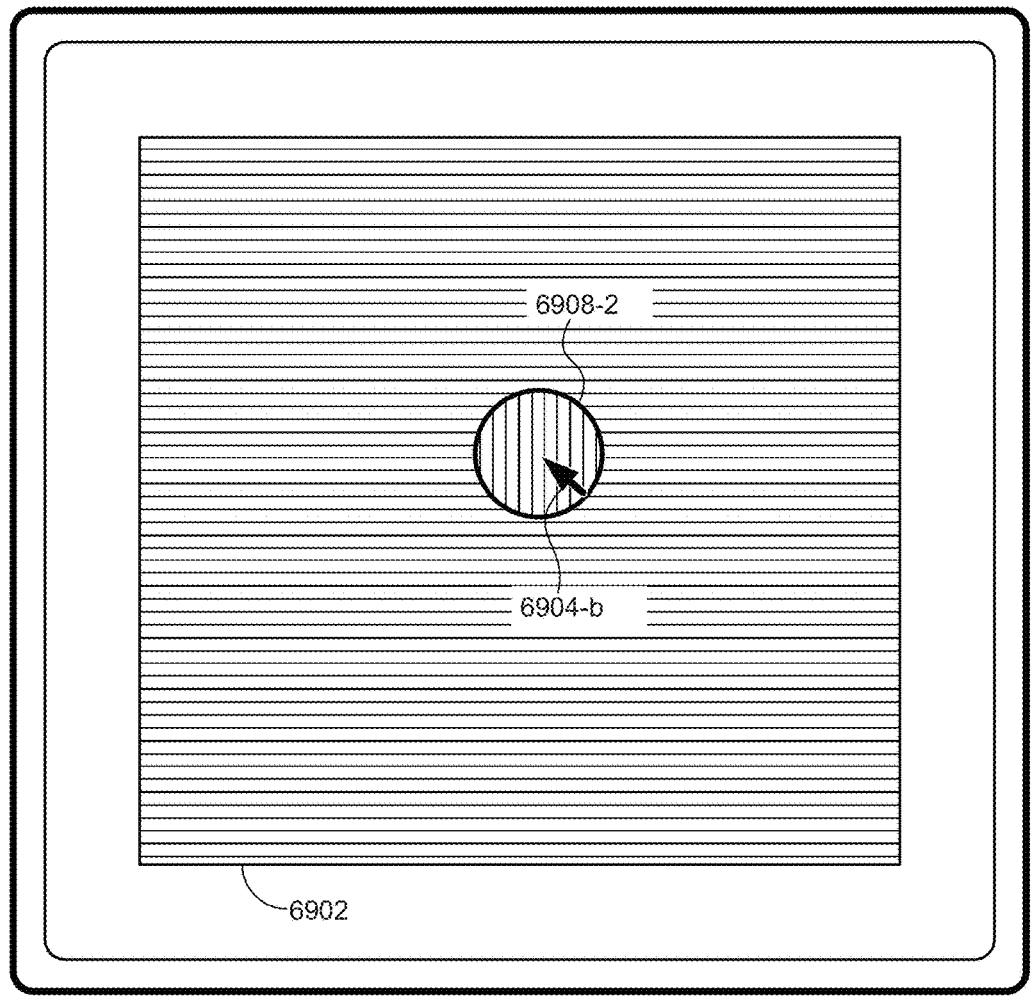
Figure 14L:
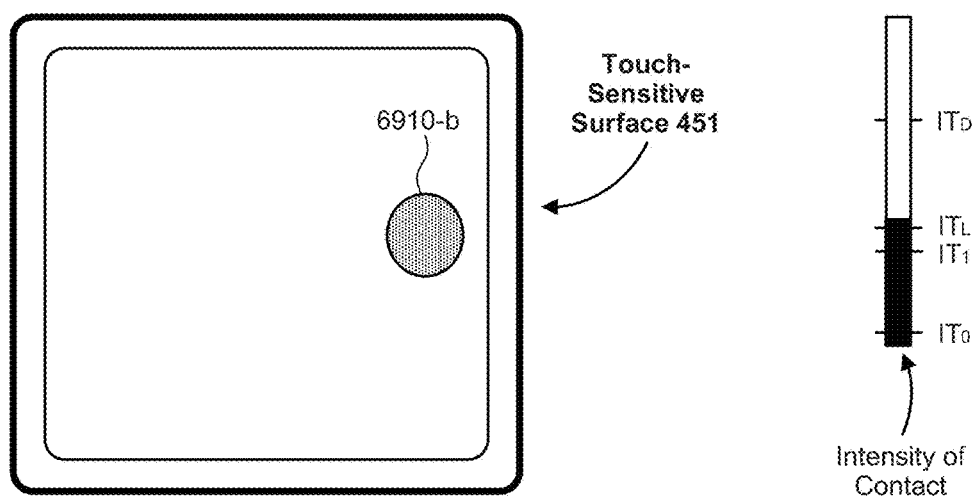

FIG. 14J shows cursor 6904 located at location 6904-1, over portion 6908-1, and contact 6910 located at location 6910-*a*. As shown in FIGS. 14J-14L the device detects, on touch-sensitive surface 451, movement 6912 of contact 6910 from location 6910-*a* toward location 6910-*b* (FIGS. 14K-14L). In response to detection of the movement of contact 6926, cursor 6904 is moved from location 6904-*a* (FIG. 14J) to location 6904-*b* (FIGS. 14K-14L, over portion 6902-2 of content 6902, as shown in FIG. 14K. The device ceases to display portion 6902-2 and displays portion 6908-2, which corresponds to portion 6902-2, as shown in FIG. 14L.

In FIGS. 14J-14L, cursor 6904 moves in response to movement 6912 of contact 6910, a portion of content 6908 is still displayed and the displayed portion of content 6908 changes as cursor 6904 moves over a new portion of content 6902; the displayed portion of content 6908 follows cursor 6904. For example, if the portion of content 6908 is displayed as if viewed through a virtual loupe, viewport or hole in content 6902, the virtual loupe, viewport or hole in content 6902 is moved along with cursor 6904 and the portion of content 6908 viewed through the virtual loupe or viewport changes. In FIG. 14K, for ease of understanding of the movement of cursor 6904 over a different portion of content 6902, the displayed portion of content 6908 is not shown. Further, as shown in FIG. 14K, portions 6902-1 and 6902-2, optionally, overlap at least partially.

FIGS. 15A-15C are flow diagrams illustrating a method 7000 of displaying content layers in accordance with some embodiments. The method 7000 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 7000 are, optionally, combined and/or the order of some operations is, optionally, changed.

As described below, the method 7000 provides an intuitive way to display content layers. The method reduces the cognitive burden on a user when displaying content layers, thereby creating a more efficient human-machine interface. For battery-operated electronic devices, enabling a user to display content layers faster and more efficiently conserves power and increases the time between battery charges.

The device displays (7002), on the display, first content, where portions of the first content are correlated with corresponding portions of second content that are not (initially) displayed on the display (e.g., the corresponding portions of the second content are not displayed prior to detecting the increase in intensity of the contact on the touch-sensitive surface, as described below). For example, FIGS. 14A and 14F show content 6902 being displayed on display 450, where portions of content 6902 are correlated with corresponding portions of content 6908, which is not initially displayed.

While a focus selector is over a first portion of the first content, the device detects (7014) an increase in intensity of a contact on the touch-sensitive surface above a respective intensity threshold (e.g., $IT_L$). For example, FIGS. 14A-14B show the detection of an increase in the intensity of contact 6906 above the respective intensity threshold (e.g., $IT_L$), while cursor 6904 is located over portion 6902-1. FIGS. 14G-14I show the detection of an increase in the intensity of contact 6910 above the respective intensity threshold (e.g., $IT_L$), while cursor 6904 is located over portion 6902-1.

In response to detecting (7018) the increase in intensity of the contact on the touch-sensitive surface above the respective intensity threshold (e.g., $IT_L$), the device ceases (7020) to display the first portion of the first content, and displays (7022) a first portion of the second content that corresponds to the first portion of the first content. For example, in FIGS. 14A-14C, in response to detecting the increase in the intensity of contact 6906 above the respective intensity threshold (e.g., $IT_L$), the device ceases to display portion 6902-1 (FIGS. 14A and 14B) and displays portion 6908-1 (FIG. 14C), which corresponds to portion 6902-1. In FIGS. 14G-14I, in response to detecting the increase in the intensity of contact 6910 above the respective intensity threshold (e.g., $IT_L$), the device ceases to display portion 6902-1 (FIG. 14G) and displays portion 6908-1 (FIG. 14I).

In some embodiments, prior to displaying the first portion of the second content (7004), the device detects (7006) an increase in intensity of the contact from a first intensity below the respective intensity threshold (e.g., $IT_L$) to a second intensity below the respective intensity threshold (e.g., $IT_L$). In response to detecting (7008) the increase in intensity of the contact to the second intensity below the respective intensity threshold (e.g., $IT_L$), in accordance with a determination that the second intensity is below a transition-initiation intensity threshold (e.g., $IT_1$), the device continues (7010) to display the first portion of the first content without displaying the first portion of the second content; and in accordance with a determination that the intensity of the contact is above the transition-initiation intensity threshold (e.g., $IT_1$), the device displays (7012) a reduced opacity version of the first portion of the first content overlaid over the first portion of the second content. In some embodiments, the opacity of the first portion of the first content decreases with increasing intensity up to the respective threshold. As shown in FIGS. 14F-14G, for example, prior to displaying portion 6908-1, the device detects an increase in the intensity of contact 6910 to intensities below the respective intensity threshold (e.g., $IT_L$). In accordance with a determination that the new intensity is below the transition-initiation intensity threshold $IT_1$, as shown in FIG. 14G, the device continues to display portion 6902-1, without displaying portion 6908-1. In contrast, in accordance with a determination that the new intensity is above the transition-initiation intensity threshold $IT_1$, as shown in FIG. 14H, the device displays a reduced-opacity version of portion 6902-1 overlaid over portion 6908-1.

In some embodiments, the size (e.g., area) of the first portion of the first content (and the corresponding first portion of the second content) is determined (7016) based on an intensity of the contact. After displaying (7028) the first portion of the second content, the device detects (7030) an increase in the intensity of the contact, and in response to detecting an increase in intensity of the contact, increases (7032) the size of the first portion of the second content (and the corresponding first portion of the first content). For example, in FIGS. 14C-14E, after displaying portion 6908-1, the device detects an increase in the intensity of contact 6906. In response to detecting the increase in intensity, the device increases the size of portion 6902-1 (in the background), and the size of portion 6908-1 to match the new size of portion 6902-1, as shown in FIG. 14E.

In some embodiments, the first content includes (7024) an image of a location (e.g., a physical location) at a first time, the second content includes an image of the location at a second time distinct from the first time, and the first portion of the first content and the first portion of the second content correspond to a same portion of the location. For example, content 6902 includes an image of a location at a first time, and content 6908 includes an image of the location at a second time different from the first time. Portion 6902-1 corresponds to portion 6908-1; they show the same portion of the location at different times.

In some embodiments, the first content includes (7026) a first map of a location (e.g., a physical location), the second content includes a second map of the location, where the first map is different from the second map, and the first portion of the first content and the first portion of the second content correspond to a same portion of the location. For example, the first map includes different map features from the map features included in the second map (e.g., a 1902 map of San Francisco instead of a 2012 map of San Francisco or a street map of San Francisco overlaid over a public transit map of San Francisco). For example, content 6902 includes a map of a first type (e.g., street map) of a location, and content 6908 includes a map of a second type (e.g., public transit map) different from the first type, of the location. Portion 6902-1 corresponds to portion 6908-1; they show different map types for the same portion of the location.

In some embodiments, after displaying (7028) the first portion of the second content, the device detects (7034) movement of the contact. In response to detecting (7036) movement of the contact, the device moves (7038) the focus selector over a second portion of the first content, ceases (7040) to display the second portion of the first content, and displays (7042) a second portion of the second content that corresponds to the second portion of the first content (e.g., the "revealed" area of the second content moves in accordance with movement of the contact on the touch-sensitive surface). For example, in FIGS. 14J-14L, after displaying portion 6908-1, the device detects movement 6912 of contact 6910 on touch-sensitive surface 451. In response to detecting the movement 6912 of contact 6910, the device moves cursor 6904 on display 450 and then ceases to display portion 6902-2 and displays portion 6908-2 which are portions of the first content 6902 and second content 6908 that correspond to the new location of cursor 6904 on display 450.

In some embodiments, the second portion of the first content at least partially overlaps the first portion of the first content (7044). In some embodiments, the second portion of the second content at least partially overlaps the first portion of the second content (e.g., the "revealed" area of the second content changes smoothly in accordance with movement of the contact, so that as a row of pixels is revealed on the right edge of the "revealed" area, a corresponding row of pixels ceases to be revealed on the left edge of the "revealed" area). For example, as shown in FIG. 14K, portions 6902-1 and 6902-2 overlap.

It should be understood that the particular order in which the operations in FIGS. 15A-15C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 7000 described above with respect to FIGS. 15A-15C. For example, the contacts, intensity thresholds, and focus selectors described above with reference to method 7000 optionally have one or more of the characteristics of the contacts, intensity thresholds, and focus selectors described herein with reference to other methods described herein (e.g., those listed in the fifth paragraph of the Description of Embodiments). For brevity, these details are not repeated here.

Figure 16:
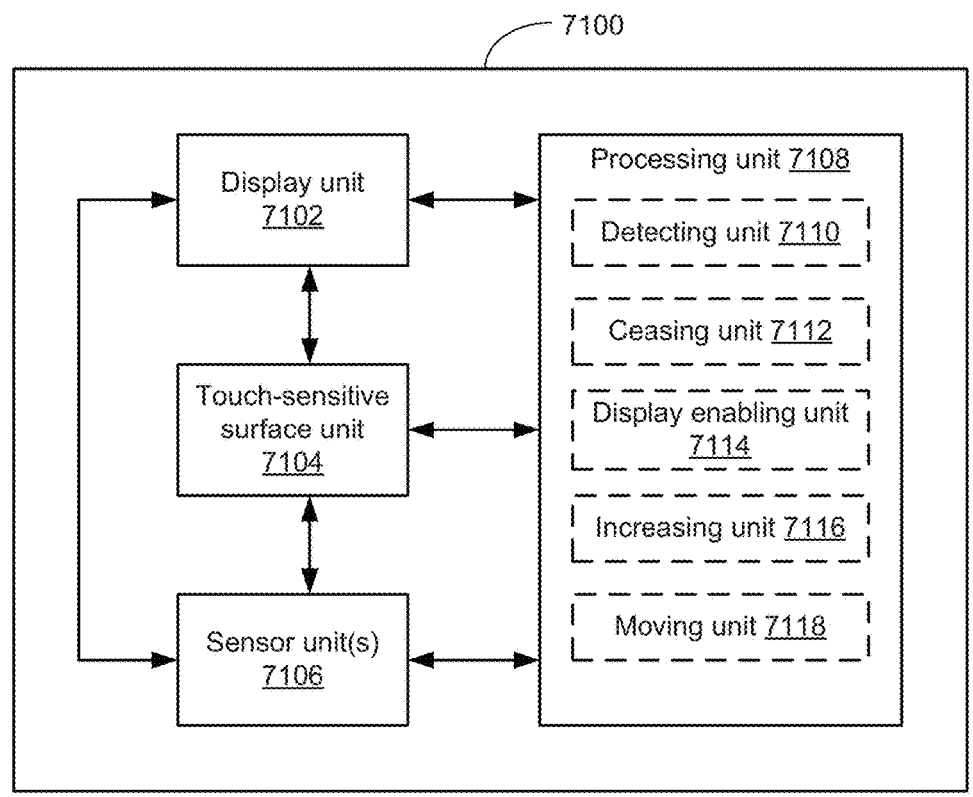
FIG. 16 is a functional block diagram of an electronic device in accordance with some embodiments.

In accordance with some embodiments, FIG. 16 shows a functional block diagram of an electronic device 7100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein.

As shown in FIG. 16, an electronic device 7100 includes a display unit 7102 configured to display, on the display unit 7102, first content, where portions of the first content are correlated with corresponding portions of second content that are not displayed on the display unit 7102; a touch-sensitive surface unit 7104 configured to receive contacts; one or more sensors 7106 configured to detect intensity of contacts with the touch-sensitive surface unit 7104; and a processing unit 7108 coupled to the display unit 7102, the touch-sensitive surface unit 7104, and the sensors 7106. In some embodiments, the processing unit 7108 includes a detecting unit 7110, a ceasing unit 7112, a display enabling unit 7114, an increasing unit 7116, and a moving unit 7118.

The processing unit 7108 is configured to: while a focus selector is over a first portion of the first content, detect an increase in intensity (e.g., with the detecting unit 7110) of a contact on the touch-sensitive surface unit 7104 above a respective intensity threshold (e.g., $IT_L$); and in response to detecting the increase in intensity of the contact on the touch-sensitive surface unit 7104 above the respective intensity threshold: cease to display the first portion of the first content (e.g., with the ceasing unit 7112), and enable display of a first portion of the second content that corresponds to the first portion of the first content (e.g., with the display enabling unit 7114).

In some embodiments, the size of the first portion of the first content is determined based on an intensity of the contact; and the processing unit 7108 is configured to, after enabling display of the first portion of the second content: detect an increase in the intensity of the contact (e.g., with the detecting unit 7110), and in response to detecting an increase in intensity of the contact, increase the size of the first portion of the second content (e.g., with the increasing unit 7116).

In some embodiments, the processing unit 7108 is configured to, prior to enabling display of the first portion of the second content: detect an increase in intensity of the contact from a first intensity below the respective intensity threshold to a second intensity below the respective intensity threshold (e.g., with the detecting unit 7110); and in response to detecting the increase in intensity of the contact to the second intensity below the respective intensity threshold: in accordance with a determination that the second intensity is below a transition-initiation intensity, continue to enable display of the first portion of the first content without enabling display of the first portion of the second content (e.g., with the display enabling unit 7114); and in accordance with a determination that the intensity of the contact is above the transition-initiation intensity threshold (e.g., $IT_1$), enable display of a reduced opacity version of the first portion of the first content overlaid over the first portion of the second content (e.g., with the display enabling unit 7114).

In some embodiments, the processing unit 7108 is configured to, after enabling display of the first portion of the second content: detect movement of the contact (e.g., with the detecting unit 7110); and in response to detecting movement of the contact: move the focus selector over a second portion of the first content (e.g., with the moving unit 7118); cease to enable display of the second portion of the first content (e.g., with the ceasing unit 7112); and enable display of a second portion of the second content that corresponds to the second portion of the first content (e.g., with the display enabling unit 7114).

In some embodiments, the second portion of the first content at least partially overlaps the first portion of the first content.

In some embodiments, the first content includes an image of a location at a first time, the second content includes an image of the location at a second time distinct from the first time, and the first portion of the first content and the first portion of the second content correspond to a same portion of the location.

In some embodiments, the first content includes a first map of a location, the second content includes a second map of the location, where the first map is different from the second map, and the first portion of the first content and the first portion of the second content correspond to a same portion of the location.

The operations in the information processing methods described above are, optionally, implemented by running one or more functional modules in information processing apparatus such as general purpose processors (e.g., as described above with respect to FIGS. 1A and 3) or application specific chips.

The operations described above with reference to FIGS. 15A-15C are, optionally, implemented by components depicted in FIGS. 1A-1B or FIG. 16. For example, detection operation 7014, ceasing operation 7020, and displaying operation 7022 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Navigating Between Displayed User Interfaces

Many electronic devices include user interfaces that include different representations of a same object (e.g., content such as an email or photo). In some situations the different representations of the same object are organized into a hierarchy (e.g., a conversation including multiple messages or a photo album including multiple photos). Such groupings require convenient methods for navigating between user interfaces corresponding to levels of the hierarchy. Some methods for navigating between user interfaces on a device with a touch-sensitive surface typically require a user to locate an affordance (e.g., a key or a "button"). Such methods, however, are problematic because they are prone to inaccuracies (e.g., accidental selection of the affordance, accidental selection of a different key when intending to select the affordance). Such methods also increase the cognitive burden on the user by requiring additional independent gestures. The embodiments described below provide a convenient and intuitive method for navigating between user interfaces corresponding to different representations of an object using similar gestures performed with a contact while a focus selector is over a representation of the object. In the embodiments described below, an improved method is provided for navigating between a first user interface that includes, at least, a first representation of an object and a second user interface that includes, at least, a second representation of the object. While displaying the first user interface, when the device detects a gesture that meets certain navigation criteria for the object, the device replaces the first user interface with the second user interface. While displaying the second user interface, when the device detects a gesture that meets certain navigation criteria, the device replaces the second user interface with the first user interface.

FIGS. 17A-17H illustrate exemplary user interfaces for navigating between displayed user interfaces in accordance with some embodiments. The user interfaces in these figures are used to illustrate the processes described below, including the processes in FIGS. 18A-18C. FIGS. 17A-17H include intensity diagrams that show the current intensity of the contact on the touch-sensitive surface relative to a plurality of intensity thresholds including a respective threshold (e.g., "$IT_L$"). In some embodiments, operations similar to those described below with reference to "$IT_L$" are performed with reference to a different intensity threshold (e.g., "$IT_D$").

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 17A-17H and 18A-18C will be discussed with reference to a touch screen 112, however analogous operations are, optionally, performed on a device with a display 450 and a separate touch-sensitive surface 451 in response to detecting the contacts described in FIGS. 17A-17H on the touch-sensitive surface 451 while displaying the user interfaces shown in FIGS. 17A-17H on the display 450; in such embodiments, the focus selector is, optionally a cursor or pointer that is displayed at a location corresponding to (e.g., at or near) the location of the contacts (e.g., 8406, 8410 and 8412) shown in FIGS. 17A-17H.

Figure 17A:
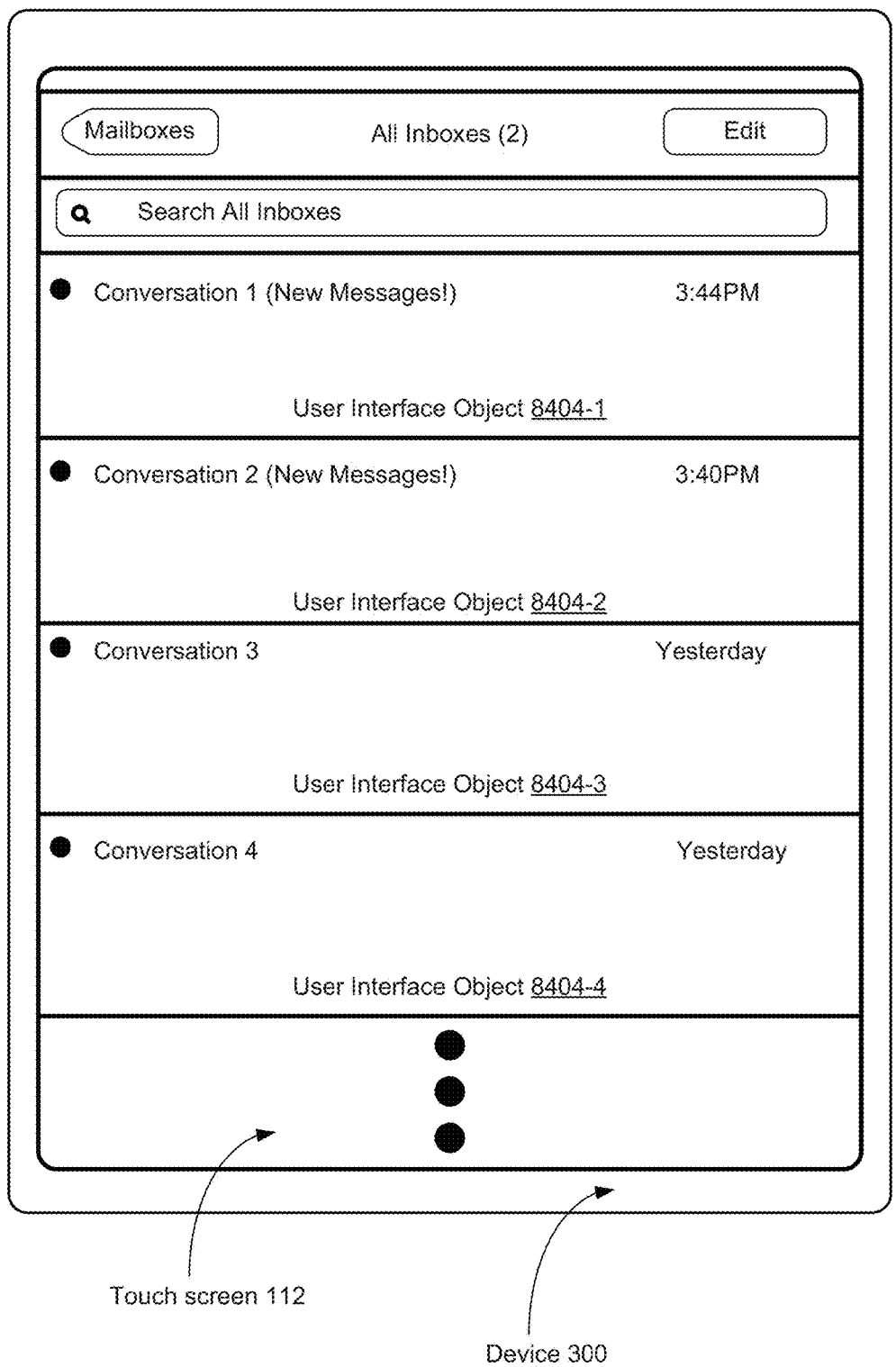
FIGS. 17A-17H illustrate exemplary user interfaces for navigating between displayed user interfaces in accordance with some embodiments.

FIG. 17A illustrates an exemplary user interface (e.g., a first user interface) on an electronic device 300 with a touch screen display 112, which is replaced in response to particular gestures, described below, with a second user interface, distinct from the first, that is currently not displayed in FIG. 17A. In some embodiments, the device displays representations of objects (e.g., media objects such as songs, pictures, and/or electronic documents). In some embodiments, some or all of the objects are electronic messages (e.g., electronic mail messages, SMS messages, instant messages, etc.) or groupings of messages (e.g., conversations). In some embodiments, the device displays a list with a plurality of entries, and the entries are the representations of the objects. The example shown in FIG. 17A illustrates a displayed list of representations of conversations (user interface objects 8404-1 through 8404-4 represent, respectively, conversations 1-4). Each conversation contains one or more messages. In some circumstances, it is desirable to change the display shown in FIG. 17A to a different display that includes a list of messages within a particular conversation (e.g., navigate from an inbox view to a conversation view). FIGS. 17A-17H illustrate examples of improved user interfaces for navigating between, for example, these different views.

Figure 17B:
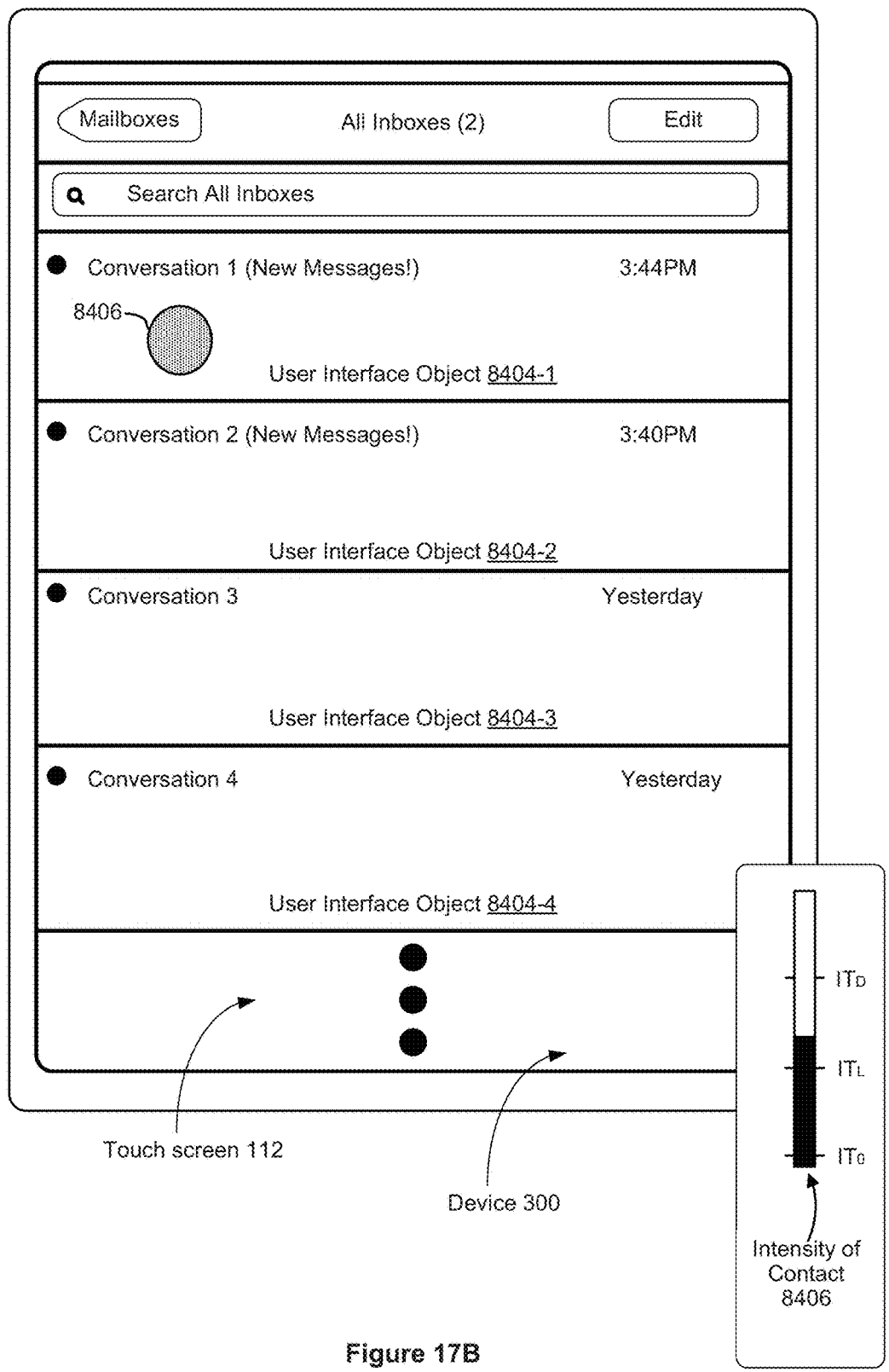
Figure 18A:
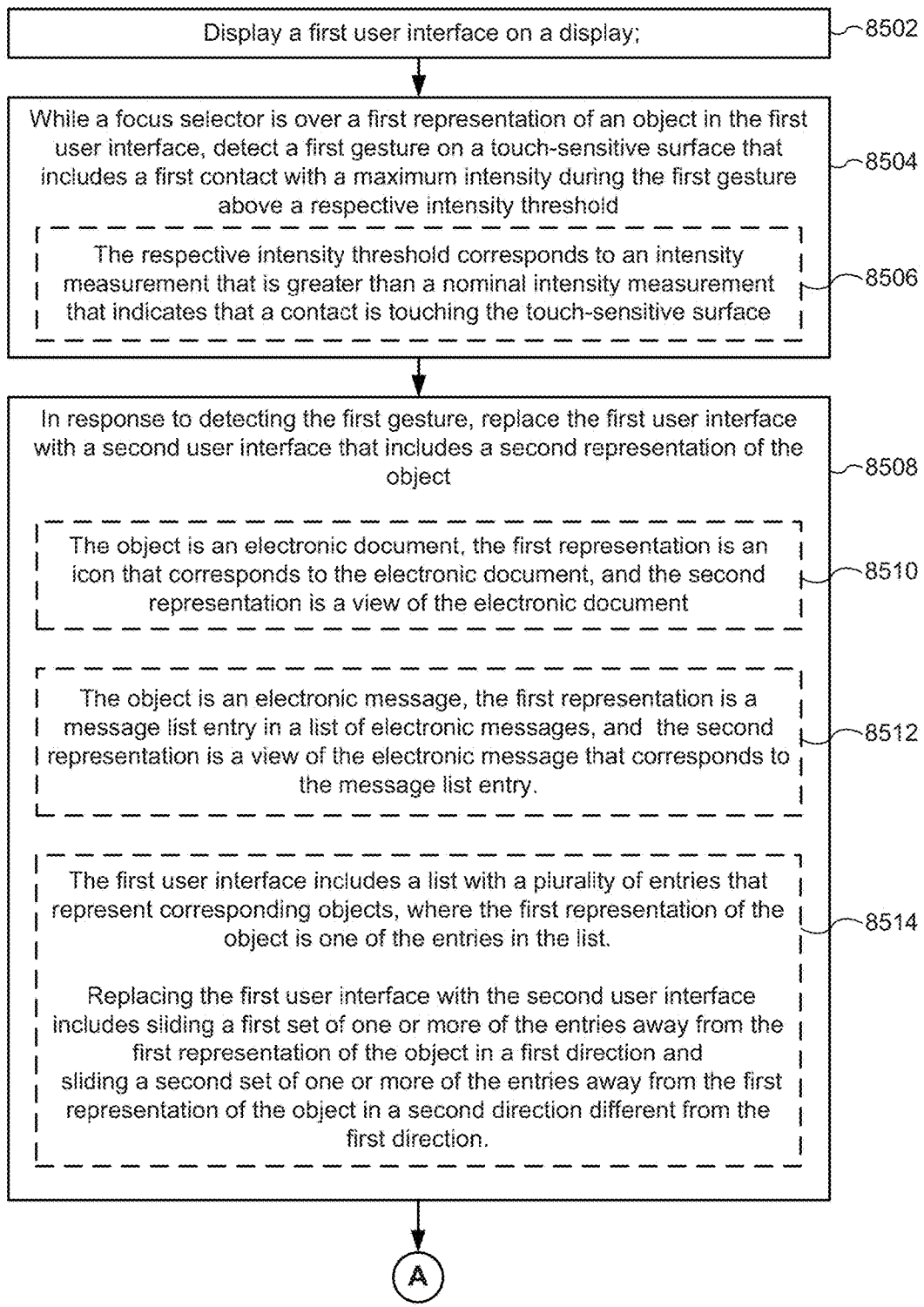
FIGS. 18A-18C are flow diagrams illustrating a method of navigating between displayed user interfaces in accordance with some embodiments.
Figure 18B:
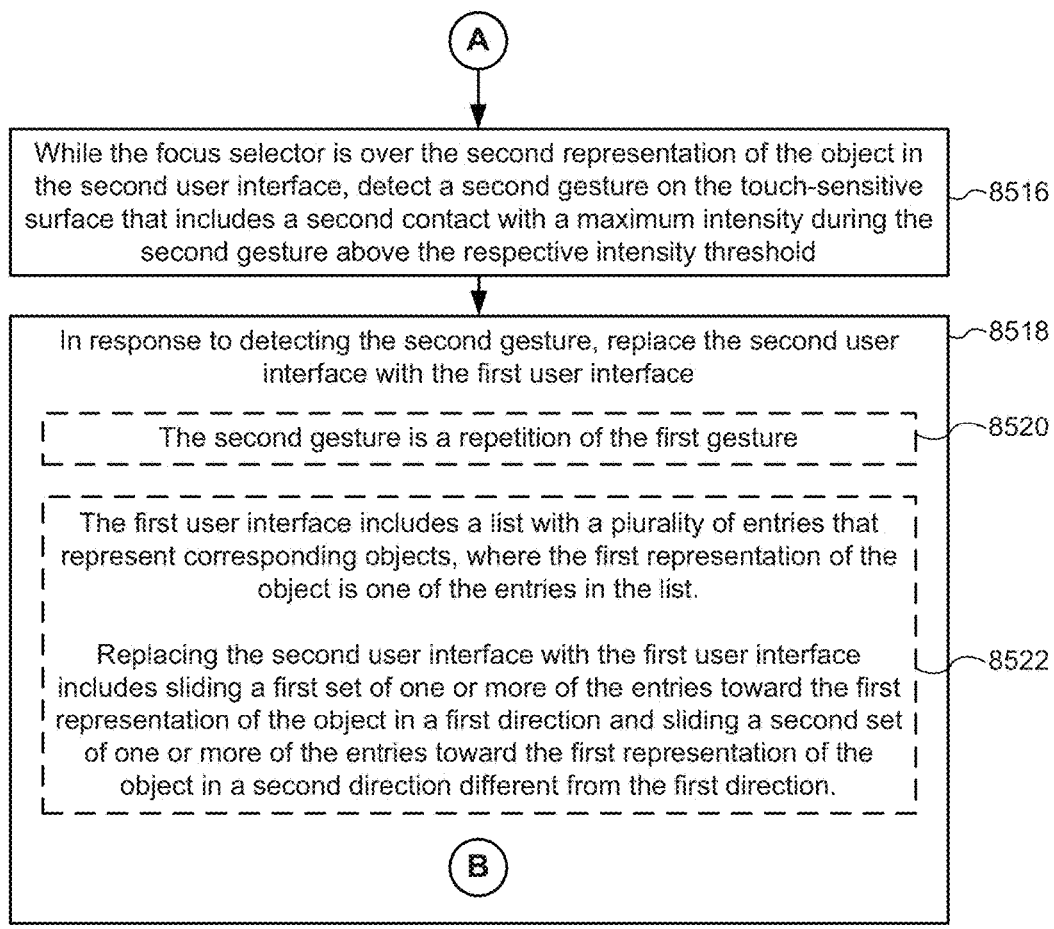
Figure 18C:
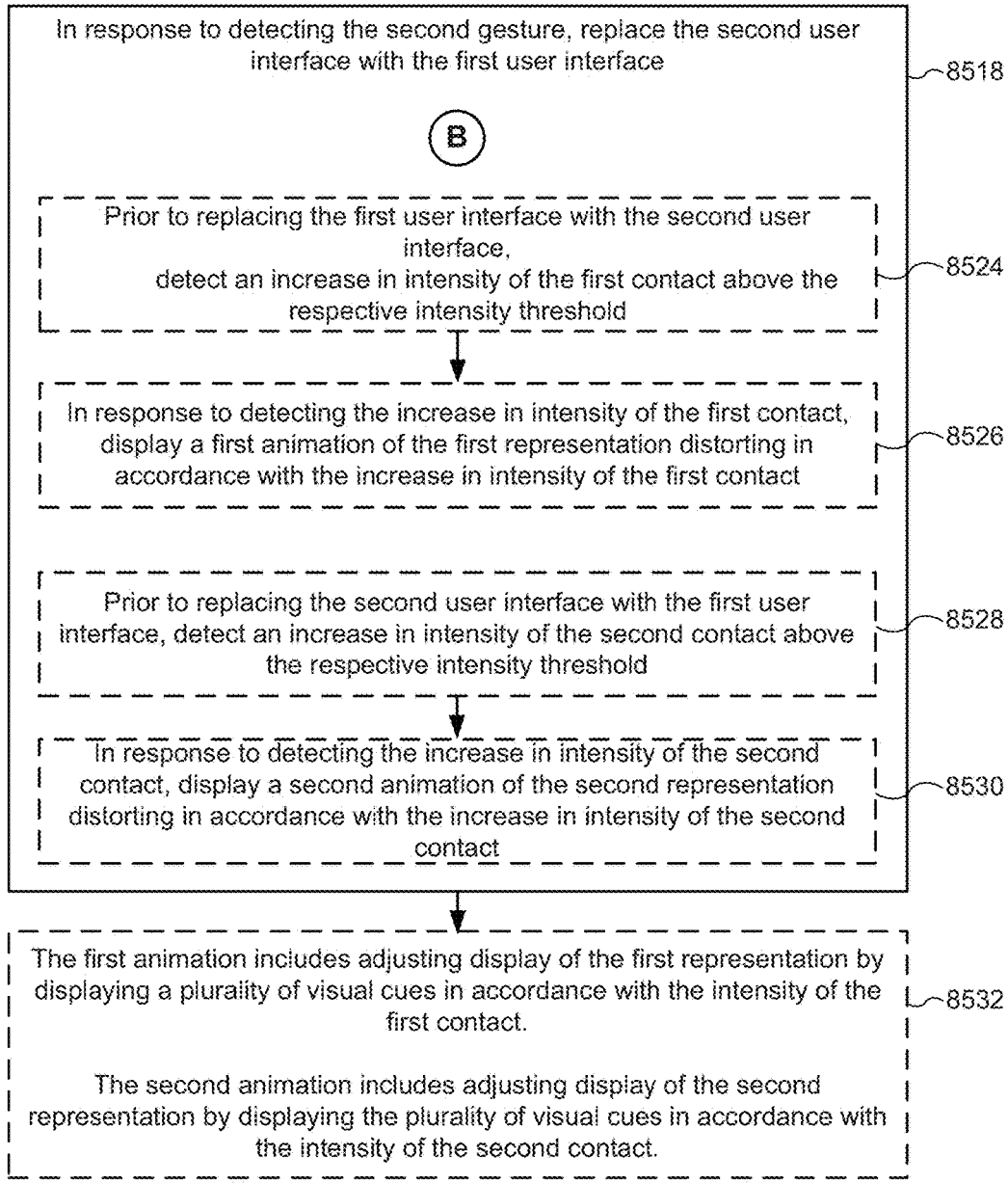

FIG. 17B illustrates detection of a contact 8406 while a focus selector is over user interface object 8404-1. In some embodiments, contact 8406 is part of a gesture that optionally includes, for example, other movements and press inputs on the touch-sensitive surface.

In some embodiments, when navigation criteria are met, the device displays a second user interface. In some embodiments, the navigation criteria include that the gesture has a maximum intensity above the respective intensity threshold (e.g., an intensity threshold that is greater than a nominal intensity measurement that indicates that a contact is touching the touch-sensitive surface, such as $IT_L$, which is greater than contact detection intensity threshold $IT_0$), as shown with contact 8406 in FIG. 17B. In some embodiments, navigation criteria include that, while the focus selector (e.g., while the gesture) is continuously over a representation of an object, an increase in intensity is detected from below the respective intensity threshold (e.g., $IT_L$) to above the respective intensity threshold (e.g., a "down-stroke" is detected). In some embodiments, navigation criteria include that, while the focus selector is continuously over a representation of an object, a decrease in intensity is detected from above the respective intensity threshold (e.g., $IT_L$) to below the respective intensity threshold (e.g., a "up-stroke" is detected). In some embodiments, navigation criteria include that, while the focus selector is continuously over a representation of an object, an increase in intensity is detected from below the respective intensity threshold (e.g., $IT_L$) to above the respective intensity threshold (e.g., $IT_L$), and subsequently a decrease in intensity is detected from above the respective intensity threshold (e.g., $IT_L$) to below the respective intensity threshold (e.g., both an up-stroke and a down-stroke are detected without leaving the representation).

FIGS. 17A-17H illustrate examples in which detecting a contact having a maximum intensity above $IT_L$ while the focus selector is over a particular representation of an object is sufficient to meet the navigation criteria. Contact 8406 therefore fulfills the criteria. Thus, contact 8406 in FIG. 17B will initiate display of the second user interface. It will be apparent to those with skill in the art, however, that other additional and/or alternative criteria are, optionally, used in place or in combination with the criteria described herein.

Figure 17C:
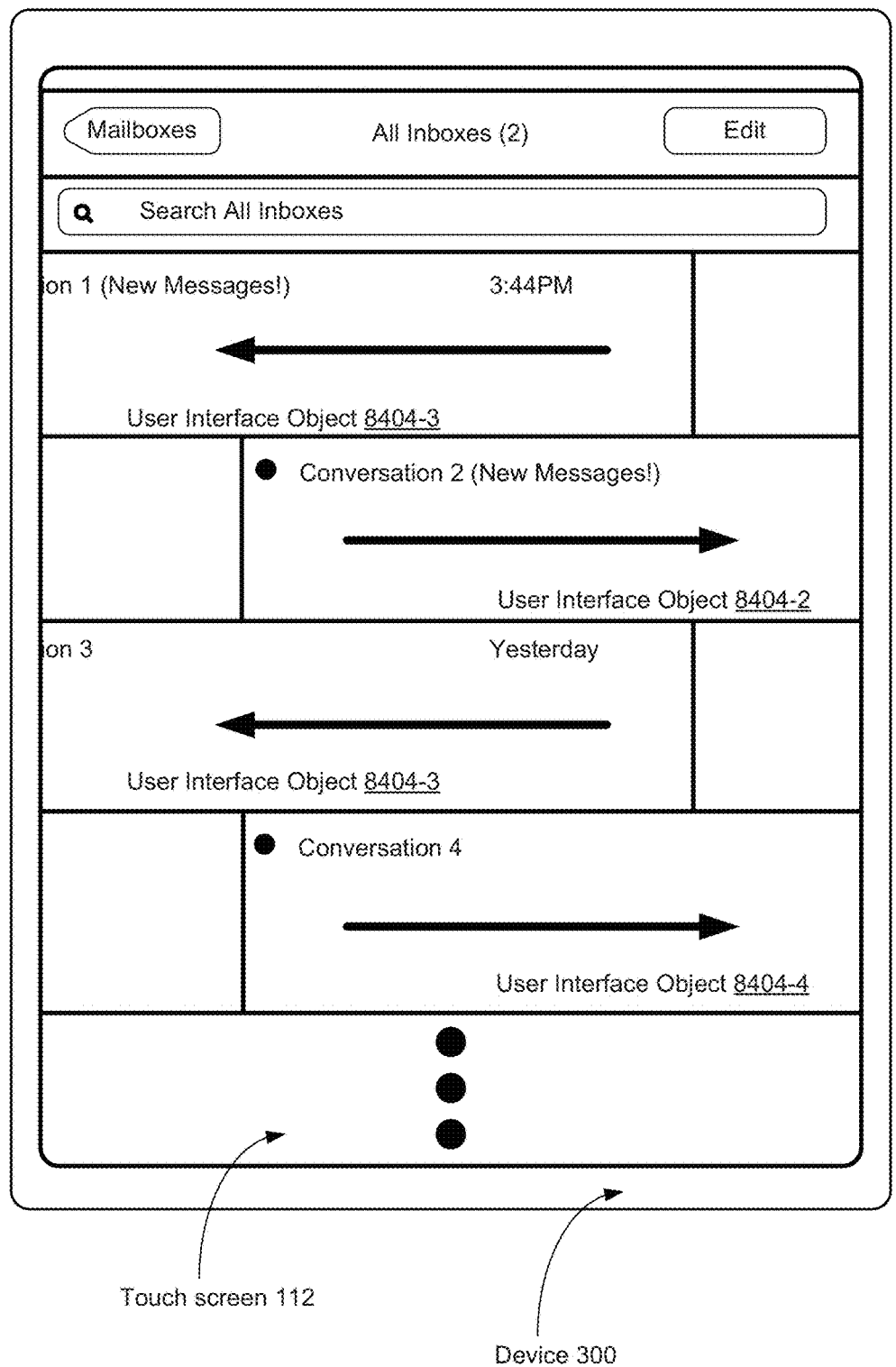

In some embodiments, the device optionally displays an animated transition between the first user interface and the second user interface. FIG. 17C illustrates an example of such a transition. In the illustrated example, a first set of messages (e.g., user interface object 8404-1 and 8404-3) slides out of the way in one direction, and a second set of messages (e.g., user interface object 8404-2 and 8404-4) slides out of the way in the opposite direction, thereby revealing the second user interface (e.g., a conversation view) "beneath" the first user interface.

Figure 17D:
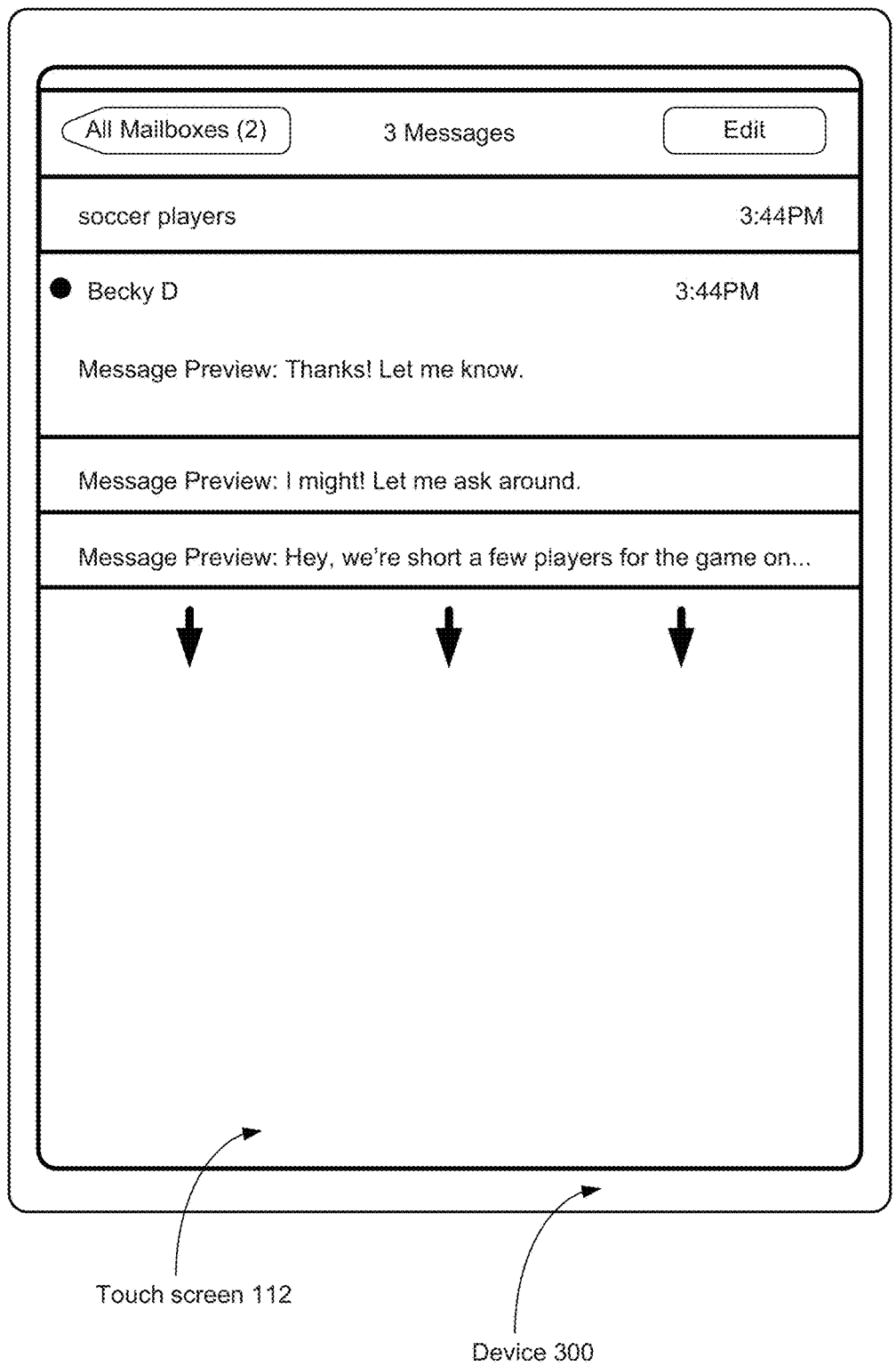

FIG. 17D illustrates an example of an animation in accordance with embodiments in which the animation includes visual cues indicating that a particular representation is expanding to become a corresponding document, message, or list of messages. FIG. 17D illustrates an example of a selected conversation expanding to reveal a list of messages corresponding to the selected conversation. In some embodiments, an "expanding messages" animation, such as the animation illustrated in FIG. 17D, follows a "sliding messages" animation (e.g., such as the animation illustrated in FIG. 17C). In some embodiments, the expanding messages animation or the sliding message animation occur independently of one another. In addition, it is envisioned that any number of possible animations are, optionally, utilized and that different animations for different types of objects and/or different circumstances are sometimes appropriate. An additional specific example of an animation, a "trampoline" animation, is described with respect to method 8500 in FIGS. 18A-18C.

Figure 17E:
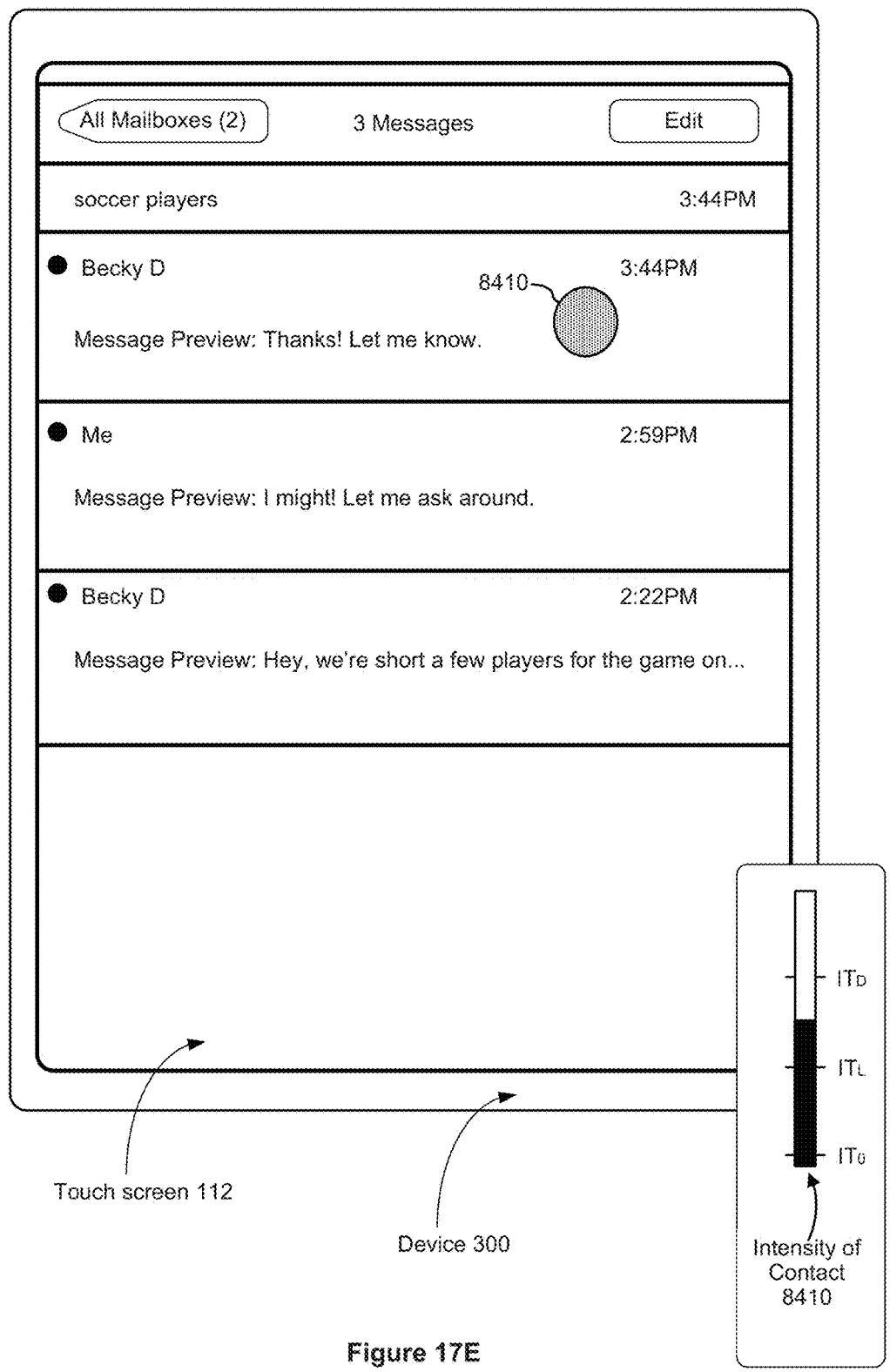

FIG. 17E illustrates the result of navigating from the first user interface, in FIG. 17B, to a second user interface. In particular, FIG. 17E illustrates that the user has now navigated to a conversation view. In addition, FIG. 17E illustrates a contact 8410 that is included in a gesture and meets navigation criteria.

In some embodiments, since the conversation view is an example of a user interface that is not on either extreme of a hierarchy of user interfaces (for example, a user could up-navigate in the hierarchy to return to the inbox view or down-navigate in the hierarchy to view an individual message), the device is configured to respond separately to up-navigation criteria and down-navigation criteria. For example, in some embodiments, the up-navigation criteria include that the gesture include a deep press (e.g., a press input with an intensity above the deep press intensity threshold, $IT_D$) whereas the down-navigation criteria include that the gesture has a maximum intensity between $IT_L$ and $IT_D$. In some embodiments, the down-navigation criteria include that the gesture include a deep press (e.g., a press input with an intensity above the deep press intensity threshold, $IT_D$) whereas the up-navigation criteria include that the gesture has a maximum intensity between $IT_L$ and $IT_D$. In some embodiments, other gestures, movements, gestures with multiple fingers, or a combination of light and deep press inputs are used separately and/or in combination to distinguish between up-navigation and down-navigation inputs.

For the purposes of providing an example, it is assumed that the gesture that includes contact 8410 in FIG. 17E is a down-navigation input. In some embodiments, an animation is displayed that is either the same as, or different than, the animation displayed in the previously described transition (e.g., from the inbox view to the conversation view with reference to FIGS. 17B-17E).

Figure 17F:
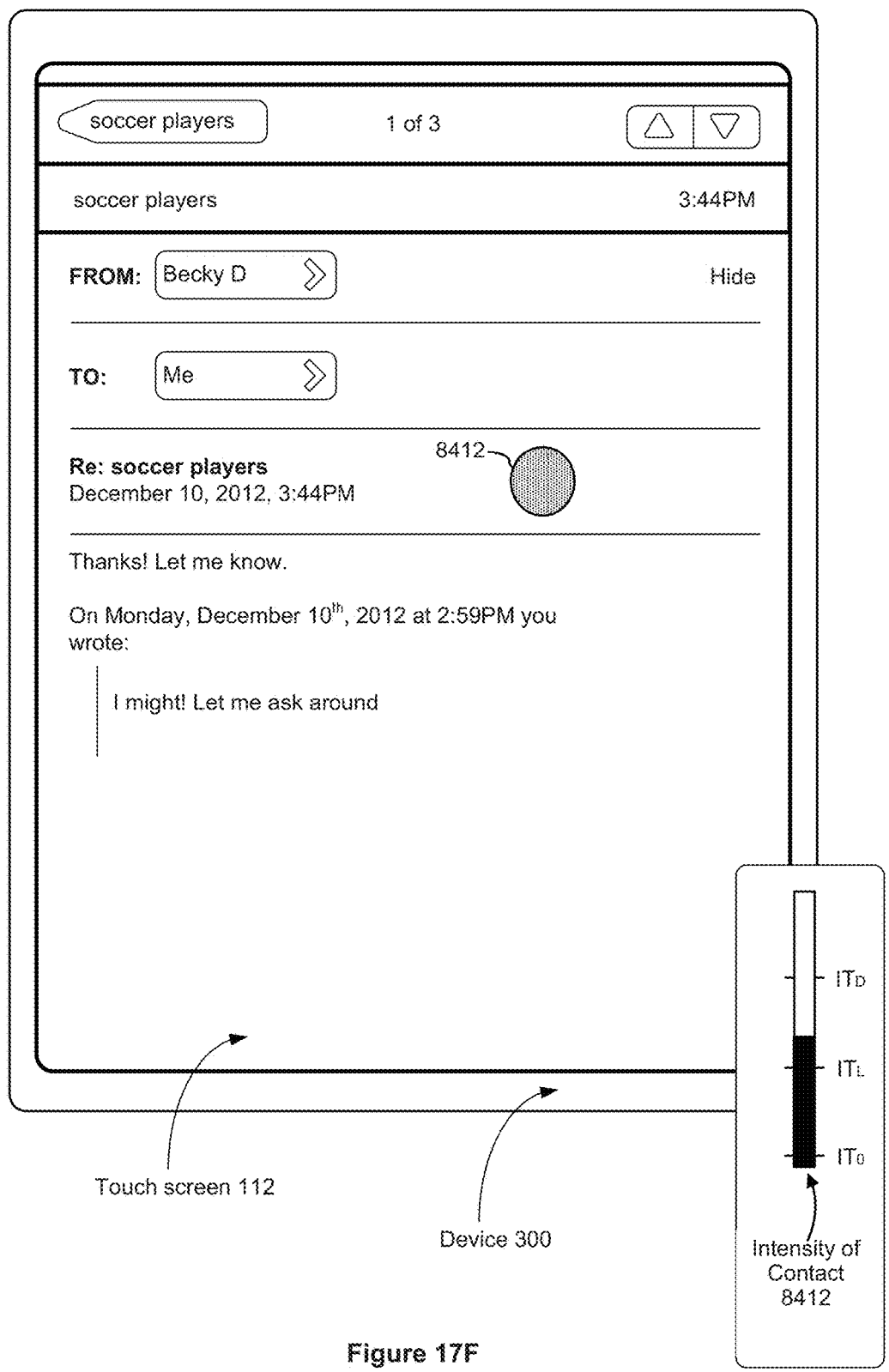

FIG. 17F continues the example by illustrating that contact 8410 in FIG. 17E (by virtue of meeting navigation criteria and/or up-navigation criteria) has caused the device to respond by displaying a third user interface (namely, a message view). FIG. 17F includes a contact 8412. In this example, a gesture that includes contact 8412 meets up-navigation criteria at least by virtue of a having a maximum intensity above $IT_L$.

Figure 17G:
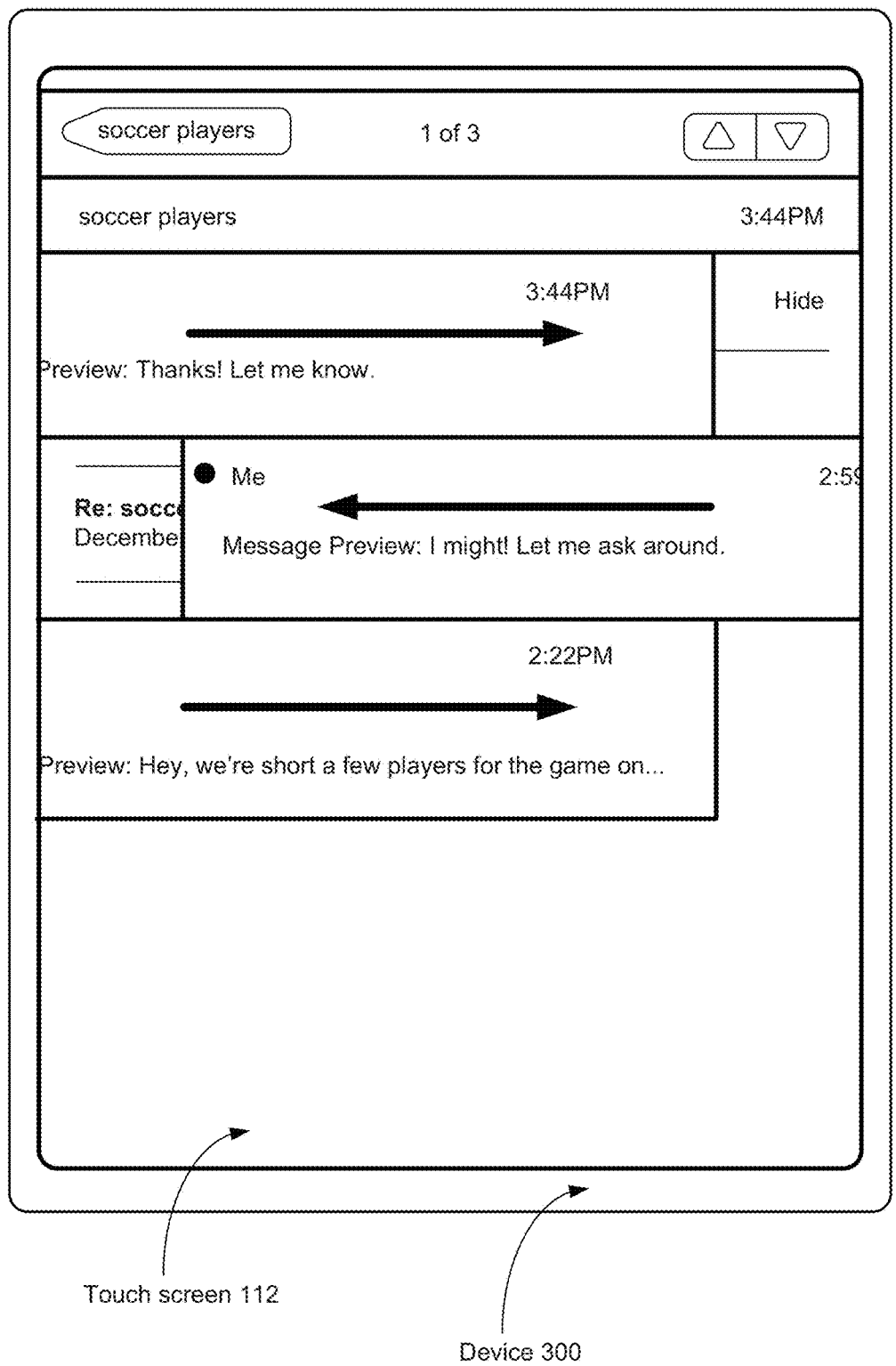

FIG. 17G illustrates an example of some embodiments in which the device displays an animation of a first set of messages "sliding in" from a first direction and a second set of messages "sliding in" from a second direction (e.g., the opposite direction), thereby "covering up" the previously displayed message and returning to the second user interface (or in some cases, the first user interface).

Figure 17H:
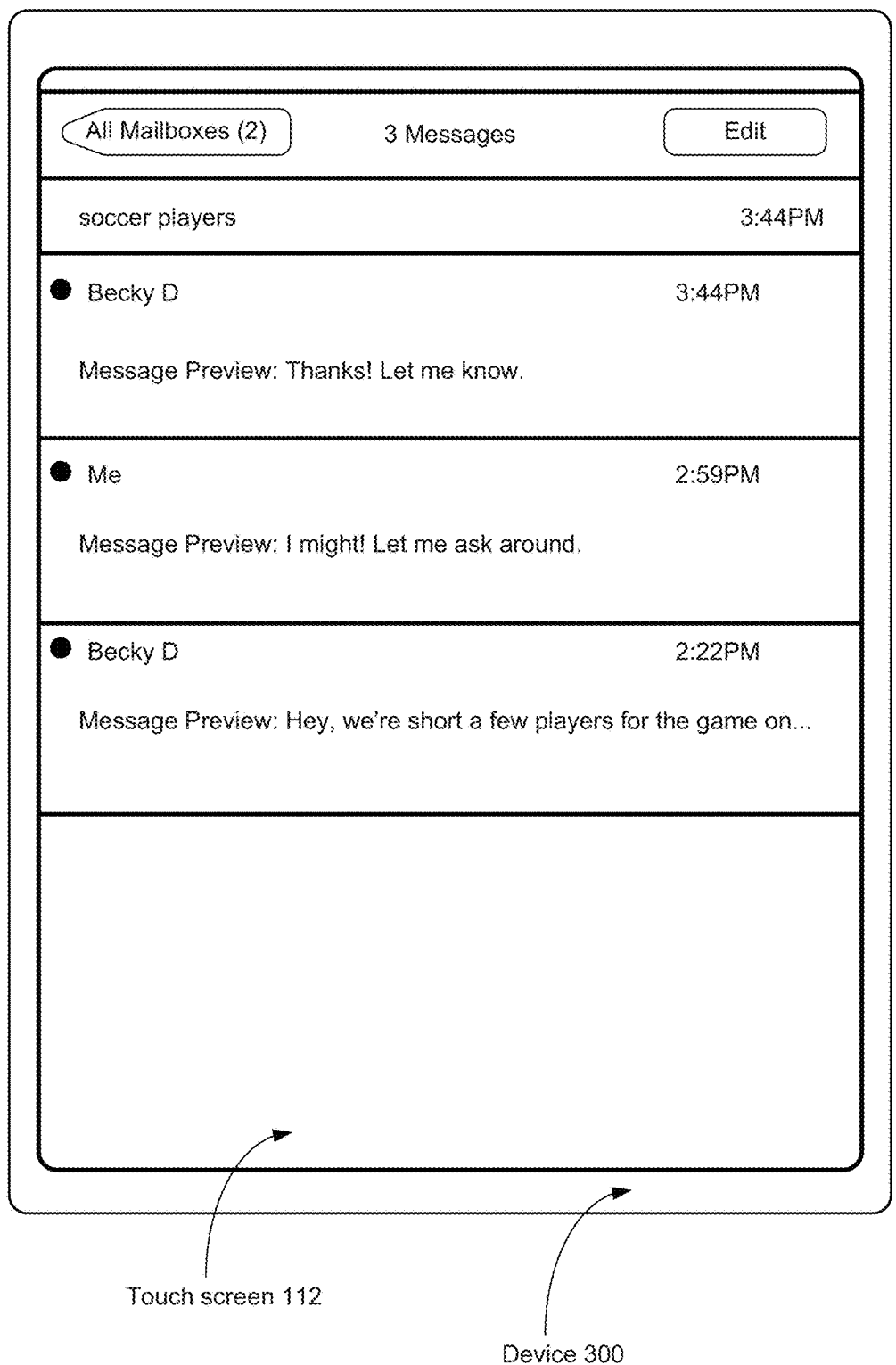

FIG. 17H illustrates the result of up-navigating from the message view shown in FIG. 17F. In this example, the conversation view is once again displayed.

FIGS. 18A-18C are flow diagrams illustrating a method 8500 of navigating between displayed user interfaces in accordance with some embodiments. The method 8500 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 8500 are, optionally, combined and/or the order of some operations is, optionally, changed.

As described below, the method 8500 provides an intuitive way to navigate between displayed user interfaces. The method reduces the cognitive burden on a user when navigating between displayed user interfaces, thereby creating a more efficient human-machine interface. For battery-operated electronic devices, enabling a user to navigating between displayed user interfaces faster and more efficiently conserves power and increases the time between battery charges.

The device displays (8502) a first user interface on a display (e.g., inbox view, FIG. 17A). While a focus selector is over a first representation of an object in the first user interface (e.g., user interface object 8404-1, FIG. 17B), the device detects (8504) a first gesture on a touch-sensitive surface that includes a first contact with a maximum intensity during the first gesture above a respective intensity threshold (e.g., contact 8406, FIG. 17B).

In some embodiments, the respective intensity threshold (e.g., $IT_L$) corresponds (8506) to an intensity measurement that is greater than a nominal intensity measurement (e.g., $IT_0$) that indicates that a contact is touching the touch-sensitive surface. In some embodiments, when the one or more sensors used to detect contact intensity (e.g., "intensity sensors") are capable of measuring 4 or more quantized values of intensity, where N is the lowest quantized value of intensity (e.g., the value of intensity that corresponds to the presence of a contact on the touch-sensitive surface), the respective intensity threshold is at least one level above N. For example if there are 4 quantized values of intensity and 1 is the lowest level, then the respective intensity threshold is 2, or a level greater than 2. As another example, if there are 256 quantized values of intensity and 1 is the lowest level, then the respective intensity threshold is 2, or a level greater than 2, such as 5, 10 or 15.

In response to detecting the first gesture, the device replaces (8508) the first user interface with a second user interface that includes a second representation of the object (e.g., conversation view, FIG. 17E or message view, FIG. 17F).

In some embodiments, the object is (8510) an electronic document (e.g., a word processing document, a spreadsheet document, a presentation document or a PDF), the first representation is an icon that corresponds to the electronic document, and the second representation is a view of the electronic document (e.g., an application window for viewing and/or responding to the electronic document, a document editing user interface for editing the electronic document or another interface for interacting with the electronic document).

In some embodiments, the object is (8512) an electronic message (e.g., an email, text message, instant message, or SMS, MMS, or a social networking message), the first representation is a message list entry in a list of electronic messages (e.g., a representation of an email in an inbox, such as user interface object 8404-1, FIG. 17A), and the second representation is a view of the electronic message that corresponds to the message list entry (e.g., message view, FIG. 17F). While many of the embodiments described herein are illustrated with the example of a conversation/message hierarchy, where the first representation of the object is a representation of a message within a conversation and the second representation of the object is a view of the full message, the principles described herein are applicable in an analogous manner to items in other hierarchies. In particular, the object could be another hierarchical item such as a discussion thread (e.g., with a first representation of a top-level discussion and a second representation of a sub-discussion), an album (e.g., with a first representation of a song in an album view and a second expanded representation of the song), or a news story (e.g., with a first representation as a headline with associated summary or image and a second representation with the full news story).

In some embodiments, the first user interface includes (8514) a list with a plurality of entries that represent corresponding objects (for example, the list of electronic messages described with reference to operation 8512, or, alternatively, a list of songs in an album, etc.), where the first representation of the object is one of the entries in the list, and replacing the first user interface with the second user interface includes sliding a first set of one or more of the entries away from the first representation of the object in a first direction and sliding a second set of one or more of the entries away from the first representation of the object in a second direction different from the first direction. In some embodiments, replacing the first user interface with the second user interface further includes displaying an animation of the first representation (a list entry) expanding to become the corresponding document or message (e.g., message list expanding, FIG. 17D). In some embodiments, the first direction is to the right and the second direction is to the left, or vice versa. In some embodiments, the first direction is up and the second direction is down, or vice versa.

While the focus selector is over the second representation of the object in the second user interface, the device detects (8516) a second gesture on the touch-sensitive surface that includes a second contact with a maximum intensity during the second gesture above the respective intensity threshold (e.g., contact 8412, FIG. 17F). In response to detecting the second gesture, the device replaces (8518) the second user interface with the first user interface (e.g., displaying the conversation view, FIG. 17G).

In some embodiments, the second gesture is (8520) a repetition of the first gesture (e.g., the second gesture includes the same basic movement and/or intensity change components as the first gesture, although the second gesture occurs at a later time).

In some embodiments, the first user interface includes (8522) a list with a plurality of entries that represent corresponding objects, where the first representation of the object is one of the entries in the list, and replacing the second user interface with the first user interface includes sliding a first set of one or more of the entries toward the first representation of the object in a first direction and sliding a second set of one or more of the entries toward the first representation of the object in a second direction different from the first direction (e.g., sliding list entries in, FIG. 17G). In some embodiments, replacing the second user interface with the first user interface further includes displaying an animation of the document or message collapsing to become the corresponding first representation (a list entry).

In some embodiments, prior to replacing the first user interface with the second user interface, the device detects (8524) an increase in intensity of the first contact above the respective intensity threshold. In response to detecting the increase in intensity of the first contact, the device displays (8526) a first animation of the first representation distorting (e.g., stretching backwards into the display like a trampoline with a weight placed on it) in accordance with the increase in intensity of the first contact. In some embodiments, the first user interface is replaced with the second user interface in response to detecting a decrease in intensity and/or liftoff of the first contact and includes displaying an animation of a reverse of the distortion of the first representation (e.g., the first representation bounces back like a trampoline after a weight is lifted off of the trampoline). In some embodiments, prior to replacing the second user interface with the first user interface, the device detects (8528) an increase in intensity of the second contact above the respective intensity threshold. In response to detecting the increase in intensity of the second contact, the device displays (8530) a second animation of the second representation distorting (e.g., stretching backward into the display like a trampoline with a weight placed on it) in accordance with the increase in intensity of the second contact. In some embodiments, the second user interface is replaced with the first user interface in response to detecting a decrease in intensity and/or liftoff of the second contact and includes displaying an animation of a reverse of the distortion of the second representation (e.g., the second representation bounces back like a trampoline after a weight is lifted off of the trampoline).

In some embodiments, the first animation includes (8532) adjusting display of the first representation by displaying a plurality of visual cues (e.g., visual cues associated with a respective physical metaphor) in accordance with the intensity of the first contact (e.g., moving a center of the first representation downward and showing distortion of the edges of the first representation to indicate that the first representation is stretching downward in accordance with the intensity of the first contact). The second animation includes adjusting display of the second representation by displaying the plurality of visual cues (e.g., visual cues associated with the same respective physical metaphor) in accordance with the intensity of the second contact (e.g., moving a center of the second representation downward and showing distortion of the edges of the second representation to indicate that the second representation is stretching downward in accordance with the intensity of the second contact).

In some embodiments, the first animation and the second animation include similar distortions of corresponding user interface elements displayed on the display. It is intended that many other transitions and/or animations fall within the scope of the current disclosure. For instance, several alternative animations are discussed herein with reference to FIGS. 17A-17H.

It should be understood that the particular order in which the operations in FIGS. 18A-18C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 8500 described above with respect to FIGS. 18A-18C. For example, the contacts, gestures, user interface objects, intensity thresholds, focus selectors, animations described above with reference to method 8500 optionally have one or more of the characteristics of the contacts, gestures, user interface objects, intensity thresholds, focus selectors, animations described herein with reference to other methods described herein (e.g., those listed in the fifth paragraph of the Description of Embodiments). For brevity, these details are not repeated here.

Figure 19:
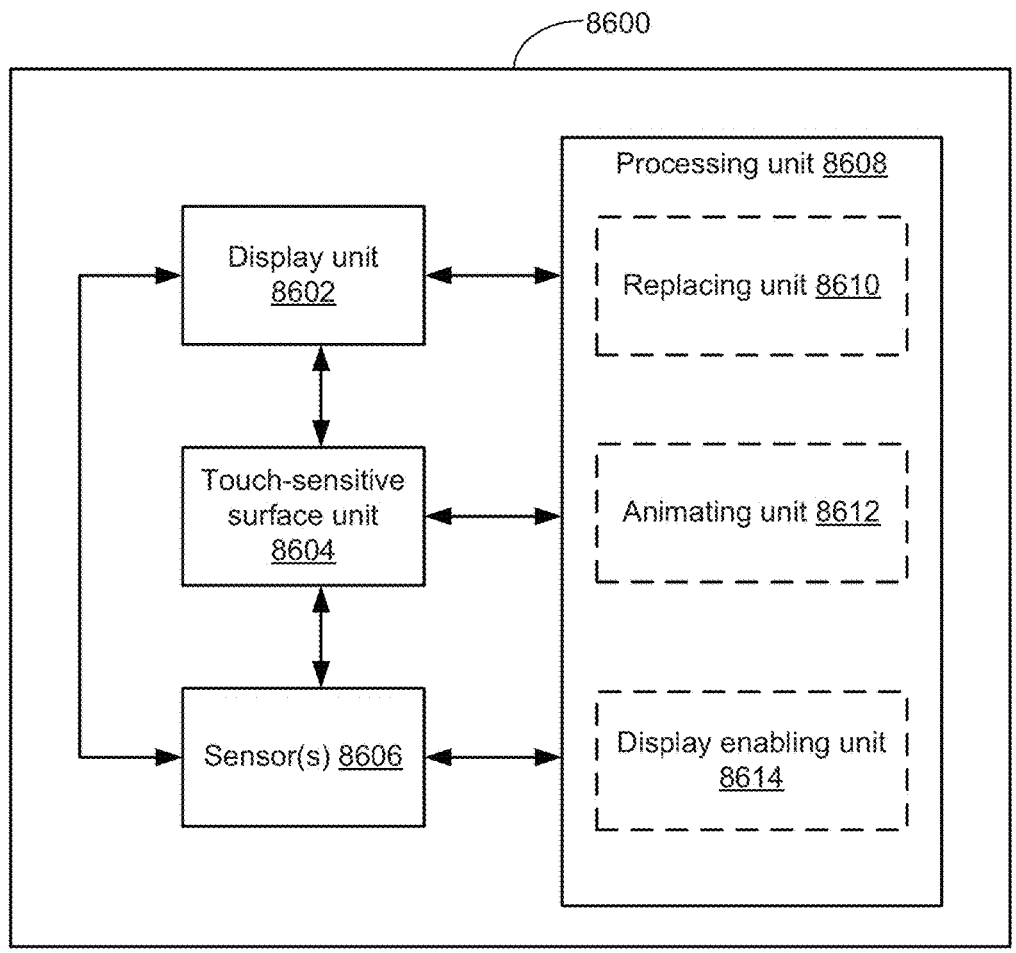
FIG. 19 is a functional block diagram of an electronic device in accordance with some embodiments.

In accordance with some embodiments, FIG. 19 shows a functional block diagram of an electronic device 8600 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 19 are, optionally, combined or separated into sub-blocks to implement the principles of the various described embodiments. Therefore, the description herein optionally supports any possible combination or separation or further definition of the functional blocks described herein.

As shown in FIG. 19, an electronic device 8600 includes a display unit 8602 configured to display a first user interface that includes a first representation of an object and a second user interface that includes a second representation of the object; a touch-sensitive surface unit 8604 configured to detect while a focus selector is over the first representation of an object in the first user interface, a first gesture on the touch-sensitive surface unit that includes a first contact with a maximum intensity during the first gesture above a respective intensity threshold, and to detect, while the focus selector is over the second representation of the object in the second user interface, a second gesture on the touch-sensitive surface unit that includes a second contact with a maximum intensity during the second gesture above the respective intensity threshold; one or more sensor units 8606 configured to detect intensity of contacts with the touch-sensitive surface unit 8604; and a processing unit 8608 coupled to the display unit 8602, the touch-sensitive surface unit 8604 and the one or more sensor units 8606. In some embodiments, the processing unit 8608 includes a replacing unit 8610, an animating unit 8612, and a display enabling unit 8614.

The processing unit 8608 is configured to: in response to detecting the first gesture, replace (e.g., with replacing unit 8610) the first user interface with the second user interface; and in response to detecting the second gesture, replace the second user interface with the first user interface.

In some embodiments, the respective intensity threshold corresponds to an intensity measurement that is greater than a nominal intensity measurement that indicates that a contact is touching the touch-sensitive surface unit 8604.

In some embodiments, the second gesture is a repetition of the first gesture.

In some embodiments, the object is an electronic message; the first representation is a message list entry in a list of electronic messages; and the second representation is a view of the electronic message that corresponds to the message list entry.

In some embodiments, the object is an electronic document; the first representation is an icon that corresponds to the electronic document; and the second representation is a view of the electronic document.

In some embodiments, the first user interface includes a list with a plurality of entries that represent corresponding objects, wherein the first representation of the object is one of the entries in the list; and replacing the first user interface with the second user interface includes: sliding a first set of one or more of the entries away from the first representation of the object in a first direction; and sliding a second set of one or more of the entries away from the first representation of the object in a second direction different from the first direction.

In some embodiments, the first user interface includes a list with a plurality of entries that represent corresponding objects, wherein the first representation of the object is one of the entries in the list; and replacing the second user interface with the first user interface includes: sliding a first set of one or more of the entries toward the first representation of the object in a first direction; and sliding a second set of one or more of the entries toward the first representation of the object in a second direction different from the first direction.

In some embodiments, the processing unit 8608 is further configured to: prior to replacing the first user interface with the second user interface: detect an increase in intensity of the first contact above the respective intensity threshold; and in response to detecting the increase in intensity of the first contact, display a first animation of the first representation distorting in accordance with the increase in intensity of the first contact; prior to replacing the second user interface with the first user interface: detect an increase in intensity of the second contact above the respective intensity threshold; and in response to detecting the increase in intensity of the second contact, display a second animation of the second representation distorting in accordance with the increase in intensity of the second contact.

In some embodiments, the first animation includes adjusting display of the first representation by displaying a plurality of visual cues in accordance with the intensity of the first contact; and the second animation includes adjusting display of the second representation by displaying the plurality of visual cues in accordance with the intensity of the second contact.

The operations in the information processing methods described above are optionally implemented by running one or more functional modules in information processing apparatus such as general purpose processors (e.g., as described above with respect to FIGS. 1A and 3) or application specific chips.

The operations described above with reference to FIGS. 18A-18E are, optionally, implemented by components depicted in FIGS. 1A-1B or FIG. 19. For example, detection operation 8504, replacing operation 8508, and animating operation 8532 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations have been described above is merely exemplary and is not intended to indicate that the described order is the only order in which the operations could be performed. One of ordinary skill in the art would recognize various ways to reorder the operations described herein. Additionally, it should be noted that the various processes separately described herein (e.g., those listed in the fifth paragraph of the Description of Embodiments) can be combined with each other in different arrangements. For example, the contacts, user interface objects, tactile sensations, intensity thresholds, and/or focus selectors described above with reference to any one of the various processes separately described herein (e.g., those listed in the fifth paragraph of the Description of Embodiments) optionally have one or more of the characteristics of the contacts, gestures, user interface objects, tactile sensations, intensity thresholds, and focus selectors described herein with reference to one or more of the other methods described herein (e.g., those listed in the fifth paragraph of the Description of Embodiments). For brevity, all of the various possible combinations are not specifically enumerated here, but it should be understood that the claims described above may be combined in any way that is not precluded by mutually exclusive claim features.

The foregoing description, for purpose of explanation, has been described with reference to specific embodiments. However, the illustrative discussions above are not intended to be exhaustive or to limit the various described embodiments to the precise forms disclosed. Many modifications and variations are possible in view of the above teachings. The embodiments were chosen and described in order to best explain the principles of the various described embodiments and their practical applications, to thereby enable others skilled in the art to best utilize the various described embodiments with various modifications as are suited to the particular use contemplated.

What is claimed is:

1. A non-transitory computer readable storage medium storing one or more programs, the one or more programs comprising instructions, which when executed by an electronic device with a display, a touch-sensitive surface and one or more sensors to detect intensities of contacts with the touch-sensitive surface, cause the device to:
concurrently display, on the display, first document content and a back button to navigate to prior content;
while concurrently displaying the first document content and the back button, detect a contact on the touch-sensitive surface while a focus selector corresponding to the contact is at a location of the back button on the display, wherein the back button is associated with prior document content that is not initially displayed on the display; and
while the focus selector is at the location of the back button:
in accordance with a determination that the contact has an intensity above a second intensity threshold before a predefined delay time has elapsed with the focus selector at the location of the back button, display, concurrently with the first document content, multiple representations of the prior document content without waiting until the predefined delay time has elapsed; and
in accordance with a determination that the contact has an intensity below the second intensity threshold, wait until the predefined delay time has elapsed while the focus selector is at the location of the back button with an intensity between a first intensity threshold and the second intensity threshold to display, concurrently with the first document content, the multiple representations of the prior document content.

2. The non-transitory computer readable storage medium of claim 1, including instructions which cause the device to:
detect a tap gesture on the touch-sensitive surface while the focus selector is at the location of the back button; and,
in response to detecting the tap gesture, perform an operation associated with the back button.

3. An electronic device, comprising:
a display;
a touch-sensitive surface;
one or more sensors to detect intensities of contacts with the touch-sensitive surface;
one or more processors;
memory; and
one or more programs, wherein the one or more programs are stored in the memory and configured to be executed by the one or more processors, the one or more programs including instructions for:
concurrently displaying, on the display, first document content and a back button to navigate to prior content;
while concurrently displaying the first document content and the back button, detecting a contact on the touch-sensitive surface while a focus selector corresponding to the contact is at a location of the back button on the display, wherein the back button is associated with prior document content that is not initially displayed on the display; and
while the focus selector is at the location of the back button:
in accordance with a determination that the contact has an intensity above a second intensity threshold before a predefined delay time has elapsed with the focus selector at the location of the back button, displaying, concurrently with the first document content, multiple representations of the prior document content without waiting until the predefined delay time has elapsed; and
in accordance with a determination that the contact has an intensity below the second intensity threshold, waiting until the predefined delay time has elapsed while the focus selector is at the location of the back button with an intensity between a first intensity threshold and the second intensity threshold to display, concurrently with the first document content, the multiple representations of the prior document content.

4. A method, comprising:

at an electronic device with a touch-sensitive surface and a display, wherein the device includes one or more sensors to detect intensities of contacts with the touch-sensitive surface:

concurrently displaying, on the display, first document content and a back button to navigate to prior content;

while concurrently displaying the first document content and the back button, detecting a contact on the touch-sensitive surface while a focus selector corresponding to the contact is at a location of the back button on the display, wherein the back button is associated with prior document content that is not initially displayed on the display; and while the focus selector is at the location of the back button:

in accordance with a determination that the contact has an intensity above a second intensity threshold before a predefined delay time has elapsed with the focus selector at the location of the back button, displaying, concurrently with the first document content, multiple representations of the prior document content without waiting until the predefined delay time has elapsed; and in accordance with a determination that the contact has an intensity below the second intensity threshold, waiting until the predefined delay time has elapsed while the focus selector is at the location of the back button with an intensity between a first intensity threshold and the second intensity threshold to display, concurrently with the first document content, the multiple representations of the prior document content.

5. The device of claim 3, including instructions for:

detecting a tap gesture on the touch-sensitive surface while the focus selector is at the location of the back button; and, in response to detecting the tap gesture, perform an operation associated with the back button.

6. The method of claim 4, including:

detecting a tap gesture on the touch-sensitive surface while the focus selector is at the location of the back button; and, in response to detecting the tap gesture, perform an operation associated with the back button.

7. The non-transitory computer readable storage medium of claim 1, wherein the multiple representations of the prior document content include a representation of the first document.

8. The non-transitory computer readable storage medium of claim 1, wherein the first intensity threshold is greater than a contact detection intensity threshold.

9. The non-transitory computer readable storage medium of claim 1, including instructions which, in accordance with a determination that the intensity of the contact has increased above the second intensity threshold, cause the device to output, by one or more tactile output generators, a tactile output.

10. The device of claim 3, wherein the multiple representations of the prior document content include a representation of the first document.

11. The device of claim 3, wherein the first intensity threshold is greater than a contact detection intensity threshold.

12. The device of claim 3, including instructions for, in accordance with a determination that the intensity of the contact has increased above the second intensity threshold, outputting, by one or more tactile output generators of the electronic device, a tactile output.

13. The method of claim 4, wherein the multiple representations of the prior document content include a representation of the first document.

14. The method of claim 4, wherein the first intensity threshold is greater than a contact detection intensity threshold.

15. The method of claim 4, including, in accordance with a determination that the contact has increased above the second intensity threshold, outputting, by one or more tactile output generators of the electronic device, a tactile output.

* * * * *

UNITED STATES PATENT AND TRADEMARK OFFICE
CERTIFICATE OF CORRECTION

PATENT NO. : 9,823,839 B2
APPLICATION NO. : 14/536426
DATED : November 21, 2017
INVENTOR(S) : Brown et al.

Page 1 of 1

It is certified that error appears in the above-identified patent and that said Letters Patent is hereby corrected as shown below:

In the Claims

Claim 9, Column 80, Line 19, please delete "second intensity" and insert --second respective intensity--;

Claim 15, Column 80, Line 41, please delete "second intensity" and insert --second respective intensity--.

Signed and Sealed this
Thirtieth Day of January, 2018

Joseph Matal
*Performing the Functions and Duties of the*
*Under Secretary of Commerce for Intellectual Property and*
*Director of the United States Patent and Trademark Office*